US012718975B2

(12) United States Patent
Kirichenko et al.

(10) Patent No.: US 12,718,975 B2
(45) Date of Patent: Aug. 25, 2026

(54) SYSTEM AND METHOD OF FLUX BIAS FOR SUPERCONDUCTING QUANTUM CIRCUITS

(71) Applicant: SeeQC, Inc., Elmsford, NY (US)

(72) Inventors: Alex F. Kirichenko, Pleasantville, NY (US); Amir Jafari-Salim, Monroe, NY (US); Patrick Truitt, Harrison, NY (US); Naveen Kumar Katam, Ossining (IN); Caleb Jordan, Peekskill, NY (US); Oleg A. Mukhanov, Putnam Valley, NY (US)

(73) Assignee: SeeQC Inc., Elmsford, NY (US)

( * ) Notice: Subject to any disclaimer, the term of this patent is extended or adjusted under 35 U.S.C. 154(b) by 169 days.

(21) Appl. No.: 18/829,112

(22) Filed: Sep. 9, 2024

(65) Prior Publication Data

US 2024/0428970 A1 Dec. 26, 2024

Related U.S. Application Data

(63) Continuation of application No. 17/838,207, filed on Jun. 11, 2022, now Pat. No. 12,087,503.

(60) Provisional application No. 63/209,937, filed on Jun. 11, 2021.

(51) Int. Cl.
*H01F 6/00* (2006.01)

(52) U.S. Cl.
CPC .................................... *H01F 6/006* (2013.01)

(58) Field of Classification Search
CPC .......... H01F 6/006; B82Y 10/00; G06N 10/40
USPC .......................................................... 361/141
See application file for complete search history.

(56) References Cited

U.S. PATENT DOCUMENTS

| | | | |
|---|---|---|---|
| 5,170,080 | A | 12/1992 | Murphy |
| 5,233,242 | A | 8/1993 | Murphy |
| 5,233,243 | A | 8/1993 | Murphy |
| 5,289,400 | A | 2/1994 | Przybysz |
| 5,388,068 | A | 2/1995 | Ghoshal |
| 5,389,837 | A | 2/1995 | Hietala |

(Continued)

FOREIGN PATENT DOCUMENTS

WO WO-2016000836 A1 * 1/2016 ........... C23C 14/541

OTHER PUBLICATIONS

Microwaves in Quantum Computing, JosephC.Bardin, Daniel H. Slichter, and David J. Reilly, IEEE Journal of Microwaves 1, 403-427 (2021), arXiv:2011.01480 (Year: 2021).*

(Continued)

*Primary Examiner* — Sreeya Sreevatsa
(74) *Attorney, Agent, or Firm* — Hoffberg & Associates; Steven M. Hoffberg

(57) ABSTRACT

Quantum computing systems require methods to control energies of qubits and couplers for quantum operations. Flux biasing of qubits and quantum couplers is provided for a superconducting quantum computer using single-flux-quantum (SFQ) technology. This method is applicable to a wide range of superconducting qubit structures and couplers, including transmons, fluxoniums, flux qubits, phase qubits and other superconducting qubits. This method enables arbitrary-amplitude time-varying flux biasing of qubits and couplers, due to a sequence of high-speed SFQ pulses. Several preferred embodiments are disclosed which provide high-fidelity control of fast single-qubit and multi-qubit operations.

20 Claims, 27 Drawing Sheets

(56) References Cited

U.S. PATENT DOCUMENTS 5,598,105 A 1/1997 Kurosawa
5,629,889 A 5/1997 Chandra
5,781,009 A 7/1998 Lee
5,793,055 A 8/1998 Kastalsky
5,818,373 A 10/1998 Semenov
5,936,458 A 8/1999 Rylov
5,963,351 A 10/1999 Kaplounenko
6,023,161 A 2/2000 Dantsker
6,175,749 B1 1/2001 Wördenweber
6,188,236 B1 2/2001 Wikborg
6,242,939 B1 6/2001 Nagasawa
6,331,805 B1 12/2001 Gupta
6,345,189 B1 2/2002 Wördenweber
6,345,190 B1 2/2002 Wördenweber
6,353,330 B1 3/2002 Kanda
6,459,097 B1 10/2002 Zagoskin
6,479,139 B1 11/2002 Claeson
6,486,694 B1 11/2002 Kirichenko
6,495,854 B1 12/2002 Newns
6,504,172 B2 1/2003 Zagoskin
6,507,234 B1 1/2003 Johnson
6,509,853 B2 1/2003 Gupta
6,518,786 B2 2/2003 Herr
6,537,847 B2 3/2003 Zagoskin
6,563,310 B2 5/2003 Zagoskin
6,563,311 B2 5/2003 Zagoskin
6,573,202 B2 6/2003 Ivanov
6,576,951 B2 6/2003 Ivanov
6,580,102 B2 6/2003 Ivanov
6,605,822 B1 8/2003 Blais
6,608,581 B1 8/2003 Semenov
6,614,047 B2 9/2003 Tzalenchuk
6,626,995 B2 9/2003 Kim
6,627,915 B1 9/2003 Ustinov
6,627,916 B2 9/2003 Amin
6,649,929 B2 11/2003 Newns
6,670,630 B2 12/2003 Blais
6,703,857 B2 3/2004 Kameda
6,724,216 B2 4/2004 Suzuki
6,725,248 B1 4/2004 Hasegawa
6,728,131 B2 4/2004 Ustinov
6,734,699 B1 5/2004 Herr
6,753,546 B2 6/2004 Tzalenchuk
6,756,925 B1 6/2004 Leung
6,773,836 B2 8/2004 Kim
6,781,435 B1 8/2004 Gupta
6,784,451 B2 8/2004 Amin
6,791,109 B2 9/2004 Tzalenchuk
6,803,599 B2 10/2004 Amin
6,812,484 B2 11/2004 Tzalenchuk
6,813,056 B2 11/2004 Cottrell
6,822,255 B2 11/2004 Tzalenchuk
6,838,694 B2 1/2005 Esteve
6,865,639 B2 3/2005 Herr
6,885,325 B2 4/2005 Omelyanchouk
6,897,468 B2 5/2005 Blais
6,900,454 B2 5/2005 Blais
6,900,456 B2 5/2005 Blais
6,905,887 B2 6/2005 Amin
6,909,109 B2 6/2005 Herr
6,911,664 B2 6/2005 Il'ichev
6,917,537 B2 7/2005 Bunyk
6,919,579 B2 7/2005 Amin
6,926,921 B2 8/2005 Stasiak
6,930,318 B2 8/2005 Vion
6,930,320 B2 8/2005 Blais
6,936,841 B2 8/2005 Amin
6,943,368 B2 9/2005 Amin
6,960,780 B2 11/2005 Blais
6,979,836 B2 12/2005 Zagoskin
6,984,846 B2 1/2006 Newns
6,987,282 B2 1/2006 Amin
7,002,174 B2 2/2006 Il'ichev
7,015,499 B1 3/2006 Zagoskin
7,018,852 B2 3/2006 Wu
7,042,005 B2 5/2006 Il'ichev
7,078,694 B2 7/2006 Polonsky
7,095,227 B2 8/2006 Tarutani
7,113,967 B2 9/2006 Cleve
7,129,870 B2 10/2006 Hirano
7,135,701 B2 11/2006 Amin
7,230,266 B2 6/2007 Hilton
7,253,654 B2 8/2007 Amin
7,268,576 B2 9/2007 Amin
7,268,713 B2 9/2007 Suzuki
7,280,623 B2 10/2007 Gupta
7,307,275 B2 12/2007 Lidar
7,313,199 B2 12/2007 Gupta
7,321,884 B2 1/2008 Burkard
7,332,738 B2 2/2008 Blais
7,335,909 B2 2/2008 Amin
7,362,125 B2 4/2008 Gupta
7,364,923 B2 4/2008 Lidar
7,365,663 B2 4/2008 Rylov
7,400,282 B2 7/2008 Tanaka
7,418,283 B2 8/2008 Amin
7,428,562 B2 9/2008 Beausoleil
7,440,490 B2 10/2008 Kidiyarova-Shevchenko
7,443,719 B2 10/2008 Kirichenko
7,468,630 B2 12/2008 Inamdar
7,498,832 B2 3/2009 Baumgardner
7,505,310 B2 3/2009 Nagasawa
7,508,230 B2 3/2009 Kirichenko
7,533,068 B2 5/2009 van den Brink
7,550,759 B2 6/2009 Hakonen
7,554,369 B2 6/2009 Kirichenko
7,570,075 B2 8/2009 Gupta
7,598,897 B2 10/2009 Kirichenko
7,605,600 B2 10/2009 Harris
7,613,764 B1 11/2009 Hilton
7,613,765 B1 11/2009 Hilton
7,619,437 B2 11/2009 Thom
7,624,088 B2 11/2009 Johnson
7,639,035 B2 12/2009 Berkley
7,687,938 B2 3/2010 Bunyk
7,689,068 B1 3/2010 Wang
7,714,605 B2 5/2010 Baumgardner
7,724,020 B2 5/2010 Herr
7,724,083 B2 5/2010 Herring
7,749,922 B2 7/2010 Bezryadin
7,772,871 B2 8/2010 Herr
7,782,077 B2 8/2010 Herr
7,786,748 B1 8/2010 Herr
7,788,192 B2 8/2010 Amin
7,800,395 B2 9/2010 Johnson
7,843,209 B2 11/2010 Berkley
7,844,656 B2 11/2010 Macready
7,847,615 B2 12/2010 Yorozu
7,852,106 B2 12/2010 Herr
7,858,966 B2 12/2010 Kitaev
7,863,892 B2 1/2011 Morley
7,868,645 B2 1/2011 Herr
7,870,087 B2 1/2011 Macready
7,875,876 B1 1/2011 Wandzura
7,876,145 B2 1/2011 Koch
7,876,248 B2 1/2011 Berkley
7,877,333 B2 1/2011 Macready
7,880,529 B2 2/2011 Amin
7,889,992 B1 2/2011 DiVincenzo
7,893,708 B2 2/2011 Baumgardner
7,898,282 B2 3/2011 Harris
7,899,852 B2 3/2011 Amin
7,912,656 B2 3/2011 Berns
7,925,614 B2 4/2011 Burkard
7,932,514 B2 4/2011 Farinelli
7,932,515 B2 4/2011 Bunyk
7,969,178 B2 6/2011 Przybysz
7,969,805 B2 6/2011 Thom
7,977,668 B2 7/2011 Nevirkovets
7,982,646 B2 7/2011 Herr
7,984,012 B2 7/2011 Coury
7,990,662 B2 8/2011 Berkley
8,008,942 B2 8/2011 van den Brink
8,008,991 B2 8/2011 Tcaciuc

(56) References Cited

U.S. PATENT DOCUMENTS 8,018,244 B2 9/2011 Berkley
8,032,474 B2 10/2011 Macready
8,035,540 B2 10/2011 Berkley
8,063,657 B2 11/2011 Rose
8,073,808 B2 12/2011 Rose
8,089,286 B2 1/2012 Silva
8,098,179 B2 1/2012 Bunyk
8,102,185 B2 1/2012 Johansson
8,111,083 B1 2/2012 Pesetski
8,138,784 B2 3/2012 Przybysz
8,138,880 B2 3/2012 Keefe
8,159,313 B2 4/2012 Uchaykin
8,169,231 B2 5/2012 Berkley
8,174,305 B2 5/2012 Harris
8,175,995 B2 5/2012 Amin
8,190,548 B2 5/2012 Choi
8,195,596 B2 6/2012 Rose
8,195,726 B2 6/2012 Macready
8,222,899 B2 7/2012 Horng
8,228,688 B2 7/2012 Uchaykin
8,229,863 B2 7/2012 Amin
8,234,103 B2 7/2012 Biamonte
8,244,650 B2 8/2012 Rose
8,244,662 B2 8/2012 Coury
8,247,799 B2 8/2012 Bunyk
8,275,428 B2 9/2012 Bonderson
8,279,022 B2 10/2012 Thom
8,283,943 B2 10/2012 van den Brink
8,284,585 B2 10/2012 Maekawa
8,294,138 B2 10/2012 Farinelli
8,315,969 B2 11/2012 Roetteler
8,355,765 B2 1/2013 Uchaykin
8,386,554 B2 2/2013 Macready
8,405,468 B2 3/2013 Uchaykin
8,421,053 B2 4/2013 Bunyk
8,437,168 B2 5/2013 Maekawa
8,441,329 B2 5/2013 Thom
8,461,862 B2 6/2013 Pesetski
8,494,993 B2 7/2013 Harris
8,504,497 B2 8/2013 Amin
8,508,280 B2 8/2013 Naaman
8,536,566 B2 9/2013 Johansson
8,560,282 B2 10/2013 Macready
8,560,470 B2 10/2013 Amin
8,571,614 B1 10/2013 Mukhanov
8,604,944 B2 12/2013 Berkley
8,606,341 B2 12/2013 Bonderson
8,611,974 B2 12/2013 Maibaum
8,648,331 B2 2/2014 Bonderson
8,654,578 B2 2/2014 Lewis
8,655,828 B2 2/2014 Rose
8,659,007 B2 2/2014 Bonderson
8,670,807 B2 3/2014 Rose
8,686,751 B2 4/2014 van den Brink
8,738,105 B2 5/2014 Berkley
8,745,850 B2 6/2014 Farinelli
8,748,196 B2 6/2014 Bonderson
8,748,950 B2 6/2014 Levy
8,772,759 B2 7/2014 Bunyk
8,786,476 B2 7/2014 Bunyk
8,812,066 B2 8/2014 Lanting
8,841,764 B2 9/2014 Poletto
8,854,074 B2 10/2014 Berkley
8,861,619 B2 10/2014 McDermott
8,872,360 B2 10/2014 Chow
8,874,629 B2 10/2014 Macready
8,892,857 B2 11/2014 Ozols
8,922,239 B2 12/2014 Pesetski
8,928,391 B2 1/2015 Naaman
8,951,808 B2 2/2015 Ladizinsky
8,975,912 B2 3/2015 Chow
8,977,576 B2 3/2015 Macready
9,015,215 B2 4/2015 Berkley
9,026,574 B2 5/2015 Macready
9,040,959 B2 5/2015 Lutchyn
9,041,427 B2 5/2015 Gambetta
9,059,674 B2 6/2015 Chow
9,059,707 B2 6/2015 Gambetta
9,069,928 B2 6/2015 van den Brink
9,129,224 B2 9/2015 Lanting
9,130,116 B1 9/2015 Tolpygo
9,134,047 B2 9/2015 Black
9,152,923 B2 10/2015 Harris
9,152,924 B2 10/2015 Bonderson
9,162,881 B2 10/2015 Biamonte
9,170,278 B2 10/2015 Neufeld
9,178,154 B2 11/2015 Bunyk
9,183,508 B2 11/2015 King
9,192,085 B2 11/2015 Chavez
9,207,672 B2 12/2015 Williams
9,208,446 B2 12/2015 Pesetski
9,218,567 B2 12/2015 Macready
9,231,181 B2 1/2016 Thom
9,235,811 B2 1/2016 Stoltz
9,240,773 B1 1/2016 Mukhanov
9,256,834 B2 2/2016 Bonderson
9,275,011 B2 3/2016 Svore
9,335,385 B2 5/2016 Lanting
9,344,092 B2 5/2016 Abraham
9,350,460 B2 5/2016 Paik
9,355,364 B2 5/2016 Miller
9,355,365 B2 5/2016 Berkley
9,361,169 B2 6/2016 Berkley
9,369,133 B2 6/2016 Naaman
9,379,303 B2 6/2016 Gambetta
9,384,827 B1 7/2016 Reohr
9,385,293 B1 7/2016 Nayfeh
9,385,294 B2 7/2016 Rigetti
9,396,440 B2 7/2016 Macready
9,400,499 B2 7/2016 Williams
9,405,876 B2 8/2016 Macready
9,406,026 B2 8/2016 Bunyk
9,412,074 B2 8/2016 Troyer
9,424,526 B2 8/2016 Ranjbar
9,425,377 B2 8/2016 Moyerman
9,425,804 B2 8/2016 McDermott, III
9,432,024 B2 8/2016 Chow
9,437,800 B1 9/2016 McDermott, III
9,438,246 B1 9/2016 Naaman
9,454,061 B1 9/2016 Abdo
9,455,391 B1 9/2016 Nayfeh
9,460,397 B2 10/2016 Apalkov
9,461,588 B1 10/2016 Naaman
9,471,880 B2 10/2016 Williams
9,473,124 B1 10/2016 Mukhanov
9,490,296 B2 11/2016 Ladizinsky
9,495,644 B2 11/2016 Chudak
9,501,747 B2 11/2016 Roy
9,501,748 B2 11/2016 Naaman
9,503,063 B1 11/2016 Abraham
9,509,274 B2 11/2016 Naaman
9,514,415 B2 12/2016 Bocharov
9,520,180 B1 12/2016 Mukhanov
9,524,470 B1 12/2016 Chow
9,547,826 B2 1/2017 King
9,548,742 B1 1/2017 Abdo
9,559,284 B2 1/2017 Chang
9,588,940 B2 3/2017 Hamze
9,594,726 B2 3/2017 Macready
9,595,969 B2 3/2017 Miller
9,607,270 B2 3/2017 Harris
9,614,532 B1 4/2017 Bulzacchelli
9,633,314 B2 4/2017 Kwon
9,646,682 B1 5/2017 Miller
9,647,662 B1 5/2017 Abutaleb
9,663,358 B1 5/2017 Cory
9,665,539 B1 5/2017 Macready
9,680,452 B1 6/2017 Abdo
9,685,935 B2 6/2017 Strand
9,692,423 B2 6/2017 McDermott, III
9,697,473 B2 7/2017 Abdo
9,699,266 B2 7/2017 Rose
9,710,758 B2 7/2017 Bunyk
9,727,527 B2 8/2017 van den Brink

(56) References Cited

U.S. PATENT DOCUMENTS 9,727,823 B2 8/2017 Amin
9,727,824 B2 8/2017 Rose
9,735,776 B1 8/2017 Abdo
9,741,918 B2 8/2017 Yohannes
9,741,920 B1 8/2017 Tolpygo
9,748,976 B2 8/2017 Naaman
9,755,133 B1 9/2017 Nayfeh
9,761,305 B2 9/2017 Reohr
9,762,200 B2 9/2017 Thom
9,767,238 B2 9/2017 Oberg
9,768,371 B2 9/2017 Ladizinsky
9,768,771 B2 9/2017 Naaman
9,779,360 B2 10/2017 Bunyk
9,780,764 B2 10/2017 Pesetski
9,780,765 B2 10/2017 Naaman
9,787,278 B1 10/2017 Abdo
9,787,312 B2 10/2017 Herr
9,793,913 B2 10/2017 Bulzacchelli
9,806,711 B1 10/2017 Abdo
9,812,836 B1 11/2017 Osborn
9,818,064 B1 11/2017 Abdo
9,836,699 B1 12/2017 Rigetti
9,845,153 B2 12/2017 Sekelsky
9,853,645 B1 12/2017 Mukhanov
9,865,648 B2 1/2018 Bunyk
9,870,277 B2 1/2018 Berkley
9,875,215 B2 1/2018 Macready
9,875,444 B2 1/2018 King
9,880,365 B2 1/2018 Goutzoulis
9,881,256 B2 1/2018 Hamze
9,882,112 B2 1/2018 Kwon
9,887,000 B1 2/2018 Mukhanov
9,892,365 B2 2/2018 Rigetti
9,909,460 B2 3/2018 Allen
9,913,414 B2 3/2018 Sadleir
9,917,580 B2 3/2018 Naaman
9,922,289 B2 3/2018 Abdo
9,928,948 B2 3/2018 Naaman
9,929,978 B2 3/2018 Naaman
9,935,252 B2 4/2018 Abraham
9,940,586 B1 4/2018 Epstein
9,945,917 B2 4/2018 Drake
9,948,254 B2 4/2018 Narla
9,952,830 B2 4/2018 Tomaru
9,953,268 B2 4/2018 Abdo
9,953,269 B2 4/2018 Chow
9,966,926 B2 5/2018 Abdo
9,971,970 B1 5/2018 Rigetti
9,978,020 B1 5/2018 Gambetta
9,978,809 B2 5/2018 Ladizinsky
9,984,333 B2 5/2018 Biamonte
9,991,864 B2 6/2018 Strong
9,996,801 B2 6/2018 Shim
9,998,122 B2 6/2018 Hamilton
10,002,107 B2 6/2018 Lanting
10,006,859 B2 6/2018 Ashrafi
10,012,704 B2 7/2018 Coar
10,013,657 B2 7/2018 Bourassa
10,014,859 B2 7/2018 Abdo
10,020,438 B2 7/2018 Yazdani
10,031,887 B2 7/2018 Raymond
10,037,493 B2 7/2018 Harris
10,042,805 B2 8/2018 Naaman
10,044,638 B2 8/2018 Dadashikelayeh
10,050,630 B2 8/2018 Reagor
10,056,540 B2 8/2018 Abraham
10,056,908 B2 8/2018 Rigetti
10,062,828 B2 8/2018 Abdo
10,062,829 B1 8/2018 Abdo
10,068,180 B2 9/2018 Amin
10,068,181 B1 9/2018 Rigetti
10,068,184 B1 9/2018 Hertzberg
10,074,056 B2 9/2018 Epstein
10,074,792 B1 9/2018 Ferguson
10,074,793 B2 9/2018 Abdo
10,084,436 B2 9/2018 Goto
10,084,454 B1 9/2018 Braun
10,097,143 B2 10/2018 Abdo
10,097,151 B2 10/2018 Thom
10,097,186 B1 10/2018 Epstein
10,097,281 B1 10/2018 Vernik
10,103,730 B1 10/2018 Abdo
10,108,071 B2 10/2018 Abdo
10,121,754 B2 11/2018 Oliver
10,122,351 B1 11/2018 Naaman
10,127,500 B2 11/2018 Abdo
10,133,959 B2 11/2018 Ahn
10,133,984 B2 11/2018 Clarke
10,134,972 B2 11/2018 Oliver
10,140,248 B2 11/2018 van den Brink
10,140,404 B2 11/2018 Rigetti
10,141,493 B2 11/2018 Tuckerman
10,141,928 B2 11/2018 Abdo
10,147,865 B1 12/2018 Tahan
10,158,343 B1 12/2018 Keane
10,161,870 B2 12/2018 Ashrafi
10,164,606 B1 12/2018 Keane
10,169,714 B2 1/2019 Chow
10,170,680 B2 1/2019 Abraham
10,170,681 B1 1/2019 Rosenblatt
10,171,077 B2 1/2019 Abdo
10,176,432 B2 1/2019 Abdo
10,177,297 B2 1/2019 Marcus
10,187,065 B2 1/2019 Kerman
10,192,168 B2 1/2019 Rigetti
10,197,497 B2 2/2019 Kolkowitz
10,199,553 B1 2/2019 Oliver
10,209,192 B2 2/2019 Ashrafi
10,210,460 B2 2/2019 Abdo
10,211,798 B2 2/2019 Abdo
10,229,355 B2 3/2019 Ronagh
10,229,366 B2 3/2019 Gambetta
10,230,038 B2 3/2019 Abdo
10,235,634 B1 3/2019 Chen
10,235,635 B1 3/2019 Abdo
10,236,432 B2 3/2019 Abdo
10,242,968 B2 3/2019 Das
10,243,132 B1 3/2019 Rosenblatt
10,250,271 B2 4/2019 Goto
10,255,557 B2 4/2019 Epstein
10,256,206 B2 4/2019 Falcon
10,256,392 B1 4/2019 Brink
10,262,276 B2 4/2019 Puri
10,262,727 B2 4/2019 Przybysz
10,263,170 B1 4/2019 Brink
10,268,622 B2 4/2019 Hilton
10,268,968 B2 4/2019 Abraham
10,275,422 B2 4/2019 Israel
10,275,556 B2 4/2019 Sarpeshkar
10,275,718 B2 4/2019 Kerman
10,276,771 B2 4/2019 Abdo
10,276,772 B2 4/2019 Abdo
10,281,278 B2 5/2019 Moxley, III
10,282,675 B2 5/2019 Bloom
10,283,693 B2 5/2019 Kerman
10,283,694 B2 5/2019 Yohannes
10,289,960 B2 5/2019 Chow
10,290,798 B2 5/2019 Harris
10,291,227 B2 5/2019 Abdo
10,304,004 B2 5/2019 Chow
10,304,005 B2 5/2019 Chow
10,305,015 B1 5/2019 Brink
10,311,369 B2 6/2019 Epstein
10,318,880 B2 6/2019 Pereverzev
10,318,881 B2 6/2019 Rose
10,319,896 B2 6/2019 Falcon
10,320,331 B1 6/2019 Abdo
10,320,383 B2 6/2019 Abdo
10,326,071 B2 6/2019 Uchaykin
10,332,023 B2 6/2019 Mezzacapo
10,332,024 B2 6/2019 Scheer
10,333,046 B2 6/2019 Abdo
10,333,047 B2 6/2019 Gilbert
10,333,048 B2 6/2019 Barkeshli

(56) References Cited

U.S. PATENT DOCUMENTS 10,339,239 B2 7/2019 Oberg
10,340,438 B2 7/2019 Rosenblatt
10,345,678 B2 7/2019 Abdo
10,346,348 B2 7/2019 Hastings
10,346,349 B2 7/2019 van den Brink
10,346,508 B2 7/2019 Amin
10,346,760 B2 7/2019 Mohseni
10,346,761 B2 7/2019 Clarke
10,347,813 B2 7/2019 Abdo
10,348,245 B1 7/2019 Abdo
10,352,992 B1 7/2019 Zeng
10,353,844 B2 7/2019 Naaman
10,354,198 B1 7/2019 Filipp
10,355,193 B2 7/2019 Rosenblatt
10,355,677 B1 7/2019 Miller
10,366,340 B2 7/2019 Przybysz
10,367,132 B2 7/2019 Krogstrup
10,367,133 B1 7/2019 Tahan
10,374,612 B1 8/2019 Sinclair
10,379,174 B2 8/2019 Hahn
10,379,420 B1 8/2019 Wang
10,380,494 B2 8/2019 Abraham
10,380,495 B2 8/2019 Leek
10,380,496 B2 8/2019 Elsherbini
10,381,541 B2 8/2019 Das
10,381,542 B2 8/2019 Chang
10,389,336 B1 8/2019 Miller
10,396,269 B2 8/2019 Oliver
10,396,782 B2 8/2019 Abdo
10,396,801 B2 8/2019 Kerman
10,398,031 B2 8/2019 Abdo
10,403,809 B2 9/2019 Krogstrup
10,404,214 B2 9/2019 Szöcs
10,411,321 B2 9/2019 Mueller
10,417,574 B2 9/2019 Babbush
10,418,540 B2 9/2019 Orcutt
10,423,888 B1 9/2019 Hertzberg
10,424,711 B2 9/2019 Schoelkopf, III
10,424,712 B2 9/2019 Schoelkopf, III
10,424,713 B2 9/2019 Rosenblatt
10,444,148 B2 10/2019 Ashrafi
10,452,991 B1 10/2019 Ganzhorn
10,453,894 B2 10/2019 Ladizinsky
10,454,015 B2 10/2019 Lanting
10,454,016 B2 10/2019 Fong
10,460,796 B1 10/2019 Mukhanov
10,461,385 B2 10/2019 Sliwa
10,467,543 B2 11/2019 Macready
10,467,544 B2 11/2019 Filipp
10,467,545 B2 11/2019 Harris
10,468,578 B2 11/2019 Elsherbini
10,468,740 B2 11/2019 Minev
10,468,793 B2 11/2019 Petroff
10,475,983 B1 11/2019 Rosenblatt
10,482,388 B1 11/2019 Jock
10,483,980 B2 11/2019 Sete
10,488,469 B2 11/2019 Martinis
10,489,477 B2 11/2019 Lanting
10,490,600 B2 11/2019 Freedman
10,491,178 B2 11/2019 Naaman
10,491,221 B1 11/2019 McKay
10,496,933 B1 12/2019 Karzig
10,496,934 B2 12/2019 Rigetti
10,497,853 B2 12/2019 Mutus
10,510,015 B2 12/2019 Mohseni
10,510,943 B1 12/2019 Topaloglu
10,527,746 B2 1/2020 Hansen
10,528,885 B2 1/2020 Chow
10,528,886 B2 1/2020 Boothby
10,528,887 B2 1/2020 Chen
10,535,013 B2 1/2020 Abdo
10,535,809 B1 1/2020 Vodrahalli
10,540,603 B2 1/2020 Naaman
10,540,604 B1 1/2020 Papageorge
10,541,659 B2 1/2020 Abdo
10,546,992 B2 1/2020 Fuhrer
10,546,993 B2 1/2020 Ferguson
10,552,755 B2 2/2020 Lanting
10,552,757 B2 2/2020 Amin
10,553,775 B2 2/2020 Goto
10,554,207 B1 2/2020 Herr
10,560,103 B2 2/2020 Reagor
10,565,515 B2 2/2020 Lampert
10,567,100 B2 2/2020 Abdo
10,571,530 B2 2/2020 Hansen
10,572,816 B1 * 2/2020 Vavilov .................. G06N 10/70
10,578,891 B1 3/2020 Schmeing
10,581,394 B2 3/2020 Abdo
10,586,908 B2 3/2020 Rosen
10,586,909 B2 3/2020 Das
10,586,911 B1 3/2020 Sandberg
10,593,858 B2 3/2020 Brink
10,593,879 B2 3/2020 Schrade
10,599,988 B2 3/2020 Thom
10,599,990 B2 3/2020 Leek
10,608,044 B1 3/2020 Herr
10,614,372 B2 4/2020 Mohseni
10,615,223 B2 4/2020 Rosenblatt
10,615,783 B2 4/2020 Powell, III
10,621,140 B2 4/2020 Raymond
10,621,502 B2 4/2020 Solgun
10,622,977 B2 4/2020 Naaman
10,622,998 B1 4/2020 Najafi-Yazdi
10,628,752 B2 4/2020 Abdo
10,628,753 B2 4/2020 Kelly
10,629,978 B2 4/2020 Abdo
10,635,988 B2 4/2020 Lutchyn
10,635,989 B2 4/2020 Blais
10,637,142 B1 4/2020 Tran
10,637,479 B2 4/2020 Hamilton
10,643,143 B2 5/2020 Bloom
10,644,217 B2 5/2020 Rosenblatt
10,644,809 B1 5/2020 Vernik
10,650,319 B2 5/2020 Medford
10,650,320 B2 5/2020 Chen
10,650,322 B1 5/2020 Temme
10,650,323 B2 5/2020 Epstein
10,651,361 B2 5/2020 Brink
10,651,808 B2 5/2020 Egan
10,657,198 B2 5/2020 Amin
10,657,455 B2 5/2020 Barzegar
10,657,456 B1 5/2020 Kharzeev
10,658,424 B2 5/2020 Oliver
10,665,635 B1 5/2020 Sandberg
10,665,701 B2 5/2020 Freedman
10,665,769 B2 5/2020 Caudillo
10,665,918 B2 5/2020 Mueller
10,671,559 B2 6/2020 Mohseni
10,671,937 B2 6/2020 Yarkoni
10,677,953 B2 6/2020 Stetson
10,686,007 B2 6/2020 George
10,686,115 B2 6/2020 Abdo
10,691,633 B2 6/2020 van den Brink
10,692,010 B2 6/2020 Freedman
10,693,566 B2 6/2020 Sliwa
10,700,256 B2 6/2020 Ladizinsky
10,700,257 B2 6/2020 Jinka
10,705,163 B2 7/2020 Barry
10,706,366 B2 7/2020 Scheer
10,707,402 B2 7/2020 Rosenblatt
10,707,812 B2 7/2020 Abdo
10,707,873 B2 7/2020 Katam
10,712,408 B2 7/2020 Pham
10,713,584 B2 7/2020 Mohseni
10,715,083 B2 7/2020 Abdo
10,719,775 B2 7/2020 Kerman
10,719,776 B1 7/2020 Kelly
10,720,562 B2 7/2020 Krogstrup
10,720,563 B1 7/2020 Jeffrey
10,720,887 B2 7/2020 Abdo
10,725,131 B2 7/2020 Clerk
10,726,351 B1 7/2020 Li
10,726,353 B2 7/2020 Ashrafi
10,735,003 B2 8/2020 Kerman

(56) References Cited

U.S. PATENT DOCUMENTS

| | | | |
|---|---|---|---|
| 10,740,688 | B2 | 8/2020 | Selvanayagam |
| 10,741,742 | B2 | 8/2020 | David |
| 10,741,744 | B2 | 8/2020 | Moodera |
| 10,748,078 | B2 | 8/2020 | Filipp |
| 10,748,079 | B2 | 8/2020 | Boothby |
| 10,748,082 | B2 | 8/2020 | Rigetti |
| 10,748,960 | B2 | 8/2020 | Michalak |
| 10,748,961 | B2 | 8/2020 | Michalak |
| 10,749,095 | B2 | 8/2020 | Ferguson |
| 10,749,096 | B2 | 8/2020 | Przybysz |
| 10,755,190 | B2 | 8/2020 | Tcaciuc |
| 10,755,194 | B2 | 8/2020 | Mohseni |
| 10,756,004 | B1 | 8/2020 | Elsherbini |
| 10,756,712 | B2 | 8/2020 | Braun |
| 10,763,420 | B2 | 9/2020 | Yoscovits |
| 10,769,545 | B2 | 9/2020 | Amin |
| 10,769,546 | B1 | 9/2020 | Rigetti |
| 10,775,173 | B2 | 9/2020 | Moxley, III |
| 10,776,709 | B2 | 9/2020 | Shen |
| 10,784,432 | B2 | 9/2020 | Rosenblatt |
| 10,784,569 | B2 | 9/2020 | Ashrafi |
| 10,789,123 | B2 | 9/2020 | Ioffe |
| 10,789,329 | B2 | 9/2020 | Lanting |
| 10,789,541 | B2 | 9/2020 | Mohseni |
| 10,790,566 | B2 | 9/2020 | Gumann |
| 10,797,684 | B1 | 10/2020 | Benz |
| 10,803,396 | B2 | 10/2020 | Yoscovits |
| 10,804,874 | B2 | 10/2020 | Abdo |
| 10,810,506 | B1 | 10/2020 | Zota |
| 10,810,507 | B2 | 10/2020 | Temme |
| 10,811,276 | B2 | 10/2020 | Megrant |
| 10,811,588 | B2 | 10/2020 | Olivadese |
| 10,813,219 | B2 | 10/2020 | Abdo |
| 10,817,463 | B1 | 10/2020 | DeBenedictis |
| 10,817,796 | B2 | 10/2020 | Macready |
| 10,819,281 | B2 | 10/2020 | Goto |
| 10,826,845 | B2 | 11/2020 | Dadashikelayeh |
| 10,832,155 | B2 | 11/2020 | Lechner |
| 10,832,156 | B2 | 11/2020 | Chen |
| 10,833,121 | B2 | 11/2020 | Rosenblatt |
| 10,833,242 | B2 | 11/2020 | Orcutt |
| 10,833,243 | B1 | 11/2020 | Tolpygo |
| 10,833,680 | B2 | 11/2020 | McKay |
| 10,839,305 | B2 | 11/2020 | Ian |
| 10,839,306 | B2 | 11/2020 | Mezzacapo |
| 10,840,295 | B2 | 11/2020 | Sandberg |
| 10,847,705 | B2 | 11/2020 | Lampert |
| 10,852,346 | B1 | 12/2020 | Zeng |
| 10,852,366 | B2 | 12/2020 | Ferguson |
| 10,858,239 | B2 | 12/2020 | Painter |
| 10,858,240 | B2 | 12/2020 | Painter |
| 10,859,641 | B2 | 12/2020 | Petrashov |
| 10,868,540 | B2 | 12/2020 | Herr |
| 10,872,021 | B1 | 12/2020 | Tezak |
| 10,879,202 | B1 | 12/2020 | Lewandowski |
| 10,879,446 | B2 | 12/2020 | Caudillo |
| 10,884,033 | B2 | 1/2021 | Przybysz |
| 10,885,459 | B2 | 1/2021 | Biamonte |
| 10,886,049 | B2 | 1/2021 | Strong |
| 10,886,454 | B2 | 1/2021 | Rosenblatt |
| 10,891,554 | B2 | 1/2021 | Harris |
| 10,892,751 | B2 | 1/2021 | Abdo |
| 10,901,062 | B2 | 1/2021 | Walsworth |
| 10,903,411 | B2 | 1/2021 | Marcus |
| 10,903,809 | B2 | 1/2021 | White |
| 10,914,969 | B2 | 2/2021 | Schmeing |
| 10,915,832 | B2 | 2/2021 | Mohseni |
| 10,916,690 | B2 | 2/2021 | Adiga |
| 10,916,821 | B2 | 2/2021 | Painter |
| 10,917,096 | B1 | 2/2021 | Mukhanov |
| 10,922,381 | B2 | 2/2021 | Amin |
| 10,922,617 | B2 | 2/2021 | Babbush |
| 10,922,619 | B2 | 2/2021 | Mohseni |
| 10,924,095 | B1 | 2/2021 | McKay |
| 10,929,576 | B2 | 2/2021 | Ronagh |
| 10,937,941 | B2 | 3/2021 | Abraham |
| 10,938,346 | B2 | 3/2021 | Berkley |
| 10,942,804 | B2 | 3/2021 | Kerman |
| 10,943,180 | B2 | 3/2021 | Abdo |
| 10,944,362 | B2 | 3/2021 | Abdo |
| 10,946,219 | B2 | 3/2021 | Tahar |
| 10,949,769 | B2 | 3/2021 | Chen |
| 10,950,299 | B1 | 3/2021 | Mukhanov |
| 10,950,654 | B2 | 3/2021 | Kelly |
| 10,950,778 | B2 | 3/2021 | Graninger |
| 10,956,267 | B2 | 3/2021 | Kapit |
| 10,957,841 | B2 | 3/2021 | Megrant |
| 10,958,274 | B2 | 3/2021 | Najafi-Yazdi |
| 10,964,997 | B2 | 3/2021 | Schuster |
| 10,969,443 | B2 | 4/2021 | Martinis |
| 10,971,672 | B2 | 4/2021 | Olivadese |
| 10,972,190 | B2 | 4/2021 | Henningsen |
| 10,978,425 | B2 | 4/2021 | White |
| 10,978,632 | B2 | 4/2021 | Kallaher |
| 10,984,336 | B2 | 4/2021 | Herr |
| 10,985,308 | B1 | 4/2021 | Vodrahalli |
| 10,985,701 | B1 | 4/2021 | Abdo |
| 10,989,767 | B2 | 4/2021 | Ferguson |
| 10,990,017 | B2 | 4/2021 | Burkett |
| 10,991,755 | B2 | 4/2021 | Ladizinsky |
| 10,996,979 | B2 | 5/2021 | Bishop |
| 10,998,869 | B2 | 5/2021 | Miano |
| 11,002,677 | B2 | 5/2021 | Ashrafi |
| 11,010,145 | B1 | 5/2021 | Smith |
| 11,010,683 | B2 | 5/2021 | Amin |
| 11,011,693 | B2 | 5/2021 | Lampert |
| 11,017,289 | B2 | 5/2021 | Crawford |
| 11,017,310 | B2 | 5/2021 | Chu |
| 11,018,290 | B2 | 5/2021 | David |
| 11,031,537 | B2 | 6/2021 | Harris |
| 11,038,095 | B2 | 6/2021 | Huang |
| 11,050,009 | B2 | 6/2021 | Topaloglu |
| 11,050,010 | B2 | 6/2021 | Jinka |
| 11,055,625 | B2 | 7/2021 | Kenawy |
| 11,057,000 | B2 | 7/2021 | Abdo |
| 11,064,637 | B2 | 7/2021 | Sterling |
| 11,070,210 | B2 | 7/2021 | Reagor |
| 11,079,354 | B2 | 8/2021 | Chen |
| 11,083,807 | B2 | 8/2021 | Ashrafi |
| 11,088,312 | B2 | 8/2021 | Schueffelgen |
| 11,093,440 | B2 | 8/2021 | van den Brink |
| 11,100,418 | B2 | 8/2021 | Bunyk |
| 11,106,980 | B2 | 8/2021 | Kapit |
| 11,108,398 | B2 | 8/2021 | Sete |
| 11,112,842 | B1 | 9/2021 | Smith |
| 11,120,357 | B2 | 9/2021 | Zeng |
| 11,127,893 | B2 | 9/2021 | Johnson |
| 11,133,450 | B2 | 9/2021 | Mutus |
| 11,133,451 | B2 | 9/2021 | Mutus |
| 11,138,511 | B2 | 10/2021 | Yarkoni |
| 11,152,471 | B1 | 10/2021 | Teo |
| 11,156,460 | B2 | 10/2021 | Moxley, III |
| 11,164,103 | B2 | 11/2021 | Bloom |
| 11,164,104 | B2 | 11/2021 | Ashrafi |
| 11,164,677 | B1 | 11/2021 | Harris |
| 11,170,317 | B2 | 11/2021 | Chow |
| 11,170,318 | B2 | 11/2021 | Ashrafi |
| 11,170,846 | B2 | 11/2021 | Bosman |
| 11,176,082 | B2 | 11/2021 | Novotny |
| 11,177,428 | B2 | 11/2021 | Jinka |
| 11,177,912 | B2 | 11/2021 | Elsherbini |
| 11,183,989 | B1 | 11/2021 | Thorbeck |
| 11,188,843 | B2 | 11/2021 | Barzegar |
| 11,194,573 | B1 | 12/2021 | Smith |
| 11,194,659 | B2 | 12/2021 | Versluis |
| 11,197,365 | B2 | 12/2021 | Lucero |
| 11,201,274 | B2 | 12/2021 | Abdo |
| 11,210,600 | B2 | 12/2021 | Von Salis |
| 11,223,005 | B2 | 1/2022 | Sandberg |
| 11,223,355 | B2 | 1/2022 | Smith |
| 11,238,131 | B2 | 2/2022 | Hamze |
| 11,258,415 | B2 | 2/2022 | Shainline |
| 11,271,533 | B2 | 3/2022 | Narla |
| 11,281,524 | B1 | 3/2022 | Egger |

(56) References Cited

U.S. PATENT DOCUMENTS

| | | | |
|---|---|---|---|
| 11,283,002 | B2 | 3/2022 | Shainline |
| 11,289,639 | B2 | 3/2022 | Gilbert |
| 11,294,986 | B2 | 4/2022 | Mezzacapo |
| 11,295,225 | B2 | 4/2022 | Hoskinson |
| 11,302,856 | B2 | 4/2022 | Lescanne |
| 11,307,242 | B1 | 4/2022 | Zeng |
| 11,309,478 | B2 | 4/2022 | David |
| 11,313,925 | B2 | 4/2022 | Zhou |
| 11,321,627 | B1 | 5/2022 | Arriola |
| 11,341,425 | B2 | 5/2022 | Tomaru |
| 11,342,493 | B2 | 5/2022 | Oliver |
| 11,346,872 | B1 | 5/2022 | Whiteley |
| 11,348,024 | B2 | 5/2022 | Harris |
| 11,348,025 | B2 | 5/2022 | Barends |
| 11,348,026 | B2 | 5/2022 | Thom |
| 11,348,027 | B1 | 5/2022 | Huang |
| 11,356,148 | B2 | 6/2022 | Ashrafi |
| 11,361,240 | B2 | 6/2022 | Roberts |
| 11,362,656 | B1 | 6/2022 | Beck |
| 11,367,011 | B2 | 6/2022 | Kelly |
| 11,367,012 | B2 | 6/2022 | Abdo |
| 11,374,537 | B2 | 6/2022 | Abdo |
| 11,374,554 | B2 | 6/2022 | Sun |
| 11,392,848 | B2 | 7/2022 | Clarke |
| 11,403,168 | B2 | 8/2022 | Abdo |
| 11,406,583 | B1 | 8/2022 | Mukhanov |
| 11,409,426 | B2 | 8/2022 | Thom |
| 11,411,158 | B2 | 8/2022 | Phung |
| 11,411,159 | B1 | 8/2022 | White |
| 11,415,642 | B2 | 8/2022 | Pellegrino |
| 11,423,115 | B2 | 8/2022 | Lanting |
| 11,424,521 | B2 | 8/2022 | Whittaker |
| 11,429,887 | B2 | 8/2022 | Ferguson |
| 11,430,831 | B2 | 8/2022 | Gumann |
| 11,436,398 | B2 | 9/2022 | Noh |
| 11,449,784 | B2 | 9/2022 | Sterling |
| 11,455,207 | B2 | 9/2022 | Chamberland |
| 11,456,741 | B2 | 9/2022 | Ahonen |
| 11,468,219 | B2 | 10/2022 | Chamberland |
| 11,469,485 | B2 | 10/2022 | Lauer |
| 11,476,836 | B1 | 10/2022 | Goto |
| 11,481,669 | B2 | 10/2022 | Rolfe |
| 11,482,656 | B2 | 10/2022 | Neill |
| 11,482,657 | B2 | 10/2022 | Topaloglu |
| 11,488,050 | B2 | 11/2022 | Shah |
| 11,494,681 | B1 | 11/2022 | Peterson |
| 11,494,683 | B2 | 11/2022 | Amin |
| 11,501,195 | B2 | 11/2022 | Rose |
| 11,501,196 | B2 | 11/2022 | Frisch |
| 11,507,875 | B2 | 11/2022 | Bauer |
| 11,508,896 | B1 | 11/2022 | Yohannes |
| 11,514,223 | B2 | 11/2022 | Molavi |
| 11,515,851 | B2 | 11/2022 | Vesterinen |
| 11,526,463 | B2 | 12/2022 | van den Brink |
| 11,531,924 | B2 | 12/2022 | Chen |
| 11,536,780 | B2 | 12/2022 | Beck |
| 11,545,974 | B2 | 1/2023 | Phung |
| 11,552,238 | B2 | 1/2023 | Shabani |
| 11,552,239 | B2 | 1/2023 | Abdo |
| 11,562,284 | B1 | 1/2023 | Ryan |
| 11,567,762 | B1 | 1/2023 | Smith |
| 11,567,887 | B2 | 1/2023 | Black |
| 11,569,205 | B2 | 1/2023 | White |
| 11,569,428 | B2 | 1/2023 | Roberts |
| 11,573,259 | B1 | 2/2023 | Zeng |
| 11,580,436 | B2 | 2/2023 | Chamberland |
| 11,586,448 | B2 | 2/2023 | Lauer |
| 11,586,702 | B2 | 2/2023 | Shehab |
| 11,593,698 | B2 | 2/2023 | Bloom |
| 11,599,819 | B2 | 3/2023 | Abdo |
| 11,600,588 | B1 | 3/2023 | Yao |
| 11,605,772 | B2 | 3/2023 | Olivadese |
| 11,615,336 | B2 | 3/2023 | Oliver |
| 11,616,187 | B2 | 3/2023 | Graninger |
| 11,620,560 | B2 | 4/2023 | McKay |
| 11,620,561 | B2 | 4/2023 | Novotny |
| 11,621,386 | B2 | 4/2023 | Hart |
| 11,626,227 | B2 | 4/2023 | Choi |
| 11,626,555 | B2 | 4/2023 | Finck |
| 11,646,734 | B1 | 5/2023 | Marakov |
| 11,651,263 | B2 | 5/2023 | Martinis |
| 11,658,660 | B1 | 5/2023 | Finck |
| 11,664,570 | B2 | 5/2023 | Underwood |
| 11,664,801 | B1 | 5/2023 | Finck |
| 11,672,187 | B2 | 6/2023 | Holmes |
| 11,675,222 | B2 | 6/2023 | Karinou |
| 11,677,402 | B2 | 6/2023 | Sete |
| 11,678,590 | B2 | 6/2023 | Schueffelgen |
| 11,681,940 | B2 | 6/2023 | King |
| 11,683,996 | B2 | 6/2023 | Hart |
| 11,687,819 | B2 | 6/2023 | Jin |
| 11,694,106 | B2 | 7/2023 | McKay |
| 11,695,417 | B1 | 7/2023 | Winik |
| 11,695,418 | B2 | 7/2023 | Archambault |
| 11,699,091 | B2 | 7/2023 | Woods |
| 11,700,777 | B2 | 7/2023 | Rosenblatt |
| 11,701,441 | B2 | 7/2023 | Ashrafi |
| 11,704,012 | B2 | 7/2023 | Thom |
| 11,704,586 | B2 | 7/2023 | Thom |
| 11,708,595 | B2 | 7/2023 | Chen |
| 11,714,142 | B2 | 8/2023 | Phung |
| 11,717,475 | B1 | 8/2023 | Mukhanov |
| 11,727,295 | B2 | 8/2023 | Hart |
| 11,727,296 | B2 | 8/2023 | Pereverzev |
| 11,727,297 | B2 | 8/2023 | Stehlik |
| 11,728,772 | B2 | 8/2023 | Abdo |
| 11,730,066 | B2 | 8/2023 | Johnson |
| 11,734,387 | B2 | 8/2023 | Mezzacapo |
| 11,735,291 | B2 | 8/2023 | Stober |
| 11,736,122 | B1 | 8/2023 | Yoder |
| 11,737,376 | B2 | 8/2023 | Frattini |
| 11,741,279 | B2 | 8/2023 | Campbell |
| 11,742,831 | B2 | 8/2023 | Goto |
| 11,748,650 | B2 | 9/2023 | Huang |
| 11,750,175 | B2 | 9/2023 | Kumph |
| 11,751,489 | B2 | 9/2023 | Finck |
| 11,755,940 | B2 | 9/2023 | Jin |
| 11,757,467 | B2 | 9/2023 | Knee |
| 11,764,780 | B2 | 9/2023 | Yamaguchi |
| 11,765,986 | B2 | 9/2023 | Topaloglu |
| 11,769,069 | B2 | 9/2023 | Jin |
| 11,774,522 | B2 | 10/2023 | Beck |
| 11,775,711 | B2 | 10/2023 | Marthaler |
| 11,778,928 | B2 | 10/2023 | Hyyppä |
| 11,786,616 | B2 | 10/2023 | Ashrafi |
| 11,789,812 | B2 | 10/2023 | Lauer |
| 11,790,259 | B2 | 10/2023 | Harris |
| 11,790,261 | B2 | 10/2023 | Rosenthal |
| 11,791,818 | B2 | 10/2023 | Mundhada |
| 11,797,874 | B2 | 10/2023 | Bunyk |
| 11,803,441 | B2 | 10/2023 | Chen |
| 11,812,671 | B2 | 11/2023 | Rosenblatt |
| 11,816,536 | B2 | 11/2023 | Biamonte |
| 11,823,997 | B2 | 11/2023 | Thomas |
| 11,829,753 | B1 | 11/2023 | Smith |
| 11,836,574 | B2 | 12/2023 | Amin |
| 11,839,164 | B2 | 12/2023 | Swenson |
| 11,846,590 | B2 | 12/2023 | Wang |
| 11,856,871 | B2 | 12/2023 | Lanting |
| 11,863,279 | B2 | 1/2024 | Jamieson |
| 11,868,847 | B2 | 1/2024 | Stehlik |
| 11,875,222 | B1 | 1/2024 | Reagor |
| 11,876,512 | B1 | 1/2024 | Beck |
| 11,879,950 | B2 | 1/2024 | Swenson |
| 11,880,742 | B2 | 1/2024 | Suttle |
| 11,886,092 | B2 | 1/2024 | Spence |
| 11,900,219 | B1 | 2/2024 | Ryan |
| 11,901,957 | B2 | 2/2024 | Henningsen |
| 11,906,877 | B2 | 2/2024 | Mukhanov |
| 11,908,756 | B2 | 2/2024 | Abraham |
| 11,917,928 | B2 | 2/2024 | Gao |
| 11,922,276 | B2 | 3/2024 | Barends |
| 11,928,004 | B2 | 3/2024 | Earnest-Noble |
| 11,929,711 | B2 | 3/2024 | Bardin |

(56) References Cited

U.S. PATENT DOCUMENTS

| | | | |
|---|---|---|---|
| 11,930,721 | B2 | 3/2024 | Ladizinsky |
| 11,937,516 | B2 | 3/2024 | Topaloglu |
| 2001/0020701 | A1 | 9/2001 | Zagoskin |
| 2001/0023943 | A1 | 9/2001 | Zagoskin |
| 2001/0025012 | A1 | 9/2001 | Tarutani |
| 2001/0035524 | A1 | 11/2001 | Zehe |
| 2001/0040447 | A1 | 11/2001 | Tanaka |
| 2001/0055669 | A1 | 12/2001 | Schultz |
| 2001/0055775 | A1 | 12/2001 | Schultz |
| 2002/0060635 | A1 | 5/2002 | Gupta |
| 2002/0066936 | A1 | 6/2002 | Maris |
| 2002/0075057 | A1 | 6/2002 | Tanaka |
| 2002/0095765 | A1 | 7/2002 | Zhou |
| 2002/0097047 | A1 | 7/2002 | Odawara |
| 2002/0102674 | A1 | 8/2002 | Anderson |
| 2002/0105948 | A1 | 8/2002 | Glomb |
| 2002/0115571 | A1 | 8/2002 | Yokosawa |
| 2002/0117467 | A1 | 8/2002 | Tanda |
| 2002/0117656 | A1 | 8/2002 | Amin |
| 2002/0117738 | A1 | 8/2002 | Amin |
| 2002/0119243 | A1 | 8/2002 | Schultz |
| 2002/0121636 | A1 | 9/2002 | Amin |
| 2002/0128156 | A1 | 9/2002 | Morooka |
| 2002/0130313 | A1 | 9/2002 | Zagoskin |
| 2002/0130315 | A1 | 9/2002 | Zagoskin |
| 2002/0152810 | A1 | 10/2002 | Couture |
| 2002/0169079 | A1 | 11/2002 | Suzuki |
| 2002/0177529 | A1 | 11/2002 | Ustinov |
| 2002/0177769 | A1 | 11/2002 | Orbach |
| 2002/0179937 | A1 | 12/2002 | Ivanov |
| 2002/0179939 | A1 | 12/2002 | Ivanov |
| 2002/0180006 | A1 | 12/2002 | Franz |
| 2002/0188578 | A1 | 12/2002 | Amin |
| 2002/0190381 | A1 | 12/2002 | Herr |
| 2003/0011398 | A1 | 1/2003 | Herr |
| 2003/0016010 | A1 | 1/2003 | Kandori |
| 2003/0016069 | A1 | 1/2003 | Furuta |
| 2003/0017949 | A1 | 1/2003 | Akimitsu |
| 2003/0027724 | A1 | 2/2003 | Rose |
| 2003/0028338 | A1 | 2/2003 | Hidaka |
| 2003/0038285 | A1 | 2/2003 | Amin |
| 2003/0039138 | A1 | 2/2003 | Herr |
| 2003/0040440 | A1 | 2/2003 | Wire |
| 2003/0042481 | A1 | 3/2003 | Tzalenchuk |
| 2003/0054960 | A1 | 3/2003 | Bedard |
| 2003/0057441 | A1 | 3/2003 | Ivanov |
| 2003/0058026 | A1 | 3/2003 | Johnson |
| 2003/0068832 | A1 | 4/2003 | Koval |
| 2003/0071246 | A1 | 4/2003 | Grigorov |
| 2003/0071258 | A1 | 4/2003 | Zagoskin |
| 2003/0076251 | A1 | 4/2003 | Gupta |
| 2003/0077224 | A1 | 4/2003 | Pines |
| 2003/0094606 | A1 | 5/2003 | Newns |
| 2003/0098455 | A1 | 5/2003 | Amin |
| 2003/0102470 | A1 | 6/2003 | Il'ichev |
| 2003/0107033 | A1 | 6/2003 | Tzalenchuk |
| 2003/0111659 | A1 | 6/2003 | Tzalenchuk |
| 2003/0111661 | A1 | 6/2003 | Tzalenchuk |
| 2003/0115401 | A1 | 6/2003 | Herr |
| 2003/0121028 | A1 | 6/2003 | Coury |
| 2003/0134089 | A1 | 7/2003 | Schultz |
| 2003/0141868 | A1 | 7/2003 | Bakharev |
| 2003/0146429 | A1 | 8/2003 | Tzalenchuk |
| 2003/0146430 | A1 | 8/2003 | Tzalenchuk |
| 2003/0146746 | A1 | 8/2003 | Bakharev |
| 2003/0169041 | A1 | 9/2003 | Coury |
| 2003/0169142 | A1 | 9/2003 | Vicci |
| 2003/0173498 | A1 | 9/2003 | Blais |
| 2003/0173997 | A1 | 9/2003 | Blais |
| 2003/0183935 | A1 | 10/2003 | Herr |
| 2003/0189203 | A1 | 10/2003 | Talroze |
| 2003/0193097 | A1 | 10/2003 | Il'ichev |
| 2003/0199395 | A1 | 10/2003 | Zhou |
| 2003/0207766 | A1 | 11/2003 | Esteve |
| 2003/0224944 | A1 | 12/2003 | Il'ichev |
| 2003/0230732 | A1 | 12/2003 | Sasaki |
| 2004/0000666 | A1 | 1/2004 | Lidar |
| 2004/0012388 | A1 | 1/2004 | Pedersen |
| 2004/0012407 | A1 | 1/2004 | Amin |
| 2004/0014077 | A1 | 1/2004 | Schultz |
| 2004/0016918 | A1 | 1/2004 | Amin |
| 2004/0022332 | A1 | 2/2004 | Gupta |
| 2004/0027125 | A1 | 2/2004 | Clarke |
| 2004/0077503 | A1 | 4/2004 | Blais |
| 2004/0095803 | A1 | 5/2004 | Ustinov |
| 2004/0098443 | A1 | 5/2004 | Omelyanchouk |
| 2004/0099861 | A1 | 5/2004 | Shoji |
| 2004/0104410 | A1 | 6/2004 | Gilbert |
| 2004/0119061 | A1 | 6/2004 | Wu |
| 2004/0120299 | A1 | 6/2004 | Kidiyarova-Shevchenko |
| 2004/0126304 | A1 | 7/2004 | Zhao |
| 2004/0130311 | A1 | 7/2004 | Humphreys |
| 2004/0134967 | A1 | 7/2004 | Moeckly |
| 2004/0135139 | A1 | 7/2004 | Koval |
| 2004/0140537 | A1 | 7/2004 | Il'ichev |
| 2004/0145366 | A1 | 7/2004 | Baudenbacher |
| 2004/0150458 | A1 | 8/2004 | Gupta |
| 2004/0154704 | A1 | 8/2004 | Schultz |
| 2004/0165454 | A1 | 8/2004 | Amin |
| 2004/0167036 | A1 | 8/2004 | Amin |
| 2004/0170047 | A1 | 9/2004 | Amin |
| 2004/0173787 | A1 | 9/2004 | Blais |
| 2004/0173792 | A1 | 9/2004 | Blais |
| 2004/0173793 | A1 | 9/2004 | Blais |
| 2004/0201400 | A1 | 10/2004 | Herr |
| 2004/0223380 | A1 | 11/2004 | Hato |
| 2004/0232405 | A1 | 11/2004 | Horibe |
| 2004/0232912 | A1 | 11/2004 | Tsukamoto |
| 2004/0239319 | A1 | 12/2004 | Tralshawala |
| 2004/0266497 | A1 | 12/2004 | Reagor |
| 2004/0266627 | A1 | 12/2004 | Moeckly |
| 2005/0001209 | A1 | 1/2005 | Hilton |
| 2005/0023518 | A1 | 2/2005 | Herr |
| 2005/0029512 | A1 | 2/2005 | Hato |
| 2005/0035368 | A1 | 2/2005 | Bunyk |
| 2005/0040843 | A1 | 2/2005 | Eaton |
| 2005/0043185 | A1 | 2/2005 | Suzuki |
| 2005/0045869 | A1 | 3/2005 | Talroze |
| 2005/0045872 | A1 | 3/2005 | Newns |
| 2005/0047245 | A1 | 3/2005 | Furuta |
| 2005/0052181 | A1 | 3/2005 | Lam |
| 2005/0057248 | A1 | 3/2005 | Woods |
| 2005/0062131 | A1 | 3/2005 | Murduck |
| 2005/0074220 | A1 | 4/2005 | Rey |
| 2005/0078022 | A1 | 4/2005 | Hirano |
| 2005/0082519 | A1 | 4/2005 | Amin |
| 2005/0088174 | A1 | 4/2005 | Lee |
| 2005/0098773 | A1 | 5/2005 | Vion |
| 2005/0101489 | A1 | 5/2005 | Blais |
| 2005/0106313 | A1 | 5/2005 | Lee |
| 2005/0107262 | A1 | 5/2005 | Tanaka |
| 2005/0109879 | A1 | 5/2005 | Patterson |
| 2005/0116719 | A1 | 6/2005 | Fardmanesh |
| 2005/0123674 | A1 | 6/2005 | Stasiak |
| 2005/0134262 | A1 | 6/2005 | Clarke |
| 2005/0143791 | A1 | 6/2005 | Hameroff |
| 2005/0149002 | A1 | 7/2005 | Wang |
| 2005/0149169 | A1 | 7/2005 | Wang |
| 2005/0162302 | A1 | 7/2005 | Omelyanchouk |
| 2005/0171421 | A1 | 8/2005 | Eden |
| 2005/0184284 | A1 | 8/2005 | Burkard |
| 2005/0197254 | A1 | 9/2005 | Stasiak |
| 2005/0202572 | A1 | 9/2005 | Seki |
| 2005/0206376 | A1 | 9/2005 | Matthews |
| 2005/0215436 | A1 | 9/2005 | Takano |
| 2005/0224784 | A1 | 10/2005 | Amin |
| 2005/0231196 | A1 | 10/2005 | Tarutani |
| 2005/0241394 | A1 | 11/2005 | Clark |
| 2005/0243708 | A1 | 11/2005 | Bunyk |
| 2005/0250651 | A1 | 11/2005 | Amin |
| 2005/0255680 | A1 | 11/2005 | Rokhvarger |
| 2005/0256007 | A1 | 11/2005 | Amin |
| 2006/0022671 | A1 | 2/2006 | Levin |
| 2006/0049891 | A1 | 3/2006 | Crete |

(56) References Cited

U.S. PATENT DOCUMENTS

| | | | |
|---|---|---|---|
| 2006/0079402 | A1 | 4/2006 | Akimitsu |
| 2006/0091881 | A1 | 5/2006 | Clarke |
| 2006/0095220 | A1 | 5/2006 | Vrba |
| 2006/0097746 | A1 | 5/2006 | Amin |
| 2006/0097747 | A1 | 5/2006 | Amin |
| 2006/0104889 | A1 | 5/2006 | Harutyunyan |
| 2006/0145694 | A1 | 7/2006 | Oppenlander |
| 2006/0147154 | A1 | 7/2006 | Thom |
| 2006/0148514 | A1 | 7/2006 | Reagor |
| 2006/0164081 | A1 | 7/2006 | Ganther |
| 2006/0176054 | A1 | 8/2006 | Clarke |
| 2006/0186881 | A1 | 8/2006 | Tilbrook |
| 2006/0220641 | A1 | 10/2006 | Pannetier |
| 2006/0225165 | A1 | 10/2006 | van den Brink |
| 2006/0237660 | A1 | 10/2006 | Sasaki |
| 2006/0247131 | A1 | 11/2006 | Horibe |
| 2006/0248618 | A1 | 11/2006 | Berkley |
| 2006/0255987 | A1 | 11/2006 | Nagasawa |
| 2006/0290553 | A1 | 12/2006 | Furuta |
| 2007/0007956 | A1 | 1/2007 | Min |
| 2007/0018643 | A1 | 1/2007 | Clarke |
| 2007/0038067 | A1 | 2/2007 | Kandori |
| 2007/0049097 | A1 | 3/2007 | Hirano |
| 2007/0052441 | A1 | 3/2007 | Taguchi |
| 2007/0069339 | A1 | 3/2007 | Hato |
| 2007/0075729 | A1 | 4/2007 | Kirichenko |
| 2007/0075752 | A1 | 4/2007 | Kirichenko |
| 2007/0077906 | A1 | 4/2007 | Kirichenko |
| 2007/0080341 | A1 | 4/2007 | MacReady |
| 2007/0085534 | A1 | 4/2007 | Seki |
| 2007/0096730 | A1 | 5/2007 | Meyer |
| 2007/0114994 | A1 | 5/2007 | Kobayashi |
| 2007/0116629 | A1 | 5/2007 | Harutyunyan |
| 2007/0158791 | A1 | 7/2007 | Wakana |
| 2007/0167723 | A1 | 7/2007 | Park |
| 2007/0174227 | A1 | 7/2007 | Johnson |
| 2007/0180586 | A1 | 8/2007 | Amin |
| 2007/0194225 | A1 | 8/2007 | Zorn |
| 2007/0197900 | A1 | 8/2007 | Baudenbacher |
| 2007/0212794 | A1 | 9/2007 | Tsukamoto |
| 2007/0236245 | A1 | 10/2007 | Bedard |
| 2007/0241746 | A1 | 10/2007 | Kim |
| 2007/0241747 | A1 | 10/2007 | Morley |
| 2007/0254375 | A1 | 11/2007 | Tsukamoto |
| 2007/0263432 | A1 | 11/2007 | Pertti |
| 2007/0293160 | A1 | 12/2007 | Gupta |
| 2007/0295954 | A1 | 12/2007 | Burkard |
| 2008/0001599 | A1 | 1/2008 | Wu |
| 2008/0024126 | A1 | 1/2008 | Sasaki |
| 2008/0047367 | A1 | 2/2008 | Choi |
| 2008/0048762 | A1 | 2/2008 | Inamdar |
| 2008/0048902 | A1 | 2/2008 | Rylov |
| 2008/0051291 | A1 | 2/2008 | Tanaka |
| 2008/0051292 | A1 | 2/2008 | Wakana |
| 2008/0052055 | A1 | 2/2008 | Rose |
| 2008/0065573 | A1 | 3/2008 | Macready |
| 2008/0074110 | A1 | 3/2008 | Mito |
| 2008/0074113 | A1 | 3/2008 | Clarke |
| 2008/0084898 | A1 | 4/2008 | Miyaho |
| 2008/0086438 | A1 | 4/2008 | Amin |
| 2008/0100175 | A1 | 5/2008 | Clark |
| 2008/0101444 | A1 | 5/2008 | Gupta |
| 2008/0101501 | A1 | 5/2008 | Gupta |
| 2008/0101503 | A1 | 5/2008 | Gupta |
| 2008/0107213 | A1 | 5/2008 | Gupta |
| 2008/0108503 | A1 | 5/2008 | Simizu |
| 2008/0109500 | A1 | 5/2008 | Macready |
| 2008/0116448 | A1 | 5/2008 | Kitaev |
| 2008/0116449 | A1 | 5/2008 | Macready |
| 2008/0122434 | A1 | 5/2008 | Chieh |
| 2008/0146449 | A1 | 6/2008 | Lesueur |
| 2008/0162613 | A1 | 7/2008 | Amin |
| 2008/0176750 | A1 | 7/2008 | Rose |
| 2008/0186064 | A1 | 8/2008 | Kirichenko |
| 2008/0215850 | A1 | 9/2008 | Berkley |
| 2008/0218519 | A1 | 9/2008 | Coury |
| 2008/0231353 | A1 | 9/2008 | Filippov |
| 2008/0238531 | A1 | 10/2008 | Harris |
| 2008/0258753 | A1 | 10/2008 | Harris |
| 2008/0260257 | A1 | 10/2008 | Rose |
| 2008/0274898 | A1 | 11/2008 | Johnson |
| 2008/0284413 | A1 | 11/2008 | Tsukamoto |
| 2008/0313114 | A1 | 12/2008 | Rose |
| 2008/0313430 | A1 | 12/2008 | Bunyk |
| 2009/0002014 | A1 | 1/2009 | Gupta |
| 2009/0008632 | A1 | 1/2009 | Bunyk |
| 2009/0014714 | A1 | 1/2009 | Koch |
| 2009/0015317 | A1 | 1/2009 | DiVincenzo |
| 2009/0033369 | A1 | 2/2009 | Baumgardner |
| 2009/0034657 | A1 | 2/2009 | Nikolova |
| 2009/0057652 | A1 | 3/2009 | Nevirkovets |
| 2009/0070402 | A1 | 3/2009 | Rose |
| 2009/0072828 | A1 | 3/2009 | Penanen |
| 2009/0073017 | A1 | 3/2009 | Kim |
| 2009/0075825 | A1 | 3/2009 | Rose |
| 2009/0077001 | A1 | 3/2009 | Macready |
| 2009/0078931 | A1 | 3/2009 | Berkley |
| 2009/0078932 | A1 | 3/2009 | Amin |
| 2009/0082209 | A1 | 3/2009 | Bunyk |
| 2009/0102580 | A1 | 4/2009 | Uchaykin |
| 2009/0121215 | A1 | 5/2009 | Choi |
| 2009/0122508 | A1 | 5/2009 | Uchaykin |
| 2009/0143665 | A1 | 6/2009 | Seki |
| 2009/0153180 | A1 | 6/2009 | Herr |
| 2009/0153381 | A1 | 6/2009 | Kirichenko |
| 2009/0167342 | A1 | 7/2009 | van den Brink |
| 2009/0168286 | A1 | 7/2009 | Berkley |
| 2009/0173936 | A1 | 7/2009 | Bunyk |
| 2009/0189633 | A1 | 7/2009 | Bedard |
| 2009/0192041 | A1 | 7/2009 | Johansson |
| 2009/0206871 | A1 | 8/2009 | Baumgardner |
| 2009/0227044 | A1 | 9/2009 | Dosev |
| 2009/0233798 | A1 | 9/2009 | Maeda |
| 2009/0237106 | A1 | 9/2009 | Kirichenko |
| 2009/0244958 | A1 | 10/2009 | Bulzacchelli |
| 2009/0256561 | A1 | 10/2009 | Ledbetter |
| 2009/0261319 | A1 | 10/2009 | Maekawa |
| 2009/0267635 | A1 | 10/2009 | Herr |
| 2009/0274609 | A1 | 11/2009 | Harutyunyan |
| 2009/0289638 | A1 | 11/2009 | Farinelli |
| 2009/0299947 | A1 | 12/2009 | Amin |
| 2009/0302844 | A1 | 12/2009 | Saito |
| 2009/0319757 | A1 | 12/2009 | Berkley |
| 2009/0321720 | A1 | 12/2009 | Rose |
| 2009/0322374 | A1 | 12/2009 | Przybysz |
| 2009/0324484 | A1 | 12/2009 | Harutyunyan |
| 2010/0006825 | A1 | 1/2010 | Wakana |
| 2010/0026447 | A1 | 2/2010 | Keefe |
| 2010/0026537 | A1 | 2/2010 | Kirichenko |
| 2010/0033206 | A1 | 2/2010 | Herr |
| 2010/0033252 | A1 | 2/2010 | Herr |
| 2010/0066576 | A1 | 3/2010 | Kirichenko |
| 2010/0085827 | A1 | 4/2010 | Thom |
| 2010/0094796 | A1 | 4/2010 | Roetteler |
| 2010/0097056 | A1 | 4/2010 | Lam |
| 2010/0102904 | A1 | 4/2010 | Kusmartsev |
| 2010/0109638 | A1 | 5/2010 | Berns |
| 2010/0109669 | A1 | 5/2010 | Penanen |
| 2010/0133514 | A1 | 6/2010 | Bunyk |
| 2010/0148841 | A1 | 6/2010 | Kirichenko |
| 2010/0148853 | A1 | 6/2010 | Harris |
| 2010/0157552 | A1 | 6/2010 | Thom |
| 2010/0164536 | A1 | 7/2010 | Herr |
| 2010/0176840 | A1 | 7/2010 | Bedard |
| 2010/0182039 | A1 | 7/2010 | Baumgardner |
| 2010/0194466 | A1 | 8/2010 | Yorozu |
| 2010/0207622 | A1 | 8/2010 | Finkler |
| 2010/0207657 | A1 | 8/2010 | Herr |
| 2010/0237899 | A1 | 9/2010 | Herr |
| 2010/0239489 | A1 | 9/2010 | Harutyunyan |
| 2010/0281885 | A1 | 11/2010 | Black |
| 2010/0301855 | A1 | 12/2010 | Hyde |
| 2010/0301856 | A1 | 12/2010 | Hyde |
| 2010/0301857 | A1 | 12/2010 | Hyde |

(56) References Cited

U.S. PATENT DOCUMENTS

| | | | |
|---|---|---|---|
| 2010/0303731 | A1 | 12/2010 | Hyde |
| 2010/0303733 | A1 | 12/2010 | Hyde |
| 2010/0306142 | A1 | 12/2010 | Amin |
| 2010/0327861 | A1 | 12/2010 | Nagasaka |
| 2010/0327865 | A1 | 12/2010 | Nagasaka |
| 2010/0330704 | A1 | 12/2010 | Nakahama |
| 2011/0009274 | A1 | 1/2011 | Uchaykin |
| 2011/0010412 | A1 | 1/2011 | Macready |
| 2011/0018612 | A1 | 1/2011 | Harris |
| 2011/0022820 | A1 | 1/2011 | Bunyk |
| 2011/0031994 | A1 | 2/2011 | Berkley |
| 2011/0047201 | A1 | 2/2011 | Macready |
| 2011/0054236 | A1 | 3/2011 | Yang |
| 2011/0054876 | A1 | 3/2011 | Biamonte |
| 2011/0055520 | A1 | 3/2011 | Berkley |
| 2011/0057169 | A1 | 3/2011 | Harris |
| 2011/0060710 | A1 | 3/2011 | Amin |
| 2011/0060711 | A1 | 3/2011 | Macready |
| 2011/0060780 | A1 | 3/2011 | Berkley |
| 2011/0063016 | A1 | 3/2011 | Tanaka |
| 2011/0065585 | A1 | 3/2011 | Lanting |
| 2011/0065586 | A1 | 3/2011 | Maibaum |
| 2011/0068789 | A1 | 3/2011 | Hwang |
| 2011/0089405 | A1 | 4/2011 | Ladizinsky |
| 2011/0098623 | A1 | 4/2011 | Zhang |
| 2011/0102068 | A1 | 5/2011 | Bouchiat |
| 2011/0133770 | A1 | 6/2011 | Przybysz |
| 2011/0152104 | A1 | 6/2011 | Farinelli |
| 2011/0175061 | A1 | 7/2011 | Berkley |
| 2011/0175062 | A1 | 7/2011 | Farinelli |
| 2011/0175628 | A1 | 7/2011 | Kohlstedt |
| 2011/0210738 | A1 | 9/2011 | Penanen |
| 2011/0231462 | A1 | 9/2011 | Macready |
| 2011/0238607 | A1 | 9/2011 | Coury |
| 2011/0241765 | A1 | 10/2011 | Pesetski |
| 2011/0254583 | A1 | 10/2011 | Herr |
| 2011/0267878 | A1 | 11/2011 | Herr |
| 2011/0285393 | A1 | 11/2011 | Zakosarenko |
| 2011/0287941 | A1 | 11/2011 | Bonderson |
| 2011/0288823 | A1 | 11/2011 | Gupta |
| 2011/0298489 | A1 | 12/2011 | van den Brink |
| 2012/0005456 | A1 | 1/2012 | Berkley |
| 2012/0012818 | A1 | 1/2012 | Wakana |
| 2012/0023053 | A1 | 1/2012 | Harris |
| 2012/0028806 | A1 | 2/2012 | Bonderson |
| 2012/0045136 | A1 | 2/2012 | Rose |
| 2012/0053059 | A1 | 3/2012 | Hatsukade |
| 2012/0088674 | A1 | 4/2012 | Faley |
| 2012/0094838 | A1 | 4/2012 | Bunyk |
| 2012/0108434 | A1 | 5/2012 | Bulzacchelli |
| 2012/0112168 | A1 | 5/2012 | Bonderson |
| 2012/0135867 | A1 | 5/2012 | Thom |
| 2012/0144159 | A1 | 6/2012 | Pesetski |
| 2012/0157319 | A1 | 6/2012 | Tsukamoto |
| 2012/0157321 | A1 | 6/2012 | Kirichenko |
| 2012/0172233 | A1 | 7/2012 | Uchaykin |
| 2012/0184445 | A1 | 7/2012 | Mukhanov |
| 2012/0187378 | A1 | 7/2012 | Bonderson |
| 2012/0187872 | A1 | 7/2012 | Camacho de Bermúdez |
| 2012/0212375 | A1 | 8/2012 | Depree, IV |
| 2012/0215821 | A1 | 8/2012 | Macready |
| 2012/0225411 | A1 | 9/2012 | Puente |
| 2012/0238860 | A1 | 9/2012 | Kim |
| 2012/0252678 | A1 | 10/2012 | Kim |
| 2012/0254586 | A1 | 10/2012 | Amin |
| 2012/0258861 | A1 | 10/2012 | Bonderson |
| 2012/0265718 | A1 | 10/2012 | Amin |
| 2012/0274494 | A1 | 11/2012 | Kirichenko |
| 2012/0278057 | A1 | 11/2012 | Biamonte |
| 2012/0302446 | A1 | 11/2012 | Ryazanov |
| 2012/0314490 | A1 | 12/2012 | Okhi |
| 2012/0319684 | A1 | 12/2012 | Gambetta |
| 2012/0320668 | A1 | 12/2012 | Lewis |
| 2012/0326130 | A1 | 12/2012 | Maekawa |
| 2012/0326720 | A1 | 12/2012 | Gambetta |
| 2013/0005580 | A1 | 1/2013 | Bunyk |
| 2013/0007087 | A1 | 1/2013 | van den Brink |
| 2013/0009677 | A1 | 1/2013 | Naaman |
| 2013/0038330 | A1 | 2/2013 | Hyde |
| 2013/0040818 | A1 | 2/2013 | Herr |
| 2013/0043945 | A1 | 2/2013 | McDermott |
| 2013/0048950 | A1 | 2/2013 | Levy |
| 2013/0096825 | A1 | 4/2013 | Mohanty |
| 2013/0117200 | A1 | 5/2013 | Thom |
| 2013/0144925 | A1 | 6/2013 | Macready |
| 2013/0190185 | A1 | 7/2013 | Chavez |
| 2013/0201316 | A1 | 8/2013 | Binder |
| 2013/0221960 | A1 | 8/2013 | Nagasaka |
| 2013/0231249 | A1 | 9/2013 | Black |
| 2013/0233077 | A1 | 9/2013 | Chen |
| 2013/0245402 | A1 | 9/2013 | Ziaie |
| 2013/0271142 | A1 | 10/2013 | Penanen |
| 2013/0272453 | A1 | 10/2013 | Gupta |
| 2013/0278265 | A1 | 10/2013 | Kim |
| 2013/0278283 | A1 | 10/2013 | Berkley |
| 2013/0282636 | A1 | 10/2013 | Macready |
| 2013/0303379 | A1 | 11/2013 | Bulzacchelli |
| 2013/0313526 | A1 | 11/2013 | Harris |
| 2013/0324832 | A1 | 12/2013 | Wu |
| 2014/0000630 | A1 | 1/2014 | Ford |
| 2014/0025606 | A1 | 1/2014 | Macready |
| 2014/0050475 | A1 | 2/2014 | Bonderson |
| 2014/0097405 | A1 | 4/2014 | Bunyk |
| 2014/0113828 | A1 | 4/2014 | Gilbert |
| 2014/0175380 | A1 | 6/2014 | Suzuki |
| 2014/0187427 | A1 | 7/2014 | Macready |
| 2014/0203838 | A1 | 7/2014 | Pesetski |
| 2014/0223224 | A1 | 8/2014 | Berkley |
| 2014/0228222 | A1 | 8/2014 | Berkley |
| 2014/0229705 | A1 | 8/2014 | van den Brink |
| 2014/0229722 | A1 | 8/2014 | Harris |
| 2014/0232400 | A1 | 8/2014 | Kim |
| 2014/0235450 | A1 | 8/2014 | Chow |
| 2014/0245249 | A1 | 8/2014 | Macready |
| 2014/0246763 | A1 | 9/2014 | Bunyk |
| 2014/0249033 | A1 | 9/2014 | Orozco |
| 2014/0250288 | A1 | 9/2014 | Roy |
| 2014/0253111 | A1 | 9/2014 | Orozco |
| 2014/0264285 | A1 | 9/2014 | Chow |
| 2014/0286465 | A1 | 9/2014 | Gupta |
| 2014/0296076 | A1 | 10/2014 | Okhi |
| 2014/0314419 | A1 | 10/2014 | Paik |
| 2014/0315723 | A1 | 10/2014 | Moyerman |
| 2014/0324933 | A1 | 10/2014 | Macready |
| 2014/0329687 | A1 | 11/2014 | Bunyk |
| 2014/0343397 | A1 | 11/2014 | Kim |
| 2014/0344322 | A1 | 11/2014 | Ranjbar |
| 2014/0354326 | A1 | 12/2014 | Bonderson |
| 2014/0368234 | A1 | 12/2014 | Chow |
| 2015/0006443 | A1 | 1/2015 | Rose |
| 2015/0028970 | A1 | 1/2015 | Chow |
| 2015/0032991 | A1 | 1/2015 | Lanting |
| 2015/0032993 | A1 | 1/2015 | Amin |
| 2015/0032994 | A1 | 1/2015 | Chudak |
| 2015/0043273 | A1 | 2/2015 | Naaman |
| 2015/0046681 | A1 | 2/2015 | King |
| 2015/0078290 | A1 | 3/2015 | Gupta |
| 2015/0087945 | A1 | 3/2015 | Ziaie |
| 2015/0092465 | A1 | 4/2015 | Herr |
| 2015/0094207 | A1 | 4/2015 | Herr |
| 2015/0111754 | A1 | 4/2015 | Harris |
| 2015/0119252 | A1 | 4/2015 | Ladizinsky |
| 2015/0119253 | A1 | 4/2015 | Yohannes |
| 2015/0143817 | A1 | 5/2015 | Gervais |
| 2015/0161524 | A1 | 6/2015 | Hamze |
| 2015/0178432 | A1 | 6/2015 | Muller |
| 2015/0179913 | A1 | 6/2015 | Pramanik |
| 2015/0179914 | A1 | 6/2015 | Greer |
| 2015/0179915 | A1 | 6/2015 | Greer |
| 2015/0179916 | A1 | 6/2015 | Pramanik |
| 2015/0179918 | A1 | 6/2015 | Greer |
| 2015/0184286 | A1 | 7/2015 | Barabash |
| 2015/0187840 | A1 | 7/2015 | Ladizinsky |
| 2015/0205759 | A1 | 7/2015 | Israel |

(56) References Cited

U.S. PATENT DOCUMENTS

2015/0212166 A1 7/2015 Kandori
2015/0219730 A1 8/2015 Tsukamoto
2015/0229343 A1 8/2015 Gupta
2015/0241481 A1 8/2015 Narla
2015/0242758 A1 8/2015 Bonderson
2015/0254571 A1 9/2015 Miller
2015/0260812 A1 9/2015 Drake
2015/0262073 A1 9/2015 Lanting
2015/0263260 A1 9/2015 Thom
2015/0263736 A1 9/2015 Herr
2015/0269124 A1 9/2015 Hamze
2015/0310350 A1 10/2015 Niskanen
2015/0318095 A1 11/2015 Ishikawa
2015/0332164 A1 11/2015 van den Brink
2015/0346291 A1 12/2015 Lanting
2015/0349780 A1 12/2015 Naaman
2015/0358022 A1 12/2015 McDermott, III
2015/0363708 A1 12/2015 Amin
2015/0379418 A1 12/2015 Harris
2016/0012346 A1 1/2016 Biamonte
2016/0012347 A1 1/2016 King
2016/0012882 A1 1/2016 Bleloch
2016/0013791 A1 1/2016 Herr
2016/0019468 A1 1/2016 Bunyk
2016/0023906 A1 1/2016 Harutyunyan
2016/0028402 A1 1/2016 McCaughan
2016/0028403 A1 1/2016 McCaughan
2016/0032904 A1 2/2016 Kaplan
2016/0034609 A1 2/2016 Herr
2016/0035404 A1 2/2016 Ohki
2016/0042294 A1 2/2016 Macready
2016/0045841 A1 2/2016 Kaplan
2016/0065693 A1 3/2016 Rose
2016/0071021 A1 3/2016 Raymond
2016/0071903 A1 3/2016 Herr
2016/0079968 A1 3/2016 Strand
2016/0085616 A1 3/2016 Berkley
2016/0087598 A1 3/2016 Thom
2016/0087599 A1 3/2016 Naaman
2016/0103192 A1 4/2016 Reiner
2016/0112031 A1 4/2016 Abraham
2016/0132785 A1 5/2016 Amin
2016/0139213 A1 5/2016 Shams
2016/0148112 A1 5/2016 Kwon
2016/0149111 A1 5/2016 Cybart
2016/0154068 A1 6/2016 Barakat
2016/0156357 A1 6/2016 Miller
2016/0164505 A1 6/2016 Naaman
2016/0191060 A1 6/2016 McDermott, III
2016/0197628 A1 7/2016 Gupta
2016/0221825 A1 8/2016 Allen
2016/0233405 A1 8/2016 Crete
2016/0233860 A1 8/2016 Naaman
2016/0254434 A1 9/2016 McDermott, III
2016/0267032 A1 9/2016 Rigetti
2016/0267964 A1 9/2016 Herr
2016/0283857 A1 9/2016 Babbush
2016/0292586 A1 10/2016 Rigetti
2016/0292587 A1 10/2016 Rigetti
2016/0296145 A1 10/2016 Bajaj
2016/0314407 A1 10/2016 Bunyk
2016/0321559 A1 11/2016 Rose
2016/0328208 A1 11/2016 Tomaru
2016/0335558 A1 11/2016 Bunyk
2016/0335559 A1 11/2016 Pereverzev
2016/0351306 A1 12/2016 Faley
2016/0371227 A1 12/2016 Macready
2016/0380636 A1 12/2016 Abdo
2017/0000375 A1 1/2017 Demas
2017/0017742 A1 1/2017 Oberg
2017/0017894 A1 1/2017 Lanting
2017/0039481 A1 2/2017 Abdo
2017/0045592 A1 2/2017 Berggren
2017/0045800 A1 2/2017 Brandenburg
2017/0062107 A1 3/2017 Naaman
2017/0069367 A1 3/2017 Ohki
2017/0069415 A1 3/2017 Faley
2017/0071082 A1 3/2017 Sadleir
2017/0077380 A1 3/2017 Uchaykin
2017/0077381 A1 3/2017 Abdo
2017/0078400 A1 3/2017 Binder
2017/0085231 A1 3/2017 Abdo
2017/0086281 A1 3/2017 Avrahamy
2017/0089961 A1 3/2017 Abdo
2017/0091647 A1 3/2017 Abdo
2017/0091649 A1 3/2017 Clarke
2017/0091650 A1 3/2017 King
2017/0098682 A1 4/2017 Ladizinsky
2017/0104491 A1 4/2017 Shauck
2017/0104493 A1 4/2017 Goto
2017/0104695 A1 4/2017 Naaman
2017/0109605 A1 4/2017 Ahn
2017/0116159 A1 4/2017 Hamze
2017/0116542 A1 4/2017 Shim
2017/0117901 A1 4/2017 Carmean
2017/0123171 A1 5/2017 Goutzoulis
2017/0133336 A1 5/2017 Oliver
2017/0133576 A1 5/2017 Marcus
2017/0133577 A1 5/2017 Cybart
2017/0138851 A1 5/2017 Ashrafi
2017/0141286 A1 5/2017 Kerman
2017/0141287 A1 5/2017 Barkeshli
2017/0141769 A1 5/2017 Miller
2017/0146618 A1 5/2017 Leese De Escobar
2017/0162778 A1 6/2017 Harris
2017/0163301 A1 6/2017 Gupta
2017/0168123 A1 6/2017 Kandori
2017/0177534 A1 6/2017 Mohseni
2017/0177751 A1 6/2017 Macready
2017/0178017 A1 6/2017 Roy
2017/0178018 A1 6/2017 Tcaciuc
2017/0184689 A1 6/2017 Wang
2017/0186934 A1 6/2017 Kwon
2017/0193388 A1* 7/2017 Filipp .................... G06N 10/40
2017/0199036 A1 7/2017 Moxley, III
2017/0201224 A1 7/2017 Strong
2017/0212860 A1 7/2017 Naaman
2017/0228483 A1 8/2017 Rigetti
2017/0229167 A1 8/2017 Reohr
2017/0229631 A1 8/2017 Abdo
2017/0229632 A1 8/2017 Abdo
2017/0229633 A1 8/2017 Abdo
2017/0230050 A1 8/2017 Rigetti
2017/0237144 A1 8/2017 Tobar
2017/0241953 A1 8/2017 Kagawa
2017/0255629 A1 9/2017 Thom
2017/0255871 A1 9/2017 Macready
2017/0255872 A1 9/2017 Hamze
2017/0262765 A1 9/2017 Bourassa
2017/0265158 A1 9/2017 Gupta
2017/0265287 A1 9/2017 Avrahamy
2017/0276827 A1 9/2017 Gulian
2017/0286859 A1 10/2017 Harris
2017/0296169 A1 10/2017 Yates
2017/0296177 A1 10/2017 Harris
2017/0296178 A1 10/2017 Miller
2017/0296179 A1 10/2017 Shelton, IV
2017/0296180 A1 10/2017 Harris
2017/0296183 A1 10/2017 Shelton, IV
2017/0296184 A1 10/2017 Harris
2017/0296185 A1 10/2017 Swensgard
2017/0296189 A1 10/2017 Vendely
2017/0296213 A1 10/2017 Swensgard
2017/0300454 A1 10/2017 van den Brink
2017/0300808 A1 10/2017 Ronagh
2017/0300827 A1 10/2017 Amin
2017/0301444 A1 10/2017 Doi
2017/0323195 A1 11/2017 Crawford
2017/0324019 A1 11/2017 Ware
2017/0329883 A1 11/2017 Oberg
2017/0331899 A1 11/2017 Binder
2017/0337155 A1 11/2017 Novotny
2017/0344898 A1 11/2017 Karimi
2017/0345990 A1 11/2017 Yohannes

(56) References Cited

U.S. PATENT DOCUMENTS

| | | | |
|---|---|---|---|
| 2017/0351974 | A1 | 12/2017 | Rose |
| 2017/0359072 | A1 | 12/2017 | Hamilton |
| 2017/0373044 | A1 | 12/2017 | Das |
| 2017/0373369 | A1 | 12/2017 | Abdo |
| 2017/0373658 | A1 | 12/2017 | Thom |
| 2018/0012932 | A1 | 1/2018 | Oliver |
| 2018/0013052 | A1 | 1/2018 | Oliver |
| 2018/0013426 | A1 | 1/2018 | Deurloo |
| 2018/0019737 | A1 | 1/2018 | Goto |
| 2018/0025775 | A1 | 1/2018 | Ambrose |
| 2018/0026633 | A1 | 1/2018 | Naaman |
| 2018/0032893 | A1 | 2/2018 | Epstein |
| 2018/0033944 | A1 | 2/2018 | Ladizinsky |
| 2018/0034425 | A1 | 2/2018 | Bell |
| 2018/0034912 | A1 | 2/2018 | Binder |
| 2018/0040935 | A1 | 2/2018 | Sliwa |
| 2018/0054201 | A1 | 2/2018 | Reagor |
| 2018/0062765 | A1 | 3/2018 | Puthoff |
| 2018/0067182 | A1 | 3/2018 | Clerk |
| 2018/0076777 | A1 | 3/2018 | Hofheinz |
| 2018/0090661 | A1 | 3/2018 | McCaughan |
| 2018/0091115 | A1 | 3/2018 | Abdo |
| 2018/0091141 | A1 | 3/2018 | Abdo |
| 2018/0091142 | A1 | 3/2018 | Abdo |
| 2018/0091143 | A1 | 3/2018 | Abdo |
| 2018/0091440 | A1 | 3/2018 | Dadashikelayeh |
| 2018/0092313 | A1 | 4/2018 | Avrahamy |
| 2018/0101784 | A1 | 4/2018 | Rolfe |
| 2018/0101786 | A1 | 4/2018 | Boothby |
| 2018/0101787 | A1 | 4/2018 | Abdo |
| 2018/0102166 | A1 | 4/2018 | Braiman |
| 2018/0102469 | A1 | 4/2018 | Das |
| 2018/0102470 | A1 | 4/2018 | Das |
| 2018/0107092 | A1 | 4/2018 | Abdo |
| 2018/0114568 | A1 | 4/2018 | Burnett |
| 2018/0118573 | A1 | 5/2018 | Harutyunyan |
| 2018/0123544 | A1 | 5/2018 | Abdo |
| 2018/0124181 | A1 | 5/2018 | Binder |
| 2018/0128739 | A9 | 5/2018 | Ashrafi |
| 2018/0131376 | A1 | 5/2018 | Ryan |
| 2018/0137428 | A1 | 5/2018 | Abdo |
| 2018/0138987 | A1 | 5/2018 | Sliwa |
| 2018/0145631 | A1 | 5/2018 | Berkley |
| 2018/0145664 | A1 | 5/2018 | Herr |
| 2018/0150579 | A1 | 5/2018 | Sarpeshkar |
| 2018/0150760 | A1 | 5/2018 | Sarpeshkar |
| 2018/0150761 | A1 | 5/2018 | Sarpeshkar |
| 2018/0157775 | A1 | 6/2018 | Ronagh |
| 2018/0164385 | A1 | 6/2018 | Chesca |
| 2018/0188107 | A1 | 7/2018 | Zen |
| 2018/0196780 | A1 | 7/2018 | Amin |
| 2018/0198427 | A1 | 7/2018 | Narla |
| 2018/0211158 | A1 | 7/2018 | Shainline |
| 2018/0218279 | A1 | 8/2018 | Lechner |
| 2018/0218280 | A1 | 8/2018 | Harris |
| 2018/0218281 | A1 | 8/2018 | Reinhardt |
| 2018/0219150 | A1 | 8/2018 | Lanting |
| 2018/0225586 | A1 | 8/2018 | Chow |
| 2018/0226974 | A1 | 8/2018 | Harms |
| 2018/0226975 | A1 | 8/2018 | Braun |
| 2018/0232652 | A1 | 8/2018 | Curtis |
| 2018/0232653 | A1 | 8/2018 | Selvanayagam |
| 2018/0232654 | A1 | 8/2018 | Epstein |
| 2018/0240033 | A1 | 8/2018 | Leek |
| 2018/0240034 | A1 | 8/2018 | Harris |
| 2018/0240035 | A1 | 8/2018 | Scheer |
| 2018/0246848 | A1 | 8/2018 | Douglass |
| 2018/0247974 | A1 | 8/2018 | Oliver |
| 2018/0248103 | A1 | 8/2018 | Ivry |
| 2018/0248104 | A1 | 8/2018 | Bouzdine |
| 2018/0260245 | A1 | 9/2018 | Smith |
| 2018/0260729 | A1 | 9/2018 | Abdo |
| 2018/0260731 | A1 | 9/2018 | Zeng |
| 2018/0260732 | A1 | 9/2018 | Bloom |
| 2018/0261752 | A1 | 9/2018 | Ferguson |
| 2018/0267115 | A1 | 9/2018 | Petrashov |
| 2018/0267116 | A1 | 9/2018 | De Andrade |
| 2018/0267933 | A1 | 9/2018 | Lanting |
| 2018/0275057 | A1 | 9/2018 | Kolkowitz |
| 2018/0276550 | A1 | 9/2018 | Yarkoni |
| 2018/0277733 | A1 | 9/2018 | Abdo |
| 2018/0278693 | A1 | 9/2018 | Binder |
| 2018/0278694 | A1 | 9/2018 | Binder |
| 2018/0285761 | A1 | 10/2018 | Gambetta |
| 2018/0287041 | A1 | 10/2018 | Abdo |
| 2018/0294401 | A1 | 10/2018 | Tuckerman |
| 2018/0294815 | A1 | 10/2018 | Hamilton |
| 2018/0300286 | A1 | 10/2018 | Raymond |
| 2018/0306716 | A1 | 10/2018 | Ashrafi |
| 2018/0306723 | A1 | 10/2018 | Ashrafi |
| 2018/0308007 | A1 | 10/2018 | Amin |
| 2018/0308896 | A1 | 10/2018 | Ladizinsky |
| 2018/0309452 | A1 | 10/2018 | Kerman |
| 2018/0314968 | A1 | 11/2018 | Biamonte |
| 2018/0314970 | A1 | 11/2018 | Harris |
| 2018/0322408 | A1 | 11/2018 | Chen |
| 2018/0323364 | A1 | 11/2018 | Abdo |
| 2018/0330264 | A1 | 11/2018 | Lanting |
| 2018/0330267 | A1 | 11/2018 | Rigetti |
| 2018/0335683 | A1 | 11/2018 | Abdo |
| 2018/0336153 | A1 | 11/2018 | Naaman |
| 2018/0337138 | A1 | 11/2018 | Luu |
| 2018/0342663 | A1 | 11/2018 | Ferguson |
| 2018/0343304 | A1 | 11/2018 | Binder |
| 2018/0348310 | A1 | 12/2018 | Martinis |
| 2018/0350411 | A1 | 12/2018 | Ware |
| 2018/0350749 | A1 | 12/2018 | Abraham |
| 2018/0351521 | A1 | 12/2018 | Abdo |
| 2018/0359718 | A1 | 12/2018 | Gupta |
| 2018/0365587 | A1 | 12/2018 | Barzegar |
| 2018/0366634 | A1 | 12/2018 | Mutus |
| 2018/0373995 | A1 | 12/2018 | Tomaru |
| 2018/0373996 | A1 | 12/2018 | Amin |
| 2018/0375790 | A1 | 12/2018 | Dadashikelayeh |
| 2018/0375940 | A1 | 12/2018 | Binder |
| 2019/0005403 | A1 | 1/2019 | Blais |
| 2019/0006572 | A1 | 1/2019 | Falcon |
| 2019/0007051 | A1 | 1/2019 | Sete |
| 2019/0013065 | A1 | 1/2019 | Przybysz |
| 2019/0019098 | A1 | 1/2019 | Przybysz |
| 2019/0019099 | A1 | 1/2019 | Hoskinson |
| 2019/0019938 | A1 | 1/2019 | Braun |
| 2019/0034819 | A1 | 1/2019 | Ian |
| 2019/0036515 | A1 | 1/2019 | Naaman |
| 2019/0042964 | A1 | 2/2019 | Elsherbini |
| 2019/0042967 | A1 | 2/2019 | Yoscovits |
| 2019/0042968 | A1 | 2/2019 | Lampert |
| 2019/0043822 | A1 | 2/2019 | Falcon |
| 2019/0043919 | A1 | 2/2019 | George |
| 2019/0044044 | A1 | 2/2019 | Lampert |
| 2019/0044046 | A1 | 2/2019 | Caudillo |
| 2019/0044047 | A1 | 2/2019 | Elsherbini |
| 2019/0044051 | A1 | 2/2019 | Caudillo |
| 2019/0044668 | A1 | 2/2019 | Elsherbini |
| 2019/0058105 | A1 | 2/2019 | Pais |
| 2019/0065889 | A1 | 2/2019 | Ahn |
| 2019/0065981 | A1 | 2/2019 | Chen |
| 2019/0065982 | A1 | 2/2019 | Clarke |
| 2019/0070438 | A1 | 3/2019 | Tahar |
| 2019/0073439 | A1 | 3/2019 | Sarpeshkar |
| 2019/0074808 | A1 | 3/2019 | Petroff |
| 2019/0079145 | A1 | 3/2019 | Leese De Escobar |
| 2019/0081629 | A1 | 3/2019 | Reagor |
| 2019/0082997 | A1 | 3/2019 | Lee |
| 2019/0087385 | A1 | 3/2019 | van den Brink |
| 2019/0095811 | A1 | 3/2019 | Antonio |
| 2019/0098090 | A1 | 3/2019 | Binder |
| 2019/0102691 | A1 | 4/2019 | Chow |
| 2019/0104614 | A1 | 4/2019 | Abdo |
| 2019/0109904 | A1 | 4/2019 | Binder |
| 2019/0121834 | A1 | 4/2019 | Tomaru |
| 2019/0122133 | A1 | 4/2019 | Zohren |
| 2019/0123743 | A1 | 4/2019 | Abdo |
| 2019/0123744 | A1 | 4/2019 | Abdo |

(56) References Cited

U.S. PATENT DOCUMENTS

| | | | |
|---|---|---|---|
| 2019/0128808 | A1 | 5/2019 | Ashrafi |
| 2019/0131511 | A1 | 5/2019 | Clarke |
| 2019/0131683 | A1 | 5/2019 | Abdo |
| 2019/0131944 | A1 | 5/2019 | Naaman |
| 2019/0147359 | A1 | 5/2019 | Chen |
| 2019/0149139 | A1 | 5/2019 | Braun |
| 2019/0156237 | A1 | 5/2019 | Epstein |
| 2019/0156238 | A1 | 5/2019 | Abdo |
| 2019/0158098 | A1 | 5/2019 | Kerman |
| 2019/0164077 | A1 | 5/2019 | Roberts |
| 2019/0164959 | A1 | 5/2019 | Thomas |
| 2019/0165245 | A1 | 5/2019 | Rosenblatt |
| 2019/0165246 | A1 | 5/2019 | Rosenblatt |
| 2019/0182995 | A1 | 6/2019 | Sterling |
| 2019/0187075 | A1 | 6/2019 | Jach |
| 2019/0188596 | A1 | 6/2019 | Ipek |
| 2019/0188597 | A1 | 6/2019 | Chen |
| 2019/0190463 | A1 | 6/2019 | Smith |
| 2019/0204372 | A1 | 7/2019 | Astafiev |
| 2019/0204753 | A1 | 7/2019 | Burkett |
| 2019/0207076 | A1 | 7/2019 | Schneider |
| 2019/0212147 | A1 | 7/2019 | Moxley, III |
| 2019/0214561 | A1 | 7/2019 | Schrade |
| 2019/0214971 | A1 | 7/2019 | Keane |
| 2019/0215952 | A1 | 7/2019 | Lucero |
| 2019/0220771 | A1 | 7/2019 | Boothby |
| 2019/0227439 | A1 | 7/2019 | Megrant |
| 2019/0228331 | A1 | 7/2019 | Harris |
| 2019/0229094 | A1 | 7/2019 | White |
| 2019/0229690 | A1 | 7/2019 | White |
| 2019/0236476 | A1 | 8/2019 | Pereverzev |
| 2019/0237648 | A1 | 8/2019 | Przybysz |
| 2019/0238137 | A1 | 8/2019 | Powell, III |
| 2019/0245538 | A1 | 8/2019 | Abdo |
| 2019/0245544 | A1 | 8/2019 | Herr |
| 2019/0251466 | A1 | 8/2019 | Mezzacapo |
| 2019/0252754 | A1 | 8/2019 | Mueller |
| 2019/0259931 | A1 | 8/2019 | Megrant |
| 2019/0266508 | A1 | 8/2019 | Bunyk |
| 2019/0266510 | A1 | 8/2019 | Yarkoni |
| 2019/0267154 | A1 | 8/2019 | Sheng |
| 2019/0267532 | A1 | 8/2019 | David |
| 2019/0267692 | A1 | 8/2019 | Roberts |
| 2019/0273196 | A1 | 9/2019 | Marcus |
| 2019/0273197 | A1 | 9/2019 | Roberts |
| 2019/0288174 | A1 | 9/2019 | Cybart |
| 2019/0288176 | A1 | 9/2019 | Yoscovits |
| 2019/0288178 | A1 | 9/2019 | Cybart |
| 2019/0288367 | A1 | 9/2019 | Schuster |
| 2019/0294025 | A1 | 9/2019 | Brandenburg |
| 2019/0294991 | A1 | 9/2019 | Filipp |
| 2019/0296214 | A1 | 9/2019 | Yoscovits |
| 2019/0296743 | A1 | 9/2019 | Pedram |
| 2019/0302107 | A1 | 10/2019 | Kauffman |
| 2019/0302194 | A1 | 10/2019 | Lemay |
| 2019/0303242 | A1 | 10/2019 | Kapit |
| 2019/0303788 | A1 | 10/2019 | Kelly |
| 2019/0305037 | A1 | 10/2019 | Michalak |
| 2019/0305038 | A1 | 10/2019 | Michalak |
| 2019/0305206 | A1 | 10/2019 | Harris |
| 2019/0317167 | A1 | 10/2019 | LaBorde |
| 2019/0317978 | A1 | 10/2019 | Amin |
| 2019/0321039 | A1 | 10/2019 | Harris |
| 2019/0324941 | A1 | 10/2019 | van den Brink |
| 2019/0326501 | A1 | 10/2019 | Gilbert |
| 2019/0339339 | A1 | 11/2019 | Berggren |
| 2019/0341540 | A1 | 11/2019 | Megrant |
| 2019/0343002 | A1 | 11/2019 | Abdo |
| 2019/0343003 | A1 | 11/2019 | Abdo |
| 2019/0347576 | A1 | 11/2019 | Von Salis |
| 2019/0348597 | A1 | 11/2019 | Pais |
| 2019/0354890 | A1 | 11/2019 | Scheer |
| 2019/0362260 | A1 | 11/2019 | Leek |
| 2019/0362780 | A1 | 11/2019 | Burnett |
| 2019/0363239 | A1 | 11/2019 | Yoscovits |
| 2019/0363688 | A1 | 11/2019 | Egan |
| 2019/0369171 | A1 | 12/2019 | Swenson |
| 2019/0370679 | A1 | 12/2019 | Curtis |
| 2019/0370680 | A1 | 12/2019 | Novotny |
| 2019/0372192 | A1 | 12/2019 | Mueller |
| 2019/0378874 | A1 | 12/2019 | Rosenblatt |
| 2019/0385088 | A1 | 12/2019 | Naaman |
| 2019/0385673 | A1 | 12/2019 | Bosman |
| 2019/0391214 | A1 | 12/2019 | Ferguson |
| 2019/0392344 | A1 | 12/2019 | Kelly |
| 2019/0392878 | A1 | 12/2019 | Murduck |
| 2020/0000468 | A1 | 1/2020 | Shelton, IV |
| 2020/0006421 | A1 | 1/2020 | Ladizinsky |
| 2020/0006620 | A1 | 1/2020 | Mutus |
| 2020/0006621 | A1 | 1/2020 | Mutus |
| 2020/0008800 | A1 | 1/2020 | Shelton, IV |
| 2020/0012961 | A1 | 1/2020 | Kelly |
| 2020/0018803 | A1 | 1/2020 | Lemay |
| 2020/0027030 | A1 | 1/2020 | Freedman |
| 2020/0027502 | A1 | 1/2020 | Berggren |
| 2020/0027971 | A1 | 1/2020 | Freedman |
| 2020/0028480 | A1 | 1/2020 | Abdo |
| 2020/0028512 | A1 | 1/2020 | Reohr |
| 2020/0036330 | A1 | 1/2020 | Abdo |
| 2020/0036331 | A1 | 1/2020 | Abdo |
| 2020/0036332 | A1 | 1/2020 | Abdo |
| 2020/0036333 | A1 | 1/2020 | Abdo |
| 2020/0041410 | A1 | 2/2020 | Ashrafi |
| 2020/0044137 | A1 | 2/2020 | Schueffelgen |
| 2020/0044632 | A1 | 2/2020 | Powell, III |
| 2020/0044656 | A1 | 2/2020 | Herr |
| 2020/0046348 | A1 | 2/2020 | Shelton, IV |
| 2020/0049776 | A1 | 2/2020 | Wood |
| 2020/0050958 | A1 | 2/2020 | Bloom |
| 2020/0050961 | A1 | 2/2020 | Abdo |
| 2020/0052183 | A1 | 2/2020 | Shainline |
| 2020/0052359 | A1 | 2/2020 | Painter |
| 2020/0058702 | A1 | 2/2020 | Kelly |
| 2020/0064412 | A1 | 2/2020 | Martinis |
| 2020/0065696 | A1 | 2/2020 | Chow |
| 2020/0074345 | A1 | 3/2020 | Solgun |
| 2020/0075093 | A1 | 3/2020 | Naaman |
| 2020/0075832 | A1 | 3/2020 | Burchard |
| 2020/0075833 | A1 | 3/2020 | Topaloglu |
| 2020/0075834 | A1 | 3/2020 | Topaloglu |
| 2020/0078015 | A1 | 3/2020 | Miller |
| 2020/0081075 | A1 | 3/2020 | Leese de Escobar |
| 2020/0081076 | A1 | 3/2020 | Leese de Escobar |
| 2020/0083424 | A1 | 3/2020 | Sandberg |
| 2020/0090738 | A1 | 3/2020 | Naaman |
| 2020/0091396 | A1 | 3/2020 | Ferguson |
| 2020/0091397 | A1 | 3/2020 | Iwanaka |
| 2020/0091867 | A1 | 3/2020 | Goto |
| 2020/0106444 | A1 | 4/2020 | Herr |
| 2020/0106445 | A1 | 4/2020 | Kerman |
| 2020/0111016 | A1 | 4/2020 | Boothby |
| 2020/0111944 | A1 | 4/2020 | Moodera |
| 2020/0112310 | A1 | 4/2020 | Najafi-Yazdi |
| 2020/0118026 | A1 | 4/2020 | Ashrafi |
| 2020/0119251 | A1 | 4/2020 | Yohannes |
| 2020/0119254 | A1 | 4/2020 | Jinka |
| 2020/0119737 | A1 | 4/2020 | Hamilton |
| 2020/0120812 | A1 | 4/2020 | Abdo |
| 2020/0125625 | A1 | 4/2020 | Lanting |
| 2020/0127678 | A1 | 4/2020 | Inamdar |
| 2020/0134503 | A1 | 4/2020 | Lupton |
| 2020/0136008 | A1 | 4/2020 | Gingrich |
| 2020/0136626 | A1 | 4/2020 | Rylov |
| 2020/0138434 | A1 | 5/2020 | Miller |
| 2020/0138437 | A1 | 5/2020 | Vendely |
| 2020/0144476 | A1 | 5/2020 | Huang |
| 2020/0152696 | A1 | 5/2020 | Rosenblatt |
| 2020/0152851 | A1 | 5/2020 | Lanting |
| 2020/0152853 | A1 | 5/2020 | Rosenblatt |
| 2020/0152854 | A1 | 5/2020 | Sandberg |
| 2020/0156955 | A1 | 5/2020 | Rieken |
| 2020/0160205 | A1 | 5/2020 | Leipold |
| 2020/0161446 | A1 | 5/2020 | Anderson |
| 2020/0161531 | A1 | 5/2020 | Olivadese |

(56) References Cited

U.S. PATENT DOCUMENTS

2020/0162047 A1 5/2020 Bell
2020/0162078 A1 5/2020 McKay
2020/0166586 A1 5/2020 Lemay
2020/0167683 A1 5/2020 Frisch
2020/0167684 A1 5/2020 Frisch
2020/0167685 A1 5/2020 Thom
2020/0176409 A1 6/2020 Lucero
2020/0176662 A1 6/2020 Dayton
2020/0183768 A1 6/2020 Berkley
2020/0184364 A1 6/2020 Abdo
2020/0186132 A1 6/2020 Braun
2020/0204181 A1 6/2020 Sete
2020/0220064 A1 7/2020 Graninger
2020/0228208 A1 7/2020 Henningsen
2020/0234171 A1 7/2020 Chu
2020/0235277 A1 7/2020 Jinka
2020/0242452 A1 7/2020 Tschirhart
2020/0242501 A1 7/2020 Babbush
2020/0242503 A1 7/2020 Chen
2020/0243132 A1 7/2020 Loving
2020/0243133 A1 7/2020 Gingrich
2020/0250567 A1 8/2020 Yu
2020/0250569 A1 8/2020 Kelly
2020/0250570 A1 8/2020 Barzegar
2020/0251419 A1 8/2020 Abraham
2020/0257644 A1 8/2020 Mohseni
2020/0258003 A1 8/2020 Rigetti
2020/0259066 A1 8/2020 Braeuninger-Weimer
2020/0259483 A1 8/2020 Wise
2020/0264130 A1 8/2020 Chen
2020/0264213 A1 8/2020 Przybysz
2020/0265334 A1 8/2020 Haider
2020/0266234 A1 8/2020 Boothby
2020/0272910 A1 8/2020 Kapit
2020/0272929 A1 8/2020 McKay
2020/0274049 A1 8/2020 Ambrose
2020/0274050 A1 8/2020 Ladizinsky
2020/0274929 A1 8/2020 Binder
2020/0278308 A1 9/2020 Kalenychenko
2020/0279013 A1 9/2020 Amin
2020/0279184 A1 9/2020 Kenawy
2020/0279186 A1 9/2020 Ferguson
2020/0279990 A1 9/2020 Burkett
2020/0280316 A1 9/2020 Reagor
2020/0280607 A1 9/2020 Binder
2020/0284855 A1 9/2020 Fisher
2020/0284859 A1 9/2020 Bertet
2020/0287118 A1 9/2020 Herr
2020/0287122 A1 9/2020 Rosenblatt
2020/0287540 A1 9/2020 Smith
2020/0287550 A1 9/2020 Rylov
2020/0293486 A1 9/2020 van den Brink
2020/0293938 A1 9/2020 Solgun
2020/0294401 A1 9/2020 Kerecsen
2020/0294557 A1 9/2020 Ware
2020/0299146 A1 9/2020 Zhao
2020/0301874 A1 9/2020 Shainline
2020/0311591 A1 10/2020 Bernoudy
2020/0320420 A1 10/2020 Hart
2020/0320424 A1 10/2020 Yarkoni
2020/0320426 A1 10/2020 Amin
2020/0321506 A1 10/2020 Kelly
2020/0321508 A1 10/2020 Hart
2020/0328339 A1 10/2020 Shabani
2020/0333263 A1 10/2020 Abdo
2020/0335683 A1 10/2020 David
2020/0342296 A1 10/2020 Wynn
2020/0345873 A1 11/2020 Ashrafi
2020/0349326 A1 11/2020 King
2020/0350083 A1 11/2020 Sorbom
2020/0350880 A1 11/2020 Miano
2020/0356889 A1 11/2020 Amin
2020/0356890 A1 11/2020 Ashrafi
2020/0358187 A1 11/2020 Tran
2020/0359501 A1 11/2020 Abdo
2020/0362384 A1 11/2020 Chen
2020/0363206 A1 11/2020 Moxley, III
2020/0364600 A1 11/2020 Elsherbini
2020/0365397 A1 11/2020 Megrant
2020/0371974 A1 11/2020 Boothby
2020/0372094 A1 11/2020 Shehab
2020/0373351 A1 11/2020 Roberts
2020/0373475 A1 11/2020 Rufenacht
2020/0379768 A1 12/2020 Berkley
2020/0380396 A1 12/2020 Raymond
2020/0381608 A1 12/2020 Olivadese
2020/0381609 A1 12/2020 Megrant
2020/0394524 A1 12/2020 Vainsencher
2020/0394548 A1 12/2020 Das
2020/0395405 A1 12/2020 Barends
2020/0396008 A1 12/2020 Henningsen
2020/0401649 A1 12/2020 Lanting
2020/0401922 A1 12/2020 Clarke
2020/0403137 A1 12/2020 Lampert
2020/0411937 A1 12/2020 Whittaker
2020/0411938 A1 12/2020 Mannhart
2021/0005249 A1 1/2021 Naaman
2021/0013391 A1 1/2021 Johnson
2021/0018575 A1 1/2021 Mitchell
2021/0019223 A1 1/2021 Chamberland
2021/0019646 A1 1/2021 Sterling
2021/0019647 A1 1/2021 Macready
2021/0021245 A1 1/2021 Frattini
2021/0028343 A1 1/2021 McCaughan
2021/0028345 A1 1/2021 Hart
2021/0033683 A1 2/2021 Ferguson
2021/0035004 A1 2/2021 Herr
2021/0035005 A1 2/2021 Martinis
2021/0036206 A1 2/2021 Neill
2021/0043824 A1 2/2021 Yan
2021/0047913 A1 2/2021 Santamarina
2021/0056454 A1 2/2021 Bloom
2021/0056455 A1 2/2021 Shehab
2021/0057135 A1 2/2021 Choi
2021/0057484 A1 2/2021 Rosenblatt
2021/0057631 A1 2/2021 Swenson
2021/0066570 A1 3/2021 Luethi
2021/0068320 A1 3/2021 Bogorin
2021/0073667 A1 3/2021 Harris
2021/0075860 A1 3/2021 Binder
2021/0075861 A1 3/2021 Binder
2021/0083167 A1 3/2021 Jespersen
2021/0083168 A1 3/2021 Rosenblatt
2021/0083676 A1 3/2021 Herr
2021/0085316 A1 3/2021 Harris
2021/0085317 A1 3/2021 Miller
2021/0085675 A1 3/2021 Zheng
2021/0089954 A1 3/2021 Kapit
2021/0091062 A1 3/2021 Boothby
2021/0099129 A1 4/2021 Abdo
2021/0099201 A1 4/2021 Winick
2021/0103012 A1 4/2021 Yasui
2021/0103018 A1 4/2021 Biber
2021/0110290 A1 4/2021 Jin
2021/0110291 A1 4/2021 Abdo
2021/0110868 A1 4/2021 Gingrich
2021/0116499 A1 4/2021 Yamamoto
2021/0125096 A1 4/2021 Puri
2021/0132969 A1 5/2021 Smith
2021/0133385 A1 5/2021 Molavi
2021/0142215 A1 5/2021 Rigetti
2021/0152127 A1 5/2021 Abdo
2021/0157877 A1 5/2021 Mezzacapo
2021/0159384 A1 5/2021 Abdo
2021/0166133 A1 6/2021 Ronagh
2021/0167272 A1 6/2021 Jinka
2021/0184329 A1 6/2021 Schuster
2021/0190885 A1 6/2021 Swenson
2021/0192380 A1 6/2021 Jin
2021/0193270 A1 6/2021 Stober
2021/0209498 A1 7/2021 Jin
2021/0226113 A1 7/2021 David
2021/0226635 A1 7/2021 Mukhanov
2021/0232739 A1 7/2021 Marthaler

(56) References Cited

U.S. PATENT DOCUMENTS

| | | | |
|---|---|---|---|
| 2021/0233617 | A1 | 7/2021 | Niroula |
| 2021/0233896 | A1 | 7/2021 | White |
| 2021/0234084 | A1 | 7/2021 | Abdo |
| 2021/0234086 | A1 | 7/2021 | Lescanne |
| 2021/0234087 | A1 | 7/2021 | Topaloglu |
| 2021/0241143 | A1 | 8/2021 | Amin |
| 2021/0241159 | A1 | 8/2021 | Heinsoo |
| 2021/0241160 | A1 | 8/2021 | Amin |
| 2021/0247329 | A1 | 8/2021 | Wang |
| 2021/0256412 | A1 | 8/2021 | Chen |
| 2021/0257969 | A1 | 8/2021 | Bardin |
| 2021/0257995 | A1 | 8/2021 | Sun |
| 2021/0258010 | A9 | 8/2021 | Smith |
| 2021/0263643 | A1 | 8/2021 | Thom |
| 2021/0265964 | A1 | 8/2021 | Miano |
| 2021/0271545 | A1 | 9/2021 | Abdo |
| 2021/0272008 | A1 | 9/2021 | Oliver |
| 2021/0279134 | A1 | 9/2021 | Versluis |
| 2021/0279627 | A1 | 9/2021 | Bauer |
| 2021/0287124 | A1 | 9/2021 | Ronagh |
| 2021/0288611 | A1 | 9/2021 | Abdo |
| 2021/0289020 | A1 | 9/2021 | Rolfe |
| 2021/0294680 | A1 | 9/2021 | Palmer Da Silva |
| 2021/0297056 | A1 | 9/2021 | Abdo |
| 2021/0302513 | A1 | 9/2021 | Perelshtein |
| 2021/0304050 | A1 | 9/2021 | Harris |
| 2021/0305374 | A1 | 9/2021 | Teo |
| 2021/0305480 | A1 | 9/2021 | Holmes |
| 2021/0314069 | A1 | 10/2021 | Henningsen |
| 2021/0326737 | A1 | 10/2021 | Jin |
| 2021/0330825 | A1 | 10/2021 | Ashrafi |
| 2021/0341411 | A1 | 11/2021 | Chen |
| 2021/0342161 | A1 | 11/2021 | Lauer |
| 2021/0342289 | A1 | 11/2021 | van den Brink |
| 2021/0342729 | A1 | 11/2021 | Scheer |
| 2021/0343923 | A1 | 11/2021 | Oliver |
| 2021/0350266 | A1 | 11/2021 | Hassel |
| 2021/0374590 | A1 | 12/2021 | Biamonte |
| 2021/0375516 | A1 | 12/2021 | Sterling |
| 2021/0384404 | A1 | 12/2021 | Finck |
| 2021/0384406 | A1 | 12/2021 | Huang |
| 2021/0390440 | A1 | 12/2021 | Shah |
| 2021/0399044 | A1 | 12/2021 | Gumann |
| 2021/0399200 | A1 | 12/2021 | Schueffelgen |
| 2021/0406746 | A1 | 12/2021 | Stehlik |
| 2022/0014192 | A1 | 1/2022 | Ahonen |
| 2022/0018801 | A1 | 1/2022 | Chen |
| 2022/0019929 | A1 | 1/2022 | Bunyk |
| 2022/0020913 | A1 | 1/2022 | Harris |
| 2022/0044143 | A1 | 2/2022 | Jin |
| 2022/0045416 | A1 | 2/2022 | Naaman |
| 2022/0054669 | A1 | 2/2022 | Ashrafi |
| 2022/0059919 | A1 | 2/2022 | Underwood |
| 2022/0065954 | A1 | 3/2022 | Beck |
| 2022/0066279 | A1 | 3/2022 | Spence |
| 2022/0076154 | A1 | 3/2022 | Wang |
| 2022/0083488 | A1 | 3/2022 | Black |
| 2022/0084085 | A1 | 3/2022 | Rigetti |
| 2022/0092152 | A1 | 3/2022 | Hamze |
| 2022/0092461 | A1 | 3/2022 | Bloom |
| 2022/0092462 | A1 | 3/2022 | Huai |
| 2022/0093500 | A1 | 3/2022 | Thomas |
| 2022/0093501 | A1 | 3/2022 | Thomas |
| 2022/0094029 | A1 | 3/2022 | Richman |
| 2022/0094320 | A1 | 3/2022 | Vesterinen |
| 2022/0094338 | A1 | 3/2022 | Kumph |
| 2022/0094341 | A1 | 3/2022 | Pellerano |
| 2022/0094358 | A1 | 3/2022 | Phung |
| 2022/0101171 | A1 | 3/2022 | Chen |
| 2022/0103172 | A1 | 3/2022 | Mundhada |
| 2022/0108200 | A1 | 4/2022 | Suttle |
| 2022/0115577 | A1 | 4/2022 | Beck |
| 2022/0121978 | A1 | 4/2022 | Woods |
| 2022/0123048 | A1 | 4/2022 | Swenson |
| 2022/0123449 | A1 | 4/2022 | Lauer |
| 2022/0129779 | A1 | 4/2022 | Moores |
| 2022/0138611 | A1 | 5/2022 | Siddiqi |
| 2022/0140223 | A1 | 5/2022 | Gao |
| 2022/0147859 | A1 | 5/2022 | Zhang |
| 2022/0155391 | A1 | 5/2022 | Juchem |
| 2022/0156441 | A1 | 5/2022 | Campbell |
| 2022/0156443 | A1 | 5/2022 | Chamberland |
| 2022/0156444 | A1 | 5/2022 | Noh |
| 2022/0156620 | A1 | 5/2022 | McDermott, III |
| 2022/0156621 | A1 | 5/2022 | Arrangoiz Arriola |
| 2022/0156622 | A1 | 5/2022 | Putterman |
| 2022/0164694 | A1 | 5/2022 | Rosenthal |
| 2022/0178995 | A1 | 6/2022 | Chamberland |
| 2022/0179732 | A1 | 6/2022 | Egger |
| 2022/0180236 | A1 | 6/2022 | Hann |
| 2022/0181534 | A1 | 6/2022 | Plourde |
| 2022/0187388 | A1 | 6/2022 | Phung |
| 2022/0188381 | A1 | 6/2022 | Mezzacapo |
| 2022/0188683 | A1 | 6/2022 | Goetz |
| 2022/0190027 | A1 | 6/2022 | Hyyppä |
| 2022/0199886 | A1 | 6/2022 | Phung |
| 2022/0207402 | A1 | 6/2022 | Lechner |
| 2022/0207403 | A1 | 6/2022 | Kapit |
| 2022/0207404 | A1 | 6/2022 | Boothby |
| 2022/0209844 | A1 | 6/2022 | Jamieson |
| 2022/0215282 | A1 | 7/2022 | Amin |
| 2022/0215283 | A1 | 7/2022 | Neill |
| 2022/0222567 | A1 | 7/2022 | Reagor |
| 2022/0223778 | A1 | 7/2022 | Kutsaev |
| 2022/0230760 | A1 | 7/2022 | Harris |
| 2022/0230761 | A1 | 7/2022 | Harris |
| 2022/0231690 | A1 | 7/2022 | Sete |
| 2022/0236593 | A1 | 7/2022 | Karinou |
| 2022/0236623 | A1 | 7/2022 | Mukhanov |
| 2022/0237489 | A1 | 7/2022 | Li |
| 2022/0237495 | A1 | 7/2022 | Yohannes |
| 2022/0245497 | A1 | 8/2022 | Zeng |
| 2022/0245501 | A1 | 8/2022 | Li |
| 2022/0246677 | A1 | 8/2022 | Kelly |
| 2022/0261680 | A1 | 8/2022 | Hasegawa |
| 2022/0263007 | A1 | 8/2022 | Lanting |
| 2022/0263483 | A1 | 8/2022 | Koh |
| 2022/0269968 | A1 | 8/2022 | Noguchi |
| 2022/0269970 | A1 | 8/2022 | Zhou |
| 2022/0277214 | A1 | 9/2022 | Kelly |
| 2022/0300844 | A1 | 9/2022 | Stehlik |
| 2022/0308134 | A2 | 9/2022 | Perelshtein |
| 2022/0309373 | A1 | 9/2022 | Huang |
| 2022/0311120 | A1 | 9/2022 | Schuster |
| 2022/0318660 | A1 | 10/2022 | Hasegawa |
| 2022/0327410 | A1 | 10/2022 | Chamberland |
| 2022/0335320 | A1 | 10/2022 | Thom |
| 2022/0343201 | A1 | 10/2022 | Lechner |
| 2022/0366291 | A1 | 11/2022 | Ni |
| 2022/0367090 | A1 | 11/2022 | Pixley |
| 2022/0374755 | A1 | 11/2022 | Didier |
| 2022/0374756 | A1 | 11/2022 | Doherty |
| 2022/0376161 | A1 | 11/2022 | Goto |
| 2022/0383179 | A1 | 12/2022 | Maksymov |
| 2022/0391081 | A1 | 12/2022 | Thom |
| 2022/0393089 | A1 | 12/2022 | Yohannes |
| 2022/0398482 | A1 | 12/2022 | Marthaler |
| 2022/0399145 | A1 | 12/2022 | Kirichenko |
| 2022/0399890 | A1 | 12/2022 | Archambault |
| 2022/0405649 | A1 | 12/2022 | Rastunkov |
| 2022/0407482 | A1 | 12/2022 | De Lange |
| 2022/0414513 | A1 | 12/2022 | Niroula |
| 2022/0414517 | A1 | 12/2022 | Sete |
| 2022/0416392 | A1 | 12/2022 | Lauer |
| 2023/0003813 | A1 | 1/2023 | Tanaka |
| 2023/0004850 | A1 | 1/2023 | Oreg |
| 2023/0004851 | A1 | 1/2023 | Harris |
| 2023/0006324 | A1 | 1/2023 | Whittaker |
| 2023/0006626 | A1 | 1/2023 | Naaman |
| 2023/0008279 | A1 | 1/2023 | Tillemann-Dick |
| 2023/0009670 | A1 | 1/2023 | Tillemann-Dick |
| 2023/0010205 | A1 | 1/2023 | Sank |
| 2023/0010758 | A1 | 1/2023 | Tillemann-Dick |
| 2023/0010920 | A1 | 1/2023 | Tillemann-Dick |

(56) References Cited

U.S. PATENT DOCUMENTS

| | | | |
|---|---|---|---|
| 2023/0011913 | A1 | 1/2023 | Henriksen |
| 2023/0012324 | A1 | 1/2023 | Tillemann-Dick |
| 2023/0020389 | A1 | 1/2023 | Davis |
| 2023/0021319 | A1 | 1/2023 | Jin |
| 2023/0022450 | A1 | 1/2023 | Gilbert |
| 2023/0023319 | A1 | 1/2023 | Poccia |
| 2023/0026518 | A1 | 1/2023 | Burchard |
| 2023/0040584 | A1 | 2/2023 | Baker |
| 2023/0043001 | A1 | 2/2023 | Neill |
| 2023/0044102 | A1 | 2/2023 | Anderson |
| 2023/0044874 | A1 | 2/2023 | Goto |
| 2023/0059903 | A1 | 2/2023 | Shiokawa |
| 2023/0068284 | A1 | 3/2023 | Phung |
| 2023/0068621 | A1 | 3/2023 | Beck |
| 2023/0073224 | A1 | 3/2023 | Schuster |
| 2023/0080126 | A1 | 3/2023 | Chamberland |
| 2023/0085177 | A1 | 3/2023 | Shehab |
| 2023/0094612 | A1 | 3/2023 | Chen |
| 2023/0101616 | A1 | 3/2023 | Volkmann |
| 2023/0103370 | A1 | 4/2023 | Lahabi |
| 2023/0104058 | A1 | 4/2023 | Hopfmueller |
| 2023/0106489 | A1 | 4/2023 | Harris |
| 2023/0115065 | A1 | 4/2023 | Fischbacher |
| 2023/0127101 | A1 | 4/2023 | Yamaguchi |
| 2023/0142623 | A1 | 5/2023 | Leroux |
| 2023/0142878 | A1 | 5/2023 | Yamaji |
| 2023/0143506 | A1 | 5/2023 | Johnson |
| 2023/0153199 | A1 | 5/2023 | Lauer |
| 2023/0153667 | A1 | 5/2023 | Kandala |
| 2023/0153669 | A1 | 5/2023 | McKay |
| 2023/0155593 | A1 | 5/2023 | Abdo |
| 2023/0155594 | A1 | 5/2023 | Camirand Lemyre |
| 2023/0162080 | A1 | 5/2023 | Kikuchi |
| 2023/0163737 | A1 | 5/2023 | Vesterinen |
| 2023/0163762 | A1 | 5/2023 | Yamaji |
| 2023/0170889 | A1 | 6/2023 | Underwood |
| 2023/0172076 | A1 | 6/2023 | Xi |
| 2023/0172077 | A1 | 6/2023 | Finck |
| 2023/0176935 | A1 | 6/2023 | Earnest-Noble |
| 2023/0178519 | A1 | 6/2023 | White |
| 2023/0179205 | A1 | 6/2023 | Finck |
| 2023/0180631 | A1 | 6/2023 | Finck |
| 2023/0186132 | A1 | 6/2023 | Safavi-Naeini |
| 2023/0189665 | A1 | 6/2023 | Swenson |
| 2023/0189666 | A1 | 6/2023 | Noguchi |
| 2023/0196156 | A1 | 6/2023 | Chen |
| 2023/0196163 | A1 | 6/2023 | Mamin |
| 2023/0197539 | A1 | 6/2023 | Abraham |
| 2023/0198555 | A1 | 6/2023 | Phung |
| 2023/0207507 | A1 | 6/2023 | Yao |
| 2023/0216495 | A1 | 7/2023 | Yamaji |
| 2023/0225224 | A1 | 7/2023 | Abdo |
| 2023/0239054 | A1 | 7/2023 | Nissilä |
| 2023/0240154 | A1 | 7/2023 | Oh |
| 2023/0255123 | A1 | 8/2023 | Holmes |
| 2023/0270019 | A1 | 8/2023 | De Lange |
| 2023/0276719 | A1 | 8/2023 | Ma |
| 2023/0289400 | A1 | 9/2023 | Carroll |
| 2023/0289641 | A1 | 9/2023 | Palmer |
| 2023/0289642 | A1 | 9/2023 | Carroll |
| 2023/0291419 | A1 | 9/2023 | Yoder |
| 2023/0297869 | A1 | 9/2023 | Bunyk |
| 2023/0299791 | A1 | 9/2023 | Yoder |
| 2023/0309419 | A1 | 9/2023 | Kikuchi |
| 2023/0316117 | A1 | 10/2023 | Martinis |
| 2023/0318601 | A1 | 10/2023 | Yamaji |
| 2023/0325700 | A1 | 10/2023 | Jin |
| 2023/0337553 | A1 | 10/2023 | Yohannes |
| 2023/0341488 | A1 | 10/2023 | Apostolos |
| 2023/0351232 | A1 | 11/2023 | Stehlik |
| 2023/0353127 | A1 | 11/2023 | Goto |
| 2023/0359918 | A1 | 11/2023 | Phung |
| 2023/0360736 | A1 | 11/2023 | Stober |
| 2023/0363293 | A1 | 11/2023 | Miyata |
| 2023/0368059 | A1 | 11/2023 | McKay |
| 2023/0368063 | A1 | 11/2023 | Chancellor |
| 2023/0368065 | A1 | 11/2023 | Koike Akino |
| 2023/0370069 | A1 | 11/2023 | Amin |
| 2023/0371404 | A1 | 11/2023 | Hyyppä |
| 2023/0385668 | A1 | 11/2023 | Thom |
| 2023/0394342 | A1 | 12/2023 | Bloom |
| 2023/0400510 | A1 | 12/2023 | Whittaker |
| 2023/0401475 | A1 | 12/2023 | Finck |
| 2023/0401476 | A1 | 12/2023 | Finck |
| 2023/0409942 | A1 | 12/2023 | Sete |
| 2023/0409945 | A1 | 12/2023 | Miller, Jr. |
| 2023/0409946 | A1 | 12/2023 | Schwaller |
| 2023/0418706 | A1 | 12/2023 | Lauer |
| 2023/0419143 | A1 | 12/2023 | Ding |
| 2023/0419154 | A1 | 12/2023 | Lechner |
| 2023/0422635 | A1 | 12/2023 | Shabani |
| 2024/0008372 | A1 | 1/2024 | Sterling |
| 2024/0012749 | A1 | 1/2024 | Simmons |
| 2024/0013082 | A1 | 1/2024 | Ding |
| 2024/0013088 | A1 | 1/2024 | Kapit |
| 2024/0019514 | A1 | 1/2024 | Neufeld |
| 2024/0020562 | A1 | 1/2024 | Miano |
| 2024/0028537 | A1 | 1/2024 | Mariella |
| 2024/0028938 | A1 | 1/2024 | Berkley |
| 2024/0029902 | A1 | 1/2024 | Weggel |
| 2024/0029903 | A1 | 1/2024 | Ford |
| 2024/0030912 | A1 | 1/2024 | Beck |
| 2024/0038723 | A1 | 2/2024 | Nah |
| 2024/0046132 | A1 | 2/2024 | Kumph |
| 2024/0047277 | A1 | 2/2024 | Burkett |
| 2024/0049609 | A1 | 2/2024 | Li |
| 2024/0054379 | A1 | 2/2024 | Hodson |
| 2024/0057485 | A1 | 2/2024 | Altomare |
| 2024/0062088 | A1 | 2/2024 | Heya |
| 2024/0062089 | A1 | 2/2024 | Igarashi |
| 2024/0069079 | A1 | 2/2024 | Shi |
| 2024/0070502 | A1 | 2/2024 | Ethier-Majcher |
| 2024/0070510 | A1 | 2/2024 | Tsai |
| 2024/0070513 | A1 | 2/2024 | Shi |
| 2024/0072796 | A1 | 2/2024 | Ockeloen-Korppi |
| 2024/0077524 | A1 | 3/2024 | Kong |
| 2024/0078460 | A1 | 3/2024 | Finck |
| 2024/0086748 | A1 | 3/2024 | Bunyk |
| 2024/0086751 | A1 | 3/2024 | Finck |
| 2024/0090348 | A1 | 3/2024 | Yang |
| 2024/0095564 | A1 | 3/2024 | Underwood |

OTHER PUBLICATIONS

Quantum Computing Circuits and Devices, Travis S. Humble and Himanshu Thapliyal and Edgard Munoz-Coreas and Fahd A. Mohiyaddin and Ryan S. Bennink, 2018, https://arxiv.org/abs/1804.10648 (Year: 2018).*

Abrams, Deanna M., Nicolas Didier, Blake R. Johnson, Marcus P. da Silva, and Colm A. Ryan. "Implementation of the XY interaction family with calibration of a single pulse." arXiv preprint arXiv:1912.04424 (2019).

Abrams, Deanna M., Nicolas Didier, Shane A. Caldwell, Blake R. Johnson, and Colm A. Ryan. "Methods for measuring magnetic flux crosstalk between tunable transmons." Physical Review Applied 12, No. 6 (2019): 064022.

Ahmad, Meraj, Christos Giagkoulovits, Sergey Danilin, Martin Weides, and Hadi Heidari. "Scalable Cryoelectronics for Superconducting Qubit Control and Readout." Advanced Intelligent Systems (2022): 2200079.

Allman, Michael S., Fabio Altomare, Jed D. Whittaker, Katarina Cicak, Dale Li, Adam Sirois, Joshua Strong, John D. Teufel, and Raymond W. Simmonds. "rf-SQUID-mediated coherent tunable coupling between a superconducting phase qubit and a lumped-element resonator." Physical review letters 104, No. 17 (2010): 177004.

Amparo, Denis, Mustafa Eren Çelik, Sagnik Nath, Joao P. Cerqueira, and Amol Inamdar. "Timing characterization for RSFQ cell library." IEEE Transactions on Applied Superconductivity 29, No. 5 (2019): 1-9.

(56) References Cited

OTHER PUBLICATIONS

Antonov, I. V., R. S. Shaikhaidarov, V. N. Antonov, and O. V. Astafiev. "Superconducting 'twin'qubit." Physical Review B 102, No. 11 (2020): 115422.
Ash-Saki, Abdullah, Mahabubul Alam, and Swaroop Ghosh. "Experimental characterization, modeling, and analysis of crosstalk in a quantum computer." IEEE Transactions on Quantum Engineering 1 (2020): 1-6.
Aumentado, Jose. "Superconducting parametric amplifiers: The state of the art in Josephson parametric amplifiers." IEEE Microwave Magazine 21, No. 8 (2020): 45-59.
Bækkegaard, Thomas, L. B. Kristensen, Niels JS Loft, Christian Kraglund Andersen, David Petrosyan, and Nikolaj T. Zinner. "Realization of efficient quantum gates with a superconducting qubit-qutrit circuit." Scientific reports 9, No. 1 (2019): 1-10.
Bairamkulov, Rassul, Tahereh Jabbari, and Eby G. Friedman. "QuCTS—single-flux quantum clock tree synthesis." IEEE Transactions on Computer-Aided Design of Integrated Circuits and Systems 41, No. 10 (2021): 3346-3358.
Bardin, Joseph C. "Analog/Mixed-Signal Integrated Circuits for Quantum Computing." In 2020 IEEE BiCMOS and Compound Semiconductor Integrated Circuits and Technology Symposium (BCICTS), pp. 1-8. IEEE, 2020.
Bardin, Joseph C., Daniel Sank, Ofer Naaman, and Evan Jeffrey. "Quantum computing: An introduction for microwave engineers." IEEE Microwave Magazine 21, No. 8 (2020): 24-44.
Bardin, Joseph C., Evan Jeffrey, Erik Lucero, Trent Huang, Ofer Naaman, Rami Barends, Ted White et al. "29.1 A 28nm bulk-CMOS 4-to-8GHz; 2mW cryogenic pulse modulator for scalable quantum computing." In 2019 IEEE International Solid-State Circuits Conference-(ISSCC), pp. 456-458. IEEE, 2019.
Barends, Rami, C. M. Quintana, A. G. Petukhov, Yu Chen, Dvir Kafri, Kostyantyn Kechedzhi, Roberto Collins et al. "Diabatic gates for frequency-tunable superconducting qubits." Physical Review Letters 123, No. 21 (2019): 210501.
Barends, Rami, Julian Kelly, Anthony Megrant, Daniel Sank, Evan Jeffrey, Yu Chen, Yi Yin et al. "Coherent Josephson qubit suitable for scalable quantum integrated circuits." Physical review letters 111, No. 8 (2013): 080502.
Berke, Christoph, Evangelos Varvelis, Simon Trebst, Alexander Altland, and David P. DiVincenzo. "Transmon platform for quantum computing challenged by chaotic fluctuations." arXiv preprint arXiv:2012.05923 (2020).
Berke, Christoph, Evangelos Varvelis, Simon Trebst, Alexander Altland, and David P. DiVincenzo. "Transmon platform for quantum computing challenged by chaotic fluctuations." Nature communications 13, No. 1 (2022): 2495.
Berkley, A. J., M. W. Johnson, P. Bunyk, R. Harris, J. Johansson, T. Lanting, E. Ladizinsky, E. Tolkacheva, M. H. S. Amin, and G. Rose. "A scalable readout system for a superconducting adiabatic quantum optimization system." Superconductor Science and Technology 23, No. 10 (2010): 105014.
Besedin, Il'ya Stanislavovich, Gleb Petrovich Fedorov, A. Yu Dmitriev, and Valerii Vladimirovich Ryazanov. "Superconducting qubits in Russia." Quantum Electronics 48, No. 10 (2018): 880.
Bhattacharyya, Shaman, and Somnath Bhattacharyya. "Demonstrating geometric phase acquisition in multi-path tunnel systems using a near-term quantum computer." Journal of Applied Physics 130, No. 3 (2021): 034901.
Bocko, Mark F., Andrea M. Herr, and Marc J. Feldman. "Prospects for quantum coherent computation using superconducting electronics." IEEE Transactions on Applied Superconductivity 7, No. 2 (1997): 3638-3641.
Boixo, Sergio, Tameem Albash, Federico M. Spedalieri, Nicholas Chancellor, and Daniel A. Lidar. "Experimental signature of programmable quantum annealing." *Nature communications* 4, No. 1 (2013): 2067.
Boutin, Samuel, David M. Toyli, Aditya V. Venkatramani, Andrew W. Eddins, Irfan Siddiqi, and Alexandre Blais. "Effect of higher-order nonlinearities on amplification and squeezing in Josephson parametric amplifiers." Physical Review Applied 8, No. 5 (2017): 054030.
Brink, Markus, Jerry M. Chow, Jared Hertzberg, Easwar Magesan, and Sami Rosenblatt. "Device challenges for near term superconducting quantum processors: frequency collisions." In 2018 IEEE International Electron Devices Meeting (IEDM), pp. 6-1. IEEE, 2018.
Brock, Darren K. "RSFQ technology: Circuits and systems." International journal of high speed electronics and systems 11, No. 01 (2001): 307-362.
Brock, Darren K., Elie K. Track, and John M. Rowell. "Superconductor ICs: the 100-GHz second generation." *IEEE spectrum* 37, No. 12 (2000): 40-46.
Bunyk, Paul I., Emile M. Hoskinson, Mark W. Johnson, Elena Tolkacheva, Fabio Altomare, Andrew J. Berkley, Richard Harris et al. "Architectural considerations in the design of a superconducting quantum annealing processor." IEEE Transactions on Applied Superconductivity 24, No. 4 (2014): 1-10.
Bunyk, Paul, Konstantin Likharev, and Dmitry Zinoviev. "RSFQ technology: Physics and devices." *International journal of high speed electronics and systems* 11, No. 01 (2001): 257-305.
Cai, T-Q., X-Y. Han, Y-K. Wu, Y-L. Ma, J-H. Wang, Z-L. Wang, H-Y. Zhang, H-Y. Wang, Y-P. Song, and L-M. Duan. "Impact of Spectators on a Two-Qubit Gate in a Tunable Coupling Superconducting Circuit." Physical Review Letters 127, No. 6 (2021): 060505.
Caldwell, S. A., N. Didier, C. A. Ryan, E. A. Sete, A. Hudson, P. Karalekas, R. Manenti et al. "Parametrically activated entangling gates using transmon qubits." Physical Review Applied 10, No. 3 (2018): 034050.
Castellano, Maria Gabriella, Fabio Chiarello, Roberto Leoni, Guido Torrioli, Pasquale Carelli, Carlo Cosmelli, Marilena Di Bucchianico, Francesco Mattioli, Stefano Poletto, and Daniela Simeone. "A new flux/phase qubit with integrated readout." IEEE transactions on applied superconductivity 15, No. 2 (2005): 849-851.
Castellano, Maria Gabriella, Leif Grönberg, Pasquale Carelli, Fabio Chiarello, Carlo Cosmelli, Roberto Leoni, Stefano Poletto, Guido Torrioli, Juha Hassel, and Panu Helisto. "Characterization of a fabrication process for the integration of superconducting qubits and rapid-single-flux-quantum circuits." Superconductor Science and Technology 19, No. 8 (2006): 860.
Çelik, Mustafa Eren, Timur V. Filippov, Anubhav Sahu, Dmitri E. Kirichenko, Saad M. Sarwana, A. Erik Lehmann, and Deepnarayan Gupta. "Fast RSFQ and ERSFQ parallel counters." IEEE Transactions on Applied Superconductivity 30, No. 7 (2020): 1-4.
Chávez-Garcia, José M., Firat Solgun, Jared B. Hertzberg, Oblesh Jinka, Markus Brink, and Baleegh Abdo. "Weakly flux-tunable superconducting qubit." Physical Review Applied 18, No. 3 (2022): 034057.
Christensen, B. G., C. D. Wilen, A. Opremcak, J. Nelson, F. Schlenker, C. H. Zimonick, L. Faoro et al. "Anomalous charge noise in superconducting qubits." Physical Review B 100, No. 14 (2019): 140503.
Coffey, Mark W. "Quantum computing based on a superconducting quantum interference device: Exploiting the flux basis." Journal of Modern Optics 49, No. 14-15 (2002): 2389-2398.
Cosmelli, C., M. G. Castellano, F. Chiarello, R. Lconi, D. Simeone, G. Torrioli, and P. Carelli. "Controllable flux coupling for the integration of flux qubits." *arXiv preprint cond-mat/0403690* (2004).
Crankshaw, Donald Shane. "Measurement and on-chip control of a niobium persistent current qubit." PhD diss., Massachusetts Institute of Technology, 2003.
De Albornoz, Alejandro Cros Carrillo, John Taylor, and Vlad Cărare. "Time-optimal implementations of quantum algorithms." Physical Review A 100, No. 3 (2019): 032329.
Di Paolo, Agustin, Catherine Leroux, Thomas M. Hazard, Kyle Serniak, Simon Gustavsson, Alexandre Blais, and William D. Oliver. "Extensible circuit-QED architecture via amplitude-and frequency-variable microwaves." arXiv preprint arXiv:2204.08098 (2022).
Dickson, Neil G., M. William Johnson, M. H. Amin, R. Harris, F. Altomare, Andrew J. Berkley, P. Bunyk et al. "Thermally assisted quantum annealing of a 16-qubit problem." Nature communications 4, No. 1 (2013): 1903.

(56) References Cited

OTHER PUBLICATIONS

Dragoman, Mircea, and Daniela Dragoman. "Quantum Computing." In Atomic-Scale Electronics Beyond CMOS, pp. 157-186. Springer, Cham, 2021.
En.wikipedia.org/wiki/Frequency-locked_loop.
En.wikipedia.org/wiki/Phase-locked_loop.
Espinós, Hilario, Iván Panadero, Juan José García-Ripoll, and Erik Torrontegui. "Quantum control of tunable-coupling transmons using dynamical invariants of motion." arXiv preprint arXiv:2205.06555 (2022).
Fedorov, Kirill G., Anastasia V. Shcherbakova, Michael J. Wolf, Detlef Beckmann, and Alexey V. Ustinov. "Fluxon readout of a superconducting qubit." Physical review letters 112, No. 16 (2014): 160502.
Feng, Guanru, Shi-Yao Hou, Hongyang Zou, Wei Shi, Sheng Yu, Zikai Sheng, Xin Rao et al. "SpinQ Triangulum: a commercial three-qubit desktop quantum computer." arXiv preprint arXiv:2202.02983 (2022).
Filippenko, L. V., V. K. Kaplunenko, M. I. Khabipov, V. P. Koshelets, K. K. Likharev, O. A. Mukhanov, S. V. Rylov, V. K. Semenov, and A. N. Vystavkin, "Experimental Implementation of Analog-to-Digital Converter Based on the Reversible Ripple Counter," IEEE Trans. Magn., vol. MAG-27, No. 2, pp. 2464-2467, Mar. 1991.
Fong, Kin Chung, Evan Walsh, Gil-Ho Lee, Dmitri Efetov, Jesse Crossno, Leonardo Ranzani, Thomas Ohki, Philip Kim, and Dirk Englund. "Graphene Josephson Junction Microwave Detector." In APS March Meeting Abstracts, vol. 2017, pp. S51-011. 2017.
Foss-Feig, Michael, Stephen Ragole, Andrew Potter, Joan Dreiling, Caroline Figgatt, John Gaebler, Alex Hall et al. "Entanglement from Tensor Networks on a Trapped-Ion Quantum Computer." Physical Review Letters 128, No. 15 (2022): 150504.
Gaj, Kris, Quentin P. Herr, Victor Adler, Darren K. Brock, Eby G. Friedman, and Marc J. Feldman. "Toward a systematic design methodology for large multigigahertz rapid single flux quantum circuits." IEEE Transactions on Applied Superconductivity 9, No. 3 (1999): 4591-4606.
Gamel, Omar. "Entangled Bloch spheres: Bloch matrix and two-qubit state space." Physical Review A 93, No. 6 (2016): 062320.
Ganzhorn, Marc, Daniel J. Egger, Panagiotis Barkoutsos, Pauline Ollitrault, Gian Salis, Nikolaj Moll, M. Roth et al. "Gate-efficient simulation of molecular eigenstates on a quantum computer." Physical Review Applied 11, No. 4 (2019): 044092.
García-Ripoll, J. J., A. Ruiz-Chamorro, and E. Torrontegui. "Quantum control of transmon superconducting qubits." arXiv preprint arXiv:2002.10320 (2020).
García-Ripoll, Juan José, Andrés Ruiz-Chamorro, and E. Torrontegui. "Quantum Control of Frequency-Tunable Transmon Superconducting Qubits." Physical Review Applied 14, No. 4 (2020): 044035.
Giustino, Feliciano, Jin Hong Lee, Felix Trier, Manuel Bibes, Stephen M. Winter, Roser Valentí, Young-Woo Son et al. "The 2021 quantum materials roadmap." *Journal of Physics: Materials* 3, No. 4 (2021): 042006.
Graham, T. M., Y. Song, J. Scott, C. Poole, L. Phuttitarn, K. Jooya, P. Eichler et al. "Demonstration of multi-qubit entanglement and algorithms on a programmable neutral atom quantum computer." arXiv preprint arXiv:2112.14589 (2021).
Graham, T. M., Y. Song, J. Scott, C. Poole, L. Phuttitarn, K. Jooya, P. Eichler et al. "Multi-qubit entanglement and algorithms on a neutral-atom quantum computer." Nature 604, No. 7906 (2022): 457-462.
Granata, C., B. Ruggiero, M. Russo, A. Vettoliere, V. Corato, and P. Silvestrini. "Josephson devices for controllable flux qubit and interqubit coupling." *Applied Physics Letters* 87, No. 17 (2005).
Groszkowski, Peter, Austin G. Fowler, Felix Motzoi, and Frank K. Wilhelm. "Tunable coupling between three qubits as a building block for a superconducting quantum computer." Physical Review B 84, No. 14 (2011): 144516.
Hahn, Henning, Giorgio Zarantonello, Marius Schulte, Amado Bautista-Salvador, Klemens Hammerer, and Christian Ospelkaus. "Integrated 9Be+ multi-qubit gate device for the ion-trap quantum computer." npj Quantum Information 5, No. 1 (2019): 1-5.
Han, X. Y., T. Q. Cai, X. G. Li, Y. K. Wu, Y. W. Ma, Y. L. Ma, J. H. Wang, H. Y. Zhang, Y. P. Song, and L. M. Duan. "Error analysis in suppression of unwanted qubit interactions for a parametric gate in a tunable superconducting circuit." Physical Review A 102, No. 2 (2020): 022619.
Harris, R., A. J. Berkley, M. W. Johnson, P. Bunyk, S. Govorkov, M. C. Thom, S. Uchaikin et al. "Sign-and magnitude-tunable coupler for superconducting flux qubits." *Physical review letters* 98, No. 17 (2007): 177001.
Harris, R., J. Johansson, A. J. Berkley, M. W. Johnson, T. Lanting, Siyuan Han, P. Bunyk et al. "Experimental demonstration of a robust and scalable flux qubit." *Physical Review B* 81, No. 13 (2010): 134510.
Harris, R., T. Lanting, A. J. Berkley, J. Johansson, M. W. Johnson, P. Bunyk, E. Ladizinsky, N. Ladizinsky, T. Oh, and Siyuan Han. "Compound Josephson-junction coupler for flux qubits with minimal crosstalk." *Physical Review B* 80, No. 5 (2009): 052506.
Harris, Richard, Mark W. Johnson, T. Lanting, A. J. Berkley, J. Johansson, P. Bunyk, E, Tolkacheva et al. "Experimental investigation of an eight-qubit unit cell in a superconducting optimization processor." *Physical Review B* 82, No. 2 (2010): 024511.
Harris, Richard, Yuki Sato, Andrew J. Berkley, M. Reis, Fabio Altomare, M. H. Amin, Kelly Boothby et al. "Phase transitions in a programmable quantum spin glass simulator." *Science* 361, No. 6398 (2018): 162-165.
Hatridge, Michael, Vijayaraghava . R., "Basics of quantum measurement with quantum Light", PowerPoint Presentation, U. Pittsburgh (2018).
Hayakawa, Hisao, Nobuyuki Yoshikawa, Shinichi Yorozu, and Akira Fujimaki. "Superconducting digital electronics." *Proceedings of the IEEE* 92, No. 10 (2004): 1549-1563.
He, Yongcheng, Jianshe Liu, Changhao Zhao, Rutian Huang, Genting Dai, and Wei Chen. "Control System of Superconducting Quantum Computers." Journal of Superconductivity and Novel Magnetism (2022): 1-21.
Hill, Charles D., Muhammad Usman, and Lloyd CL Hollenberg. "An exchange-based surface-code quantum computer architecture in silicon." arXiv preprint arXiv:2107.11981 (2021).
Hornibrook, J. M., J. I. Colless, ID Conway Lamb, S. J. Pauka, H. Lu, A. C. Gossard, J. D. Watson et al. "Cryogenic control architecture for large-scale quantum computing." *Physical Review Applied* 3, No. 2 (2015): 024010.
Hou, Shi-Yao, Guanru Feng, Zipeng Wu, Hongyang Zou, Wei Shi, Jinfeng Zeng, Chenfeng Cao et al. "SpinQ Gemini: a desktop quantum computer for education and research." arXiv preprint arXiv:2101.10017 (2021).
Huang, Ziwen, Yao Lu, Eliot Kapit, David I. Schuster, and Jens Koch. "Universal stabilization of single-qubit states using a tunable coupler." Physical Review A 97, No. 6 (2018): 062345.
Humble, Travis S., Himanshu Thapliyal, Edgard Munoz-Coreas, Fahd A. Mohiyaddin, and Ryan S. Bennink. "Quantum computing circuits and devices." *IEEE Design & Test* 36, No. 3 (2019): 69-94.
Hutchings, M. D., Jared B. Hertzberg, Yebin Liu, Nicholas T. Bronn, George A. Keefe, Markus Brink, Jerry M. Chow, and B. L. T. Plourde. "Tunable superconducting qubits with flux-independent coherence." *Physical Review Applied* 8, No. 4 (2017): 044003.
Ilves, Jesper, Shingo Kono, Yoshiki Sunada, Shota Yamazaki, Minkyu Kim, Kazuki Koshino, and Yasunobu Nakamura. "On-demand generation and characterization of a microwave time-bin qubit." npj Quantum Information 6, No. 1 (2020): 1-7.
Ireland, Jane, Oliver Kieler, Johannes Kohlmann, Helge Malmbekk, Jonathan M. Williams, Ralf Behr, Bjornar Karlsen et al. "Josephson arbitrary waveform system with optoelectronic drive." In 2017 16th International Superconductive Electronics Conference (ISEC), pp. 1-4. IEEE, 2017.
Jin, Lijing. "Implementing High-fidelity Two-Qubit Gates in Superconducting Coupler Architecture with Novel Parameter Regions." arXiv preprint arXiv:2105.13306 (2021).
Johnson, M. W., P. Bunyk, F. Maibaum, E. Tolkacheva, A. J. Berkley, E. M. Chapple, R. Harris et al. "A scalable control system

(56) References Cited

OTHER PUBLICATIONS for a superconducting adiabatic quantum optimization processor." Superconductor Science and Technology 23, No. 6 (2010): 065004.
Johnson, Philip R., Frederick W. Strauch, Alex J. Dragt, James R. Anderson, Christopher J. Lobb, and Frederick C. Wellstood. "Quantum control of superconducting phase qubits." In Quantum Information and Computation II, vol. 5436, pp. 232-241. International Society for Optics and Photonics, 2004.
Johnson, Philip R., Frederick W. Strauch, Alex J. Dragt, James R. Anderson, Christopher J. Lobb, and Frederick C. Wellstood. "Quantum control of superconducting phase qubits." In *Quantum Information and Computation II*, vol. 5436, pp. 232-241. SPIE, 2004.
Kafri, Dvir, Chris Quintana, Yu Chen, Alireza Shabani, John M. Martinis, and Hartmut Neven. "Tunable inductive coupling of superconducting qubits in the strongly nonlinear regime." Physical Review A 95, No. 5 (2017): 052333.
Kaivarainen, Alex, and Bo Lehnert. "Two Extended New Approaches to Vacuum, Matter and Fields." arXiv preprint physics/0112027 (2001).
Karlsen, Bjørnar. "Optically operated pulse-driven Josephson junction arrays and range extension using voltage dividers and buffer amplifiers." (2019); Karlsen, Bjørnar. "Optically operated pulse-driven Josephson junction arrays and range extension using voltage dividers and buffer amplifiers." (2019).
Kelly, Julian, Rami Barends, Brooks Campbell, Yu Chen, Zijun Chen, Ben Chiaro, Andrew Dunsworth et al. "Optimal quantum control using randomized benchmarking." *Physical review letters* 112, No. 24 (2014): 240504.
Khabipov, M. I., D. V. Balashov, F. Maibaum, A. B. Zorin, V. A. Oboznov, V. V. Bolginov, A. N. Rossolenko, and V. V. Ryazanov. "A single flux quantum circuit with a ferromagnet-based Josephson π-junction." *Superconductor Science and Technology* 23, No. 4 (2010): 045032.
Kim, Dohun, Zhan Shi, C. B. Simmons, D. R. Ward, J. R. Prance, Teck Seng Koh, John King Gamble et al. "Quantum control and process tomography of a semiconductor quantum dot hybrid qubit." Nature 511, No. 7507 (2014): 70-74.
King, Andrew D., Juan Carrasquilla, Jack Raymond, Isil Ozfidan, Evgeny Andriyash, Andrew Berkley, Mauricio Reis et al. "Observation of topological phenomena in a programmable lattice of 1,800 qubits." *Nature* 560, No. 7719 (2018): 456-460.
Kito, Nobutaka, and Kazuyoshi Takagi. "An RSFQ flexible-precision multiplier utilizing bit-level processing." In Journal of Physics: Conference Series, vol. 1975, No. 1, p. 012025. IOP Publishing, 2021;.
Klenov, N. V., A. V. Kuznetsov, I. I. Soloviev, S. V. Bakurskiy, M. V. Denisenko, and A. M. Satanin. "Flux qubit interaction with rapid single-flux quantum logic circuits: Control and readout." *Low Temperature Physics* 43, No. 7 (2017): 789-798.
Kono, Shingo, Kazuki Koshino, Yutaka Tabuchi, Atsushi Noguchi, and Yasunobu Nakamura. "Quantum non-demolition detection of an itinerant microwave photon." Nature Physics 14, No. 6 (2018): 546-549.
Krantz, Philip, Morten Kjaergaard, Fei Yan, Terry P. Orlando, Simon Gustavsson, and William D. Oliver. "A quantum engineer's guide to superconducting qubits." Applied Physics Reviews 6, No. 2 (2019): 021318.
Landig, Andreas J., Jonne V. Koski, Pasquale Scarlino, Clemens Müller, José C. Abadillo-Uriel, Benedikt Kratochwil, Christian Reichl et al. "Virtual-photon-mediated spin-qubit-transmon coupling." Nature communications 10, No. 1 (2019): 1-7.
Lanting, Trevor, Anthony J. Przybysz, A. Yu Smirnov, Federico M. Spedalieri, Mohammad H. Amin, Andrew J. Berkley, Richard Harris et al. "Entanglement in a quantum annealing processor." *Physical Review X* 4, No. 2 (2014): 021041.
Larsen, Thorvald Wadum, Karl David Petersson, Ferdinand Kuemmeth, Thomas Sand Jespersen, Peter Krogstrup, Jesper Nygård, and Charles M. Marcus. "Semiconductor-nanowire-based superconducting qubit." Physical review letters 115, No. 12 (2015): 127001.
Leonard Jr, Edward, Matthew A. Beck, J. Nelson, Brad G. Christensen, Ted Thorbeck, Caleb Howington, Alexander Opremcak et al. "Digital coherent control of a superconducting qubit." *Physical Review Applied* 11, No. 1 (2019): 014009.
Li, Kangbo, R. McDermott, and Maxim G. Vavilov, "Hardware-efficient qubit control with single-flux-quantum pulse sequences." *Physical Review Applied* 12, No. 1 (2019): 014044.
Li, X., T. Cai, H. Yan, Z. Wang, X. Pan, Y. Ma, W. Cai et al. "Tunable coupler for realizing a controlled-phase gate with dynamically decoupled regime in a superconducting circuit." Physical Review Applied 14, No. 2 (2020): 024070;.
Liebermann, Per J., and Frank K. Wilhelm. "Optimal qubit control using single-flux quantum pulses," *Physical Review Applied* 6, No. 2 (2016): 024022.
Likharev, Konstantin K., Oleg A. Mukhanov, and Vasilii K. Semenov. "Resistive single flux quantum logic for the Josephson-junction digital technology." *SQUID* 85 (1985): 1103-1108.
Lin, Shi-Zeng. "Josephson effect between a two-band superconductor with s++ or stpairing symmetry and a conventional s-wave superconductor." *Physical Review B* 86, No. 1 (2012): 014510.
Liu, Chenxu, Maria Mucci, Xi Cao, Michael Hatridge, and David Pekker. "Theory of an on-chip Josephson quantum micromaser." Bulletin of the American Physical Society 65 (2020).
Lu, Yao, Srivatsan Chakram, Ngainam Leung, Nathan Earnest, Ravi K. Naik, Ziwen Huang, Peter Groszkowski, Eliot Kapit, Jens Koch, and David I. Schuster. "Universal stabilization of a parametrically coupled qubit." Physical review letters 119, No. 15 (2017): 150502.
Lüders, Carolin, and Marc Aßmann. "Distinguishing intrinsic photon correlations from external noise with frequency-resolved homodyne detection." Scientific Reports 10, No. 1 (2020): 1-11.
Machnes, Shai, Elie Assémat, David Tannor, and Frank K. Wilhelm. "Tunable, flexible, and efficient optimization of control pulses for practical qubits." *Physical review letters* 120, No. 15 (2018): 150401.
Mališ, Momir, P. Kl Barkoutsos, Marc Ganzhorn, Stefan Filipp, Daniel J. Egger, Sara Bonella, and Ivano Tavernelli. "Local control theory for superconducting qubits." *Physical Review A* 99, No. 5 (2019): 052316.
Marques, J. F., B. M. Varbanov, M. S. Moreira, Hany Ali, Nandini Muthusubramanian, Christos Zachariadis, Francesco Battistel et al. "Logical-qubit operations in an error-detecting surface code." Nature Physics 18, No. 1 (2022): 80-86.
Massoli, Fabio Valerio, Lucia Vadicamo, Giuseppe Amato, and Fabrizio Falchi. "A leap among quantum computing and quantum neural networks: A survey." *ACM Computing Surveys* 55, No. 5 (2022): 1-37.
McConkey, T. G., J. H. Béjanin, C. T. Earnest, C. R. H. McRae, Z. Pagel, J. R. Rinehart, and M. Mariantoni. "Mitigating leakage errors due to cavity modes in a superconducting quantum computer." Quantum Science and Technology 3, No. 3 (2018): 034004.
McCourt, Trevor, Charles Neill, Kenny Lee, Chris Quintana, Yu Chen, Julian Kelly, V. N. Smelyanskiy et al. "Learning Noise via Dynamical Decoupling of Entangled Qubits." arXiv preprint arXiv:2201.11173 (2022).
McDermott, R., and M. G. Vavilov. "Accurate qubit control with single flux quantum pulses." *Physical Review Applied* 2, No. 1 (2014): 014007.
McDermott, R., M. G. Vavilov, B. L. T. Plourde, F. K. Wilhelm, P. J. Liebermann, O. A. Mukhanov, and T. A. Ohki. "Quantum—classical interface based on single flux quantum digital logic." *Quantum science and technology* 3, No. 2 (2018): 024004.
McKay, David C., Christopher J. Wood, Sarah Sheldon, Jerry M. Chow, and Jay M. Gambetta. "Efficient Z gates for quantum computing." Physical Review A 96, No. 2 (2017): 022330.
McKay, David C., Stefan Filipp, Antonio Mezzacapo, Easwar Magesan, Jerry M. Chow, and Jay M. Gambetta. "Tunable coupling between fixed-frequency superconducting transmon qubits, Part II: Implementing a two-qubit XX-90 gate." In APS March Meeting Abstracts, vol. 2016, pp. F48-008. 2016.
Miano, Alessandro, and Oleg A. Mukhanov. "Symmetric traveling wave parametric amplifier." IEEE Transactions on Applied Superconductivity 29, No. 5 (2019): 1-6.

(56) References Cited

OTHER PUBLICATIONS

Mukhanov, Oleg A, A. Kirichenko, C. Howington, J. Walter, M. Hutchings, I. Vernik, D. Yohannes, K. Dodge, A. Ballard, B. L.T. Plourde, A. Opremcak, C.-H. Liu, R. McDermott, "Scalable Quantum Computing Infrastructure Based on Superconducting Electronics," 2019 IEEE International Electron Devices Meeting (IEDM), San Francisco, CA, USA (2019): 31.2.1-31.2.4.
Mukhanov, Oleg A. "Energy-efficient single flux quantum technology." *IEEE Transactions on Applied Superconductivity* 21, No. 3 (2011): 760-769.
Mundada, Pranav, Gengyan Zhang, Thomas Hazard, and Andrew Houck, "Suppression of qubit crosstalk in a tunable coupling superconducting circuit." *Physical Review Applied* 12, No. 5 (2019): 054023.
Murch, K. W., S. J. Weber, Christopher Macklin, and Irfan Siddiqi. "Observing single quantum trajectories of a superconducting quantum bit." Nature 502, No. 7470 (2013): 211-214.
Naaman, Ofer, J. A. Strong, D. G. Ferguson, J. Egan, N. Bailey, and R. T. Hinkey. "Josephson junction microwave modulators for qubit control." Journal of Applied Physics 121, No. 7 (2017): 073904;.
Naaman, Ofer, Joshua Strong, David Ferguson, Jonathan Egan, Nancyjane Bailey, and Robert Hinkey. "Josephson Junction Microwave Modulators." In 2018 IEEE/MTT-S International Microwave Symposium-IMS, pp. 1003-1005. IEEE, 2018.
Nägele, Maximilian, Christian Schweizer, Federico Roy, and Stefan Filipp. "Effective non-local parity-dependent couplings in qubit chains." arXiv preprint arXiv:2203.07331 (2022).
Nakahara, K., H. Nagaishi, H. Hasegawa, S. Kominami, H. Yamada, and T. NishiNo. "Optical input/output interface system for Josephson junction integrated circuits." IEEE transactions on applied superconductivity 4, No. 4 (1994): 223-227.
Negîrneac, V., H. Ali, N. Muthusubramanian, F. Battistel, R. Sagastizabal, M. S. Moreira, J. F. Marques, W. J. Vlothuizen, M. Beekman, C. Zachariadis, N. Haider, A. Bruno, and L. DiCarlo, "High-fidelity controlled-Z gate with maximal intermediate leakage operating at the speed limit in a superconducting quantum processor," Phys. Rev. Letters 126 (2021): 220502.
Nguyen, Long Bao. "Toward the Fluxonium Quantum Processor." PhD diss., University of Maryland, College Park, 2020,.
Niskanen, A. O., Khalil Harrabi, F. Yoshihara, Y. Nakamura, S. Lloyd, and Jaw Shen Tsai. "Quantum coherent tunable coupling of superconducting qubits." *Science* 316, No. 5825 (2007): 723-726.
Ohki, Thomas A., Michael Wulf, and Marc J. Feldman. "Low-Jc rapid single flux quantum (RSFQ) qubit control circuit." *IEEE transactions on applied superconductivity* 17, No. 2 (2007): 154-157.
Ohzeki, Masayuki, Akira Miki, Masamichi J. Miyama, and Masayoshi Terabe. "Control of automated guided vehicles without collision by quantum annealer and digital devices." *Frontiers in Computer Science* 1 (2019): 9.
Opremcak, A., I. V. Pechenezhskiy, C. Howington, B. G. Christensen, M. A. Beck, E. Leonard Jr, J. Suttle et al. "Measurement of a superconducting qubit with a microwave photon counter." *Science* 361, No. 6408 (2018): 1239-1242.
Pasandi, Ghasem, and Massoud Pedram. "An efficient pipelined architecture for superconducting single flux quantum logic circuits utilizing dual clocks." *IEEE Transactions on Applied Superconductivity* 30, No. 2 (2019): 1-12.
Pasieka, Aron, David W. Kribs, Raymond Laflamme, and Rajesh Pereira. "On the geometric interpretation of single qubit quantum operations on the Bloch sphere." *Acta applicandae mathematicae* 108 (2009): 697-707.
Patra, Bishnu, Jeroen PG van Dijk, Sushil Subramanian, Andrea Corna, Xiao Xue, Charles Jeon, Farhana Sheikh et al. "19.1 a scalable cryo-CMOS 2-to-20GHz digitally intensive controller for 4×32 frequency multiplexed spin qubits/transmons in 22nm FinFET technology for quantum computers." In 2020 IEEE International Solid-State Circuits Conference-(ISSCC), pp. 304-306. IEEE, 2020.
Pezzagna, Sébastien, and Jan Meijer. "Quantum computer based on color centers in diamond." Applied Physics Reviews 8, No. 1 (2021): 011308.
Pitalúa-García, Damián. "Spacetime symmetries and the qubit Bloch ball: A physical derivation of finite-dimensional quantum theory and the number of spatial dimensions." *Physical Review A* 104, No. 3 (2021): 032220.
Planat, Luca, Arpit Ranadive, Rémy Dassonneville, Javier Puertas Martínez, Sébastien Léger, Cécile Naud, Olivier Buisson, Wiebke Hasch-Guichard, Denis M. Basko, and Nicolas Roch. "Photonic-crystal Josephson traveling-wave parametric amplifier." Physical Review X 10, No. 2 (2020): 021021.
Qiao, Yuanxin, and Zhaoxian Yu. "Geometric Phase in a Quantum Computation with Josephson Qubits Using a Current-Biased Information Bus." (2018). Advances in Condensed Matter Physics, 2018, 7(1), 7-11 Published Online Feb. 2018 in Hans. http://www.hanspub.org/journal/cmp https://doi.org/10.12677/cmp.2018.71002.
Qu, Pei-Yao, Guang-Ming Tang, Jia-Hong Yang, Xiao-Chun Ye, Dong-Rui Fan, Zhi-Min Zhang, and Ning-Hui Sun. "Design of an 8-bit bit-parallel RSFQ microprocessor." *IEEE Transactions on Applied Superconductivity* 30, No. 7 (2020): 1-6.
Quintana, Chris, Yu Chen, D. Sank, D. Kafri, A. Megrant, T. C. White, A. Shabani et al. "Coplanar waveguide flux qubit suitable for quantum annealing." In APS March Meeting Abstracts, vol. 2016, pp. K48-K010. 2016.
Radparvar, Masoud. *Digital SQUID Magnetometers for Read-out of Detectors and Magnetic Particles*. No. Phase II Sbir Final Report. Hypres, Inc., Elmsford, NY (United States), 2016.
Rol, M. A., F. Battistel, F. K. Malinowski, C. C. Bultink, B. M. Tarasinski, R. Vollmer, N. Haider et al. "A fast, low-leakage, high-fidelity two-qubit gate for a programmable superconducting quantum computer." arXiv preprint arXiv:1903.02492 (2019).
Rønnow, Troels F., Zhihui Wang, Joshua Job, Sergio Boixo, Sergei V. Isakov, David Wecker, John M. Martinis, Daniel A. Lidar, and Matthias Troyer. "Defining and detecting quantum speedup." *science* 345, No. 6195 (2014): 420-424.
Rosenberg, D., D. Kim, R. Das, D. Yost, S. Gustavsson, D. Hover, P. Krantz et al. "3D integrated superconducting qubits." *npj quantum information* 3, No. 1 (2017): 42.
Salmon, Neil A. "A quantum Bell Test homodyne interferometer at ambient temperature for millimetre wave entangled photons." In Quantum Information Science and Technology IV, vol. 10803, p. 108030I. International Society for Optics and Photonics, 2018.
Schrade, Constantin, and Liang Fu. "Majorana superconducting qubit." Physical Review Letters 121, No. 26 (2018): 267002.
Sete, Eyob A., Matthew J. Reagor, Nicolas Didier, and Chad T. Rigetti. "Charge- and flux-insensitive tunable superconducting qubit." *Physical Review Applied* 8, No. 2 (2017): 024004.
Sheldon, Sarah, Easwar Magesan, Jerry M. Chow, and Jay M. Gambetta. "Procedure for systematically tuning up cross-talk in the cross-resonance gate." *Physical Review A* 93, No. 6 (2016): 060302.
Shukla, Ashish, Dmitry Kirichenko, Timur Filippov, Anubhav Sahu, Mustafa Eren Celik, Mingoo Seok, and Deepnarayan Gupta. "Pulse Interfaces and Current Management Techniques for Serially Biased RSFQ Circuits." IEEE Transactions on Applied Superconductivity (2022).
Sirois, Adam, Manuel Castellanos-Beltran, Anna Fox, Samuel Benz, and Peter Hopkins. "Josephson Microwave Sources Applied to Quantum Information Systems." IEEE Transactions on Quantum Engineering (2020).
Sivak, V. V., Shyam Shankar, Gangqiang Liu, Jose Aumentado, and M. H. Devoret. "Josephson array-mode parametric amplifier." Physical Review Applied 13, No. 2 (2020): 024014;.
Soloviev, Igor I., Nikolay V. Klenov, Sergey V. Bakurskiy, Mikhail Yu Kupriyanov, Alexander L. Gudkov, and Anatoli S. Sidorenko. "Beyond Moore's technologies: operation principles of a superconductor alternative." *Beilstein journal of nanotechnology* 8, No. 1 (2017): 2689-2710.
Song, Chao, Kai Xu, Hekang Li, Yu-Ran Zhang, Xu Zhang, Wuxin Liu, Qiujiang Guo et al. "Generation of multicomponent atomic Schrödinger cat states of up to 20 qubits." Science 365, No. 6453 (2019): 574-577.

(56) References Cited

OTHER PUBLICATIONS

Stassi, Roberto, Mauro Cirio, and Franco Nori. "Scalable quantum computer with superconducting circuits in the ultrastrong coupling regime." npj Quantum Information 6, No. 1 (2020): 1-6.
Stenger, John, Gilad Ben-Shach, David Pekker, and Nicholas T. Bronn. "Simulating spectroscopic detection of Majorana zero modes with a superconducting quantum computer." arXiv preprint arXiv:2202.12910 (2022).
Sung, Youngkyu, Leon Ding, Jochen Braumüller, Antti Vepsäläinen, Bharath Kannan, Morten Kjaergaard, Ami Greene et al. "Realization of High-Fidelity CZ and Z Z-Free iSWAP Gates with a Tunable Coupler." Physical Review X 11, No. 2 (2021): 021058.
Tolpygo, Sergey K. "Superconductor digital electronics: Scalability and energy efficiency issues." *Low Temperature Physics* 42, No. 5 (2016): 361-379.
Tolpygo, Sergey K., and Vasili K. Semenov. "Increasing integration scale of superconductor electronics beyond one million Josephson junctions." In *Journal of Physics: Conference Series*, vol. 1559, No. 1, p. 012002. IOP Publishing, 2020.
Tolpygo, Sergey K., Vladimir Bolkhovsky, Terence J. Weir, Alex Wynn, Daniel E. Oates, Leonard M. Johnson, and Mark A. Gouker. "Advanced fabrication processes for superconducting very large-scale integrated circuits." *IEEE Transactions on Applied Superconductivity* 26, No. 3 (2016): 1-10.
Uilhoorn, Willemijntje. "Hybrid Josephson junction-based quantum devices in magnetic field." (2021). Propositions accompanying the dissertation. Delft University of Technology.
Van Den Brink, Alec Maassen, A. J. Berkley, and M. Yalowsky. "Mediated tunable coupling of flux qubits." *New Journal of Physics* 7, No. 1 (2005): 230.
Van der Ploeg, S. H. W., A. Izmalkov, Alec Maassen van den Brink, U. Hübner, M. Grajcar, E. Il'Ichev, H-G. Meyer, and A. M. Zagoskin. "Controllable coupling of superconducting flux qubits." Physical review letters 98, No. 5 (2007): 057004.
Van Zeghbroeck, B. "Optical data communication between Josephson-junction circuits and room-temperature electronics." IEEE transactions on applied superconductivity 3, No. 1 (1993): 2881-2884;.
Venturelli, Davide, Salvatore Mandrà, Sergey Knysh, Bryan O'Gorman, Rupak Biswas, and Vadim Smelyanskiy. "Quantum optimization of fully connected spin glasses." Physical Review X 5, No. 3 (2015): 031040.
Versluis, Richard, Stefano Poletto, Nader Khammassi, Brian Tarasinski, Nadia Haider, David J. Michalak, Alessandro Bruno, Koen Bertels, and Leonardo DiCarlo. "Scalable quantum circuit and control for a superconducting surface code." Physical Review Applied 8, No. 3 (2017): 034021.
Volkmann, Mark H., Anubhav Sahu, Coenrad J. Fourie, and Oleg A. Mukhanov. "Implementation of energy efficient single flux quantum digital circuits with sub-aJ/bit operation." *Superconductor Science and Technology* 26, No. 1 (2012): 015002.
Vrajitoarea, Andrei, Ziwen Huang, Peter Groszkowski, Jens Koch, and Andrew A. Houck. "Quantum control of an oscillator using a stimulated Josephson nonlinearity." Nature Physics 16, No. 2 (2020): 211-217;.
Wang, Joel, Daniel Rodan Legrain, Charlotte Boettcher, Landry Bretheau, Daniel Campbell, Bharath Kannan, David Kim et al. "Quantum coherent control of graphene-based transmon qubit." In APS March Meeting Abstracts, vol. 2019, pp. C29-010. 2019.
Wendin, Göran. "Quantum information processing with superconducting circuits: a review." Reports on Progress in Physics 80, No. 10 (2017): 106001.
Winkel, Patrick, Ivan Takmakov, Dennis Rieger, Luca Planat, Wiebke Hasch-Guichard, Lukas Grünhaupt, Nataliya Maleeva et al. "Nondegenerate parametric amplifiers based on dispersion-engineered josephson-junction arrays." Physical Review Applied 13, No. 2 (2020): 024015.
Wu, Xian, Spencer L. Tomarken, N. Anders Petersson, Luis A. Martinez, Yaniv J. Rosen, and Jonathan L. DuBois. "High-fidelity software-defined quantum logic on a superconducting qudit." *Physical Review Letters* 125, No. 17 (2020): 170502.
Wulschner, Friedrich, Jan Goetz, Fabian R. Koessel, Elisabeth Hoffmann, Alexander Baust, Peter Eder, Michael Fischer et al. "Tunable coupling of transmission-line microwave resonators mediated by an rf SQUID." EPJ Quantum Technology 3, No. 1 (2016): 1-10.
Xin, Tao, Shilin Huang, Sirui Lu, Keren Li, Zhihuang Luo, Zhangqi Yin, Jun Li, Dawei Lu, Guilu Long, and Bei Zeng. "NMRCloudQ: a quantum cloud experience on a nuclear magnetic resonance quantum computer." Science Bulletin 63, No. 1 (2018): 17-23.
Xu, Huikai, Weiyang Liu, Zhiyuan Li, Jiaxiu Han, Jingning Zhang, Kehuan Linghu, Yongchao Li et al. "Realization of adiabatic and diabatic CZ gates in superconducting qubits coupled with a tunable coupler." Chinese Physics B 30, No. 4 (2021): 044212.
Xu, Xuexin, and M. H. Ansari. "Parasitic-free gate: A protected switch between idle and entangled states." arXiv preprint arXiv:2202.05208 (2022).
Xu, Yuan, Ji Chu, Jiahao Yuan, Jiawei Qiu, Yuxuan Zhou, Libo Zhang, Xinsheng Tan et al. "High-fidelity, high-scalability two-qubit gate scheme for superconducting qubits." Physical Review Letters 125, No. 24 (2020): 240503.
Yamae, Taiki, Naoki Takeuchi, and Nobuyuki Yoshikawa. "Binary counters using adiabatic quantum-flux-parametron logic." IEEE Transactions on Applied Superconductivity 31, No. 2 (2020): 1-5.
Yamanashi, Yuki, Sotaro Nakaishi, Akira Sugiyama, Naoki Takeuchi, and Nobuyuki Yoshikawa. "Design methodology of single-flux-quantum flip-flops composed of both 0-and π-shifted Josephson junctions." *Superconductor Science and Technology* 31, No. 10 (2018): 105003.
Yamanashi, Yuki, Takanobu Nishigai, and Nobuyuki Yoshikawa. "Study of LR-loading technique for low-power single flux quantum circuits." IEEE Transactions on applied superconductivity 17, No. 2 (2007): 150-153.
Yan, Fei, Philip Krantz, Youngkyu Sung, Morten Kjaergaard, Daniel L. Campbell, Terry P. Orlando, Simon Gustavsson, and William D. Oliver. "Tunable coupling scheme for implementing high-fidelity two-qubit gates." Physical Review Applied 10, No. 5 (2018): 054062.
Yang, Chui-Ping, Qi-Ping Su, Shi-Biao Zheng, and Siyuan Han. "One-step transfer or exchange of arbitrary multipartite quantum states with a single-qubit coupler." Physical Review B 92, No. 5 (2015): 054509.
Yeninas, Steven. "Tunnel-diode resonator and nuclear magnetic resonance studies of low-dimensional magnetic and superconducting systems." Ph.D. Dissertation Iowa State University (2013).
Yohannes, D., M. Renzullo, J. Vivalda, A. C. Jacobs, M. Yu, J. Walter, A. F. Kirichenko, I. V. Vernik, and O. A. Mukhanov. "High density fabrication process for single flux quantum circuits." *Applied Physics Letters* 122, No. 21 (2023).
Yoshikawa, Nobuyuki, "Superconducting digital electronics for controlling quantum computing systems." *IEICE Transactions on Electronics* 102, No. 3 (2019): 217-223.
Youssefi, Amir, Itay Shomroni, Yash J. Joshi, Nathan R. Bernier, Anton Lukashchuk, Philipp Uhrich, Liu Qiu, and Tobias J. Kippenberg. "A cryogenic electro-optic interconnect for superconducting devices." Nature Electronics (2021): 1-7.
Zajac, D. M., J. Stehlik, D. L. Underwood, T. Phung, J. Blair, S. Carnevale, D. Klaus et al. "Spectator errors in tunable coupling architectures." arXiv preprint arXiv:2108.11221 (2021).
Zhang, Helin, Srivatsan Chakram, Tanay Roy, Nathan Earnest, Yao Lu, Ziwen Huang, Daniel Weiss, Jens Koch, and David I. Schuster, "Universal fast flux control of a coherent, low-frequency qubit," Phys. Rev. X 11 (2021): 011010.
Zhang, Xian-Peng, Li-Tuo Shen, Zhang-Qi Yin, Luyan Sun, Huai-Zhi Wu, and Zhen-Biao Yang. "Multi-Resonator-Assisted Multi-Qubit Resetting in a Network." *arXiv preprint arXiv*:1604.08393 (2016).
Zhou, Jian, Sai Li, Guo-Zhu Pan, Gang Zhang, Tao Chen, and Zheng-Yuan Xue. "Nonadiabatic geometric quantum gates that are insensitive to qubit-frequency drifts." Physical Review A 103, No. 3 (2021): 032609.
Zhu, Daoquan, Tuomas Jaako, Qiongyi He, and Peter Rabl. "Quantum computing with superconducting circuits in the picosecond regime." *Physical Review Applied* 16, No. 1 (2021): 014024.

(56) References Cited

OTHER PUBLICATIONS

Zhu, Na. "Integrated Cavity Magnonics." PhD diss., Yale University, 2020.
Observations of Third Party EP 22821175.1, Definition IP Limited, Aug. 5, 2024.

* cited by examiner

Serially programmable NDRO register

SYSTEM AND METHOD OF FLUX BIAS FOR SUPERCONDUCTING QUANTUM CIRCUITS

CROSS REFERENCE TO RELATED APPLICATIONS

The present application is a Continuation of U.S. patent application Ser. No. 17/838,207, filed Jun. 11, 2022, now U.S. Pat. No. 12,087,503, issued Sep. 10, 2024, which is a non-provisional of and claims benefit of priority from U.S. Provisional Patent Application No. 62/209,937, filed Jun. 11, 2021, the entirety of which are expressly incorporated herein by reference.

FIELD OF THE INVENTION

The present invention relates to the field of superconducting circuits, and more particularly superconducting circuits for application to quantum computing.

BACKGROUND OF THE INVENTION

Each patent, patent publication, and other cited reference cited herein is expressly incorporated herein by reference in its entirety for all purposes.

Superconducting integrated circuits based on Josephson junctions (JJs) are capable of operation with very low power and high speed, well beyond those possible using conventional semiconducting circuits. It has long been known that superconducting integrated circuits may be used for digital logic circuits based on single-flux-quantum (SFQ) pulses. These SFQ pulses are voltage pulses with time-integrated voltage of $\Phi_0=h/2e=2.07$ mV-ps, each comprising one fluxon of magnetic flux, corresponding typically to a pulse height about 1 mV and a pulse width about 2 ps. Several logic families based on SFQ pulses are known in the prior art, including Rapid Single Flux Quantum (RSFQ), Energy-Efficient RSFQ (EERSFQ), Reciprocal Quantum Logic (RQL), and Quantum Flux Parametron (QFP). Despite the word "quantum", all of these logic families comprise classical digital computing with classical bits. See, for example, the following U.S. Pat. Nos. 8,571,614; 9,473,124; 9,853,645; 10,917,096; 10,528,886; 10,748,079; 7,969,178; 8,138,784; 9,646,682; 10,084,454.

Recently, superconducting integrated circuits comprised of a plurality of JJs have also been applied to true quantum computing using quantum bits (qubits), which may enable computations that are unachievable using classical computers. There are several types of superconducting qubits disclosed in the prior art, such as flux qubits, phase qubits, charge qubits, topological qubits, fluxonium qubits, and transmon qubits, among others. See, for example, U.S. Pat. Nos. 6,459,097; 6,504,172; 6,576,951; 6,627,915; 6,784,451; 6,838,694; 6,984,846; 7,268,576; 7,335,909; 7,843,209; 8,648,331; 8,654,578; 9,524,470; 9,685,935; 10,068,184; 10,176,432; 10,255,557; 10,256,392; 10,622,998; 10,789,123; 10,840,295; 10,949,769; and 2020/0280316.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred to as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. A Hilbert space is an abstract vector space possessing the structure of an inner product that allows length and angle to be measured. Furthermore, Hilbert spaces are complete: there are enough limits in the space to allow the techniques of calculus to be used.

A quantum circuit may be specified as a sequence of quantum gates. The term "quantum gate," may refer to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a $2^n \times 2^n$ complex matrix representing the same overall state change on n qubits. A quantum circuit may thus be expressed as a single resultant operator. However, designing a quantum circuit in terms of constituent gates allows the design to conform to a standard set of gates, and thus enable greater case of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing “measurement feedback.” For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Each superconducting qubit is characterized by a ground quantum state and an excited quantum state, separated by an energy E, such that E=hf. The transition between the ground and excited states is mediated by a narrowband microwave signal with frequency f that is typically of order 10 GHz. Such a microwave signal may have a shaped envelope with a width that may be of order 100 cycles, which may sometimes be referred to as a “microwave pulse”. However, such a “microwave pulse” is quite different from the SFQ pulse mentioned above, which has broadband spectral content up to hundreds of GHz. Most prior-art control systems are based on these narrowband microwave pulses; see U.S. Pat. Nos. 7,932,514; 8,294,138; 8,872,360; 10,572,816; and 10,650,319.

It is known in the prior art that any quantum computing system will require an interface with a classical computer for control and readout. In most of the prior art, the classical control computer may comprise a conventional semiconductor computer at room temperature, with control lines down to the cryogenic qubits. However, it may be advantageous to employ cryogenic control circuits close to the quantum computer, for at least the first stage of control of the quantum computer. Such a control system in close proximity to the quantum computer would reduce latency, enabling more rapid and flexible control of the quantum computer. Furthermore, superconducting quantum computing requires ultra-low temperatures about 0.01 K, typically using a helium dilution refrigerator, where the available cooling capacity is very small. A major heat load in a cryogenic computer comprises the set of input/output (I/O) lines, which would become impractically large for a quantum computer of a significant scale. Including a local source of classical control circuits could reduce the number of I/O lines, thus making a large-scale system more practical, provided that the dissipation of the cryogenic classical control circuits is also very small.

Some prior art discloses use of conventional semiconductor circuits at cryogenic temperatures to control the cryogenic qubits. See, for example, U.S. Pat. No. 10,671,559; 2020/0394548; and 2020/0160205. However, the power levels for semiconductor control circuits are generally far higher than is compatible with the deep cryogenic environment of the quantum computer.

One type of superconducting circuit that may be used to control superconducting qubits is an inductive circuit that applies magnetic flux, including circuits based on superconducting quantum interference devices or SQUIDs. See, for example, U.S. Pat. Nos. 7,847,615; 7,932,514; 8,854,074; 9,996,801; 10,665,635; 10,969,443; and 2021/0033683. These control methods are generally quite slow.

Although all superconducting logic circuits are low in dissipation, some variants are especially low in energy, such as those identified as ERSFQ, eSFQ, RQL, and QFP. These are based on SFQ pulses, which is quite different from the resonant narrowband microwave signal that is more commonly used. Such a circuit may be placed close to the superconducting qubits, given a common cryogenic environment and low-power dissipation. There have been several previous proposals for SFQ logic circuits to control or read out superconducting qubits. For example, a properly timed train of SFQ pulses may be used to induce a quantum transition in a superconducting qubit, or to measure the quantum state of a qubit. See, for example, U.S. Pat. Nos. 7,969,178; 8,138,784; 8,508,280; 9,425,804; 9,787,312; 10,726,351; and 10,748,079.

While SFQ pulses are themselves quite fast, the prior art does not teach methods for rapid, programmable SFQ control of over the very large number of qubits that will be needed for a practical quantum computer. In particular, the prior art does not teach methods to tune the parameters of the various qubits and the couplings between them, using SFQ circuits.

Quantum computers (QC), comprising qubits promise exponential speed-up in solving certain problems. A qubit can be implemented in a physical system with two distinct energy levels representing the $|0\rangle$ and $|1\rangle$ states, e.g., the up and down spin states of an electron. The qubit states can be manipulated with microwave pulses, whose frequency f matches the energy level spacing E=hf. Qubit operations can be represented as rotations in the Bloch sphere. The rotation axis is set by the phase of the microwave signal relative to the qubit phase, which must be tracked for coherent operations. The pulse amplitude and duration determine the rotation angle.

A singular value decomposition allows visualization of a two-qubit state through a pair of Bloch spheres, one per subsystem. The Bloch vectors $\vec{u}$ and $\vec{v}$ are inscribed in their respective spheres, representing 6 degrees of freedom detectable through local measurements. The 9 degrees of freedom that can only be detected nonlocally are contained in Σ, M, and N, or equivalently, in the two matrix products MΣ and NΣ. The columns of these two products are the scaled correlation axes, given by $x_{i\hat{m}i}$ and $x_{i\hat{n}i}$ respectively. To complete the geometric representation of the quantum state, the three scaled correlation axes for each system can be added to their respective Bloch sphere, where they represent the magnitude and direction of the correlation. The scaled correlation axes in the two systems are paired off by a shared index i.

Spin in the directions of two such axes with the same index are correlated, proportional to their shared length $x_i$, while spin along axes with different indices are uncorrelated.

That is, simultaneously measuring the two spins on multiple copies of the system, each along the direction of its scaled correlation axis i, yields an expectation value equal to the axis length. Measuring the two spins simultaneously along correlation axes with different indices, i≠j, yields zero expectation value.

Quantum channels and operations are described by completely positive trace preserving maps, and lie at the heart of investigations in quantum information science. The single quantum bit (qubit) case has a particularly attractive geometric interpretation in terms of certain deformations of the Bloch sphere. This geometric picture to a large extent guides the intuition for higher-dimensional cases.

Viewing quantum operations as operators acting on operators leads to a clean geometric decomposition in the single qubit case; that is, completely positive trace preserving maps. Given an arbitrary 2×2 complex matrix, we can identify eight degrees of freedom through the real and imaginary parts of the four entries for example. In the case of Hermitian matrices, these eight degrees of freedom are reduced to four, as specification of any one of the off-diagonal terms fixes one of the others and each of the diagonal terms must be real. As a result, a linear map from 2×2 Hermitian matrices to 2×2 Hermitian matrices can be completely characterized by sixteen parameters. It is easily verified that any Hermitian matrix can be written as a linear combination of the identity and the three Pauli matrices, with real coefficients. Thus we can express any Hermitian 2×2 matrix as a 4-component real vector in the Pauli basis, $\{1, \sigma x, \sigma y, \sigma z\}$, and we can express a linear map on the 2×2 Hermitian matrices as a 4×4 real matrix in the same basis.

Shifting attention to a subset of the 2×2 Hermitian matrices, namely density matrices for a single qubit, we add the conditions that the matrices must be positive and have trace equal to one. The trace condition forces the coefficient of the identity to be ½, reducing the characterization to a 3-dimensional real subspace. Positivity then tells us that all density matrices are represented by points within a radius of ½ from the origin in this 3-dimensional real subspace. Using the standard convention that ½ is factored out of each component, we have the familiar Bloch vector representation of a density matrix, wherein the set of permissible density matrices are represented by the ball $|r|^2 \leq 1$, the Bloch sphere. When considering density matrices and quantum operations thereon, we can further refine the form of our linear map since a quantum operation will be described by a completely positive trace-preserving map. (Equivalently, the Hilbert-Schmidt dual of the map is completely positive and unital.)

We can therefore characterize the effect of an arbitrary completely positive trace-preserving map on the Bloch sphere as the composition of a rotation with a possible inversion, a compression to an ellipsoid, a second rotation with a possible inversion, and a translation.

See:

Abrams, Deanna M., Nicolas Didier, Blake R. Johnson, Marcus P. da Silva, and Colm A. Ryan. "Implementation of the XY interaction family with calibration of a single pulse." arXiv preprint arXiv: 1912.04424 (2019).

Abrams, Deanna M., Nicolas Didier, Shane A. Caldwell, Blake R. Johnson, and Colm A. Ryan. "Methods for measuring magnetic flux crosstalk between tunable transmons." Physical Review Applied 12, no. 6 (2019): 064022.

Ahmad, Meraj, Christos Giagkoulovits, Sergey Danilin, Martin Weides, and Hadi Heidari. "Scalable Cryoelectronics for Superconducting Qubit Control and Readout." Advanced Intelligent Systems (2022): 2200079.

Antonov, I. V., R. S. Shaikhaidarov, V. N. Antonov, and O. V. Astafiev. "Superconducting 'twin' qubit." Physical Review B 102, no. 11 (2020): 115422.

Ash-Saki, Abdullah, Mahabubul Alam, and Swaroop Ghosh. "Experimental characterization, modeling, and analysis of crosstalk in a quantum computer." IEEE Transactions on Quantum Engineering 1 (2020): 1-6.

Bækkegaard, Thomas, L. B. Kristensen, Niels JS Loft, Christian Kraglund Andersen, David Petrosyan, and Nikolaj T. Zinner. "Realization of efficient quantum gates with a superconducting qubit-qutrit circuit." Scientific reports 9, no. 1 (2019): 1-10.

Bardin, Joseph C. "Analog/Mixed-Signal Integrated Circuits for Quantum Computing." In 2020 IEEE BiCMOS and Compound Semiconductor Integrated Circuits and Technology Symposium (BCICTS), pp. 1-8. IEEE, 2020.

Bardin, Joseph C., Daniel Sank, Ofer Naaman, and Evan Jeffrey. "Quantum computing: An introduction for microwave engineers." IEEE Microwave Magazine 21, no. 8 (2020): 24-44.

Bardin, Joseph C., Evan Jeffrey, Erik Lucero, Trent Huang, Ofer Naaman, Rami Barends, Ted White et al. "29.1 A 28 nm bulk-CMOS 4-to-8 GHz; 2 mW cryogenic pulse modulator for scalable quantum computing." In 2019 IEEE International Solid-State Circuits Conference-(ISSCC), pp. 456-458. IEEE, 2019.

Barends, Rami, C. M. Quintana, A. G. Petukhov, Yu Chen, Dvir Kafri, Kostyantyn Kechedzhi, Roberto Collins et al. "Diabatic gates for frequency-tunable superconducting qubits." Physical Review Letters 123, no. 21 (2019): 210501.

Berke, Christoph, Evangelos Varvelis, Simon Trebst, Alexander Altland, and David P. DiVincenzo. "Transmon platform for quantum computing challenged by chaotic fluctuations." arXiv preprint arXiv: 2012.05923 (2020).

Besedin, Il'ya Stanislavovich, Gleb Petrovich Fedorov, A. Yu Dmitriev, and Valerii Vladimirovich Ryazanov. "Superconducting qubits in Russia." Quantum Electronics 48, no. 10 (2018): 880.

Bhattacharyya, Shaman, and Somnath Bhattacharyya. "Demonstrating geometric phase acquisition in multi-path tunnel systems using a near-term quantum computer." Journal of Applied Physics 130, no. 3 (2021): 034901.

Bocko, Mark F., Andrea M. Herr, and Marc J. Feldman. "Prospects for quantum coherent computation using superconducting electronics." IEEE Transactions on Applied Superconductivity 7, no. 2 (1997): 3638-3641.

Brink, Markus, Jerry M. Chow, Jared Hertzberg, Easwar Magesan, and Sami Rosenblatt. "Device challenges for near term superconducting quantum processors: frequency collisions." In 2018 IEEE International Electron Devices Meeting (IEDM), pp. 6-1. IEEE, 2018.

Cai, T-Q., X-Y. Han, Y-K. Wu, Y-L. Ma, J-H. Wang, Z-L. Wang, H-Y. Zhang, H-Y. Wang, Y-P. Song, and L-M. Duan. "Impact of Spectators on a Two-Qubit Gate in a Tunable Coupling Superconducting Circuit." Physical Review Letters 127, no. 6 (2021): 060505.

Caldwell, S. A., N. Didier, C. A. Ryan, E. A. Sete, A. Hudson, P. Karalekas, R. Manenti et al. "Parametrically activated entangling gates using transmon qubits." Physical Review Applied 10, no. 3 (2018): 034050.

Castellano, Maria Gabriella, Leif Grönberg, Pasquale Carelli, Fabio Chiarello, Carlo Cosmelli, Roberto Leoni, Stefano Poletto, Guido Torrioli, Juha Hassel, and Panu Helistö. "Characterization of a fabrication process for the integration of superconducting qubits and rapid-single-flux-quantum circuits." Superconductor Science and Technology 19, no. 8 (2006): 860.
Christensen, B. G., C. D. Wilen, A. Opremcak, J. Nelson, F. Schlenker, C. H. Zimonick, L. Faoro et al. "Anomalous charge noise in superconducting qubits." Physical Review B 100, no. 14 (2019): 140503.
Coffey, Mark W. "Quantum computing based on a superconducting quantum interference device: Exploiting the flux basis." Journal of Modern Optics 49, no. 14-15 (2002): 2389-2398.
Crankshaw, Donald Shane. "Measurement and on-chip control of a niobium persistent current qubit." PhD diss., Massachusetts Institute of Technology, 2003.
de Albornoz, Alejandro Cros Carrillo, John Taylor, and Vlad Cărare. "Time-optimal implementations of quantum algorithms." Physical Review A 100, no. 3 (2019): 032329.
Dragoman, Mircea, and Daniela Dragoman. "Quantum Computing." In Atomic-Scale Electronics Beyond CMOS, pp. 157-186. Springer, Cham, 2021.
Espinós, Hilario, Iván Panadero, Juan José García-Ripoll, and Erik Torrontegui. "Quantum control of tunable-coupling transmons using dynamical invariants of motion." arXiv preprint arXiv: 2205.06555 (2022).
Fedorov, Kirill G., Anastasia V. Shcherbakova, Michael J. Wolf, Detlef Beckmann, and Alexey V. Ustinov. "Fluxon readout of a superconducting qubit." Physical review letters 112, no. 16 (2014): 160502.
Feng, Guanru, Shi-Yao Hou, Hongyang Zou, Wei Shi, Sheng Yu, Zikai Sheng, Xin Rao et al. "SpinQ Triangulum: a commercial three-qubit desktop quantum computer." arXiv preprint arXiv: 2202.02983 (2022).
Foss-Feig, Michael, Stephen Ragole, Andrew Potter, Joan Dreiling, Caroline Figgatt, John Gaebler, Alex Hall et al. "Entanglement from Tensor Networks on a Trapped-Ion Quantum Computer." Physical Review Letters 128, no. 15 (2022): 150504.
Ganzhorn, Marc, Daniel J. Egger, Panagiotis Barkoutsos, Pauline Ollitrault, Gian Salis, Nikolaj Moll, M. Roth et al. "Gate-efficient simulation of molecular eigenstates on a quantum computer." Physical Review Applied 11, no. 4 (2019): 044092.
García-Ripoll, J. J., A. Ruiz-Chamorro, and E. Torrontegui. "Quantum control of transmon superconducting qubits." arXiv preprint arXiv: 2002.10320 (2020).
García-Ripoll, Juan José, Andrés Ruiz-Chamorro, and E. Torrontegui. "Quantum Control of Frequency-Tunable Transmon Superconducting Qubits." Physical Review Applied 14, no. 4 (2020): 044035.
Graham, T. M., Y. Song, J. Scott, C. Poole, L. Phuttitarn, K. Jooya, P. Eichler et al. "Multi-qubit entanglement and algorithms on a neutral-atom quantum computer." Nature 604, no. 7906 (2022): 457-462.
Graham, T. M., Y. Song, J. Scott, C. Poole, L. Phuttitarn, K. Jooya, P. Eichler et al. "Demonstration of multi-qubit entanglement and algorithms on a programmable neutral atom quantum computer." arXiv preprint arXiv: 2112.14589 (2021).
Hahn, Henning, Giorgio Zarantonello, Marius Schulte, Amado Bautista-Salvador, Klemens Hammerer, and Christian Ospelkaus. "Integrated 9Be+ multi-qubit gate device for the ion-trap quantum computer." npj Quantum Information 5, no. 1 (2019): 1-5.
Hill, Charles D., Muhammad Usman, and Lloyd CL Hollenberg. "An exchange-based surface-code quantum computer architecture in silicon." arXiv preprint arXiv: 2107.11981 (2021).
Hou, Shi-Yao, Guanru Feng, Zipeng Wu, Hongyang Zou, Wei Shi, Jinfeng Zeng, Chenfeng Cao et al. "SpinQ Gemini: a desktop quantum computer for education and research." arXiv preprint arXiv: 2101.10017 (2021).
Huang, Ziwen, Yao Lu, Eliot Kapit, David I. Schuster, and Jens Koch. "Universal stabilization of single-qubit states using a tunable coupler." Physical Review A 97, no. 6 (2018): 062345.
Humble, Travis S., Himanshu Thapliyal, Edgard Munoz-Coreas, Fahd A. Mohiyaddin, and Ryan S. Bennink. "Quantum computing circuits and devices." IEEE Design & Test 36, no. 3 (2019): 69-94.
Hutchings, M. D., Jared B. Hertzberg, Yebin Liu, Nicholas T. Bronn, George A. Keefe, Markus Brink, Jerry M. Chow, and B. L. T. Plourde. "Tunable superconducting qubits with flux-independent coherence." Physical Review Applied 8, no. 4 (2017): 044003.
Johnson, Philip R., Frederick W. Strauch, Alex J. Dragt, James R. Anderson, Christopher J. Lobb, and Frederick C. Wellstood. "Quantum control of superconducting phase qubits." In Quantum Information and Computation II, vol. 5436, pp. 232-241. International Society for Optics and Photonics, 2004.
Khabipov, M. I., D. V. Balashov, F. Maibaum, A. B. Zorin, V. A. Oboznov, V. V. Bolginov, A. N. Rossolenko, and V. V. Ryazanov. "A single flux quantum circuit with a ferromagnet-based Josephson x-junction." Superconductor Science and Technology 23, no. 4 (2010): 045032.
Klenov, N. V., A. V. Kuznetsov, I. I. Soloviev, S. V. Bakurskiy, M. V. Denisenko, and A. M. Satanin. "Flux qubit interaction with rapid single-flux quantum logic circuits: Control and readout." Low Temperature Physics 43, no. 7 (2017): 789-798.
Krantz, Philip, Morten Kjaergaard, Fei Yan, Terry P. Orlando, Simon Gustavsson, and William D. Oliver. "A quantum engineer's guide to superconducting qubits." Applied Physics Reviews 6, no. 2 (2019): 021318.
Landig, Andreas J., Jonne V. Koski, Pasquale Scarlino, Clemens Müller, José C. Abadillo-Uriel, Benedikt Kratochwil, Christian Reichl et al. "Virtual-photon-mediated spin-qubit-transmon coupling." Nature communications 10, no. 1 (2019): 1-7.
Larsen, Thorvald Wadum, Karl David Petersson, Ferdinand Kuemmeth, Thomas Sand Jespersen, Peter Krogstrup, Jesper Nygård, and Charles M. Marcus. "Semiconductor-nanowire-based superconducting qubit." Physical review letters 115, no. 12 (2015): 127001.
Leonard Jr, Edward, Matthew A. Beck, J. Nelson, Brad G. Christensen, Ted Thorbeck, Caleb Howington, Alexander Opremcak et al. "Digital coherent control of a superconducting qubit." Physical Review Applied 11, no. 1 (2019): 014009.
Li, Kangbo, R. McDermott, and Maxim G. Vavilov. "Hardware-efficient qubit control with single-flux-quantum pulse sequences." Physical Review Applied 12, no. 1 (2019): 014044.
Liebermann, Per J., and Frank K. Wilhelm. "Optimal qubit control using single-flux quantum pulses." Physical Review Applied 6, no. 2 (2016): 024022.
Lu, Yao, Srivatsan Chakram, Ngainam Leung, Nathan Earnest, Ravi K. Naik, Ziwen Huang, Peter Groszkowski, Eliot Kapit, Jens Koch, and David I. Schuster. "Universal stabilization of a parametrically coupled qubit." Physical review letters 119, no. 15 (2017): 150502.
Machnes, Shai, Elie Assemat, David Tannor, and Frank K. Wilhelm. "Tunable, flexible, and efficient optimization of control pulses for practical qubits." Physical review letters 120, no. 15 (2018): 150401.
Mališ, Momir, P. KI Barkoutsos, Marc Ganzhorn, Stefan Filipp, Daniel J. Egger, Sara Bonella, and Ivano Tavernelli. "Local control theory for superconducting qubits." Physical Review A 99, no. 5 (2019): 052316.
Marques, J. F., B. M. Varbanov, M. S. Moreira, Hany Ali, Nandini Muthusubramanian, Christos Zachariadis, Francesco Battistel et al. "Logical-qubit operations in an error-detecting surface code." Nature Physics 18, no. 1 (2022): 80-86.
McConkey, T. G., J. H. Béjanin, C. T. Earnest, C. R. H. McRae, Z. Pagel, J. R. Rinehart, and M. Mariantoni. "Mitigating leakage errors due to cavity modes in a superconducting quantum computer." Quantum Science and Technology 3, no. 3 (2018): 034004.
McDermott, R., and M. G. Vavilov. "Accurate qubit control with single flux quantum pulses." Physical Review Applied 2, no. 1 (2014): 014007.
McDermott, R., M. G. Vavilov, B. L. T. Plourde, F. K. Wilhelm, P. J. Liebermann, O. A. Mukhanov, and T. A. Ohki. "Quantum-classical interface based on single flux quantum digital logic." Quantum science and technology 3, no. 2 (2018): 024004.
McKay, David C., Christopher J. Wood, Sarah Sheldon, Jerry M. Chow, and Jay M. Gambetta. "Efficient Z gates for quantum computing." Physical Review A 96, no. 2 (2017): 022330.
Mukhanov, Oleg A, A. Kirichenko, C. Howington, J. Walter, M. Hutchings, I. Vernik, D. Yohannes, K. Dodge, A. Ballard, B. L. T. Plourde, A. Opremcak, C.-H. Liu, R. McDermott, "Scalable Quantum Computing Infrastructure Based on Superconducting Electronics," 2019 IEEE International Electron Devices Meeting (IEDM), San Francisco, CA, USA (2019): 31.2.1-31.2.4.
Mukhanov, Oleg A. "Energy-efficient single flux quantum technology." IEEE Transactions on Applied Superconductivity 21, no. 3 (2011): 760-769.
Mundada, Pranav, Gengyan Zhang, Thomas Hazard, and Andrew Houck. "Suppression of qubit crosstalk in a tunable coupling superconducting circuit." Physical Review Applied 12, no. 5 (2019): 054023.
Murch, K. W., S. J. Weber, Christopher Macklin, and Irfan Siddiqi. "Observing single quantum trajectories of a superconducting quantum bit." Nature 502, no. 7470 (2013): 211-214.
Negîrneac, V., H. Ali, N. Muthusubramanian, F. Battistel, R. Sagastizabal, M. S. Moreira, J. F. Marques, W. J. Vlothuizen, M. Beekman, C. Zachariadis, N. Haider, A. Bruno, and L. DiCarlo, "High-fidelity controlled-Z gate with maximal intermediate leakage operating at the speed limit in a superconducting quantum processor," Phys. Rev. Letters 126 (2021): 220502.
Nguyen, Long Bao. "Toward the Fluxonium Quantum Processor." PhD diss., University of Maryland, College Park, 2020.
Niskanen, A. O., K. Harrabi, F. Yoshihara, Y. Nakamura, S. Lloyd, and Jaw Shen Tsai. "Quantum coherent tunable coupling of superconducting qubits." Science 316, no. 5825 (2007): 723-726.
Ohki, Thomas A., Michael Wulf, and Marc J. Feldman. "Low-Jc rapid single flux quantum (RSFQ) qubit control circuit." IEEE transactions on applied superconductivity 17, no. 2 (2007): 154-157.
Patra, Bishnu, Jeroen PG van Dijk, Sushil Subramanian, Andrea Corna, Xiao Xue, Charles Jeon, Farhana Sheikh et al. "19.1 a scalable cryo-CMOS 2-to-20 GHz digitally intensive controller for 4×32 frequency multiplexed spin qubits/transmons in 22 nm FinFET technology for quantum computers." In 2020 IEEE International Solid-State Circuits Conference-(ISSCC), pp. 304-306. IEEE, 2020.
Pezzagna, Sébastien, and Jan Meijer. "Quantum computer based on color centers in diamond." Applied Physics Reviews 8, no. 1 (2021): 011308.
Rol, M. A., F. Battistel, F. K. Malinowski, C. C. Bultink, B. M. Tarasinski, R. Vollmer, N. Haider et al. "A fast, low-leakage, high-fidelity two-qubit gate for a programmable superconducting quantum computer." arXiv preprint arXiv: 1903.02492 (2019).
Schrade, Constantin, and Liang Fu. "Majorana superconducting qubit." Physical Review Letters 121, no. 26 (2018): 267002.
Sete, Eyob A., Matthew J. Reagor, Nicolas Didier, and Chad T. Rigetti. "Charge- and flux-insensitive tunable superconducting qubit." Physical Review Applied 8, no. 2 (2017): 024004.
Sheldon, Sarah, Easwar Magesan, Jerry M. Chow, and Jay M. Gambetta. "Procedure for systematically tuning up cross-talk in the cross-resonance gate." Physical Review A 93, no. 6 (2016): 060302.
Sirois, Adam, Manuel Castellanos-Beltran, Anna Fox, Samuel Benz, and Peter Hopkins. "Josephson Microwave Sources Applied to Quantum Information Systems." IEEE Transactions on Quantum Engineering (2020).
Song, Chao, Kai Xu, Hekang Li, Yu-Ran Zhang, Xu Zhang, Wuxin Liu, Qiujiang Guo et al. "Generation of multicomponent atomic Schrödinger cat states of up to 20 qubits." Science 365, no. 6453 (2019): 574-577.
Stassi, Roberto, Mauro Cirio, and Franco Nori. "Scalable quantum computer with superconducting circuits in the ultrastrong coupling regime." npj Quantum Information 6, no. 1 (2020): 1-6.
Stenger, John, Gilad Ben-Shach, David Pekker, and Nicholas T. Bronn. "Simulating spectroscopic detection of Majorana zero modes with a superconducting quantum computer." arXiv preprint arXiv: 2202.12910 (2022).
Uilhoorn, Willemijntje. "Hybrid Josephson junction-based quantum devices in magnetic field." (2021).
Versluis, Richard, Stefano Poletto, Nader Khammassi, Brian Tarasinski, Nadia Haider, David J. Michalak, Alessandro Bruno, Koen Bertels, and Leonardo DiCarlo. "Scalable quantum circuit and control for a superconducting surface code." Physical Review Applied 8, no. 3 (2017): 034021.
Wang, Joel, Daniel Rodan Legrain, Charlotte Boettcher, Landry Bretheau, Daniel Campbell, Bharath Kannan, David Kim et al. "Quantum coherent control of graphene-based transmon qubit." In APS March Meeting Abstracts, vol. 2019, pp. C29-010. 2019.
Wendin, Göran. "Quantum information processing with superconducting circuits: a review." Reports on Progress in Physics 80, no. 10 (2017): 106001.
Xin, Tao, Shilin Huang, Sirui Lu, Keren Li, Zhihuang Luo, Zhangqi Yin, Jun Li, Dawei Lu, Guilu Long, and Bei Zeng. "NMRCloudQ: a quantum cloud experience on a nuclear magnetic resonance quantum computer." Science Bulletin 63, no. 1 (2018): 17-23.
Yamanashi, Yuki, Takanobu Nishigai, and Nobuyuki Yoshikawa. "Study of LR-loading technique for low-power single flux quantum circuits." IEEE Transactions on applied superconductivity 17, no. 2 (2007): 150-153.
Yoshikawa, Nobuyuki. "Superconducting digital electronics for controlling quantum computing systems." IEICE Transactions on Electronics 102, no. 3 (2019): 217-223.

Zhang, Helin, Srivatsan Chakram, Tanay Roy, Nathan Earnest, Yao Lu, Ziwen Huang, Daniel Weiss, Jens Koch, and David I. Schuster, "Universal fast flux control of a coherent, low-frequency qubit," Phys. Rev. X 11 (2021): 011010.

Zhang, Xian-Peng, Li-Tuo Shen, Zhang-Qi Yin, Luyan Sun, Huai-Zhi Wu, and Zhen-Biao Yang. "Multi-Resonator-Assisted Multi-Qubit Resetting in a Network." arXiv preprint arXiv: 1604.08393 (2016).

Zhou, Jian, Sai Li, Guo-Zhu Pan, Gang Zhang, Tao Chen, and Zheng-Yuan Xuc. "Nonadiabatic geometric quantum gates that are insensitive to qubit-frequency drifts." Physical Review A 103, no. 3 (2021): 032609.

Zhu, Daoquan, Tuomas Jaako, Qiongyi He, and Peter Rabl. "Quantum computing with superconducting circuits in the picosecond regime." arXiv preprint arXiv: 2101.05810 (2021).

See, U.S. Pat. Nos. 5,170,080; 5,233,242; 5,233,243; 5,289,400; 5,388,068; 5,389,837; 5,598,105; 5,629,889; 5,781,009; 5,793,055; 5,818,373; 5,936,458; 5,963,351; 5,982,219; 6,023,161; 6,175,749; 6,188,236; 6,217,165; 6,242,939; 6,315,200; 6,317,192; 6,331,805; 6,345,189; 6,345,190; 6,353,330; 6,356,715; 6,362,868; 6,362,869; 6,415,054; 6,431,669; 6,442,525; 6,459,097; 6,459,495; 6,476,863; 6,479,139; 6,486,694; 6,495,854; 6,504,172; 6,507,234; 6,509,853; 6,518,786; 6,526,491; 6,537,847; 6,542,645; 6,563,310; 6,563,311; 6,573,202; 6,576,951; 6,580,102; 6,605,822; 6,608,581; 6,614,047; 6,626,995; 6,627,915; 6,627,916; 6,630,426; 6,636,216; 6,649,929; 6,665,454; 6,670,630; 6,703,857; 6,724,216; 6,725,248; 6,728,131; 6,734,699; 6,750,901; 6,750,944; 6,753,546; 6,756,925; 6,773,836; 6,781,435; 6,784,451; 6,786,420; 6,788,336; 6,791,109; 6,797,341; 6,803,599; 6,809,734; 6,812,484; 6,813,056; 6,822,255; 6,826,662; 6,831,681; 6,838,694; 6,838,749; 6,850,274; 6,865,639; 6,879,341; 6,885,325; 6,897,468; 6,900,454; 6,900,456; 6,905,887; 6,909,109; 6,911,664; 6,917,537; 6,918,542; 6,919,579; 6,926,921; 6,930,318; 6,930,320; 6,936,841; 6,943,368; 6,946,428; 6,948,661; 6,960,780; 6,979,836; 6,984,846; 6,987,282; 7,002,174; 7,007,852; 7,015,499; 7,018,852; 7,042,005; 7,050,143; 7,073,713; 7,078,694; 7,083,108; 7,089,099; 7,090,889; 7,092,011; 7,093,104; 7,095,227; 7,097,104; 7,100,834; 7,103,460; 7,110,139; 7,113,967; 7,124,259; 7,129,870; 7,135,701; 7,139,882; 7,155,395; 7,187,404; 7,201,319; 7,230,266; 7,231,500; 7,233,421; 7,233,998; 7,234,645; 7,236,998; 7,253,654; 7,268,576; 7,268,713; 7,280,623; 7,283,162; 7,287,702; 7,289,142; 7,289,156; 7,304,646; 7,307,275; 7,313,199; 7,313,467; 7,321,958; 7,332,738; 7,335,909; 7,360,102; 7,362,125; 7,362,971; 7,364,923; 7,365,663; 7,373,083; 7,377,706; 7,379,800; 7,386,687; 7,389,508; 7,391,435; 7,392,511; 7,395,411; 7,408,453; 7,409,570; 7,415,703; 7,418,283; 7,428,562; 7,428,619; 7,437,536; 7,439,208; 7,440,490; 7,443,719; 7,444,210; 7,444,525; 7,444,632; 7,453,492; 7,456,861; 7,457,939; 7,460,152; 7,461,931; 7,467,034; 7,468,630; 7,475,257; 7,475,825; 7,478,390; 7,483,050; 7,496,673; 7,496,917; 7,498,832; 7,502,928; 7,505,310; 7,508,230; 7,509,457; 7,511,744; 7,516,334; 7,516,456; 7,523,157; 7,524,045; 7,526,608; 7,527,288; 7,533,068; 7,546,405; 7,547,648; 7,549,145; 7,549,327; 7,550,759; 7,554,369; 7,559,472; 7,565,653; 7,570,075; 7,598,897; 7,602,423; 7,603,894; 7,605,600; 7,613,764; 7,613,765; 7,613,886; 7,614,053; 7,619,437; 7,624,088; 7,629,999; 7,630,802; 7,631,966; 7,639,035; 7,644,255; 7,650,210; 7,653,908; 7,654,626; 7,672,756; 7,676,683; 7,680,474; 7,680,972; 7,685,601; 7,687,938; 7,689,068; 7,689,783; 7,689,784; 7,689,814; 7,693,053; 7,693,626; 7,694,306; 7,698,473; 7,701,286; 7,701,506; 7,707,385; 7,714,605; 7,719,453; 7,720,982; 7,724,020; 7,724,083; 7,728,748; 7,730,456; 7,732,804; 7,733,253; 7,748,006; 7,749,922; 7,750,664; 7,760,080; 7,768,287; 7,772,871; 7,774,512; 7,782,077; 7,786,748; 7,786,786; 7,786,864; 7,788,192; 7,788,467; 7,800,395; 7,802,023; 7,805,756; 7,814,166; 7,816,940; 7,818,507; 7,818,724; 7,826,088; 7,829,377; 7,837,115; 7,843,209; 7,844,656; 7,847,615; 7,852,106; 7,858,966; 7,863,892; 7,868,645; 7,870,087; 7,875,876; 7,876,145; 7,876,248; 7,876,869; 7,877,333; 7,880,529; 7,880,594; 7,882,310; 7,882,379; 7,886,112; 7,889,096; 7,889,992; 7,893,708; 7,898,282; 7,899,852; 7,903,456; 7,911,265; 7,912,656; 7,917,667; 7,917,798; 7,920,102; 7,921,151; 7,924,313; 7,926,023; 7,928,875; 7,931,200; 7,932,514; 7,932,515; 7,936,395; 7,942,332; 7,944,253; 7,956,640; 7,958,371; 7,969,178; 7,969,805; 7,977,668; 7,982,646; 7,984,012; 7,984,965; 7,990,662; 7,991,013; 7,991,814; 7,999,813; 8,001,294; 8,001,377; 8,001,390; 8,001,592; 8,008,942; 8,008,991; 8,010,716; 8,018,244; 8,022,012; 8,024,084; 8,028,288; 8,028,292; 8,032,474; 8,035,540; 8,045,660; 8,050,648; 8,055,235; 8,055,318; 8,063,657; 8,068,151; 8,068,741; 8,073,808; 8,077,207; 8,089,286; 8,091,078; 8,098,179; 8,108,564; 8,130,880; 8,138,784; 8,138,880; 8,148,715; 8,159,313; 8,159,825; 8,169,231; 8,169,311; 8,175,995; 8,176,481; 8,179,133; 8,188,901; 8,190,548; 8,195,596; 8,195,726; 8,208,288; 8,219,871; 8,219,981; 8,224,639; 8,228,688; 8,234,103; 8,244,650; 8,244,662; 8,247,799; 8,249,540; 8,260,143; 8,260,144; 8,260,145; 8,271,805; 8,283,943; 8,284,585; 8,290,553; 8,291,485; 8,294,138; 8,301,104; 8,301,214; 8,312,529; 8,315,969; 8,321,866; 8,328,101; 8,332,924; 8,401,509; 8,401,600; 8,405,468; 8,416,109; 8,434,091; 8,437,168; 8,437,818; 8,441,329; 8,462,889; 8,494,993; 8,504,497; 8,508,280; 8,514,986; 8,521,117; 8,547,732; 8,549,521; 8,555,370; 8,565,345; 8,571,614; 8,582,687; 8,593,141; 8,604,944; 8,611,974; 8,618,799; 8,619,242; 8,627,444; 8,654,578; 8,655,828; 8,670,807; 8,686,751; 8,726,041; 8,735,964; 8,738,105; 8,744,541; 8,745,850; 8,748,196; 8,751,212; 8,755,220; 8,766,630; 8,769,495; 8,772,759; 8,786,476; 8,787,873; 8,804,358; 8,811,536; 8,812,066; 8,841,764; 8,854,074; 8,861,619; 8,867,931; 8,872,360; 8,872,690; 8,874,629; 8,892,857; 8,922,239; 8,928,391; 8,933,695; 8,936,196; 8,937,255; 8,951,808; 8,970,217; 8,971,977; 8,975,912; 8,977,223; 8,977,576; 8,986,646; 9,015,215; 9,020,079; 9,020,362; 9,021,011; 9,026,574; 9,040,959; 9,041,427; 9,058,164; 9,059,674; 9,059,707; 9,065,452; 9,069,928; 9,072,894; 9,077,577; 9,129,224; 9,130,116; 9,134,047; 9,152,923; 9,152,924; 9,160,593; 9,162,881; 9,170,278; 9,178,154; 9,183,051; 9,183,508; 9,192,085; 9,203,654; 9,207,672; 9,208,446; 9,218,567; 9,235,811; 9,240,773; 9,252,825; 9,252,986; 9,256,834; 9,261,573; 9,270,385; 9,275,011; 9,276,615; 9,312,878; 9,312,895; 9,331,875; 9,335,385; 9,344,069; 9,344,092; 9,350,460; 9,355,364; 9,355,365; 9,361,169; 9,369,133; 9,379,303; 9,384,827; 9,385,293; 9,385,294; 9,396,440; 9,400,499; 9,401,823; 9,405,876; 9,406,026; 9,412,074; 9,424,526; 9,425,377; 9,425,804; 9,425,838; 9,432,024; 9,437,800; 9,438,246; 9,455,391; 9,460,397; 9,461,588; 9,471,880; 9,473,124; 9,476,950; 9,490,296; 9,495,644; 9,501,747; 9,501,748; 9,503,063; 9,503,258; 9,509,274; 9,509,315; 9,514,415; 9,520,180; 9,524,470; 9,531,671; 9,537,575; 9,547,826; 9,548,878; 9,552,862; 9,554,303; 9,559,284; 9,565,045; 9,577,690; 9,588,191; 9,588,940; 9,594,726; 9,595,969; 9,607,270; 9,614,532; 9,618,591; 9,627,045; 9,633,314; 9,641,372; 9,647,194; 9,647,662; 9,661,596; 9,663,358; 9,665,539; 9,680,452; 9,685,935; 9,686,112; 9,692,423; 9,697,473; 9,699,266;

9,703,516; 9,710,586; 9,710,758; 9,712,238; 9,727,527; 9,727,823; 9,727,824; 9,735,776; 9,741,918; 9,741,920; 9,742,429; 9,747,968; 9,748,937; 9,748,976; 9,753,102; 9,755,133; 9,761,305; 9,768,371; 9,768,771; 9,779,360; 9,780,765; 9,787,312; 9,793,913; 9,793,933; 9,806,711; 9,812,836; 9,818,064; 9,836,699; 9,838,051; 9,853,645; 9,859,981; 9,865,648; 9,870,277; 9,875,215; 9,875,444; 9,881,256; 9,882,112; 9,887,000; 9,892,365; 9,906,191; 9,906,248; 9,909,460; 9,917,580; 9,922,289; 9,928,948; 9,929,978; 9,935,252; 9,940,586; 9,948,254; 9,953,268; 9,953,269; 9,966,720; 9,971,970; 9,978,020; 9,978,809; 9,982,935; 9,984,333; 9,991,864; 9,996,801; 9,998,122; 9,998,187; 10,002,107; 10,013,657; 10,014,859; 10,020,438; 10,031,887; 10,037,493; 10,042,805; 10,044,638; 10,050,630; 10,051,591; 10,056,540; 10,056,908; 10,062,828; 10,062,829; 10,068,180; 10,068,181; 10,074,056; 10,074,792; 10,074,793; 10,097,186; 10,097,221; 10,097,281; 10,103,730; 10,108,071; 10,121,754; 10,122,350; 10,122,351; 10,127,500; 10,128,878; 10,133,984; 10,134,972; 10,140,248; 10,140,404; 10,141,493; 10,141,928; 10,147,865; 10,148,360; 10,157,842; 10,158,343; 10,164,606; 10,168,501; 10,169,714; 10,170,680; 10,170,681; 10,171,077; 10,171,086; 10,176,432; 10,177,297; 10,177,749; 10,187,065; 10,192,168; 10,193,729; 10,197,497; 10,199,553; 10,210,460; 10,222,416; 10,224,475; 10,229,355; 10,229,366; 10,230,038; 10,230,389; 10,230,558; 10,235,634; 10,235,635; 10,236,432; 10,236,869; 10,242,968; 10,243,132; 10,255,557; 10,256,206; 10,262,276; 10,262,727; 10,263,170; 10,268,622; 10,268,968; 10,275,422; 10,275,556; 10,275,718; 10,276,771; 10,276,772; 10,281,278; 10,282,675; 10,283,693; 10,283,694; 10,289,960; 10,290,798; 10,291,227; 10,304,004; 10,304,005; 10,305,015; 10,311,369; 10,318,880; 10,318,881; 10,319,896; 10,320,331; 10,320,383; 10,326,526; 10,332,023; 10,332,024; 10,333,046; 10,333,047; 10,333,048; 10,333,049; 10,333,503; 10,340,438; 10,345,678; 10,346,348; 10,346,349; 10,346,508; 10,346,760; 10,346,761; 10,348,245; 10,348,343; 10,352,992; 10,353,844; 10,354,198; 10,355,193; 10,355,677; 10,355,681; 10,366,340; 10,367,132; 10,367,133; 10,373,928; 10,374,612; 10,379,420; 10,380,494; 10,380,495; 10,380,496; 10,381,206; 10,381,541; 10,381,542; 10,382,132; 10,389,336; 10,396,269; 10,396,782; 10,396,801; 10,398,031; 10,403,808; 10,403,809; 10,404,214; 10,411,321; 10,411,804; 10,417,574; 10,418,540; 10,423,888; 10,424,711; 10,424,712; 10,424,713; 10,452,991; 10,453,894; 10,454,015; 10,454,016; 10,454,459; 10,460,796; 10,461,385; 10,467,543; 10,467,544; 10,467,545; 10,468,578; 10,468,740; 10,475,983; 10,482,388; 10,483,980; 10,488,469; 10,489,477; 10,490,600; 10,491,178; 10,491,221; 10,496,933; 10,496,934; 10,497,853; 10,502,802; 10,504,842; 10,505,097; 10,505,524; 10,509,084; 10,510,015; 10,510,943; 10,511,276; 10,516,486; 10,528,885; 10,528,886; 10,528,887; 10,529,003; 10,530,435; 10,535,013; 10,535,809; 10,540,603; 10,540,604; 10,541,659; 10,546,992; 10,546,993; 10,547,160; 10,552,755; 10,552,756; 10,552,757; 10,553,775; 10,554,207; 10,560,076; 10,560,103; 10,565,515; 10,567,100; 10,572,816; 10,573,093; 10,578,891; 10,586,908; 10,586,909; 10,586,911; 10,593,858; 10,593,879; 10,599,988; 10,599,990; 10,601,623; 10,614,372; 10,615,223; 10,615,783; 10,616,025; 10,621,140; 10,621,502; 10,622,032; 10,622,977; 10,622,998; 10,628,752; 10,628,753; 10,629,978; 10,630,326; 10,635,988; 10,635,989; 10,635,990; 10,637,142; 10,637,449; 10,637,479; 10,643,143; 10,644,217; 10,644,809; 10,650,319; 10,650,320; 10,650,322; 10,650,323; 10,651,361; 10,651,808; 10,657,198; 10,657,455; 10,657,456; 10,658,424; 10,659,018; 10,659,075; 10,665,635; 10,665,701; 10,665,769; 10,665,918; 10,666,238; 10,671,559; 10,671,937; 10,680,617; 10,686,007; 10,686,115; 10,691,633; 10,692,010; 10,693,566; 10,700,256; 10,700,257; 10,705,163; 10,706,366; 10,707,402; 10,707,812; 10,707,873; 10,708,046; 10,712,408; 10,713,584; 10,715,083; 10,719,775; 10,719,776; 10,720,562; 10,720,563; 10,720,887; 10,725,131; 10,725,361; 10,726,351; 10,726,353; 10,735,003; 10,740,688; 10,741,742; 10,748,078; 10,748,079; 10,748,082; 10,748,960; 10,748,961; 10,749,095; 10,749,096; 10,755,190; 10,755,194; 10,755,775; 10,756,004; 10,756,712; 10,763,420; 10,769,545; 10,769,546; 10,770,638; 10,775,173; 10,776,709; 10,784,432; 10,789,123; 10,789,329; 10,789,541; 10,790,566; 10,797,684; 10,803,396; 10,804,874; 10,809,177; 10,810,506; 10,810,507; 10,811,276; 10,811,588; 10,813,219; 10,817,463; 10,817,796; 10,819,281; 10,826,845; 10,832,155; 10,832,156; 10,833,016; 10,833,121; 10,833,242; 10,833,243; 10,833,680; 10,839,305; 10,839,306; 10,840,295; 10,847,705; 10,847,706; 10,852,346; 10,852,366; 10,858,239; 10,858,240; 10,862,465; 10,868,540; 10,872,021; 10,879,202; 10,879,446; 10,879,906; 10,884,033; 10,885,459; 10,886,049; 10,886,454; 10,886,585; 10,887,013; 10,891,554; 10,891,555; 10,892,725; 10,892,751; 10,897,069; 10,901,062; 10,903,411; 10,903,809; 10,914,969; 10,915,832; 10,916,690; 10,916,821; 10,917,096; 10,922,381; 10,922,617; 10,922,619; 10,924,095; 10,927,076; 10,929,576; 10,931,267; 10,937,941; 10,938,346; 10,942,804; 10,943,180; 10,944,362; 10,949,769; 10,950,299; 10,950,654; 10,950,778; 10,956,267; 10,957,841; 10,958,253; 10,958,274; 10,964,997; 10,969,443; 10,971,672; 10,978,425; 10,978,632; 10,984,335; 10,984,336; 10,985,308; 10,985,701; 10,985,739; 10,989,767; 10,990,017; 10,991,755; 10,992,106; 10,996,979; 10,998,869; 11,004,009; 11,005,023; 11,005,024; 11,006,527; 11,010,145; 11,010,686; 11,011,693; 11,012,960; 11,017,310; 11,018,290; 11,033,981; 11,037,068; 11,038,095; 11,049,037; 11,050,009; 11,050,010; 11,055,627; 11,056,583; 11,063,201; 11,069,790; 11,070,210; 11,075,435; 11,088,679; 11,095,489; 11,100,418; 11,105,866; 11,106,980; 11,106,993; 11,108,120; 11,108,380; 11,108,398; 11,112,442; 11,112,842; 11,115,011; 11,115,012; 11,115,027; 11,115,131; 11,119,385; 11,120,357; 11,121,239; 11,121,301; 11,121,302; 11,126,062; 11,126,926; 11,127,892; 11,128,045; 11,133,450; 11,133,451; 11,138,354; 11,139,424; 11,152,707; 11,157,827; 11,163,209; 11,164,100; 11,164,102; 11,164,103; 11,164,104; 11,169,801; 11,170,317; 11,170,318; 11,170,846; 11,177,428; 11,177,912; 11,178,771; 11,182,230; 11,182,690; 11,183,989; 11,188,843; 11,194,573; 11,194,659; 11,197,365; 11,200,508; 11,210,600; 11,210,601; 11,210,602; 11,211,482; 11,218,471; 11,223,005; 11,223,355; 11,240,223; 11,245,389; 11,245,390; 11,245,486; 11,245,519; 11,258,415; 11,264,089; 11,264,554; 11,271,280; 11,271,533; 11,281,524; 11,283,002; 11,283,445; 11,288,121; 11,289,156; 11,289,639; 11,293,851; 11,294,986; 11,300,853; 11,301,770; 11,302,856; 11,303,281; 11,307,242; 11,308,416; 11,309,478; 11,317,519; 11,320,588; 11,321,627; 11,329,638; 11,334,811; 11,341,426; 11,342,493; 11,342,905; 20010020701; 20010023943; 20010025012; 20010035524; 20010040447; 20010055669; 20010055775; 20020060635; 20020066936; 20020075057; 20020095765; 20020097047; 20020102674; 20020105948; 20020115571; 20020117467; 20020117656; 20020117738; 20020118903; 20020119243; 20020119805; 20020121636; 20020128156; 20020130313; 20020130315; 20020135582; 20020138637; 20020138701; 20020138707; 20020152810; 20020156993; 20020169079; 20020177529; 20020177769; 20020179937;

20020179939; 20020188578; 20020189533; 20020190381; 20030005010; 20030011398; 20030016010; 20030016069; 20030017949; 20030027724; 20030028338; 20030034794; 20030038285; 20030039138; 20030040440; 20030042481; 20030054960; 20030057441; 20030058026; 20030068832; 20030071246; 20030071258; 20030076251; 20030077224; 20030094606; 20030098455; 20030102470; 20030107033; 20030111659; 20030111661; 20030115401; 20030117496; 20030121028; 20030134089; 20030141868; 20030146429; 20030146430; 20030146746; 20030169041; 20030169142; 20030173498; 20030173997; 20030179831; 20030183935; 20030189203; 20030193097; 20030199395; 20030207766; 20030207767; 20030219911; 20030224944; 20030229765; 20030230732; 20040000666; 20040004129; 20040004698; 20040008262; 20040012388; 20040012407; 20040014077; 20040016883; 20040016918; 20040022332; 20040027125; 20040041018; 20040056105; 20040065738; 20040075747; 20040077503; 20040080620; 20040090553; 20040095803; 20040098443; 20040099861; 20040104410; 20040119061; 20040119827; 20040120299; 20040125209; 20040125212; 20040126304; 20040129789; 20040130311; 20040134967; 20040135139; 20040140537; 20040145366; 20040150458; 20040151321; 20040154704; 20040165454; 20040167036; 20040170047; 20040173787; 20040173792; 20040173793; 20040183914; 20040201400; 20040215931; 20040220057; 20040223380; 20040232405; 20040232912; 20040234785; 20040239319; 20040266497; 20040266627; 20050001209; 20050023518; 20050029512; 20050035368; 20050040843; 20050043185; 20050045869; 20050045872; 20050047245; 20050052181; 20050057248; 20050062131; 20050071404; 20050071513; 20050071526; 20050071578; 20050071651; 20050071828; 20050074220; 20050078022; 20050078117; 20050081181; 20050081182; 20050081201; 20050081202; 20050081203; 20050081209; 20050081213; 20050082519; 20050086655; 20050088174; 20050091473; 20050092849; 20050095011; 20050097231; 20050097280; 20050097302; 20050098773; 20050101489; 20050106313; 20050107262; 20050109879; 20050116204; 20050116719; 20050120185; 20050120187; 20050120254; 20050122399; 20050123674; 20050134262; 20050138325; 20050143791; 20050145701; 20050146613; 20050146614; 20050149002; 20050149169; 20050151819; 20050160097; 20050162302; 20050171421; 20050179781; 20050180095; 20050185198; 20050185461; 20050188372; 20050188373; 20050192727; 20050197254; 20050202572; 20050206376; 20050215436; 20050216222; 20050216775; 20050218236; 20050224784; 20050228967; 20050231196; 20050241394; 20050243708; 20050247793; 20050250651; 20050251659; 20050251667; 20050255680; 20050256007; 20050258248; 20050268038; 20050268048; 20050273652; 20060022671; 20060025897; 20060038821; 20060049891; 20060050286; 20060055782; 20060056728; 20060069879; 20060072030; 20060075397; 20060076423; 20060079402; 20060091881; 20060092957; 20060093861; 20060095220; 20060097746; 20060097747; 20060104889; 20060107122; 20060112213; 20060126770; 20060129786; 20060129999; 20060143509; 20060145694; 20060147154; 20060148514; 20060149861; 20060151775; 20060155792; 20060155955; 20060155964; 20060158519; 20060161741; 20060164081; 20060176054; 20060177122; 20060179179; 20060179198; 20060179255; 20060179275; 20060179277; 20060179278; 20060179436; 20060180371; 20060186881; 20060190614; 20060190942; 20060195824; 20060206731; 20060206732; 20060212193; 20060212194; 20060212643; 20060214012; 20060220641; 20060225165; 20060231627; 20060234419; 20060237660; 20060243043; 20060244581; 20060247131; 20060248618; 20060251070; 20060255987; 20060259733; 20060259743; 20060270173; 20060275958; 20060284839; 20060290553; 20070005202; 20070007956; 20070011023; 20070018643; 20070038067; 20070046955; 20070049097; 20070052441; 20070057781; 20070069339; 20070075729; 20070075752; 20070075919; 20070077906; 20070080341; 20070083870; 20070085534; 20070096565; 20070096730; 20070114994; 20070116629; 20070126561; 20070139216; 20070156312; 20070156320; 20070158791; 20070167723; 20070168538; 20070174227; 20070176625; 20070180041; 20070180586; 20070186077; 20070194225; 20070194958; 20070197900; 20070201845; 20070201846; 20070205881; 20070212794; 20070236245; 20070240013; 20070241746; 20070241747; 20070254375; 20070258329; 20070263432; 20070277000; 20070283103; 20070288701; 20070293160; 20080001599; 20080024126; 20080024642; 20080040805; 20080047367; 20080048762; 20080048902; 20080049885; 20080051291; 20080051292; 20080052055; 20080052504; 20080065290; 20080065573; 20080074110; 20080074113; 20080077721; 20080077815; 20080084898; 20080086240; 20080086438; 20080091886; 20080098260; 20080100175; 20080101444; 20080101501; 20080101503; 20080103708; 20080107213; 20080108503; 20080109500; 20080112313; 20080116448; 20080116449; 20080122434; 20080126601; 20080129475; 20080146449; 20080155203; 20080156406; 20080162613; 20080162834; 20080162877; 20080165254; 20080168443; 20080176750; 20080186064; 20080209156; 20080215850; 20080216567; 20080218519; 20080229143; 20080231353; 20080235679; 20080238531; 20080250414; 20080256275; 20080258753; 20080260257; 20080271003; 20080274898; 20080276232; 20080279370; 20080282063; 20080282084; 20080282093; 20080282341; 20080282342; 20080284413; 20080284575; 20080290938; 20080297230; 20080301695; 20080313114; 20080313430; 20090002014; 20090008632; 20090014714; 20090015317; 20090031412; 20090033369; 20090034657; 20090043441; 20090057652; 20090068355; 20090070402; 20090072828; 20090073017; 20090075825; 20090077001; 20090078931; 20090078932; 20090082209; 20090086533; 20090102580; 20090121215; 20090122508; 20090125717; 20090135215; 20090135232; 20090143665; 20090153180; 20090153381; 20090167342; 20090168286; 20090173936; 20090189633; 20090192041; 20090206871; 20090227044; 20090232191; 20090232507; 20090232510; 20090233798; 20090237106; 20090241013; 20090242636; 20090244215; 20090244292; 20090244958; 20090256561; 20090259905; 20090261319; 20090267635; 20090274609; 20090289638; 20090299947; 20090302844; 20090319757; 20090321720; 20090322374; 20090324484; 20100006825; 20100026447; 20100026537; 20100033206; 20100033252; 20100066576; 20100079600; 20100085827; 20100091116; 20100094796; 20100097056; 20100102904; 20100109638; 20100109669; 20100133514; 20100148841; 20100148853; 20100149011; 20100164536; 20100170951; 20100176840; 20100182039; 20100194466; 20100207622; 20100207657; 20100207754; 20100237899; 20100239489; 20100281885; 20100301855; 20100301856; 20100301857; 20100303731; 20100303733; 20100306142; 20100312969; 20100315516; 20100327861; 20100327865; 20100329401; 20100329962; 20100330704; 20110004930; 20110009274; 20110010412; 20110018612; 20110022820; 20110031994; 20110047201; 20110049475; 20110054236; 20110054450; 20110054876; 20110055520; 20110057169; 20110060710; 20110060711; 20110060780; 20110063016; 20110065585; 20110065586; 20110068789; 20110085381; 20110087909; 20110089405; 20110098623; 20110102068; 20110122261; 20110125460; 20110133770; 20110152104; 20110167241; 20110175061; 20110175062; 20110175628; 20110210738; 20110231462; 20110238607; 20110241765; 20110254583; 20110267878; 20110278355; 20110285393;

20110288823; 20110298489; 20110302591; 20110303153; 20120005456; 20120012818; 20120019242; 20120023053; 20120030386; 20120042372; 20120045136; 20120053059; 20120088674; 20120089299; 20120094838; 20120096873; 20120108434; 20120112168; 20120135867; 20120144159; 20120157319; 20120157321; 20120172233; 20120184445; 20120187378; 20120187872; 20120210111; 20120212375; 20120215821; 20120225411; 20120238860; 20120252678; 20120254586; 20120258861; 20120265718; 20120266174; 20120274494; 20120278057; 20120294424; 20120302446; 20120314490; 20120319684; 20120320668; 20120324563; 20120324564; 20120326130; 20120326720; 20120328301; 20130004180; 20130005580; 20130007087; 20130009677; 20130015885; 20130038330; 20130040818; 20130043945; 20130079230; 20130096825; 20130117200; 20130144925; 20130186953; 20130190185; 20130196855; 20130201316; 20130221960; 20130231249; 20130233077; 20130245402; 20130258595; 20130271142; 20130272453; 20130278265; 20130278283; 20130282636; 20130303379; 20130313526; 20130324832; 20140000630; 20140025606; 20140050475; 20140056385; 20140089374; 20140097405; 20140113828; 20140167811; 20140167836; 20140175380; 20140187427; 20140203838; 20140223224; 20140228222; 20140229705; 20140229722; 20140232400; 20140235450; 20140245249; 20140245314; 20140246763; 20140249033; 20140250288; 20140253111; 20140264285; 20140286465; 20140296076; 20140303931; 20140314419; 20140315723; 20140324933; 20140329687; 20140343397; 20140344322; 20140354326; 20140368234; 20150006443; 20150028970; 20150032991; 20150032993; 20150032994; 20150043273; 20150046681; 20150055961; 20150070131; 20150078290; 20150087945; 20150092465; 20150094207; 20150111754; 20150119252; 20150119253; 20150125155; 20150143817; 20150146805; 20150146806; 20150161524; 20150178432; 20150179913; 20150179914; 20150179915; 20150179916; 20150179918; 20150184286; 20150187840; 20150195248; 20150205759; 20150212166; 20150219730; 20150229343; 20150241481; 20150242758; 20150254571; 20150262073; 20150263736; 20150269124; 20150288476; 20150288542; 20150300719; 20150310350; 20150318095; 20150332164; 20150346291; 20150349780; 20150357550; 20150358022; 20150363708; 20150372217; 20150379418; 20160012346; 20160012347; 20160012882; 20160013791; 20160019468; 20160023906; 20160028402; 20160028403; 20160032904; 20160034609; 20160035404; 20160036612; 20160042294; 20160044647; 20160045841; 20160065693; 20160071021; 20160071903; 20160079968; 20160080189; 20160085616; 20160087599; 20160093420; 20160103192; 20160112031; 20160127073; 20160132785; 20160139213; 20160148112; 20160149111; 20160154068; 20160156357; 20160164505; 20160191060; 20160197628; 20160221825; 20160233405; 20160233860; 20160233965; 20160248582; 20160254434; 20160267032; 20160267964; 20160276570; 20160283857; 20160292586; 20160292587; 20160296145; 20160308502; 20160314407; 20160321559; 20160335558; 20160335559; 20160351306; 20160364653; 20160371227; 20160380636; 20170000375; 20170012862; 20170017742; 20170017894; 20170026095; 20170038123; 20170039481; 20170045592; 20170045800; 20170061317; 20170062107; 20170069367; 20170069415; 20170070290; 20170071082; 20170072504; 20170077381; 20170077382; 20170077665; 20170078400; 20170085231; 20170086281; 20170089961; 20170091647; 20170091649; 20170091650; 20170098682; 20170104491; 20170104493; 20170104695; 20170116159; 20170116542; 20170117901; 20170117994; 20170123171; 20170133336; 20170133576; 20170133577; 20170134091; 20170141286; 20170141287; 20170141769; 20170146618; 20170162778; 20170163301; 20170168123; 20170177534; 20170177751; 20170178017; 20170178018; 20170179973; 20170184689; 20170186934; 20170186935; 20170193388; 20170199036; 20170201224; 20170212860; 20170213143; 20170228483; 20170229167; 20170229631; 20170229632; 20170229633; 20170230050; 20170237144; 20170237594; 20170241953; 20170250796; 20170255629; 20170255871; 20170255872; 20170262765; 20170265158; 20170265287; 20170276827; 20170286859; 20170294965; 20170295048; 20170296169; 20170296177; 20170296178; 20170296179; 20170296180; 20170296183; 20170296184; 20170296185; 20170296189; 20170296213; 20170300454; 20170300808; 20170300827; 20170301444; 20170316487; 20170317262; 20170323195; 20170324019; 20170329883; 20170331899; 20170337155; 20170343750; 20170344898; 20170345990; 20170351974; 20170359072; 20170366270; 20170373044; 20170373369; 20180005809; 20180005887; 20180012932; 20180013052; 20180013426; 20180019737; 20180025775; 20180026633; 20180032893; 20180033944; 20180034425; 20180034912; 20180040935; 20180054201; 20180062765; 20180067182; 20180069288; 20180069631; 20180076777; 20180090661; 20180091115; 20180091141; 20180091142; 20180091143; 20180091440; 20180092313; 20180101784; 20180101785; 20180101786; 20180101787; 20180102166; 20180102469; 20180102470; 20180107092; 20180114568; 20180118573; 20180123544; 20180124181; 20180131376; 20180137428; 20180137429; 20180137430; 20180138987; 20180145631; 20180145664; 20180145753; 20180150579; 20180150760; 20180150761; 20180157775; 20180164385; 20180188107; 20180196780; 20180198427; 20180211158; 20180218279; 20180218280; 20180218281; 20180219150; 20180225586; 20180226974; 20180226975; 20180232652; 20180232653; 20180232654; 20180232655; 20180240033; 20180240034; 20180240035; 20180246848; 20180247974; 20180248103; 20180248104; 20180260245; 20180260729; 20180260730; 20180260731; 20180260732; 20180261752; 20180262243; 20180267116; 20180267933; 20180275057; 20180276550; 20180277733; 20180278693; 20180278694; 20180285761; 20180287041; 20180294401; 20180294815; 20180300286; 20180301612; 20180301613; 20180308007; 20180308896; 20180309452; 20180314968; 20180314970; 20180322408; 20180323364; 20180330264; 20180330266; 20180330267; 20180331274; 20180335683; 20180336153; 20180337138; 20180337324; 20180341874; 20180342663; 20180343304; 20180348310; 20180350411; 20180350749; 20180351521; 20180359718; 20180365587; 20180366634; 20180373996; 20180375790; 20180375940; 20190005403; 20190006572; 20190007051; 20190013065; 20190019098; 20190019099; 20190019938; 20190027672; 20190034819; 20190036515; 20190042264; 20190042962; 20190042963; 20190042964; 20190042967; 20190042968; 20190042970; 20190042971; 20190042972; 20190042973; 20190043822; 20190043919; 20190044044; 20190044046; 20190044047; 20190044051; 20190044668; 20190049495; 20190058105; 20190065981; 20190065982; 20190073439; 20190079145; 20190081629; 20190082997; 20190087385; 20190095811; 20190098090; 20190102691; 20190104614; 20190109273; 20190109904; 20190122133; 20190123743; 20190123744; 20190131511; 20190131683; 20190131944; 20190147359; 20190149139; 20190156237; 20190156238; 20190158098; 20190164077; 20190164959; 20190165239; 20190165240; 20190165242; 20190165245; 20190165246; 20190173708; 20190182995; 20190187075; 20190188596; 20190188597; 20190190463; 20190190474; 20190204372; 20190204753; 20190205784; 20190207075; 20190207076; 20190207794; 20190212147; 20190214561; 20190214789; 20190214971; 20190215952; 20190220771; 20190227439; 20190228331; 20190228332; 20190229094;

20190229690; 20190236476; 20190237648; 20190237649; 20190238137; 20190245538; 20190245544; 20190251466; 20190252754; 20190259931; 20190266508; 20190266510; 20190266512; 20190267154; 20190267532; 20190267692; 20190270635; 20190273196; 20190273197; 20190288174; 20190288176; 20190288178; 20190288367; 20190294025; 20190294991; 20190296212; 20190296214; 20190296743; 20190302194; 20190303242; 20190303788; 20190305037; 20190305038; 20190305206; 20190317167; 20190317978; 20190321039; 20190324846; 20190324941; 20190326501; 20190332965; 20190337894; 20190339339; 20190341540; 20190341668; 20190343002; 20190343003; 20190347576; 20190348597; 20190354890; 20190362260; 20190362780; 20190363239; 20190363688; 20190369171; 20190370679; 20190370680; 20190372192; 20190378874; 20190385088; 20190385673; 20190391214; 20190392344; 20190392878; 20190393401; 20200000468; 20200005178; 20200005186; 20200006421; 20200006619; 20200006620; 20200006621; 20200007235; 20200008800; 20200012961; 20200018803; 20200023462; 20200027502; 20200028480; 20200028512; 20200033511; 20200036330; 20200036331; 20200036332; 20200036333; 20200044137; 20200044632; 20200044656; 20200046348; 20200049776; 20200050026; 20200050958; 20200050959; 20200050961; 20200052101; 20200052183; 20200052359; 20200057957; 20200058702; 20200062583; 20200064412; 20200065696; 20200074345; 20200075093; 20200075832; 20200075833; 20200075834; 20200078015; 20200081075; 20200081076; 20200082291; 20200083424; 20200090738; 20200091396; 20200091397; 20200091867; 20200099116; 20200104740; 20200106149; 20200106444; 20200106445; 20200111016; 20200111944; 20200112310; 20200115372; 20200116623; 20200118025; 20200118026; 20200119251; 20200119254; 20200119737; 20200120812; 20200125625; 20200127186; 20200127678; 20200134502; 20200134503; 20200136008; 20200136223; 20200136626; 20200138434; 20200138437; 20200142225; 20200144476; 20200144690; 20200145065; 20200152696; 20200152851; 20200152853; 20200152854; 20200156955; 20200160204; 20200161446; 20200161531; 20200162047; 20200162078; 20200166586; 20200167683; 20200167684; 20200167685; 20200169396; 20200176409; 20200176662; 20200183768; 20200184364; 20200186132; 20200193320; 20200204181; 20200206344; 20200210879; 20200215131; 20200219001; 20200220064; 20200220757; 20200226487; 20200227617; 20200234171; 20200234173; 20200235277; 20200242452; 20200242500; 20200242501; 20200242503; 20200243132; 20200243133; 20200244253; 20200250564; 20200250567; 20200250569; 20200250570; 20200251419; 20200257644; 20200258003; 20200259066; 20200259483; 20200264130; 20200264213; 20200265334; 20200266234; 20200272910; 20200272925; 20200272929; 20200274049; 20200274050; 20200274526; 20200274703; 20200274929; 20200278308; 20200278903; 20200279013; 20200279184; 20200279186; 20200279990; 20200280316; 20200280317; 20200280607; 20200284855; 20200284859; 20200285539; 20200287118; 20200287122; 20200287525; 20200287540; 20200287550; 20200287631; 20200293486; 20200293937; 20200293938; 20200294401; 20200294557; 20200299146; 20200301244; 20200301874; 20200311591; 20200320420; 20200320423; 20200320424; 20200320426; 20200321506; 20200321508; 20200327440; 20200327441; 20200328339; 20200333263; 20200334101; 20200334104; 20200334107; 20200335683; 20200342296; 20200342345; 20200344051; 20200349326; 20200349458; 20200349459; 20200350083; 20200350880; 20200352918; 20200356889; 20200356890; 20200358187; 20200359501; 20200362384; 20200363206; 20200364600; 20200364602; 20200365397; 20200371974; 20200372094; 20200373351; 20200373475; 20200379768; 20200380396; 20200381608; 20200381609; 20200393738; 20200394524; 20200394537; 20200394546; 20200394547; 20200395405; 20200395448; 20200401649; 20200401922; 20200401927; 20200403137; 20200403289; 20200410343; 20200410382; 20200411937; 20200411938; 20200412369; 20210004708; 20210005249; 20210013391; 20210013570; 20210018575; 20210019223; 20210019646; 20210019647; 20210021245; 20210026162; 20210027188; 20210028138; 20210028343; 20210028345; 20210028346; 20210033683; 20210034998; 20210035004; 20210035005; 20210036206; 20210036692; 20210043824; 20210047913; 20210056454; 20210056455; 20210057135; 20210057484; 20210057631; 20210064350; 20210065036; 20210066570; 20210067146; 20210068320; 20210072139; 20210073667; 20210073668; 20210075860; 20210075861; 20210081816; 20210083167; 20210083168; 20210083676; 20210085316; 20210085317; 20210085675; 20210089954; 20210091062; 20210091755; 20210099129; 20210099201; 20210103012; 20210103018; 20210104656; 20210110290; 20210110291; 20210110868; 20210111469; 20210114864; 20210116499; 20210117512; 20210117845; 20210119101; 20210125096; 20210132969; 20210133614; 20210133617; 20210133618; 20210139315; 20210142203; 20210142205; 20210142215; 20210143804; 20210143805; 20210151844; 20210157877; 20210159384; 20210167272; 20210175095; 20210182724; 20210182725; 20210182728; 20210184329; 20210190885; 20210193270; 20210202573; 20210208509; 20210218367; 20210226113; 20210226597; 20210226635; 20210230674; 20210232960; 20210232963; 20210233617; 20210233896; 20210234086; 20210234087; 20210247329; 20210255856; 20210256351; 20210256409; 20210257177; 20210257969; 20210257995; 20210263390; 20210264309; 20210265964; 20210271545; 20210272002; 20210279134; 20210279624; 20210279625; 20210280701; 20210280704; 20210280766; 20210281252; 20210288611; 20210294680; 20210296558; 20210296749; 20210302513; 20210304052; 20210304053; 20210304054; 20210305958; 20210313973; 20210325368; 20210326737; 20210326739; 20210326740; 20210334081; 20210336032; 20210336121; 20210336319; 20210341411; 20210341979; 20210342161; 20210342726; 20210342727; 20210342729; 20210343923; 20210350266; 20210350268; 20210351075; 20210357798; 20210359666; 20210359670; 20210365622; 20210367065; 20210374550; 20210374595; 20210384401; 20210384402; 20210384406; 20210384896; 20210390440; 20210390442; 20210391851; 20210391852; 20210399044; 20210399199; 20210399763; 20210406746; 20210408112; 20210408355; 20220003676; 20220004079; 20220011384; 20220012622; 20220014408; 20220019927; 20220019929; 20220020912; 20220021391; 20220028927; 20220029083; 20220036943; 20220045416; 20220045425; 20220051123; 20220052662; 20220057261; 20220058508; 20220059919; 20220065954; 20220076154; 20220083488; 20220083891; 20220083892; 20220083893; 20220084085; 20220085527; 20220087012; 20220087022; 20220092461; 20220092462; 20220094320; 20220094338; 20220094341; 20220094342; 20220101171; 20220103172; 20220115577; 20220116208; 20220121978; 20220121979; 20220123449; 20220129779; 20220131064; 20220135409; 20220136895; 20220137390; 20220138609; 20220138611; 20220140223; 20220140820; 20220140927; 20220146905; 20220147358; 20220147859; 20220149841; 20220156444; 20220156621; 20220164501; 20220164694; 202102580109; and 202103904449.

See Patent and Publication Nos.: AU-2002248800; AU-2003250608; AU-2004266178; AU-2005242881; AU-2007209712; AU-2008200506; AU-2012236227; AU-2012271422; AU-2012279307; AU-2014354845;

AU-2015267491; AU-2015275326; AU-2015283229; AU-2015347258; AU-2015361113; AU-2015417667; AU-2015417766; AU-2016215234; AU-2016215236; AU-2016287262; AU-2016335554; AU-2016351374; AU-2016357098; AU-2016423167; AU-2016423191; AU-2016432064; AU-2016432315; AU-2017215201; AU-2017219169; AU-2017280880; AU-2017345039; AU-2017360505; AU-2017386234; AU-2017387796; AU-2017404530; AU-2017404536; AU-2017429630; AU-2017429631; AU-2017430443; AU-2017431392; AU-2017431764; AU-2017432161; AU-2017432809; AU-2017434905; AU-2017442682; AU-2017442703; AU-2017443043; AU-2017443044; AU-2018230440; AU-2018230642; AU-2018247327; AU-2018278348; AU-2018282100; AU-2018362084; AU-2018406532; AU-2018415721; AU-2018434686; AU-2019203536; AU-2019206299; AU-2019206300; AU-2019209295; AU-2019210496; AU-2019283688; AU-2019289070; AU-2019321613; AU-2019333268; AU-2019365240; AU-2019389858; AU-2019420732; AU-2019426405; AU-2019430032; AU-2019446426; AU-2020202779; AU-2020217399; AU-2020235374; AU-2020250769; AU-2020255132; AU-2020256387; AU-2020259653; AU-2020274007; AU-2020292425; AU-2020294362; AU-2020297857; AU-2020324398; AU-2020340968; AU-2020349591; AU-2020354489; AU-2020376131; AU-2021201028; AU-2021201029; AU-2021201519; AU-2021201695; AU-2021202981; AU-2021203130; AU-2021204723; AU-2021225173; AU-2021232777; AU-2021257928; AU-763277; CA-2225803-C; CA-2381109; CA-2396201; CA-2444659; CA-2448682; CA-2482792; CA-2493592; CA-2530942-C; CA-2637071; CA-2662604; CA-2662604-C; CA-2667640; CA-2667640-C; CA-2681147; CA-2751897; CA-2763134; CA-2765898; CA-2814865; CA-2836156; CA-2837896; CA-2849589; CA-2860516; CA-2868986; CA-2898598; CA-2898608; CA-2927326; CA-2931398; CA-2950133; CA-2953185; CA-2960483; CA-2968827; CA-2968830; CA-2974106; CA-2977662; CA-2977780; CA-2981493; CA-2987426; CA-2988829; CA-2996620; CA-2998363; CA-3003272; CA-3004750; CA-3008796; CA-3008825; CA-3009887; CA-3010686; CA-3012700; CA-3012853; CA-3026499; CA-3032557; CA-3034528; CA-3036054; CA-3036059; CA-3036478; CA-3036489; CA-3036501; CA-3036945; CA-3040583; CA-3043201; CA-3046173; CA-3046616; CA-3047541; CA-3049097; CA-3054796; CA-3056595; CA-3056596; CA-3058725; CA-3058731; CA-3065337; CA-3065859; CA-3074067; CA-3074121; CA-3074722; CA-3075163; CA-3075253; CA-3076182; CA-3076743; CA-3078581; CA-3080318; CA-3085717; CA-3085827; CA-3085866; CA-3085954; CA-3085955; CA-3086919; CA-3087071; CA-3087257; CA-3087539; CA-3088133; CA-3088135; CA-3088650; CA-3089263; CA-3090429; CA-3093134; CA-3093358; CA-3096026; CA-3096490; CA-3096897; CA-3101170; CA-3102199; CA-3102773; CA-3102866; CA-3103471; CA-3104518; CA-3109380; CA-3109599; CA-3109604; CA-3109643; CA-3112351; CA-3112444; CA-3112594; CA-3112596; CA-3114773; CA-3117223; CA-3125749; CA-3125824; CA-3125917; CA-3125986; CA-3127307; CA-3132092; CA-3132152; CA-3133917; CA-3135530; CA-3135532; CA-3137517; CA-3137657; CA-3139157; CA-3140970; CA-3141547; CA-3142865; CA-3143227; CA-3143363; CA-3143581; CA-3143661; CA-3143691; CA-3147698; CA-3147706; CA-3149305; CA-3150036; CA-3150374; CA-3151055; CA-3151510; CA-3154738; CN-100382014; CN-100409222; CN-100412848; CN-100419638; CN-100432956; CN-100451996; CN-100504790; CN-100524270; CN-100549984; CN-100555174; CN-100572590; CN-101040268; CN-101057223; CN-101080701; CN-101084505; CN-101091147; CN-101099140; CN-101099141; CN-101203939; CN-101326500; CN-101375302; CN-101401128; CN-101615233; CN-101626233; CN-101626234; CN-101657827; CN-101705469; CN-101838844; CN-102334206; CN-102449481; CN-102460196; CN-102687169; CN-102687476; CN-102959750; CN-103069421; CN-103451265; CN-103582949; CN-103781918; CN-104081464; CN-104576914; CN-104838590; CN-105190656; CN-105264680; CN-105814074; CN-105814856; CN-105914219; CN-105980615; CN-105984840; CN-106267902; CN-106461287; CN-106575667; CN-106662707; CN-106664194; CN-106767944; CN-106953000; CN-107004755; CN-107075559; CN-107251435; CN-107302512; CN-107393941; CN-107580752; CN-107636699; CN-107704649; CN-107924490; CN-107925146; CN-107980145; CN-107994307; CN-108028293; CN-108108151; CN-108259014; CN-108290733; CN-108342385; CN-108349725; CN-108352841; CN-108475353; CN-108778345; CN-108780119; CN-108780129; CN-108796058; CN-109075186; CN-109238775; CN-109285760; CN-109313725; CN-109314174; CN-109376870; CN-109389223; CN-109450555; CN-109477061; CN-109508303; CN-109626323; CN-109643710; CN-109643730; CN-109685216; CN-109715802; CN-109716650; CN-109764960; CN-109783054; CN-109791944; CN-109792840; CN-109804477; CN-109841645; CN-109844637; CN-109844642; CN-109845107; CN-109863249; CN-109874327; CN-109889318; CN-109891252; CN-109891591; CN-109997156; CN-110024146; CN-110024282; CN-110024292; CN-110034228; CN-110050383; CN-110069238; CN-110073375; CN-1101083-C; CN-110176532; CN-110235150; CN-110249343; CN-110257430; CN-110289256; CN-110289312; CN-110311662; CN-110383303; CN-110383485; CN-110402446; CN-110431568; CN-110462836; CN-110472740; CN-110494998; CN-110520873; CN-110622297; CN-110646503; CN-110692067; CN-110709934; CN-110739010; CN-110741391; CN-110945536; CN-110998853; CN-111033773; CN-111049503; CN-111095306; CN-111095307; CN-111095584; CN-111108687; CN-111133459; CN-111149439; CN-111164618; CN-111180848; CN-111183434; CN-111213280; CN-111213281; CN-111247741; CN-111260066; CN-111260068; CN-111328432; CN-111344875; CN-111344896; CN-111417966; CN-111417967; CN-111427810; CN-111460749; CN-111465947; CN-111465948; CN-111480170; CN-111523672; CN-111542842; CN-111542935; CN-111598248; CN-111613716; CN-111630531; CN-111656374; CN-111712842; CN-111723936; CN-111725382; CN-111727248; CN-111755587; CN-111788588; CN-111868755; CN-111868756; CN-111868757; CN-111902358; CN-111903057; CN-111914500; CN-111914507; CN-111950215; CN-111950216; CN-111967603; CN-111969100; CN-112114875; CN-112116094; CN-112149832; CN-112236785; CN-112262398; CN-112313677; CN-112313796; CN-112331693; CN-112368721; CN-112368940; CN-112385140; CN-112397862; CN-112400178; CN-112444715;

CN-112449704; CN-112514158; CN-112514246; CN-112534448; CN-112567397; CN-112585627; CN-112602205; CN-112633506; CN-112640200; CN-112654970; CN-112673486; CN-112771553; CN-112771717; CN-112789629; CN-112819170; CN-112823361; CN-112861463; CN-112868135; CN-112930491; CN-112949229; CN-112956129; CN-112990468; CN-112990470; CN-113037294; CN-113056752; CN-113065301; CN-113095033; CN-113128165; CN-113128172; CN-113168579; CN-113168581; CN-113193311; CN-113206364; CN-113215326; CN-113255921; CN-113257552; CN-113261156; CN-113302631; CN-113328759; CN-113330465; CN-113361718; CN-113421600; CN-113424205; CN-113424441; CN-113449870; CN-113452326; CN-113454656; CN-113490731; CN-113516248; CN-113557666; CN-113627614; CN-113646779; CN-113646781; CN-113661502; CN-113725208; CN-113725349; CN-113826124; CN-113839644; CN-113853619; CN-113890513; CN-113906449; CN-113934680; CN-113939833; CN-113987993; CN-114021519; CN-114077897; CN-114122249; CN-114127900; CN-114175058; CN-114175059; CN-114186516; CN-114200282; CN-114207630; CN-114221629; CN-114223003; CN-114239838; CN-114254754; CN-114296685; CN-114297976; CN-114335318; CN-114373635; CN-114386610; CN-114399054; CN-114429215; CN-114444703; CN-114450697; CN-114450698; CN-114497113; CN-114503019; CN-114503027; CN-114503431; CN-114514192; CN-114528806; CN-1189934; CN-1279469-C; CN-1279470-C; CN-1291327-C; CN-1292366-C; CN-1300723-C; CN-1494690; CN-1496511; CN-1496516; CN-1496517; CN-1496518; CN-1601468; CN-1601511; CN-1601512; CN-1806231; CN-1808400; CN-1811745; CN-1815438; CN-1834852; CN-1839093; CN-1890400; CN-1906576; CN-1906586; CN-1906587; CN-1910554; CN-1914600; CN-1938687; CN-1942858; CN-1989769; CN-201479114; CN-201667647; CN-207399151; CN-209930215; CN-209930216; CN-210327515; CN-211404707; CN-213069884; CN-213426111; CN-214378496; CN-215008192; CN-215186652; CN-215729853; CN-215895506; CN-216083004; CN-216083732; CN-216086610; CN-216134457; CN-216285581; CN-216286750; CN-216286751; DE-102004005243; DE-102008036993; DE-102009025716; DE-102010026098; DE-1020100260989; DE-102010053575; DE-102016204201; DE-102017129364; DE-102017129365; DE-102019101054; DE-102019104312; DE-102019112893; DE-102020007977; DE-102020122245; DE-102020125169; DE-102020125171; DE-102020125172; DE-102020125173; DE-102020125174; DE-102020125175; DE-102020125176; DE-102020125177; DE-102020125178; DE-102020125179; DE-102020125180; DE-102020125181; DE-102020125182; DE-102020125183; DE-102020125185; DE-102020125186; DE-102020125187; DE-102020125188; DE-102020125189; DE-102020125190; DE-102020125191; DE-102020201688; DE-102021005497; DE-102021121877; DE-10218695; DE-112012001735; DE-112012003764; DE-112012005798; DE-112014000501; DE-112016001769;

DE-112016003215; DE-112016004439; DE-112016005278; DE-112017003036; DE-112017003044; DE-112017003719; DE-112017004725; DE-112017004860; DE-112017007187; DE-112017007873; DE-112017007921; DE-112020002985; DE-19634808; DE-19649500; DE-19705239; DE-19741483; DE-19927661; DE-19954265; DE-19964555; DE-202017105268; DE-202020005427; DE-4441766; DE-602005005035; DE-60212967; EP-0835555; EP-0922333; EP-0985939; EP-1001473; EP-1030380; EP-1069687; EP-1245002; EP-1324549; EP-1370948; EP-1370961; EP-1370968; EP-1370969; EP-1370971; EP-1395947; EP-1468303; EP-1518208; EP-1561277; EP-1620800; EP-1623317; EP-1639463; EP-1658564; EP-1660403; EP-1669911; EP-1677193; EP-1690218; EP-1696318; EP-1697558; EP-1702264; EP-1716486; EP-1725935; EP-1730635; EP-1733296; EP-1769347; EP-1779668; EP-1800214; EP-1803062; EP-1805575; EP-1805626; EP-1805627; EP-1834245; EP-1836635; EP-1839165; EP-1842227; EP-1846820; EP-1846829; EP-1846895; EP-1851637; EP-1854016; EP-1861790; EP-1884791; EP-1974315; EP-1975590; EP-19755909; EP-2021929; EP-2097936; EP-2143044; EP-2149196; EP-2263332; EP-2296090; EP-2304654; EP-2309562; EP-2397004; EP-2401776; EP-2425609; EP-2443469; EP-2446069; EP-2457354; EP-2476119; EP-2504777; EP-2519870; EP-2585987; EP-2591514; EP-2609541; EP-2638448; EP-2659365; EP-2691996; EP-2707832; EP-2707903; EP-2710471; EP-2730029; EP-2774077; EP-2797038; EP-2803211; EP-2904540; EP-2919172; EP-29191729; EP-2945160; EP-2946413; EP-2946414; EP-3039174; EP-3058618; EP-3075123; EP-3098865; EP-3111379; EP-3111380; EP-3111381; EP-3113084; EP-3114618; EP-3127266; EP-3130031; EP-3132209; EP-3164889; EP-3170259; EP-3195377; EP-3217336; EP-3224640; EP-3231092; EP-3248210; EP-3250792; EP-3254241; EP-3254375; EP-3262573; EP-3262762; EP-3266063; EP-3284115; EP-3296932; EP-3300004; EP-3304363; EP-3332363; EP-3344576; EP-3360253; EP-3378162; EP-3380995; EP-3380996; EP-3383793; EP-3391415; EP-3394905; EP-3398213; EP-3411080; EP-3414583; EP-3422412; EP-3427310; EP-3475217; EP-3475760; EP-3476048; EP-3488474; EP-3491586; EP-3497726; EP-3513249; EP-3513434; EP-3513443; EP-3513631; EP-3514723; EP-3516407; EP-3516596; EP-3520039; EP-3539061; EP-3542320; EP-3542321; EP-3542463; EP-3545563; EP-3563308; EP-3563309; EP-3563310; EP-3568128; EP-3574455; EP-3576025; EP-3576142; EP-3577700; EP-3580701; EP-3580702; EP-3583626; EP-3589581; EP-3593296; EP-3593297; EP-3593298; EP-3596669; EP-3610519; EP-3613141; EP-3619655; EP-3634442; EP-3635726; EP-3639295; EP-3642959; EP-3660179; EP-3662515; EP-3673487; EP-3676882; EP-3682381; EP-3682382; EP-3685321; EP-3685322; EP-3685323; EP-3685451; EP-3689113; EP-3692476; EP-3703141; EP-3704794; EP-3707649; EP-3711004; EP-3718059; EP-3718166; EP-3718207; EP-3718208; EP-3724827; EP-3724828; EP-3724829; EP-3724933; EP-3735392; EP-3735710; EP-3735711; EP-3735712; EP-3738206; EP-3738209; EP-3738210; EP-3740910; EP-3744001; EP-3745481; EP-3746953; EP-3746954; EP-3759659; EP-3769271; EP-3769347; EP-3776390; EP-3782089; EP-3785185; EP-3785186; EP-3788562; EP-3788563; EP-3788565; EP-3788657; EP-3789932; EP-3791334; EP-3795950; EP-3803719; EP-3805423; EP-3807825; EP-3807972; EP-3814905;

EP-3815006; EP-3818173; EP-3822871; EP-3824415; EP-3827381; EP-3828782; EP-3830625; EP-3830867; EP-3830953; EP-3835916; EP-3836038; EP-3837646; EP-3837647; EP-3844684; EP-3844687; EP-3844688; EP-3847701; EP-3850478; EP-3852021; EP-3853943; EP-3857619; EP-3861488; EP-3861489; EP-3861588; EP-3864110; EP-3864403; EP-3864586; EP-3867829; EP-3867972; EP-3869420; EP-3871162; EP-3886003; EP-3886321; EP-3888018; EP-3888019; EP-3888020; EP-3895078; EP-3899814; EP-3903375; EP-3903415; EP-3907669; EP-3908988; EP-3908989; EP-3910415; EP-3912107; EP-3912200; EP-3918538; EP-3928260; EP-3931765; EP-3935583; EP-3939160; EP-3939165; EP-3942362; EP-3948697; EP-3948698; EP-3948953; EP-3956770; EP-3956824; EP-3959666; EP-3963518; EP-3966751; EP-3970084; EP-3970272; EP-3971793; EP-3983958; EP-3983961; EP-3983962; EP-3983963; EP-3983964; EP-3987462; EP-3989130; EP-3991104; EP-3992868; ES-2346045; ES-2849257; ES-2850151; FI-128904; FI-129128; FI-129520; FI-20195045; FI-20205115; FR-2855921; FR-2862151; FR-3021163; FR-3090891; GB-2482008; GB-2524039; GB-2553848; GB-2592935; GB-2598059; IL-245788; IL-260859; IL-283799; IL-2837990; IL-286336; IL-2863360; IL-286366; IL-2863660; IL-286404; IL-2864040; IL-286612; IL-2866120; IL-288973; IL-2889730; IN-2006KN00539; IN-2006KN01207; IN-2008CN03914; IN-2011DN10030; IN-201847025509; IN-201847025527; IN-201947035669; IN-202047029322; IN-242559; JP-2000150973; JP-2000244308; JP-2000260187; JP-2001060862; JP-2001068995; JP-2001119300; JP-2001504647; JP-2002135111; JP-2002237749; JP-2002342165; JP-2002344307; JP-2002351850; JP-2002358289; JP-2002366533; JP-2002366534; JP-2003069418; JP-2003271570; JP-2003281107; JP-2003303134; JP-2003519927; JP-2004015151; JP-2004032481; JP-2004046861; JP-2004071630; JP-2004072141; JP-2004072305; JP-2004078979; JP-2004252990; JP-2004533061; JP-2005079749; JP-2005093511; JP-2005100405; JP-2005166056; JP-2005235228; JP-2005235229; JP-2005259812; JP-2005260364; JP-2005267635; JP-2005285123; JP-2005285124; JP-2005322232; JP-2005322240; JP-2005332402; JP-2005339557; JP-2005346327; JP-2005513600; JP-2005527902; JP-2006040451; JP-2006065864; JP-2006092541; JP-2006092542; JP-2006099774; JP-2006107513; JP-2006107514; JP-2006120147; JP-2006139785; JP-2006146921; JP-2006165812; JP-2006172468; JP-2006172474; JP-2006178987; JP-2006190299; JP-2006190301; JP-2006196004; JP-2006202287; JP-2006216058; JP-2006216060; JP-2006221638; JP-2006221639; JP-2006221642; JP-2006221643; JP-2006221644; JP-2006221645; JP-2006260555; JP-2006260556; JP-2006268928; JP-2006286002; JP-2006318470; JP-2006318477; JP-2006323824; JP-2006323829; JP-2006506010; JP-2006512270; JP-2007042074; JP-2007049009; JP-20070490095; JP-2007053247; JP-2007104332; JP-2007214885; JP-2007250771; JP-2007287933; JP-2007516610; JP-2007521397; JP-2007534144; JP-2008047678; JP-2008077640; JP-2008108927; JP-2008182157; JP-2008526682; JP-2009003946; JP-2009016767; JP-2009049631; JP-2009182745; JP-2009194646; JP-2009217845; JP-2009225213; JP-2009302219; JP-2009503624; JP-2009508179; JP-2009524857; JP-2010092499; JP-2010109697; JP-2010199343; JP-2010213210; JP-2010271087; JP-2010511293; JP-2010525431; JP-2011082515; JP-2011197875; JP-2011523747; JP-2012015878; JP-2012026738; JP-2012064622; JP-2012519379; JP-2012530674; JP-2012530895; JP-2012531876; JP-2013058705; JP-2013058997; JP-2013058998; JP-2013535805; JP-2014166956; JP-2014215985; JP-2014216596; JP-2014241073; JP-2014504057; JP-2014523705; JP-2014525161; JP-2015015590; JP-2015035129; JP-2015155377; JP-2015167176; JP-2015508253; JP-2015511067; JP-2016042521; JP-2016045001; JP-2016058441; JP-2016151561; JP-2016509800; JP-2016510497; JP-2016511534; JP-2016518637; JP-2016539607; JP-2016541146; JP-2017073106; JP-2017175155; JP-2017511463; JP-2017517918; JP-2017518629; JP-2017529695; JP-2017532841; JP-2017533572; JP-2018129535; JP-2018136316; JP-2018503249; JP-2018511848; JP-2018512729; JP-2018514094; JP-2018514104; JP-2018516456; JP-2018524667; JP-2018529142; JP-2018532177; JP-2018533253; JP-2018536324; JP-2018538681; JP-2019003975; JP-2019036625; JP-20190366255; JP-2019041088; JP-2019041121; JP-2019047126; JP-2019050399; JP-2019145800; JP-2019186418; JP-2019501581; JP-2019504511; JP-2019504527; JP-2019505989; JP-2019508819; JP-2019508876; JP-2019511562; JP-2019512112; JP-2019513249; JP-2019525452; JP-2019530051; JP-2019530336; JP-2019532505; JP-2019532506; JP-2019532507; JP-2019532520; JP-2019534551; JP-2019534555; JP-2019537241; JP-2019537882; JP-2020010337; JP-2020038976; JP-2020047999; JP-2020065261; JP-2020074351; JP-2020127032; JP-2020501216; JP-2020502551; JP-2020503690; JP-2020503694; JP-2020503706; JP-2020504466; JP-2020509608; JP-2020510309; JP-2020511794; JP-2020513610; JP-2020519005; JP-2020520084; JP-2020522120; JP-2020522128; JP-2020522805; JP-2020522892; JP-2020532099; JP-2020532865; JP-2020532866; JP-2020533705; JP-2020533804; JP-2020534607; JP-2020535461; JP-2020535690; JP-2020535747; JP-2020536376; JP-2020536397; JP-2021087004; JP-2021090075; JP-2021103093; JP-2021118342; JP-2021121946; JP-2021141318; JP-2021141319; JP-2021157798; JP-2021175178; JP-2021500737; JP-2021500781; JP-2021500783; JP-2021501499; JP-2021504956; JP-2021504964; JP-2021506045; JP-2021509244; JP-2021509748; JP-2021509771; JP-2021509982; JP-2021511657; JP-2021511659; JP-2021512395; JP-2021512396; JP-2021515395; JP-2021516389; JP-2021518655; JP-2021519459; JP-2021521550; JP-2021524198; JP-2021530040; JP-2021530042; JP-2021531544; JP-2021531578; JP-2021532396; JP-2021532514; JP-2021532629; JP-2021533345; JP-2021535592; JP-2021535593; JP-2021536666; JP-2022003576; JP-2022010223; JP-2022069496; JP-2022069525; JP-2022500776; JP-2022501802; JP-2022501885; JP-2022502836; JP-2022509003; JP-2022509907; JP-2022511331; JP-2022511376; JP-2022512281; JP-2022513533; JP-2022517773; JP-2022518863; JP-2022520689; JP-2022522757; JP-2022525909; JP-2022525910; JP-2679610; JP-2688011; JP-2768276; JP-2931787; JP-2962251; JP-3107034; JP-3325545; JP-3411273; JP-3454808; JP-3483877; JP-3488663; JP-3515985; JP-3519303; JP-3647795; JP-3648551; JP-3696563; JP-3705252; JP-3802042; JP-3821405; JP-3936889; JP-3983250; JP-4015159;

JP-4023546; JP-4024271; JP-4044807; JP-4053547; JP-4113077; JP-4116978; JP-4134182; JP-4176787; JP-4183712; JP-4219369; JP-4243318; JP-4246204; JP-4255457; JP-4286826; JP-4316574; JP-4322259; JP-4334521; JP-4334901; JP-4339307; JP-4346612; JP-4364202; JP-4386373; JP-4386883; JP-4408079; JP-4421561; JP-4451397; JP-4455822; JP-4489399; JP-4507791; JP-4524126; JP-4524784; JP-4526412; JP-4527029; JP-4578366; JP-4583327; JP-4597553; JP-4609733; JP-4645973; JP-4681755; JP-4712328; JP-4733085; JP-4756718; JP-4768386; JP-4769938; JP-4777718; JP-4792328; JP-4805341; JP-4836028; JP-4855255; JP-4913501; JP-4925012; JP-4955961; JP-5020181; JP-5048350; JP-5062659; JP-5078979; JP-5092596; JP-5093515; JP-5167504; JP-5414031; JP-5432073; JP-5497596; JP-5513188; JP-5520939; JP-5567669; JP-5579563; JP-5638770; JP-5669832; JP-5674603; JP-5750194; JP-5766350; JP-5877428; JP-5956392; JP-5976641; JP-6028307; JP-6029070; JP-6030591; JP-6042777; JP-6066314; JP-6087716; JP-6230123; JP-6247177; JP-6326379; JP-6347489; JP-6360499; JP-6379298; JP-6395736; JP-6396726; JP-6397509; JP-6415737; JP-6437607; JP-6461009; JP-6498752; JP-6530326; JP-6534741; JP-6553287; JP-6556952; JP-6590446; JP-6609066; JP-6617197; JP-6656273; JP-6678102; JP-6684366; JP-6704086; JP-6706391; JP-6734873; JP-6742028; JP-6742433; JP-6744379; JP-6749382; JP-6771009; JP-6771660; JP-6776187; JP-6779278; JP-6785219; JP-6788734; JP-6789385; JP-6790245; JP-6802266; JP-6802383; JP-6810280; JP-6831452; JP-6840237; JP-6840818; JP-6845238; JP-6849858; JP-6852187; JP-6853141; JP-6861245; JP-6864812; JP-6877050; JP-6882533; JP-6884273; JP-6894378; JP-6912559; JP-6931071; JP-6936313; JP-6941166; JP-6941230; JP-6947408; JP-6964079; JP-6974470; JP-6974473; JP-6977176; JP-6986627; JP-6998459; JP-7005748; JP-7005786; JP-7033658; JP-7035169; JP-7039689; JP-7047230; JP-7050153; JP-70501536; JP-7052042; JP-7058014; JP-7064057; JP-7064599; JP-H07235699; JP-H08172352; JP-H08340136; JP-H09198876; JP-H09219542; JP-H09237923; JP-H09246608; JP-H10269783; JP-H11261384; JP-H11311663; JP-H11312971; JP-H1140866; JP-H11508747; JP-WO2006011451; JP-WO2007077984; JP-WO20070779846; JP-WO2008029815; JP-WO2020179554; JP-WO2020213596; KR-100282356; KR-100388497; KR-100724098; KR-100777600; KR-100829287; KR-100832192; KR-100840113; KR-100841864; KR-100847982; KR-100866739; KR-100875030; KR-100878424; KR-100881539; KR-100881810; KR-100890134; KR-100891063; KR-100933389; KR-100938942; KR-100959748; KR-101052209; KR-101189972; KR-101309677; KR-101747455; KR-101822326; KR-101899842; KR-101901166; KR-101929207; KR-101936533; KR-102031584; KR-102035149; KR-102063563; KR-102088675; KR-102098081; KR-102109070; KR-102116277; KR-102158678; KR-102173099; KR-102174976; KR-102193846; KR-102196240; KR-102208348; KR-102211013; KR-102217205; KR-102241971; KR-102247626; KR-102250154; KR-102250155; KR-102252438; KR-102279157; KR-102283357; KR-102318773; KR-102319393; KR-102389777; KR-102390936; KR-102400989; KR-19990028555; KR-19990065792; KR-20020092038; KR-20030081532; KR-20030085037; KR-20030085038; KR-20030086319; KR-20030086320; KR-20060063977; KR-20060096109; KR-20060121266; KR-20060127120; KR-20060127859; KR-20060132852; KR-20070007775; KR-20070052311; KR-20070073825; KR-20070085411; KR-20070089998; KR-20070098900; KR-20070100336; KR-20080106911; KR-20080108588; KR-20100056622; KR-20110002020; KR-20110040705; KR-20110046390; KR-20130045831; KR-20140140474; KR-20160072187; KR-20160089410; KR-20160140913; KR-20160147988; KR-20170013224; KR-20170048470; KR-20170085533; KR-20170089880; KR-20170103866; KR-20170106364; KR-20170127476; KR-20170134399; KR-20180004132; KR-20180022925; KR-20180043802; KR-20180069026; KR-20180090857; KR-20180102581; KR-20180112833; KR-20180122596; KR-20190015330; KR-20190035819; KR-20190042720; KR-20190043170; KR-20190045362; KR-20190047022; KR-20190052109; KR-20190077518; KR-20190094418; KR-20190100344; KR-20190113923; KR-20190116452; KR-20190123313; KR-20200016336; KR-20200038546; KR-20200040839; KR-20200040862; KR-20200051769; KR-20200052367; KR-20200065032; KR-20200097787; KR-20200103786; KR-20200104374; KR-20200105510; KR-20200105517; KR-20200106535; KR-20200127052; KR-20210011433; KR-20210024638; KR-20210054034; KR-20210055806; KR-20210095784; KR-20210106452; KR-20210113669; KR-20210118459; KR-20210120869; KR-20210123400; KR-20210125035; KR-20210129186; KR-20210130209; KR-20210134031; KR-20210134688; KR-20210136986; KR-20210138678; KR-20220002366; KR-20220031998; KR-20220041156; KR-20220042440; KR-20220043190; KR-20220044944; KR-20220047753; NL-2016442; NL-2018253; NL-2024742; Publication Number; RU-177295; RU-2599904; RU-2612847; RU-2682559; RU-2716028; RU-2742504; SE-512591; TW-200525428; TW-200532471; TW-200540705; TW-201731071; TW-201814902; TW-201930633; TW-202007091; TW-202011286; TW-202107744; TW-202107837; TW-202115625; TW-202121267; TW-202123097; TW-202205159; TW-202215309; TW-461105; TW-574653; TW-594492; TW-1227401; TW-1274283; TW-1291656; TW-1292880; TW-I293157; TW-1306552; TW-1314285; TW-1314286; TW-1321414; TW-1326426; TW-1338844; TW-1345155; TW-1352905; TW-1361981; TW-1713194; UA-104982; WO-1997002661; WO-1998008307; WO-19980083079; WO-1999017449; WO-2001010027; WO-2001039283; WO-2001050534; WO-2002063430; WO-2002069498; WO-2002077826; WO-2002077838; WO-2002077845; WO-2002077846; WO-2002077848; WO-2002084337; WO-2002086813; WO-2002097725; WO-2003019685; WO-2003025725; WO-2003052438; WO-2003052687; WO-2003082482; WO-2003090162; WO-2004013808; WO-2004013965; WO-2004019270; WO-2004045063; WO-2004086295; WO-2004102470; WO-2004109924; WO-2005010953; WO-2005019095; WO-2005048183; WO-2005055057; WO-2005069392; WO-2005081104; WO-2005081105; WO-2005088443; WO-2005089092; WO-2005093564; WO-2005093649; WO-2005096150; WO-2005106647; WO-2005106662; WO-2005111799; WO-2005116839; WO-2006011451; WO-2006019188; WO-2006033419; WO-2006033423; WO-2006035989; WO-2006038714; WO-2006038717; WO-2006041218; WO-2006043300; WO-2006052017; WO-2006064961; WO-2006064962; WO-2006073204; WO-2006076354; WO-2006078002; WO-2006083043; WO-2006083045; WO-2006083046; WO-2006085636; WO-2006085639; WO-2006085641; WO-2006085665; WO-2006098499;

WO-2006121175; WO-2006121211; WO-2006127495; WO-2007077617; WO-2007077984; WO-2007085074; WO-2007086542; WO-2007129786; WO-2007135783; WO-2008006217; WO-2008024368; WO-2008029815; WO-2008064491; WO-2008128338; WO-2008147769; WO-2008150341; WO-2009019040; WO-2009114738; WO-2009117003; WO-2010011409; WO-2010051580; WO-2010092545; WO-2010099312; WO-2010125233; WO-2010145631; WO-2010149775; WO-2011064440; WO-2011088399; WO-2012003821; WO-2012007736; WO-2012025665; WO-2012030319; WO-2012064974; WO-2012089904; WO-2012113983; WO-2012123642; WO-2012135683; WO-2012153000; WO-2012173712; WO-2012174366; WO-2013006375; WO-2013034801; WO-2013035512; WO-2013104822; WO-2013126120; WO-2013160531; WO-2013180780; WO-2014006567; WO-2014053697; WO-2014075296; WO-2014092819; WO-2014140943; WO-2014163728; WO-2014168665; WO-2014197047; WO-2014197048; WO-2014197095; WO-2015014549; WO-2015036266; WO-2015057839; WO-2015081107; WO-2015127498; WO-2015153056; WO-2015159258; WO-2015178990; WO-2015178991; WO-2015178992; WO-2015183535; WO-2016000836; WO-2016003626; WO-2016020648; WO-2016022689; WO-2016025598; WO-2016049446; WO-2016061114; WO-2016076935; WO-2016083140; WO-2016094045; WO-2016118821; WO-2016126979; WO-2016126981; WO-2016138395; WO-2016138406; WO-2016168642; WO-2016183213; WO-2016199029; WO-2016200845; WO-2017001404; WO-2017015432; WO-2017015532; WO-2017021714; WO-2017040598; WO-2017055946; WO-2017059104; WO-2017062143; WO-2017065934; WO-2017079394; WO-20170793949; WO-2017079417; WO-2017079424; WO-2017082983; WO-2017087070; WO-2017089891; WO-2017100078; WO-2017103694; WO-2017105429; WO-2017105524; WO-2017111949; WO-2017115008; WO-2017115160; WO-2017116442; WO-2017131831; WO-2017136450; WO-2017139683; WO-2017151200; WO-2017152287; WO-2017155531; WO-2017158134; WO-2017217958; WO-2017217959; WO-2017217960; WO-2017217961; WO-2017222806; WO-2018004578; WO-2018004634; WO-2018004635; WO-2018004636; WO-2018009240; WO-2018030977; WO-2018034638; WO-2018035448; WO-2018038707; WO-2018051123; WO-2018052397; WO-2018052399; WO-2018052414; WO-2018052424; WO-2018052427; WO-2018052465; WO-2018052466; WO-2018055467; WO-2018055607; WO-2018057024; WO-2018060981; WO-2018062991; WO-2018063139; WO-2018063168; WO-2018063205; WO-2018063206; WO-2018069908; WO-2018073668; WO-2018075106; WO-2018089850; WO-2018093545; WO-2018106215; WO-2018106222; WO-2018111242; WO-2018125026; WO-2018125513; WO-2018125543; WO-2018125604; WO-2018132769; WO-2018139928; WO-2018144601; WO-2018159832; WO-2018160184; WO-2018160185; WO-2018160187; WO-2018160674; WO-2018162965; WO-2018165021; WO-2018165500; WO-2018165607; WO-2018169579; WO-2018169585; WO-2018182571; WO-2018182584; WO-2018185306; WO-2018191041; WO-2018192674; WO-2018217351; WO-2018219484; WO-2018223037; WO-2018226586; WO-2018231212; WO-2018231241; WO-2018236374; WO-2018236922; WO-2019004991; WO-2019025019; WO-2019032114; WO-2019032115; WO-2019038409; WO-2019040098; WO-2019045762; WO-2019045763; WO-2019050525; WO-2019054990; WO-2019054995; WO-2019055002; WO-2019055038;

WO-2019055048; WO-2019057317; WO-2019059879; WO-2019063113; WO-2019063116; WO-2019070228; WO-2019070265; WO-2019077397; WO-2019077398; WO-2019077399; WO-2019084286; WO-2019086943; WO-2019089141; WO-2019089603; WO-2019105630; WO-2019106416; WO-2019108512; WO-2019116103; WO-2019117883; WO-2019117922; WO-2019117929; WO-2019117930; WO-2019117949; WO-2019117954; WO-2019117955; WO-2019117972; WO-2019117973; WO-2019117974; WO-2019117975; WO-2019118442; WO-2019125423; WO-2019125498; WO-2019126396; WO-2019132963; WO-2019136213; WO-2019139799; WO-2019139800; WO-2019143680; WO-2019152019; WO-2019152020; WO-2019156759; WO-2019156760; WO-2019164591; WO-2019168721; WO-2019173651; WO-2019173799; WO-2019178009; WO-2019179732; WO-2019179740; WO-2019183602; WO-2019190460; WO-2019204680; WO-2019217772; WO-2019222514; WO-2019224789; WO-2019229527; WO-2019236137; WO-2019241570; WO-2019245740; WO-2020005963; WO-2020010147; WO-2020010214; WO-2020018797; WO-2020019015; WO-2020025458; WO-2020025460; WO-2020027779; WO-2020028325; WO-2020028650; WO-2020033807; WO-2020033974; WO-2020036673; WO-2020036707; WO-2020037253; WO-2020037300; WO-2020037301; WO-2020043415; WO-2020043596; WO-2020043597; WO-2020046928; WO-2020048842; WO-2020055450; WO-2020056176; WO-2020058002; WO-2020068237; WO-20200682379; WO-2020069623; WO-2020069883; WO-2020072661; WO-2020072819; WO-2020074742; WO-2020077288; WO-20200772889; WO-2020078777; WO-2020078849; WO-2020081805; WO-2020083618; WO-2020086867; WO-2020104206; WO-2020106313; WO-2020106955; WO-2020109106; WO-2020109107; WO-2020109869; WO-2020112185; WO-2020120183; WO-2020127299; WO-2020139407; WO-2020142122; WO-2020145854; WO-2020146025; WO-20201460259; WO-2020146083; WO-2020146794; WO-2020148565; WO-2020150348; WO-2020152393; WO-2020156680; WO-2020169224; WO-2020178640; WO-2020179554; WO-2020180442; WO-2020180902; WO-2020183060; WO-2020186076; WO-2020197575; WO-2020200782; WO-2020200801; WO-2020212092; WO-2020213596; WO-2020214910; WO-2020219578; WO-2020222044; WO-2020227385; WO-2020231378; WO-2020231795; WO-2020236587; WO-2020252157; WO-2020252425; WO-2020253292; WO-2020254055; WO-2020257772; WO-2020259813; WO-2020263255; WO-2020263278; WO-2021007153; WO-2021008796; WO-2021011765; WO-2021015789; WO-2021016542; WO-2021018466; WO-2021019294; WO-2021021398; WO-2021022217; WO-2021022375; WO-2021022376; WO-2021026070; WO-2021029095; WO-2021034404; WO-2021044210; WO-2021044212; WO-2021046184; WO-2021046495; WO-2021050541; WO-2021051163; WO-2021055000; WO-2021055507; WO-2021056115; WO-2021059013; WO-2021061776; WO-2021062331; WO-2021067023; WO-2021076221; WO-2021076808; WO-2021077691; WO-2021080789; WO-2021083448; WO-2021087206; WO-2021091600; WO-2021092351; WO-2021093977; WO-2021096955; WO-2021101829; WO-2021102321; WO-2021102344; WO-2021105100; WO-2021107949; WO-2021108487; WO-2021111961; WO-2021113513; WO-2021118867; WO-2021123903; WO-2021132009; WO-2021140995; WO-2021146028; WO-2021148311; WO-2021150101; WO-2021155289; WO-2021156538; WO-2021162981; WO-2021163032;

WO-2021163487; WO-2021165639; WO-2021168019; WO-2021168096; WO-2021176974; WO-2021178042; WO-2021178562; WO-2021181059; WO-2021181155; WO-2021183344; WO-2021185595; WO-2021188193; WO-2021191501; WO-2021195368; WO-2021201954; WO-2021202405; WO-2021202409; WO-2021202687; WO-2021211657; WO-2021216497; WO-2021223964; WO-2021223983; WO-2021224551; WO-2021229388; WO-2021231224; WO-2021236725; WO-2021237362; WO-2021247125; WO-2021247540; WO-2021247656; WO-2021247878; WO-2021249759; WO-2021253404; WO-2021255055; WO-2021259711; WO-2021262741; WO-2022002881; WO-2022003450; WO-2022004921; WO-2022015399; WO-2022018038; WO-2022018170; WO-2022020951; WO-2022023913; WO-2022031348; WO-2022036422; WO-2022037958; WO-2022038205; WO-2022043020; WO-2022043297; WO-2022048399; WO-2022051030; WO-2022053561; WO-2022054992; WO-2022058025; WO-2022058285; WO-2022058381; WO-2022060897; WO-2022060950; WO-2022060954; WO-2022060957; WO-2022060959; WO-2022060962; WO-2022060964; WO-2022073380; WO-2022074041; WO-2022081675; WO-2022084350; WO-2022084778; WO-2022086751; WO-2022087143; WO-2022092815; WO-2022093575; WO-2022093618; and ZA-200207825.

SUMMARY OF THE INVENTION

A quantum computer requires many qubits and couplers with well-defined and precise energies. Superconducting quantum computers are fabricated from integrated circuits comprising a plurality of Josephson junctions. In practice, due to the spread in the fabrication processes of Josephson junctions, the fabricated qubits will possess energies that are slightly different from the design parameters. Such variations in the energy of qubits and coupler make it difficult to accurately perform single and multi-qubit operations in the quantum computer, particularly as the number of coupled qubits increase. An external energy tuning of the qubits through flux biasing may compensate for the inherent variation of the fabrication process, and permit additional degrees of control. Precisely controlled flux biasing of superconducting circuits is necessary to achieve the desired quantum behavior in scalable quantum computing systems.

In addition to compensation for the fabrication variation, the controllability of the energy of the quantum circuit such as qubits and quantum coupler enables certain functions and properties. As an example, by changing the energy of the qubits and quantum couplers, we can increase or decrease the interaction with other components in a quantum circuit. This enables deliberate coupling and decoupling of different quantum components based on the desired functionality. For example, to enable two-qubit or multi-qubit gate operation, the energies of the coupler or the qubits may be tuned to enable interaction among them. Similarly, a qubit may be decoupled from other qubits or couplers by detuning the energy through the flux biasing. Change of flux biasing to increase coupling enables multi-qubit and coupler gate operations, whereas the change of flux biasing to decouple quantum components enables preserving the quantum coherence by decreasing interaction.

Finally, one can execute single or two-qubit gate operations by applying the generated fast flux bias pulses to execute high-fidelity qubit control. Such control can be done using a universal set of flux pulses, in which qubit gates are completed within a single or multiple Larmor periods. The basic principle of SFQ flux biasing according to the present invention is as follows. A superconducting storage loop is magnetically coupled to the quantum circuit. To change the amount of the flux biasing of the qubits or couplers, SFQ pulses are added or removed from the storage loop as shown in FIG. 1.

The resolution, amount of coupling, and the speed of the change of flux biasing can be controlled through different design parameters of the transformer, i.e., $L_{in}$, $L_{out}$, M, and SFQ circuits and/or the qubit/coupler.

Li, X., T. Cai, H. Yan, Z. Wang, X. Pan, Y. Ma, W. Cai et al. "Tunable coupler for realizing a controlled-phase gate with dynamically decoupled regime in a superconducting circuit." Physical Review Applied 14, no. 2 (2020): 024070, discloses a tunable and switchable qubit coupler. Controllable interaction between superconducting qubits is desirable for large-scale quantum computation and simulation. Based on Yan et al. [Phys. Rev. Appl. 10, 054061 (2018)], a flux-controlled tunable coupler with a continuous tunability by adjusting the coupler frequency, which can completely turn off adjacent superconducting qubit coupling was tested. Utilizing the tunable interaction between two qubits via the coupler, a controlled-phase (CZ) gate with dynamically decoupled regime, which allows the qubit-qubit coupling to be only "on" at the usual operating point while dynamically "off" during the tuning process of one qubit frequency into and out of the operating point. This efficiently suppresses the leakage out of the computational subspace, but also allows for the acquired two-qubit phase being geometric at the operating point. See also:

Sung, Youngkyu, Leon Ding, Jochen Braumüller, Antti Vepsäläinen, Bharath Kannan, Morten Kjaergaard, Ami Greene et al. "Realization of High-Fidelity CZ and Z Z-Free iSWAP Gates with a Tunable Coupler." Physical Review X 11, no. 2 (2021): 021058.

Allman, Michael S., Fabio Altomare, Jed D. Whittaker, Katarina Cicak, Dale Li, Adam Sirois, Joshua Strong, John D. Teufel, and Raymond W. Simmonds. "rf-SQUID-mediated coherent tunable coupling between a superconducting phase qubit and a lumped-element resonator." Physical review letters 104, no. 17 (2010): 177004.

Han, X. Y., T. Q. Cai, X. G. Li, Y. K. Wu, Y. W. Ma, Y. L. Ma, J. H. Wang, H. Y. Zhang, Y. P. Song, and L. M. Duan. "Error analysis in suppression of unwanted qubit interactions for a parametric gate in a tunable superconducting circuit." Physical Review A 102, no. 2 (2020): 022619.

Harris, R., A. J. Berkley, M. W. Johnson, P. Bunyk, S. Govorkov, M. C. Thom, S. Uchaikin et al. "Sign- and magnitude-tunable coupler for superconducting flux qubits." Physical review letters 98, no. 17 (2007): 177001.

Xu, Huikai, Weiyang Liu, Zhiyuan Li, Jiaxiu Han, Jingning Zhang, Kehuan Linghu, Yongchao Li et al. "Realization of adiabatic and diabatic CZ gates in superconducting qubits coupled with a tunable coupler." Chinese Physics B 30, no. 4 (2021): 044212.

Yang, Chui-Ping, Qi-Ping Su, Shi-Biao Zheng, and Siyuan Han. "One-step transfer or exchange of arbitrary multipartite quantum states with a single-qubit coupler." Physical Review B 92, no. 5 (2015): 054509.

Van der Ploeg, S. H. W., A. Izmalkov, Alec Maassen van den Brink, U. Hübner, M. Grajcar, E. Il'Ichev, H-G. Meyer, and A. M. Zagoskin. "Controllable coupling of superconducting flux qubits." Physical review letters 98, no. 5 (2007): 057004.

Zajac, D. M., J. Stehlik, D. L. Underwood, T. Phung, J. Blair, S. Carnevale, D. Klaus et al. "Spectator errors in tunable coupling architectures." arXiv preprint arXiv: 2108.11221 (2021).

McKay, David C., Stefan Filipp, Antonio Mezzacapo, Easwar Magesan, Jerry M. Chow, and Jay M. Gambetta. "Tunable coupling between fixed-frequency superconducting transmon qubits, Part II: Implementing a two-qubit XX-90 gate." In APS March Meeting Abstracts, vol. 2016, pp. F48-008. 2016.

Jin, Lijing. "Implementing High-fidelity Two-Qubit Gates in Superconducting Coupler Architecture with Novel Parameter Regions." arXiv preprint arXiv: 2105.13306 (2021).

Quintana, Chris, Yu Chen, D. Sank, D. Kafri, A. Megrant, T. C. White, A. Shabani et al. "Coplanar waveguide flux qubit suitable for quantum annealing." In APS March Meeting Abstracts, vol. 2016, pp. K48-010. 2016.

Kafri, Dvir, Chris Quintana, Yu Chen, Alireza Shabani, John M. Martinis, and Hartmut Neven. "Tunable inductive coupling of superconducting qubits in the strongly nonlinear regime." Physical Review A 95, no. 5 (2017): 052333.

Wulschner, Friedrich, Jan Goetz, Fabian R. Koessel, Elisabeth Hoffmann, Alexander Baust, Peter Eder, Michael Fischer et al. "Tunable coupling of transmission-line microwave resonators mediated by an rf SQUID." EPJ Quantum Technology 3, no. 1 (2016): 1-10.

Xu, Xuexin, and M. H. Ansari. "Parasitic-free gate: A protected switch between idle and entangled states." arXiv preprint arXiv: 2202.05208 (2022).

Xu, Yuan, Ji Chu, Jiahao Yuan, Jiawei Qiu, Yuxuan Zhou, Libo Zhang, Xinsheng Tan et al. "High-fidelity, high-scalability two-qubit gate scheme for superconducting qubits." Physical Review Letters 125, no. 24 (2020): 240503.

Groszkowski, Peter, Austin G. Fowler, Felix Motzoi, and Frank K. Wilhelm. "Tunable coupling between three qubits as a building block for a superconducting quantum computer." Physical Review B 84, no. 14 (2011): 144516.

Di Paolo, Agustin, Catherine Leroux, Thomas M. Hazard, Kyle Serniak, Simon Gustavsson, Alexandre Blais, and William D. Oliver. "Extensible circuit-QED architecture via amplitude- and frequency-variable microwaves." arXiv preprint arXiv: 2204.08098 (2022).

Nägele, Maximilian, Christian Schweizer, Federico Roy, and Stefan Filipp. "Effective non-local parity-dependent couplings in qubit chains." arXiv preprint arXiv: 2203.07331 (2022).

McCourt, Trevor, Charles Neill, Kenny Lee, Chris Quintana, Yu Chen, Julian Kelly, V. N. Smelyanskiy et al. "Learning Noise via Dynamical Decoupling of Entangled Qubits." arXiv preprint arXiv: 2201.11173 (2022).

He, Yongcheng, Jianshe Liu, Changhao Zhao, Rutian Huang, Genting Dai, and Wei Chen. "Control System of Superconducting Quantum Computers." Journal of Superconductivity and Novel Magnetism (2022): 1-21.

The circuit to add or remove flux could be designed in many ways. The simplest approach is using Josephson Transmission lines (JTLs) as shown in FIG. 2. In FIG. 2, the chain of JTLs could be amplifying JTLs to increase the number of fluxons that can be stored in $L_{in}$.

A more scalable approach uses parallel JTLs to increase the capacity of stored fluxons in the loop and, therefore, the induced current through inductor $L_{in}$ as shown in FIG. 3. In the circuit shown in FIG. 4, the number of parallel JTLs could be arbitrary large from 1 to n, depending on the specifics of the flux biasing design. The circuit simulation of this circuit is shown in FIG. 4.

It is possible to create different profiles of the flux biasing over time using this technique. In FIG. 5, a sample time and amplitude-varying flux biasing is shown. The flux biasing can be either positive or negative. The SFQ circuit to add or remove flux to the flux biasing circuit in FIG. 1 could be designed for a specific profile or time dependence of the flux biasing. The slew rate of the rising and falling edges of the flux biasing waveforms or flux bias pulses (FBP) can be achieved by changing SFQ pulse repetition rates set by SFQ circuit clock, its submultiples, and or special on-chip SFQ pulse generator circuits (flux pumps). In general case, the SFQ pulse repetition rates can be non-uniform.

As an example, a flux pump could be used for a fast change in the flux biasing by injection or removal of a fast train of pulses for coarse flux biasing, as shown in FIG. 6. An example of a flux pump is a relaxation oscillator circuit using an under-damped Josephson junction. When an under-damped Josephson junction switches it creates a train of SFQ pulses with the number of pulses determined by the resistance and inductance load of the circuit.

Flux biasing using SFQ pulses can be further refined for specific purposes including fast but high-resolution biasing over large intervals by combining coarse and fine tune biasing as shown in FIG. 7. In FIG. 7, the coarse biasing could be used for fast steps in biasing, and fine-tune biasing for the initial and/or final high-resolution tuning. In general, the specific sequence, duration, pulse rates, and other parameters of the coarse and fine biasing and, therefore, generated flux bias pulse shapes, their number and polarities are selected based on the specific function and optimization to achieve the highest gate fidelity.

The initial flux stored in the flux biasing storage loop can be reset by adding a reset circuit as shown in FIG. 8. In FIG. 8, the SQUID in series with the input transformer can be used as a reset mechanism. When the critical current of the SQUID is suppressed by applying the reset current to the input transformer, the flux stored in $L_{in}$ is completely removed.

SFQ pulse control can be used not only for tuning of a qubit, but also for initiating quantum transitions between qubit states, as was proposed in the prior art. In this scheme, SFQ pulse is applied resonantly (uniformly) over many qubit Larmor periods or using more complex, non-uniform pulse patterns derived using the optimal control theory methods.

With a central control unit (which may also be an SFQ digital logic circuit), the combination and timing of these two control mechanisms can be coordinated and synchronized, as suggested in the block diagram of FIG. 9A. Fast flux biasing of the qubits and couplers also enables new and improved multi-qubit operations, as shown in FIG. 10A. This could be used to increase the speed of multi-qubit gate operation or improve the fidelity of the gate operation by exploiting new modes of multi-qubit interaction.

Here, the central control unit is capable of precise timing and control of a train of SFQ pulses acting on each qubit, and the flux biasing of all the qubits and coupler to achieve faster multi-qubit operation with higher fidelity.

Alternatively, quantum transitions can be executed using FBP waveforms generated by SFQ circuits, as shown in FIG. 9B. In this case, qubit rotations are driven exclusively by flux biasing applied to a qubit, while SFQ circuits are used to generate specific FBPs corresponding to the desired gate. This method can potentially lead to a faster gate execution, since the applied FBP can perform gate within a single or a few Larmor periods in contrast to SFQ pulse trains or microwave pulses typically applied over many qubit Larmor periods.

FIG. 10B shows a block diagram of multi-qubit operations using only flux biasing controls. In this case, separate FBPs are generated to control qubits and a coupler connecting qubits. The SFQ flux bias to adjust qubit energy (qubit frequency) is combined with the qubit control flux biasing, see the SFQ flux bias offset in FIG. 10B.

An example of the application of SFQ flux biasing to change the energy of the qubit during SFQ single qubit operation as shown in FIG. 11. In this example, the energy of the qubit can be reduced quickly during a single qubit operation, which enables faster single qubit operation. At the end of the single qubit rotation, the flux biasing can change the energy of the qubit again to decouple it from the rest of the circuit.

This type of flux bias control can be applied to change the superconducting critical current of a SQUID loop incorporated in qubit in place of a single Josephson junction (sometimes called a split junction) that is a central component of a superconducting qubit or coupler, which in turn affects the energy and coupling strength of the quantum device. Applicable qubits include flux qubits, phase qubits, and transmons, among others. For fluxoniums and similar qubits having large inductors (superinductors), flux bias can be applied to the superinductor which can be made using a Josephson junction array. Other applications of the rapid time-varying superconducting digital flux control to quantum computing are described in more detail below, or may become clear to those skilled in the art.

It is therefore an object to provide a magnetic flux control system, comprising: a superconducting circuit configured to convert each of successive single-flux-quantum pulses into a magnetic flux; a superconducting inductor configured to integrate the magnetic flux from the superconducting circuit to define an integrated magnetic flux; and a control system comprising a plurality of Josephson junctions, the control system being configured to generate at least one output control signal for controlling the superconducting circuit, the output control signal comprising at least one sequence of single-flux-quantum pulses adapted to selectively change the integrated magnetic flux.

It is also an object to provide a magnetic flux control system, comprising: at least one superconducting circuit configured to generate single-flux-quantum pulses; a coupling circuit configured to couple the single-flux-quantum pulses into a corresponding magnetic flux; a superconducting inductor configured to integrate the magnetic flux corresponding to the single-flux-quantum pulses to define an integrated magnetic flux; a qubit having a resonance frequency dependent on the integrated magnetic flux; and a sensor having a sensor output, the sensor being configured to determine at least one of the resonance frequency and the integrated magnetic flux; a control system comprising a plurality of Josephson junctions, the control system being configured to control a value of the integrated magnetic flux dependent on the sensor output.

It is a further object to provide a magnetic flux control method for controlling a superconducting system, comprising a superconducting circuit configured to convert each of successive single-flux-quantum pulses into a magnetic flux, and a superconducting inductor configured to integrate the magnetic flux from the superconducting circuit to define an integrated magnetic flux, and a control circuit comprising a plurality of Josephson junctions, the method comprising: defining a target magnetic flux; controlling the superconducting circuit to produce a sequence of single-flux-quantum pulses for monotonically changing the integrated magnetic flux to reduce a difference between the target magnetic flux and the integrated magnetic flux; and controlling the superconducting circuit to cease production of the sequence of single-flux-quantum pulses for monotonically changing the integrated magnetic flux and thereby cease monotonically changing the integrated magnetic flux, wherein said controlling superconducting circuit to cease production of the sequence of single-flux-quantum pulses is dependent on a value of the integrated magnetic flux.

The magnetic flux control system may further comprise a quantum computing circuit comprising at least one qubit having at last one physical property tunable dependent on at least the integrated magnetic flux, wherein the integrated magnetic flux is coupled with the at least one qubit. The at least one physical property may comprise a microwave resonance. The control system may be configured to control a dynamic variation of the at least one physical property of the at least one qubit over time. The at least one physical property may comprise at least one of a microwave resonance, an energy and a phase of the qubit, and may control each of a microwave resonance, an energy and a phase of the qubit. The control system may be configured to control a dynamic variation of the at least one physical property of the at least one of the qubit and the tunable qubit coupler. The at least one of the qubit and the tunable qubit coupler may comprise a switched qubit coupler configured to selectively control presence and absence of an interaction of a plurality of qubits.

The magnetic flux control system may be provided in a first integrated circuit and the at least one of the qubit and the tunable qubit coupler is provided in a second integrated circuit, therein the first integrated circuit and the second integrated circuit are provided on a common substrate.

The magnetic flux control system may further comprise at least one of a qubit and a tunable qubit coupler associated with a qubit, coupled to the integrated magnetic flux, wherein a qubit Bloch sphere state of the qubit is responsive to the at least one output control signal.

The magnetic flux control system may further comprising a qubit, whose state is represented by a phase and an amplitude a Bloch sphere, coupled to the integrated magnetic flux, wherein the phase and amplitude of the Bloch sphere are responsive to the at least one output control signal.

The magnetic flux control system may be provided in a first integrated circuit and the at least one of the qubit and the tunable qubit coupler is provided in a second integrated circuit, therein the first integrated circuit and the second integrated circuit are inductively coupled and provided on separate substrates having a flip chip geometry.

The control system may further comprise an input port configured to receive at least one feedback signal relating to a magnitude of the integrated magnetic flux.

The control system further may further comprise a pair of output ports configured to produce a first signal adapted to increase the integrated magnetic flux and a second signal adapted to decrease the integrated magnetic flux.

The control system may be configured to implement at least one of a phase locked loop control and a frequency locked loop control.

The control system may be configured to receive a photonic input control signal.

The magnetic flux control system may further comprise a frequency mixer and a detector configured to receive an output of at least one qubit and produce an input control signal for the control system.

The magnetic flux control system may further comprise a superconducting oscillator configured to generate a microwave signal which interacts with a qubit.

The superconducting inductor may be further configured to couple the integrated magnetic flux with a quantum computing circuit comprising a transmon qubit circuit having a microwave resonance tunable dependent on at least the integrated magnetic flux. The control system may be configured to, within a quantum calculation period of the transmon qubit, define a first microwave resonant frequency of the transmon qubit, and subsequently define a second microwave resonant frequency of the transmon qubit, wherein the first microwave resonant frequency and the second microwave resonant frequency are different.

The superconducting inductor may be further configured to couple the integrated magnetic flux with a quantum computing circuit comprising a transmon qubit circuit having a microwave resonance tunable dependent on at least the integrated magnetic flux, and the control system may be configured to tune the microwave resonance of the transmon qubit circuit with the integrated magnetic flux dependent on a microwave resonance state of the transmon qubit circuit.

The magnetic flux control system may further comprise a superconducting quantum interference device responsive to the integrated magnetic flux, adapted to produce a magnetometer output, wherein the control system comprises a control system input responsive to the magnetometer output.

The control system further may comprise a first input port configured to receive a reference frequency signal, a second input port configured to receive a microwave resonance signal, and a comparing circuit configured to produce a comparison output configured to control the integrated magnetic flux to selectively change the integrated magnetic flux in response to the comparison output.

The control system is further configured: to receive at least one input control signal selectively dependent on a signal from a qubit during a quantum computing calculation representing a calculation state of the qubit during a phase of quantum computing, and to control the integrated magnetic flux selectively dependent on the calculation state of the qubit during a subsequent phase of quantum computing.

The magnetic flux control system may further comprise an error input port configured to receive an error signal; and at least one memory configured to persistently store a calibration value dependent on the error signal, wherein the control system produces output control signal selectively dependent on the persistently stored calibration value.

The magnetic flux control system may further comprise a superconducting circuit configured to reset the integrated magnetic flux to a predetermine value.

The control system may be further configured to produce at least two types of the at least one sequence of single-flux-quantum pulses, comprising: a first type of the sequence adapted to change the integrated magnetic flux by a first amount; and a second type of the sequence adapted to change the integrated magnetic flux by a second amount, the first amount being different from the second amount; and the control system is configured to receive at least one input control signal representing an amount of change of the integrated magnetic flux, and to produce at least the first type of sequence and the second type of sequence selectively dependent on the at least one input control signal.

The control system may be further configured to produce at least two different types of the output control signal comprising the at least one sequence of single-flux-quantum pulses, comprising a first type of sequence associated with a first positive whole number of single single-flux-quantum pulses, and a second type of sequence associated with a second positive whole number of single-flux-quantum pulses, the first positive whole number and the second positive whole number being different.

The magnetic flux control system may further comprise a counter responsive to a target value, configured to count each single-flux-quantum pulse and selectively produce a signal when a cumulative value of the at least one sequence of single-flux-quantum pulses corresponds to the target value, wherein the superconducting circuit comprises a superconducting transformer primary inductor, coupled to the superconducting inductor as a superconducting transformer secondary inductor; and the at least one sequence of single-flux-quantum pulses comprise first pulses and second pulses; the superconducting transformer primary inductor has a first terminal and a second terminal, the first pulses enter the superconducting transformer primary inductor at the first terminal, and the second pulses enter the superconducting transformer primary inductor at the second terminal, such that the first pulses act with opposite polarity with respect to the second pulses with respect to changes in the integrated magnetic flux.

See, çelik, Mustafa Eren, Timur V. Filippov, Anubhav Sahu, Dmitri E. Kirichenko, Saad M. Sarwana, A. Erik Lehmann, and Deepnarayan Gupta. “Fast RSFQ and ERSFQ parallel counters.” IEEE Transactions on Applied Superconductivity 30, no. 7 (2020): 1-4; L. V. Filippenko, V. K. Kaplunenko, M. I. Khabipov, V. P. Koshelets, K. K. Likharev, O. A. Mukhanov, S. V. Rylov, V. K. Semenov, and A. N. Vystavkin, “Experimental Implementation of Analog-to-Digital Converter Based on the Reversible Ripple Counter,” IEEE Trans. Magn., vol. MAG-27, no. 2, pp. 2464-2467 Mar. 1991; Shukla, Ashish, Dmitry Kirichenko, Timur Filippov, Anubhav Sahu, Mustafa Eren Celik, Mingoo Seok, and Deepnarayan Gupta. “Pulse Interfaces and Current Management Techniques for Serially Biased RSFQ Circuits.” IEEE Transactions on Applied Superconductivity (2022); Amparo, Denis, Mustafa Eren çelik, Sagnik Nath, Joao P. Cerqueira, and Amol Inamdar. “Timing characterization for RSFQ cell library.” IEEE Transactions on Applied Superconductivity 29, no. 5 (2019): 1-9; Kito, Nobutaka, and Kazuyoshi Takagi. “An RSFQ flexible-precision multiplier utilizing bit-level processing.” In Journal of Physics: Conference Series, vol. 1975, no. 1, p. 012025. IOP Publishing, 2021; Qu, Pei-Yao, Guang-Ming Tang, Jia-Hong Yang, Xiao-Chun Ye, Dong-Rui Fan, Zhi-Min Zhang, and Ning-Hui Sun. “Design of an 8-bit Bit-Parallel RSFQ Microprocessor.” IEEE Transactions on Applied Superconductivity 30, no. 7 (2020): 1-6; Yamac, Taiki, Naoki Takeuchi, and Nobuyuki Yoshikawa. “Binary counters using adiabatic quantum-flux-parametron logic.” IEEE Transactions on Applied Superconductivity 31, no. 2 (2020): 1-5.

The control system may be configured to receive a feedback signal based on a magnitude of the integrated magnetic flux, further comprising a gate configured to cease the at least one sequence of single-flux-quantum pulses when the feedback signal indicates a sufficient correction in the integrated magnetic flux.

The magnetic flux control system may further comprise a control system input representing a feedback signal, wherein the control system is configured to produce the at least one output control signal selectively in dependence on the feedback signal, to produce: a continuous series of single-flux-quantum pulses of a first type for increasing the integrated magnetic flux; or a continuous series of single-flux-quantum pulses of a second type for decreasing the integrated magnetic flux; or an output representing no net single-flux-quantum pulses for maintaining the integrated magnetic flux.

The magnetic flux control system may further comprise a counter, wherein the control system is configured to receive a target value and in dependence thereon selectively: increment a counter based on a continuous series of single-flux-quantum pulses adapted to increase the integrated magnetic flux; decrement the counter based on a continuous series of single-flux-quantum pulses adapted to decrease the integrated magnetic flux; and suppress net single-flux-quantum pulses while a count value of the counter corresponds to an error margin of the target value.

The magnetic flux control system may further comprise a reset circuit configured to establish the magnetic flux at a predetermined value, the reset circuit comprising a reset inductor coupled to a superconducting quantum interference device (SQUID) having a critical current, in series with the superconducting inductor, wherein a current in the reset inductor is sufficient to drive the SQUID above the critical current and become resistive and dissipative of energy stored in the superconducting inductor.

It is another object of the invention to provide a method for controlling a superconducting quantum computing circuit, comprising generating different types of flux biasing pulses using a superconducting digital SFQ control circuit dependent on at least one control signal over time; converting the single-flux-quantum voltage pulses to a magnetic flux selectively dependent on a history of the at least one control signal, using the generated flux bias pulse with or without single-flux-quantum pulse control patterns applied to a superconducting quantum circuit, the different types of single-flux-quantum voltage pulses selectively causing increases and decreases in the magnetic flux; coupling the magnetic flux to a quantum computing circuit having a property tunable dependent on the coupled magnetic flux; and defining the at least one control signal over time dependent on a performance of the quantum computing circuit.

It is also an object of the invention to provide a method for controlling a superconducting quantum computing circuit, comprising: generating single-flux-quantum voltage pulses with a superconducting digital control circuit dependent on at least one control signal over time; converting the single-flux-quantum voltage pulses to a magnetic flux selectively dependent on a history of the at least one control signal; coupling the magnetic flux to a quantum computing circuit comprising at least one component having a property tunable dependent on the coupled magnetic flux; and defining the at least one control signal over time to selectively define the magnetic flux, to alter the property of the at least one component. The coupled magnetic flux may control a frequency, phase, rate, precision, or dynamic range of the at least one component, for example.

It is a further object to provide a magnetic flux control method, comprising: a control system comprising a plurality of Josephson junctions, the control system being configured to generate a sequence of single-flux-quantum pulses; a superconducting circuit configured to convert the sequence of single-flux-quantum pulses into a magnetic flux; and a superconducting inductor configured to couple the magnetic flux with a quantum computing circuit comprising at least one qubit coupler circuit having physical properties tunable dependent on the magnetic flux.

It is also an object to provide a magnetic flux control system, comprising: a control system comprising a plurality of Josephson junctions, configured to generate a sequence of single-flux-quantum pulses; a superconducting circuit configured to convert each pulse of the sequence of single-flux-quantum pulses into a magnetic flux; and a superconducting inductor configured to integrate the magnetic flux, wherein the integrated magnetic flux is controlled to increase and decrease corresponding to at least one control signal of the control system.

The superconducting inductor may be further configured to couple the integrated magnetic flux with a quantum computing circuit comprising at least one qubit circuit having physical properties tunable dependent on at least the magnetic flux.

The magnetic flux control system may further comprise the quantum computing circuit comprising at least one qubit circuit having physical properties tunable dependent on at least the magnetic flux.

The control system may have at least one control mode adapted to maintain a constant physical property of the at least one qubit.

The control system may have at least one control mode adapted to dynamically vary the physical property of the at least one qubit over time.

The superconducting inductor may be further configured to couple the integrated magnetic flux with a qubit circuit having physical properties tunable dependent on at least the magnetic flux.

The magnetic flux control system may be provided together with, or integrated with, the qubit circuit having physical properties tunable dependent on at least the magnetic flux.

The control system may have at least one control mode adapted to maintain a constant physical property of the qubit.

The control system may have at least one control mode adapted to dynamically vary the physical property of the qubit over time.

The control system may comprise an input configured to receive a feedback signal.

The control system may comprise a pair of inputs configured to receive feedback signals representing an excess of magnetic flux and a deficiency of magnetic flux.

The control system may comprise a pair of outputs configured to produce signals representing an increase of magnetic flux and a decrease of magnetic flux.

The control system may be configured to implement a phase locked loop control. See, en.wikipedia.org/wiki/Phase-locked_loop.

The control system may be configured to implement a frequency locked loop control. See, en.wikipedia.org/wiki/Frequency-locked_loop.

The control system may be configured to receive an optical control signal. See, e.g., Nakahara, K., H. Nagaishi, H. Hasegawa, S. Kominami, H. Yamada, and T. Nishino. "Optical input/output interface system for Josephson junction integrated circuits." IEEE transactions on applied superconductivity 4, no. 4 (1994): 223-227; Van Zeghbroeck, B. "Optical data communication between Josephson-junction circuits and room-temperature electronics." IEEE transactions on applied superconductivity 3, no. 1 (1993): 2881-2884; Karlsen, Bjørnar. "Optically operated pulse-driven Josephson junction arrays and range extension using voltage dividers and buffer amplifiers." (2019); Karlsen, Bjørnar. "Optically operated pulse-driven Josephson junction arrays and range extension using voltage dividers and buffer amplifiers." (2019).

The control system may be configured to receive a photonic control signal.

The control system may further comprise an optical output signal. See, e.g., Ireland, Jane, Oliver Kieler, Johannes Kohlmann, Helge Malmbekk, Jonathan M. Williams, Ralf Behr, Bjornar Karlsen et al. "Josephson arbitrary waveform system with optoelectronic drive." In 2017 16th International Superconductive Electronics Conference (ISEC), pp. 1-4. IEEE, 2017; Youssefi, Amir, Itay Shomroni, Yash J. Joshi, Nathan R. Bernier, Anton Lukashchuk, Philipp Uhrich, Liu Qiu, and Tobias J. Kippenberg. "A cryogenic electro-optic interconnect for superconducting devices." Nature Electronics (2021): 1-7.

The control system may further comprise a photonic output signal. See, Liu, Chenxu, Maria Mucci, Xi Cao, Michael Hatridge, and David Pekker. "Theory of an on-chip Josephson quantum micromaser." Bulletin of the American Physical Society 65 (2020).

Modulation of signals may be detected by using receiver having a heterodyne or homodyne architecture. In a homodyne, the modulated signal is mixed in a mixer, typically a nonlinear device which produces modulation products of input frequencies $f_1$ and $f_2$ of $f_1+f_2$, $f_1-f_2$. etc. If $f_1=f_2$, the homodyne state, the modulating signal on the inputs will appear in the output as a baseband signal. If $f_1 \neq f_2$, the modulating signal will appear in the output biased with the offset frequency of $f_1$ and $f_2$, in which has the advantage of producing an intermediate frequency that may be bandpass filtered and subjected to other processes and transforms above baseband frequency. Even where modulation of one or both of the signals is immaterial, the mixer permits frequency translation of the output. The detector is a device that determines characteristics of a modulating signal.

The magnetic flux control system may further comprise a heterodyne detector. Sec, e.g., Ilves, Jesper, Shingo Kono, Yoshiki Sunada, Shota Yamazaki, Minkyu Kim, Kazuki Koshino, and Yasunobu Nakamura. "On-demand generation and characterization of a microwave time-bin qubit." npj Quantum Information 6, no. 1 (2020): 1-7.

The magnetic flux control system may further comprise a homodyne detector. Sec, e.g., Fong, Kin Chung, Evan Walsh, Gil-Ho Lee, Dmitri Efetov, Jesse Crossno, Leonardo Ranzani, Thomas Ohki, Philip Kim, and Dirk Englund. "Graphene Josephson Junction Microwave Detector." In APS March Mecting Abstracts, vol. 2017, pp. S51-011. 2017; Salmon, Neil A. "A quantum Bell Test homodyne interferometer at ambient temperature for millimetre wave entangled photons." In Quantum Information Science and Technology IV, vol. 10803, p. 108030I. International Society for Optics and Photonics, 2018; Vrajitoarea, Andrei, Ziwen Huang, Peter Groszkowski, Jens Koch, and Andrew A. Houck. "Quantum control of an oscillator using a stimulated Josephson nonlinearity." Nature Physics 16, no. 2 (2020): 211-217; Lüders, Carolin, and Marc Aßmann. "Distinguishing intrinsic photon correlations from external noise with frequency-resolved homodyne detection." Scientific Reports 10, no. 1 (2020): 1-11.

The magnetic flux control system may further comprise a phase-sensitive amplifier configured to amplify a microwave signal which interacts with at least one qubit.

The magnetic flux control system may further comprise a Josephson parametric amplifier configured to amplify signals associated with at least one qubit. See, e.g., Boutin, Samuel, David M. Toyli, Aditya V. Venkatramani, Andrew W. Eddins, Irfan Siddiqi, and Alexandre Blais. "Effect of higher-order nonlinearities on amplification and squeezing in Josephson parametric amplifiers." Physical Review Applied 8, no. 5 (2017): 054030; Sivak, V. V., Shyam Shankar, Gangqiang Liu, Jose Aumentado, and M. H. Devoret. "Josephson array-mode parametric amplifier." Physical Review Applied 13, no. 2 (2020): 024014; Winkel, Patrick, Ivan Takmakov, Dennis Rieger, Luca Planat, Wiebke Hasch-Guichard, Lukas Grünhaupt, Nataliya Maleeva et al. "Non-degenerate parametric amplifiers based on dispersion-engineered josephson-junction arrays." Physical Review Applied 13, no. 2 (2020): 024015; Planat, Luca, Arpit Ranadive, Rémy Dassonneville, Javier Puertas Martínez, Sébastien Léger, Cécile Naud, Olivier Buisson, Wiebke Hasch-Guichard, Denis M. Basko, and Nicolas Roch. "Photonic-crystal Josephson traveling-wave parametric amplifier." Physical Review X 10, no. 2 (2020): 021021; Miano, Alessandro, and Oleg A. Mukhanov. "Symmetric traveling wave parametric amplifier." IEEE Transactions on Applied Superconductivity 29, no. 5 (2019): 1-6; Aumentado, Jose. "Superconducting parametric amplifiers: The state of the art in Josephson parametric amplifiers." IEEE Microwave Magazine 21, no. 8 (2020): 45-59.

The magnetic flux control system may further comprise a quadrature oscillator. Sec, Naaman, Ofer, J. A. Strong, D. G. Ferguson, J. Egan, N. Bailey, and R. T. Hinkey. "Josephson junction microwave modulators for qubit control." Journal of Applied Physics 121, no. 7 (2017): 073904; Naaman, Ofer, Joshua Strong, David Ferguson, Jonathan Egan, Nancyjane Bailey, and Robert Hinkey. "Josephson Junction Microwave Modulators." In 2018 IEEE/MTT-S International Microwave Symposium-IMS, pp. 1003-1005. IEEE, 2018.

The magnetic flux control system may further comprise a quadrature signal demodulator. Sec, e.g., Kono, Shingo, Kazuki Koshino, Yutaka Tabuchi, Atsushi Noguchi, and Yasunobu Nakamura. "Quantum non-demolition detection of an itinerant microwave photon." Nature Physics 14, no. 6 (2018): 546-549.

The control system may be configured to, within a decoherence time of a qubit, maintain a first magnetic flux associated with the qubit, and maintain a second magnetic flux associated with the qubit, wherein the first magnetic flux and the second magnetic flux are different.

The superconducting inductor may be further configured to couple the integrated magnetic flux with a quantum computing circuit comprising at least one qubit circuit having a physical property tunable dependent on at least the magnetic flux, and the control system may be configured to, within a decoherence time of the at least one qubit, maintain a first state of the physical property of the at least one qubit, and subsequently maintain a second state of the physical property of the at least one qubit, wherein the first state and the second state are different.

The physical property may comprise a microwave resonance.

The superconducting inductor may be further configured to couple the integrated magnetic flux with a quantum computing circuit comprising a transmon qubit circuit having a microwave resonance tunable dependent on at least the magnetic flux, and the control system may be configured to, within a quantum calculation period of the transmon qubit, define a first microwave resonant frequency of the transmon qubit, and subsequently define a second microwave resonant frequency of the transmon qubit, wherein the first microwave resonant frequency and the second microwave resonant frequency are different.

The magnetic flux control system may further comprise a magnetometer configured to measure the integrated magnetic flux. The magnetometer may comprise a superconducting quantum interference detector (SQUID) magnetometer. The magnetometer may comprise a superconducting quantum interference filter (SQIF) magnetometer. The control system may further comprise an input for receiving a signal dependent on an output of the magnetometer.

The control system may further comprise an input for receiving a reference frequency signal, an input for receiving a microwave resonance signal, and a comparing circuit producing an output for controlling the magnetic flux to increase or decrease.

The control system may receive control signals comprising a reference frequency signal, and a microwave resonance signal, the control system further comprising a comparing circuit producing an output for controlling the magnetic flux to increase or decrease in dependence on an output of the comparing circuit.

The control system may receive at least one control signal selectively dependent on a signal from a qubit during a quantum computing calculation representing a calculation state of the qubit during a phase of quantum computing, and controls the magnetic flux selectively dependent on the calculation state of the qubit during a subsequent phase of quantum computing.

The magnetic flux control system may further comprise at least one memory configured to persistently store a calibration value, wherein the control system produces the sequence of single-flux-quantum pulses dependent on the persistently stored calibration value. An input may be provided to receive the calibration value. A circuit may be provided to determine the calibration value.

The magnetic flux control system may further comprise a circuit configured to reset the integrated magnetic flux to a predetermine value, e.g., by providing an element that temporarily transitions from a superconducting state to a non-superconducting state to dissipate energy stored in the superconducting inductor.

The control system may be configured to produce at least two types of the sequence of single-flux-quantum pulses, comprising a first type having a first number of single-flux-quantum pulses to change the integrated magnetic flux by a first amount, and second type having a second number of single-flux-quantum pulses to change the integrated magnetic flux by a second amount, the first number being different from the second number.

The control system may be configured to produce at least two types of the sequence of single-flux-quantum pulses, a first type which changes the integrated magnetic flux by a first amount, and second type which changes the integrated magnetic flux by a second amount, the first amount and the second amount being different.

The control system may be configured to produce at least four types of the sequence of single-flux-quantum pulses, comprising a first type having a first number of single-flux-quantum pulses to increase the integrated magnetic flux by a first amount, second type having a second number of single-flux-quantum pulses to increase the integrated magnetic flux by a second amount, a third type having a third number of single-flux-quantum pulses to decrease the integrated magnetic flux by a third amount, and fourth type having a fourth number of single-flux-quantum pulses to decrease the integrated magnetic flux by a second amount, the first number being different from the second number; and the third number being different from the fourth number.

The control system may be configured to produce at least four types of the sequence of single-flux-quantum pulses, a first type which increases the integrated magnetic flux by a first amount, second type which increases the integrated magnetic flux by a second amount, a third type which decreases the integrated magnetic flux by a third amount, and fourth type which decreases the integrated magnetic flux by a fourth amount, the first amount and the second amount being different, and the third amount and the fourth amount being different.

The control system may be configured to produce at least three respectively different types of the sequence of single-flux-quantum pulses, a first type which changes the integrated magnetic flux by a first amount, a second type which changes the integrated magnetic flux by a second amount, and a third type which changes the integrated magnetic flux by a third amount.

The control system may receive at least one control signal representing an amount of change of the integrated magnetic flux, and the control system may be configured to produce at least the first type, the second type, and the third type selectively dependent on the at least one control signal representing an amount of change of the integrated magnetic flux.

The control system may be configured to produce at least two different types of the sequence of single-flux-quantum pulses for increasing the integrated magnetic flux, a first type which produces a single single-flux-quantum pulse and a second type which produces a plurality of single-flux-quantum pulses.

The control system may be configured to produce at least two different types of the sequence of single-flux-quantum pulses for decreasing the integrated magnetic flux, a third type which produces a single single-flux-quantum pulse and a fourth type which produces a plurality of single-flux-quantum pulses.

The control system may be configured to produce at least three different types of the sequence of single-flux-quantum pulses for increasing the integrated magnetic flux, a first type which produces a single single-flux-quantum pulse, a second type which produces a plurality of single-flux-quantum pulses comprising a first range, and a third type which produces a plurality of single-flux-quantum pulses comprising a second range. The first range and the second range may be different. The control system may be configured to produce at least three additional different types of the sequence of single-flux-quantum pulses for decreasing the integrated magnetic flux, a fourth type which produces a single single-flux-quantum pulse, a fifth type which produces a plurality of single-flux-quantum pulses comprising a third range, and a sixth type which produces a plurality of single-flux-quantum pulses comprising a fourth range. The first range and the second range are different, and the third range and the fourth range are different.

It is also an object to provide a flux bias control method, comprising: generating a sequence of single-flux-quantum pulses with a control system having a plurality of Josephson junctions; converting each pulse of the sequence of single-flux-quantum pulses into a magnetic flux with a superconducting circuit; and integrating the magnetic flux with a superconducting inductor, wherein the integrated magnetic flux may be increased and decreased corresponding to at least one control signal of the control system.

The superconducting inductor may couple the integrated magnetic flux with a quantum computing circuit comprising at least one qubit circuit having physical properties tunable dependent on at least the magnetic flux.

The control system may maintain a constant physical property of the at least one qubit over a period.

The control system may dynamically vary the physical property of the at least one qubit over time.

The superconducting inductor may couple the integrated magnetic flux with a qubit circuit having physical properties tunable dependent on at least the magnetic flux.

The control system may maintain a constant physical property of the qubit over a period.

The control system may dynamically vary the physical property of the qubit over time.

A control system feedback signal may be received. A pair of feedback signals may be received representing respectively an excess of magnetic flux and a deficiency of magnetic flux.

A pair of outputs may be provided producing signals representing an increase of magnetic flux and a decrease of magnetic flux.

The control system implements a phase locked loop control and/or a frequency locked loop control.

The magnetic flux control method may receive an optical control signal and/or a photonic control signal, and may produce an optical output signal and/or a photonic output signal.

A microwave signal may be detected with a heterodyne detector or a homodyne detector.

A phase-sensitive amplifier may be provided for amplifying a microwave signal which interacts with at least one qubit. A Josephson parametric amplifier may be provided for amplifying signals associated with at least one qubit. The microwave signal may be an output of a qubit, have a characteristic dependent on the qubit. In some cases, a plurality of qubits are coupled, and an output signal derived from one qubit may be used to influence another qubit.

A quadrature microwave signal may be generated with a quadrature oscillator. A microwave signal may be demodulated with a quadrature signal demodulator.

Within a decoherence time of a qubit, a first magnetic flux associated with the qubit may be maintained, and subsequently a second magnetic flux associated with the qubit maintained, wherein the first magnetic flux and the second magnetic flux are different.

The magnetic flux control method may further comprise coupling the integrated magnetic flux with a quantum computing circuit comprising at least one qubit circuit having a physical property tunable dependent on at least the magnetic flux, and within a decoherence time of the at least one qubit maintaining a first state of the physical property of the at least one qubit, and subsequently maintaining a second state of the physical property of the at least one qubit, wherein the first state and the second state are different.

The physical property may comprise a microwave resonance.

The superconducting inductor may couple the integrated magnetic flux with a quantum computing circuit comprising a transmon qubit circuit having a microwave resonance tunable dependent on at least the magnetic flux, further comprising, within a quantum calculation period of the transmon qubit: defining a first microwave resonant frequency of the transmon qubit, and subsequently defining a second microwave resonant frequency of the transmon qubit, wherein the first microwave resonant frequency and the second microwave resonant frequency are different.

A magnetometer sensor may be provided to measure the integrated magnetic flux. The magnetometer may comprise a superconducting quantum interference detector (SQUID) magnetometer. The magnetometer may comprise a superconducting quantum interference filter (SQIF) magnetometer. A control system input signal dependent on an output of the magnetometer may be provided.

The magnetic flux control method may further comprise comparing a reference frequency signal, and a microwave resonance signal, and controlling the magnetic flux to increase or decrease in dependence on the comparing.

The magnetic flux control method may further comprise receiving control signals comprising a reference frequency signal, and a microwave resonance signal; comparing the reference frequency signal, and a microwave resonance signal to produce a comparing output; and controlling the magnetic flux to increase or decrease in dependence on the comparing output.

The magnetic flux control method may further comprise receiving at least one control signal selectively dependent on a signal from a qubit during a quantum computing calculation representing a calculation state of the qubit during a phase of quantum computing; and controlling the magnetic flux selectively dependent on the calculation state of the qubit during a subsequent phase of quantum computing.

The magnetic flux control method may further comprise storing a calibration value in a memory, register or analog storage; and producing the sequence of single-flux-quantum pulses dependent on the persistently stored calibration value. The calibration value may be received from an external input. The calibration value may be determined within the control system.

The integrated magnetic flux may be reset to a predetermine value. The integrated magnetic flux may be reset by causing at least one superconducting element associated with the superconducting inductor to become temporarily resistive while a portion of the superconducting inductor remains superconductive. The at least one superconducting element may comprise a superconducting quantum interference device (SQUID) which is induced to enter into a non-superconducting state by exceeding a critical current.

At least two types of the sequence of single-flux-quantum pulses may be produced, comprising a first type having a first number of single-flux-quantum pulses to change the magnetic flux by a first amount, and second type having a second number of single-flux-quantum pulses to change the integrated magnetic flux by a second amount, the first number being different from the second number.

At least two types of the sequence of single-flux-quantum pulses may be produced, comprising a first type which changes the integrated magnetic flux by a first amount, and second type which changes the integrated magnetic flux by a second amount, the first amount and the second amount being different.

At least four types of the sequence of single-flux-quantum pulses may be produced, comprising a first type having a first number of single-flux-quantum pulses to increase the integrated magnetic flux by a first amount, second type having a second number of single-flux-quantum pulses to increase the integrated magnetic flux by a second amount, a third type having a third number of single-flux-quantum pulses to decrease the integrated magnetic flux by a third amount, and fourth type having a fourth number of single-flux-quantum pulses to decrease the integrated magnetic flux by a second amount, the first number being different from the second number; and the third number being different from the fourth number.

At least four types of the sequence of single-flux-quantum pulses may be produced, a first type which increases the integrated magnetic flux by a first amount, second type which increases the integrated magnetic flux by a second amount, a third type which decreases the integrated magnetic flux by a third amount, and fourth type which decreases the integrated magnetic flux by a fourth amount, the first amount and the second amount being different, and the third amount and the fourth amount being different.

The magnetic flux control method may further comprise producing at least three respectively different types of the sequence of single-flux-quantum pulses, a first type which changes the integrated magnetic flux by a first amount, a second type which changes the integrated magnetic flux by a second amount, and a third type which changes the integrated magnetic flux by a third amount. The method may further comprise receiving at least one control signal representing an amount of change of the integrated magnetic flux, and the control system may be configured to produce at least the first type, the second type, and the third type selectively dependent on the at least one control signal representing an amount of change of the integrated magnetic flux.

The magnetic flux control method may further comprise producing at least two different types of the sequence of single-flux-quantum pulses for increasing the integrated magnetic flux, a first type which produces a single single-flux-quantum pulse and a second type which produces a plurality of single-flux-quantum pulses. The method may further comprise producing at least two different types of the sequence of single-flux-quantum pulses for decreasing the integrated magnetic flux, a third type which produces a single single-flux-quantum pulse and a fourth type which produces a plurality of single-flux-quantum pulses.

The magnetic flux control method may further comprise producing at least three different types of the sequence of single-flux-quantum pulses for increasing the integrated magnetic flux, a first type which produces a single single-flux-quantum pulse, a second type which produces a plurality of single-flux-quantum pulses comprising a first range, and a third type which produces a plurality of single-flux-quantum pulses comprising a second range. The first range and the second range may be different. At least three additional different types of the sequence of single-flux-quantum pulses for decreasing the integrated magnetic flux may be produced, a fourth type which produces a single single-flux-quantum pulse, a fifth type which produces a plurality of single-flux-quantum pulses comprising a third range, and a sixth type which produces a plurality of single-flux-quantum pulses comprising a fourth range. The first range and the second range may be different, and the third range and the fourth range may be different.

The magnetic flux from the sequence of single-flux-quantum pulses may be integrated by the superconducting inductor, such that successive single-flux-quantum pulses cause a change in a current in the superconducting inductor by a quantized amount.

The control system may selectively produce single-flux-quantum pulses representing different polarities.

The control system may selectively produce single-flux-quantum pulses of a first type and single-flux-quantum pulses of a second type, wherein the single-flux-quantum pulse of the first type causes an increase in a current in the superconducting inductor, and the single-flux-quantum pulse of the second type causes a decrease in the current in the superconducting inductor. The superconducting circuit may comprise a superconducting transformer primary inductor, coupled to the superconducting inductor as a superconducting transformer secondary inductor. The superconducting transformer primary inductor may have a first terminal and a second terminal, wherein the single-flux-quantum pulse of the first type enters the superconducting transformer primary inductor at the first terminal, and the single-flux-quantum pulse of the second type enters the superconducting transformer primary inductor at the second terminal, such that the single-flux-quantum pulse of the first type acts with opposite polarity with respect to the single-flux-quantum pulse of the first type with respect to changes in the magnetic flux.

The control system may be configured to receive a target value for the magnetic flux, the system further comprising a counter configured to count the single-flux-quantum pulses and cease the sequence of single-flux-quantum pulses when the counter value corresponds to the target value.

The control system may be configured to receive a feedback signal for the magnetic flux, the system further comprising a gate configured to cease the sequence of single-flux-quantum pulses (or their effect on the integrated magnetic flux) when the feedback signal indicates a sufficient correction in the magnetic flux.

The control system may receive a feedback signal and in dependence thereon selectively produce a continuous series of single-flux-quantum pulses of a first type or selectively produce a continuous series of single-flux-quantum pulses of a second type, wherein the single-flux-quantum pulse of the first type causes an increase in a current in the superconducting inductor, and the single-flux-quantum pulse of the second type causes a decrease in the current in the superconducting inductor.

The control system may receive a target value and in dependence thereon selectively produce and count a continuous series of single-flux-quantum pulses of a first type or of a second type, until the count corresponds to the target value, wherein the single-flux-quantum pulse of the first type causes an increase in a current in the superconducting inductor, and the single-flux-quantum pulse of the second type causes a decrease in the current in the superconducting inductor. The counter acts as a numerical integrator for the pulses. Since the pulses are quantized, their cumulative effect correlates with their numerosity.

The control system may receive a feedback signal and in dependence thereon selectively produce: a continuous series of single-flux-quantum pulses of a first type; or a continuous series of single-flux-quantum pulses of a second type; or an output representing no net single-flux-quantum pulses; wherein the single-flux-quantum pulse of the first type causes an increase in a current in the superconducting inductor, the single-flux-quantum pulse of the second type causes a decrease in the current in the superconducting inductor, and the output representing no net single-flux-quantum pulses produces no net change in the current in the superconducting inductor. The output representing no net single-flux-quantum pulses may comprise no single-flux-quantum pulses. The output may represent no net single-flux-quantum pulses may comprise offsetting single-flux-quantum pulses of the first type and single-flux-quantum pulses of the second type.

The control system may receive a target value and in dependence thereon selectively: increment a counter based on a continuous series of single-flux-quantum pulses of a first type until the count increases to the target value; decrement the counter based on a continuous series of single-flux-quantum pulses of a second type until the count decreases to the target value; or suppress net single-flux-quantum pulses while the counter corresponds to an error margin of the target value, wherein the single-flux-quantum pulse of the first type causes an increase in a current in the superconducting inductor, and the single-flux-quantum pulse of the second type causes a decrease in the current in the superconducting inductor. The suppressed net single-flux-quantum pulses may comprise no single-flux-quantum pulses and/or offsetting single-flux-quantum pulses of the first type and single-flux-quantum pulses of the second type.

The system may further comprise a sensor configured to measure the magnetic flux, a sensor configured to measure the physical properties, and/or an input configured to receive a feedback signal dependent on a performance of the plurality of qubits.

The at least one qubit may comprise a plurality of qubits and couplers between the plurality of qubits, having physical properties tunable dependent on the magnetic flux. The qubits may be superconducting qubits.

The control system may selectively produce single-flux-quantum pulses of a first type and single-flux-quantum pulses of a second type, wherein the single-flux-quantum pulse of the first type cause a change in current in the superconducting inductor of a first amplitude, and the single-flux-quantum pulse of the second type causes a change in current in the superconducting inductor of a second amplitude, and wherein the single-flux-quantum pulse of the first type is produced independently of the single-flux-quantum pulse of the second type. The single-flux-quantum pulse of the first type may cause a change in the current in the superconducting inductor which has an absolute value smaller than the change in the current in the superconducting inductor caused by the single-flux-quantum pulse of the second type.

A reset may be provided, configured to establish the magnetic flux at a predetermined value, e.g., zero. The reset may comprise a reset inductor coupled to a superconducting quantum interference device (SQUID) in series with the superconducting inductor, wherein a current in the reset inductor is sufficient to drive the SQUID above its critical current and become resistive and therefore dissipative of energy stored in the superconducting inductor.

It is also an object to provide a flux bias control method, comprising generating a sequence of single-flux-quantum pulses with a control system comprising a plurality of Josephson junctions; converting the sequence of single-flux-quantum pulses into a magnetic flux; coupling the magnetic flux with a quantum computing circuit comprising at least one qubit circuit with a superconducting inductor; and tuning physical properties of the qubit dependent on the magnetic flux.

The magnetic flux from the sequence of single-flux-quantum pulses may be integrated by the superconducting inductor, such that successive single-flux-quantum pulses cause a change in a current in the superconducting inductor by a quantized amount.

The generating may comprise selectively producing single-flux-quantum pulses representing different polarities with a control system.

Single-flux-quantum pulses of a first type and single-flux-quantum pulses of a second type may be selectively produced, wherein the single-flux-quantum pulse of the first type causes an increase in a current in the superconducting inductor, and the single-flux-quantum pulse of the second type causes a decrease in the current in the superconducting inductor.

The sequence of single-flux-quantum pulses may be converted into a magnetic flux by a superconducting circuit comprising a superconducting transformer primary inductor, coupled to the superconducting inductor as a superconducting transformer secondary inductor.

The superconducting transformer primary inductor may have a first terminal and a second terminal, wherein the single-flux-quantum pulse of the first type enters the superconducting transformer primary inductor at the first terminal, and the single-flux-quantum pulse of the second type enters the superconducting transformer primary inductor at the second terminal, such that the single-flux-quantum pulse of the first type acts with opposite polarity with respect to the single-flux-quantum pulse of the first type with respect to changes in the magnetic flux.

The method may further comprise receiving a target value for the magnetic flux; counting the sequence of single-flux-quantum pulses; and ceasing the single-flux-quantum pulses after the counter value corresponds to the target value.

The method may further comprise receiving a feedback signal for the magnetic flux dependent on a required correction of the magnetic flux; and gating the sequence of single-flux-quantum pulses when the feedback signal indicates a sufficient correction of the magnetic flux.

The method may further comprise receiving a feedback signal; and producing a continuous series of single-flux-quantum pulses of a first type or a second type selectively dependent on the feedback signal, wherein the single-flux-quantum pulse of the first type causes an increase in a current in the superconducting inductor, and the single-flux-quantum pulse of the second type causes a decrease in the current in the superconducting inductor.

The method may further comprise receiving a target value; and counting a continuous series of single-flux-quantum pulses of a first type or a second type, until the count corresponds to the target value; wherein the single-flux-quantum pulse of the first type causes an increase in a current in the superconducting inductor, and the single-flux-quantum pulse of the second type causes a decrease in the current in the superconducting inductor.

The method may further comprise receiving a feedback signal; and selectively producing a continuous series of single-flux-quantum pulses of a first type or of a second type or an output representing no net single-flux-quantum pulses, selectively dependent on the feedback signal; wherein the single-flux-quantum pulse of the first type causes an increase in a current in the superconducting inductor, the single-flux-quantum pulse of the second type causes a decrease in the current in the superconducting inductor, and the output representing no net single-flux-quantum pulses produces no net change in the current in the superconducting inductor.

The output representing no net single-flux-quantum pulses may comprise no single-flux-quantum pulses and/or offsetting single-flux-quantum pulses of the first type and single-flux-quantum pulses of the second type.

The method may further comprise receiving a target value; selectively incrementing a counter based on a continuous series of single-flux-quantum pulses of a first type if the count is below the target value; selectively decrementing the counter based on a continuous series of single-flux-quantum pulses of a second type if the count is above the target value; and selectively suppressing net single-flux-quantum pulses if the count corresponds to an error margin of the target value, wherein the single-flux-quantum pulse of the first type causes an increase in a current in the superconducting inductor, and the single-flux-quantum pulse of the second type causes a decrease in the current in the superconducting inductor. The suppressed net single-flux-quantum pulses may comprise no single-flux-quantum pulses and/or offsetting single-flux-quantum pulses of the first type and single-flux-quantum pulses of the second type.

The method may further comprise measuring the magnetic flux or integrated magnetic flux with a sensor, and/or measuring the physical properties with a sensor, and/or receiving a feedback signal dependent on a performance of the plurality of qubits.

The at least one qubit may comprise a plurality of qubits and couplers between the plurality of qubits, having physical properties tunable dependent on the magnetic flux. The qubits may be superconducting qubits.

The method may further comprise selectively producing single-flux-quantum pulses of a first type and selectively producing single-flux-quantum pulses of a second type, wherein the single-flux-quantum pulses of the first type cause an change in current in the superconducting inductor of a first amplitude, and the single-flux-quantum pulses of the second type cause a change in current in the superconducting inductor of a second amplitude, and wherein the single-flux-quantum pulse of the first type is produced independently of the single-flux-quantum pulse of the second type. The single-flux-quantum pulse of the first type may cause a change in the current in the superconducting inductor which has an absolute value smaller than the change in the current in the superconducting inductor caused by the single-flux-quantum pulse of the second type.

The method may further comprise resetting the magnetic flux to a predetermined value. The resetting may comprise passing a pulse through a reset inductor coupled to a superconducting quantum interference device (SQUID) in series with the superconducting inductor, wherein a pulse-induced current in the reset inductor is sufficient to drive the SQUID above its critical current and become resistive and therefore dissipative of energy stored in the superconducting inductor.

DETAILED DESCRIPTION OF THE PREFERRED EMBODIMENTS

Figure 1:
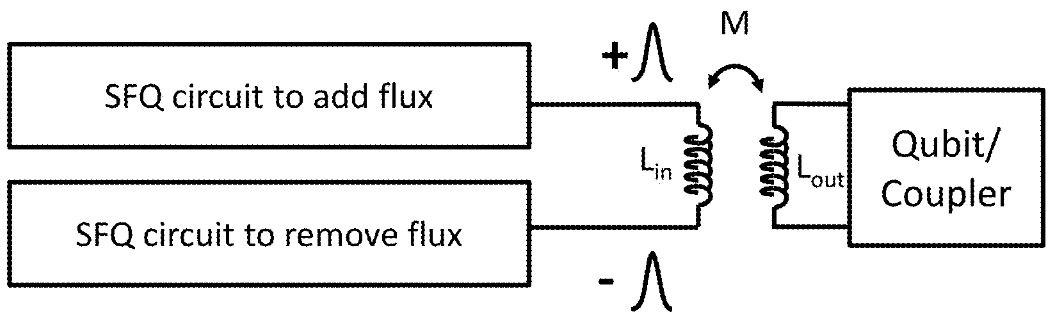
FIG. 1 shows a SFQ flux biasing circuit.

FIG. 1 shows a conceptual diagram of a preferred embodiment of a flux biasing circuit. This diagram comprises the flux biasing circuit itself, which generates a time-variable magnetic flux, inductively coupled to a superconducting qubit, or a superconducting coupler between two qubits (Qubit/Coupler). The inductive coupling comprises a transformer, generally without a magnetic core, with a primary inductance $L_{in}$, a secondary inductance $L_{out}$, and a mutual inductance M. The transformer lines preferably comprise a superconducting material, such as niobium or aluminum, at the cryogenic temperature of operation, so that they are essentially lossless with magnetic flux that is quantized as a multiple of the fluxon $\Phi_0$. Both the flux-biasing circuit and the qubit/coupler comprise a plurality of Josephson junctions. The flux biasing circuit and the qubit/coupler may be integrated circuits, which may be fabricated on the same chip, or alternatively they may be fabricated on separate chips that are coupled inductively in a flip-chip geometry.

FIG. 1 also comprises two digital SFQ generating circuits, which may be nominally identical, but which are connected to the primary inductance $L_{in}$ with opposite polarities, so as to correspond to magnetic flux of opposite signs.

Figure 2:
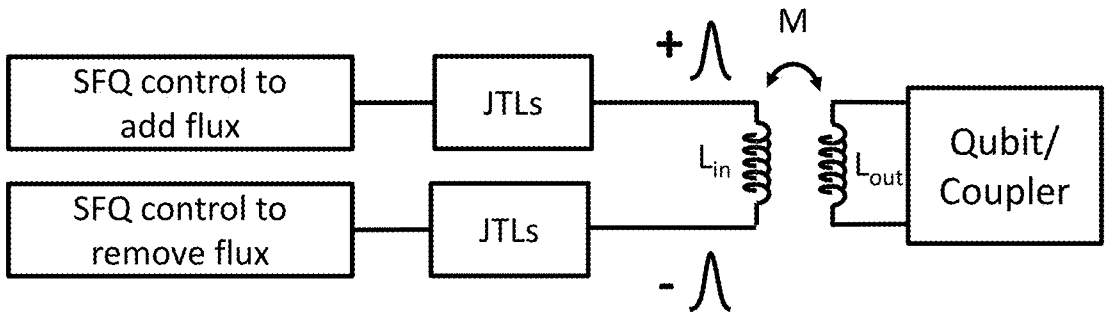
FIG. 2 shows a SFQ flux biasing using chain of JTLs.
Figure 3:
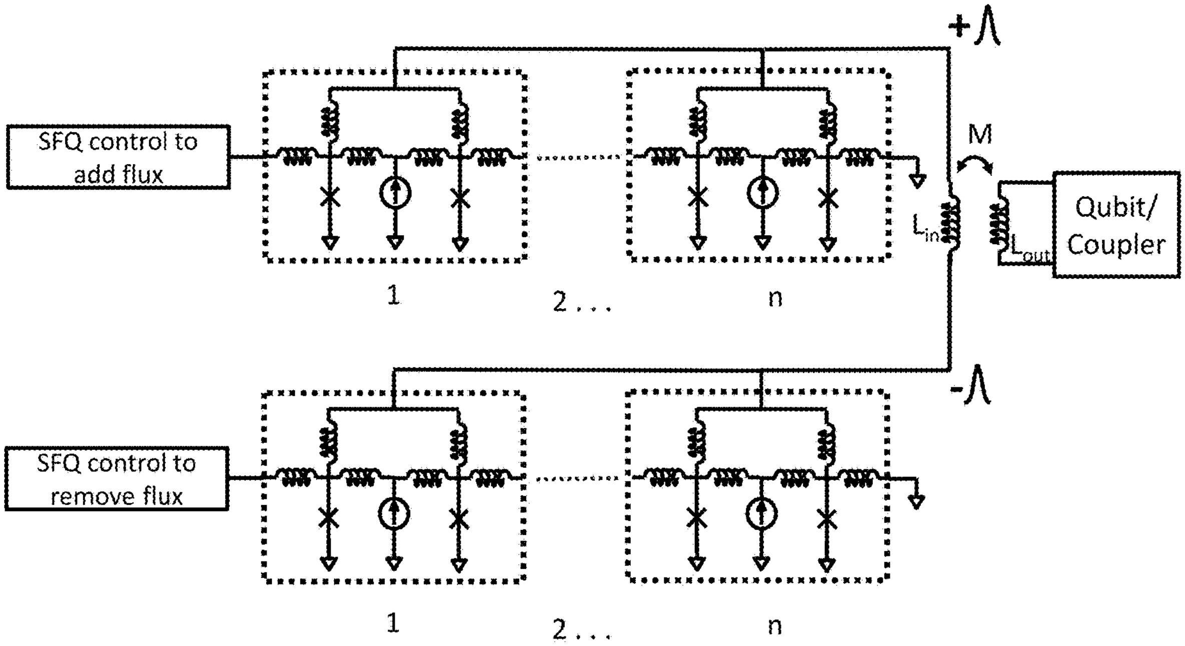
FIG. 3 shows a flux biasing using parallel JTLs.

This conceptual diagram is further refined in FIG. 2 to include Josephson Transmission Lines (JTLs) in each of the two channels. The JTLs are used to transport and shape the SFQ pulses, and may also be configured in parallel to achieve current gain, as shown in FIG. 3. While the JTL itself propagates an SFQ pulse in series, the parallel output configuration functions as a digital pulse multiplier, increasing the total flux by a factor of n of the parallel unit cells.

Figure 4:
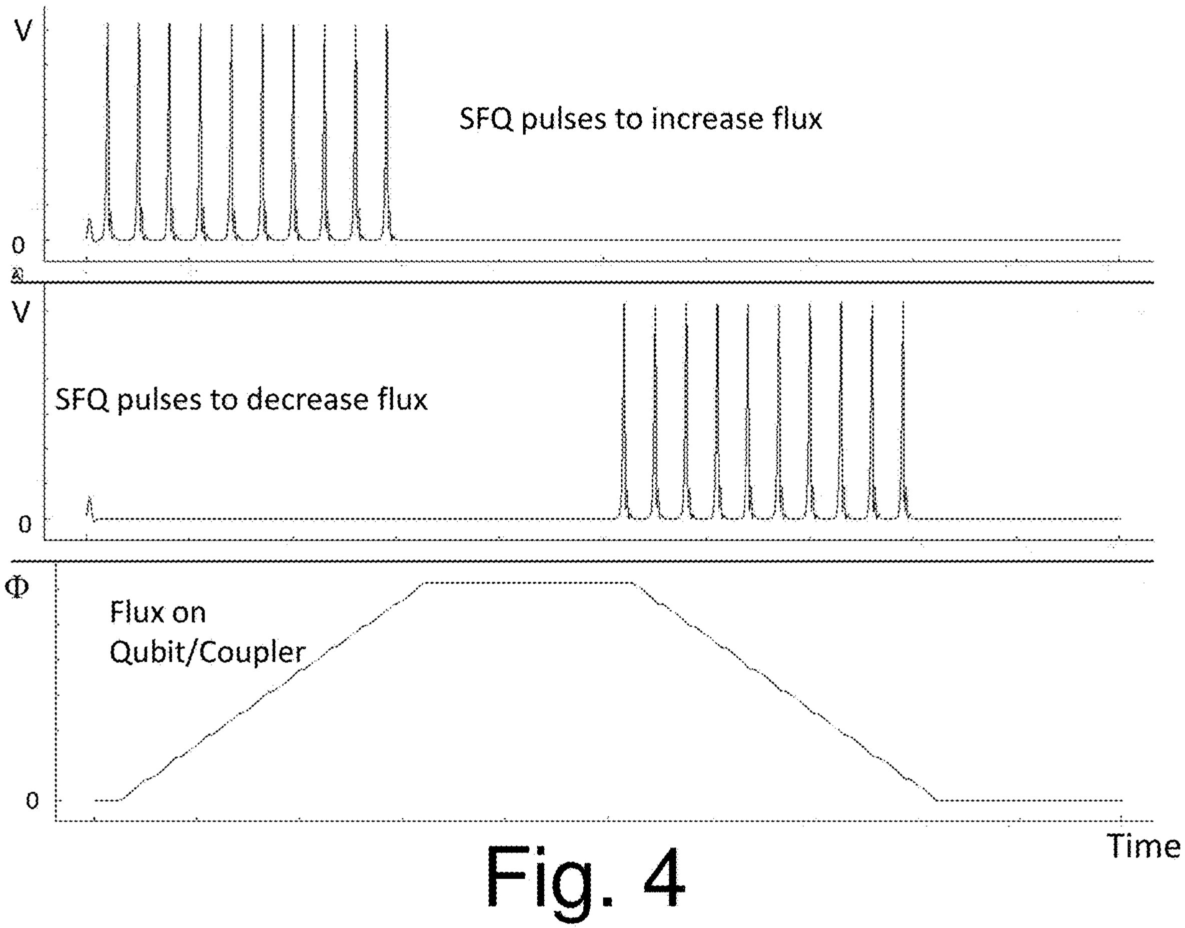
FIG. 4 shows a simulation of flux biasing by adding or removing magnetic fluxons.
Figure 5:
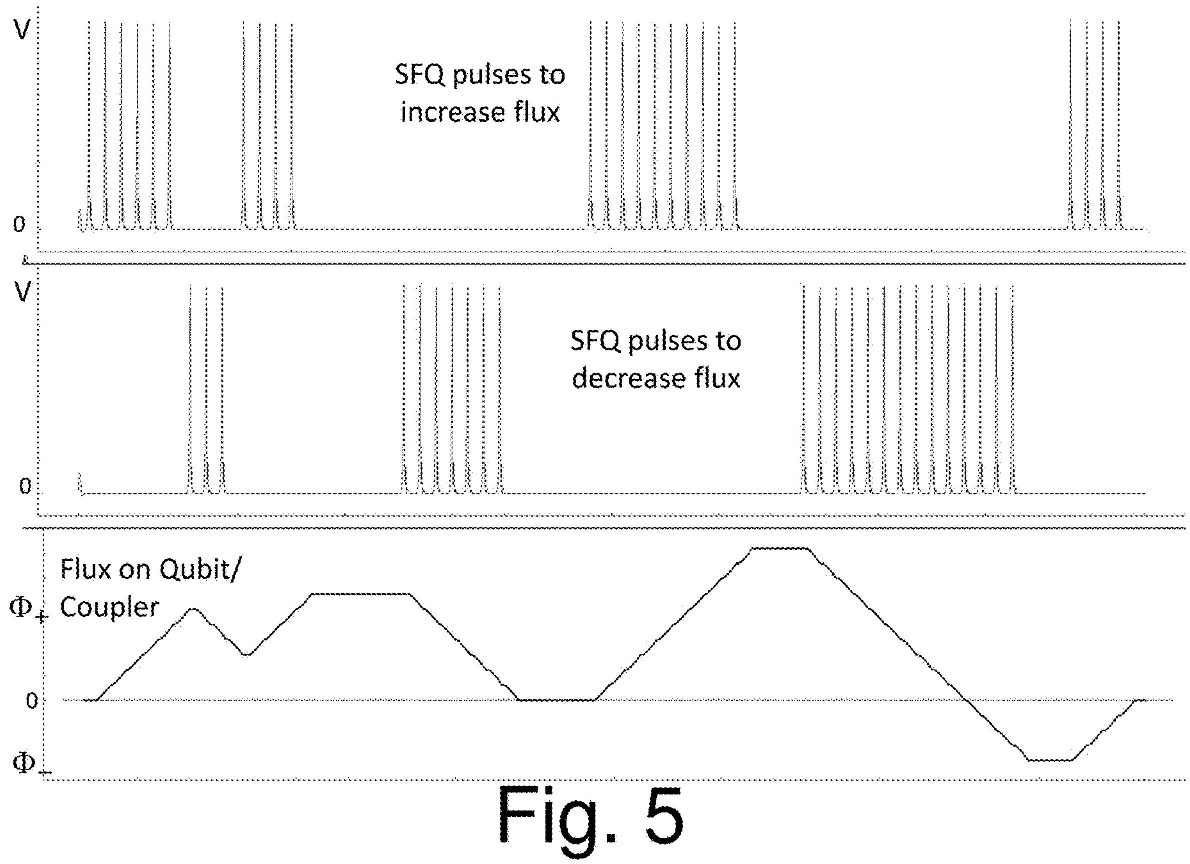
FIG. 5 shows an arbitrary-shape time-varying flux-biasing.

FIGS. 4 and 5 show two examples of time-varying flux profiles that may be generated by such positive and negative fluxon generators. FIG. 4 shows a simple profile that rises linearly, remains constant, and then ramps down again, while FIG. 5 represents an arbitrary variation in time. The time axis is not specified in either case, but the characteristic ramp time can be anywhere from 10 ps to 1 ns or longer, since the individual SFQ pulses have intrinsic pulsewidth of order 1-2 ps. This may be compared to the period of a qubit resonance, which may be of order 100 ps. So, the flux bias variation may occur either within a single resonance period, or over a plurality of resonance periods. Note also that while the SFQ pulses comprise very high frequency components, the circuits can be configured to filter out the highest frequency components to yield a smooth flux profile. Such a smooth flux profile will also not excite quasiparticles in the quantum portion of the circuit, which would tend to reduce quantum coherence times.

Figure 6:
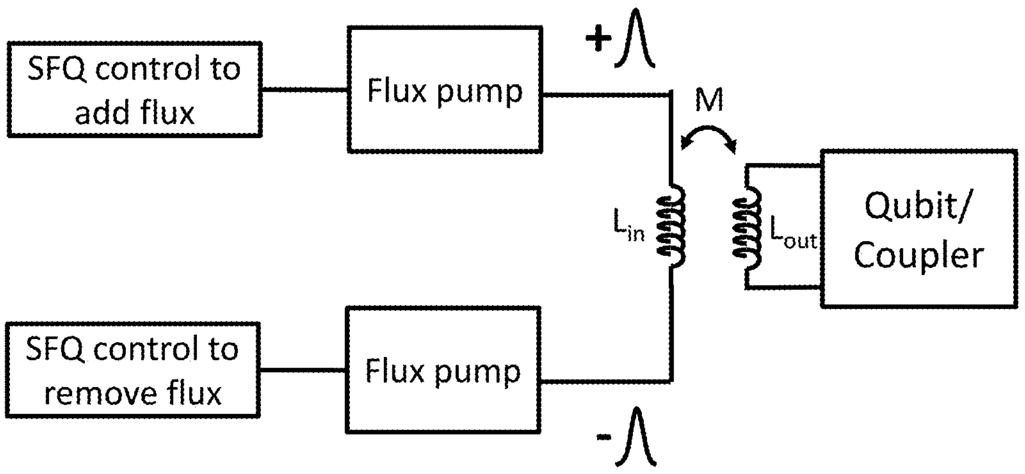
FIG. 6 shows a circuit for coarse flux biasing using flux pump.
Figure 7:
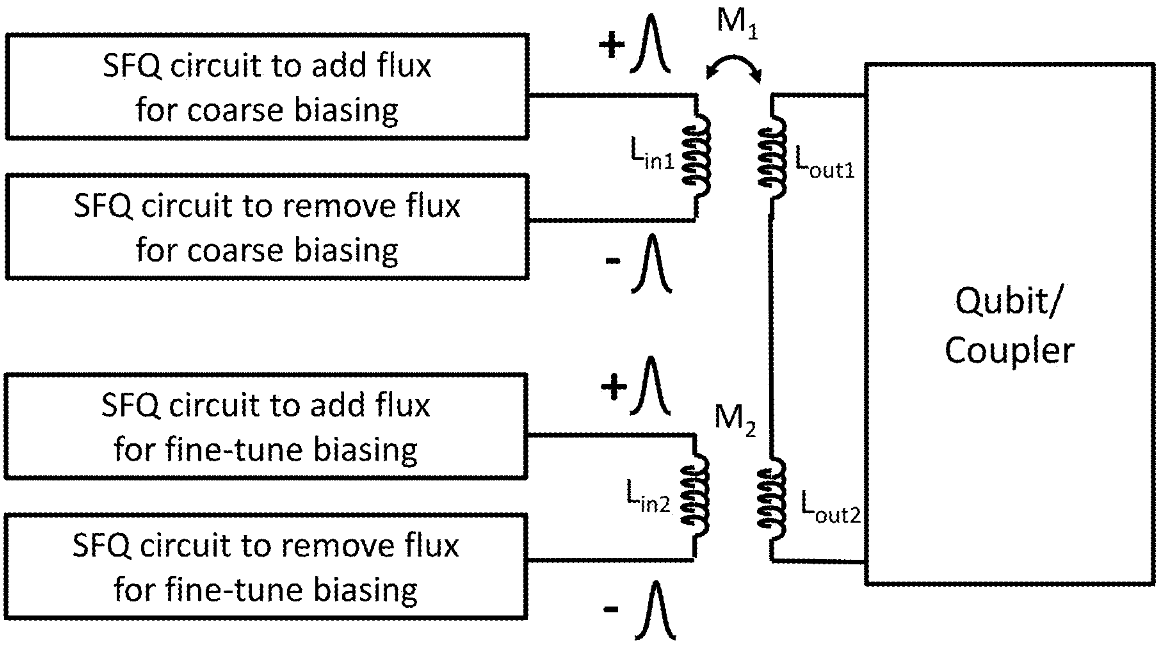
FIG. 7 shows a combining coarse and fine tune biasing.

A further embodiment of the flux biasing circuit is shown in FIGS. 6 and 7, and comprises a two-stage coarse and fine control. The coarse control may comprise a flux pump that multiplies the flux by a known factor. One embodiment of a flux pump is a SQUID relaxation oscillator, shown in FIGS. 14A-14C and described further below. The two-stage flux bias control permits high precision, high speed, and large dynamic range.

Figure 8:
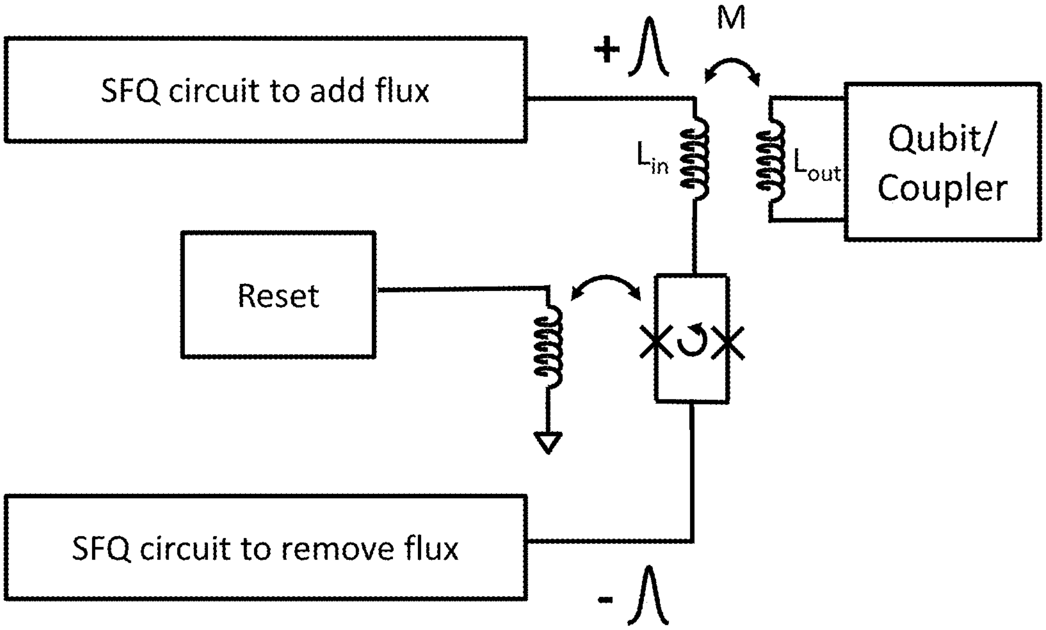
FIG. 8 shows a circuit to reset flux stored in the flux biasing circuit.

A further refinement is shown in FIG. 8, which resets the flux in the control loop to zero. This is achieved using a SQUID in series with the inductive storage loop. When a control SFQ pulse drives the SQUID above its critical current into its normal state, the loop becomes resistive, and the stored flux of either sign quickly escapes the loop.

Figure 9A:
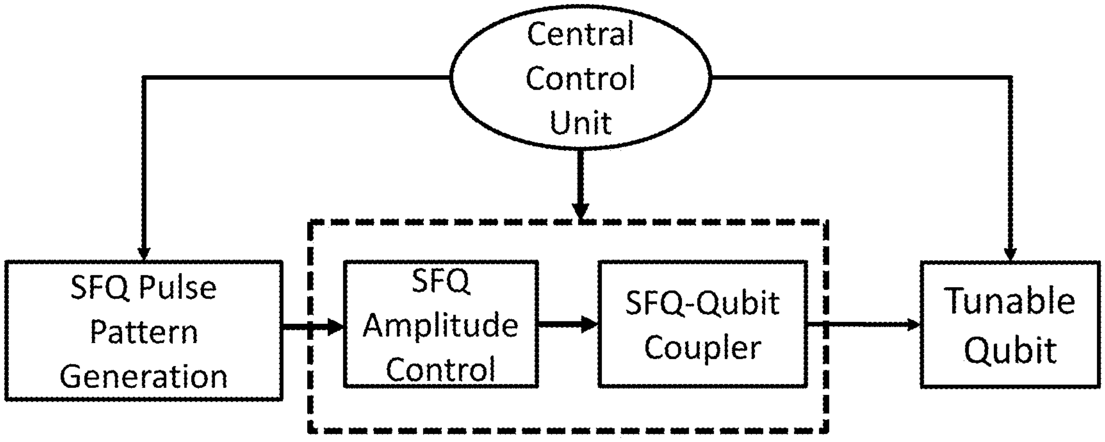
FIG. 9A shows a block diagram for single-qubit gate operation with time-variable flux biasing.

The block diagram in FIG. 9A shows the various ways that SFQ digital control may be applied to qubit control. In a preferred embodiment, all of these blocks comprise superconducting circuits located at cryogenic temperatures. The block on the top is the Central Control Unit, which provides the centralized source for clock pulses for synchronization and sequential timing. These clock pulses are also SFQ pulses. SFQ control signals include flux bias for the qubit, but also include other SFQ pulse sequences that can be used to induce quantum transitions, for example. These include the blocks labeled “SFQ Pattern Generation”, “SFQ Amplitude Control”, and “SFQ-Qubit Coupler”. These are similar to prior-art circuits for SFQ control, but here they may be properly synchronized with the flux biasing circuits for improved control.

Figure 9B:
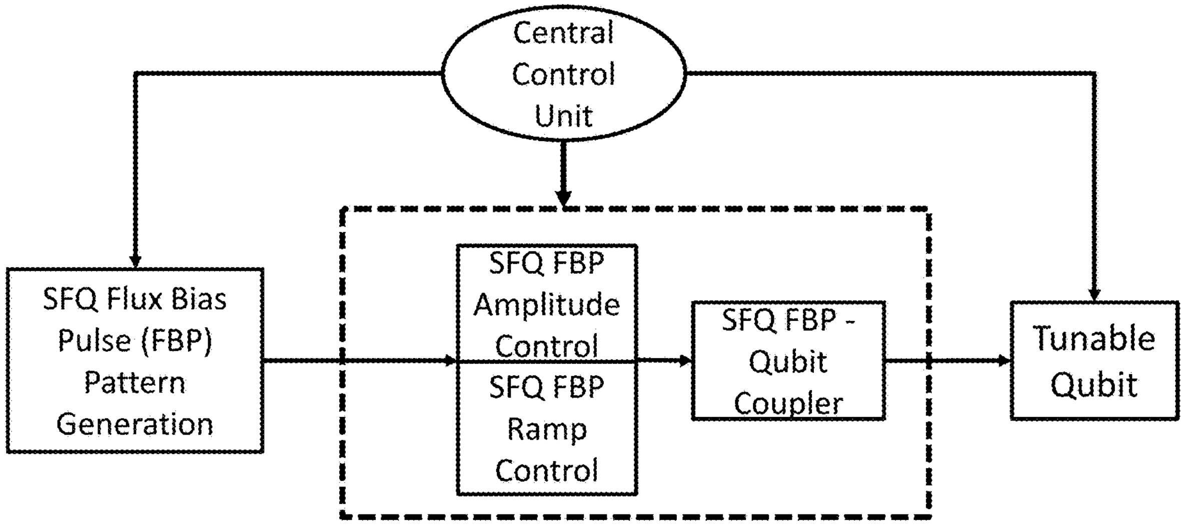
FIG. 9B shows a block diagram for single-qubit gate operation with time- and pulse rate-variable flux biasing.

The block diagram on FIG. 9B shows another embodiment, in which the qubit is controlled exclusively using flux bias pulses (FBP). The shape of the pulses is controlled using blocks “SFQ FBP Amplitude Control” and “SFQ FBP Ramp Control”. Specific control functions for these blocks are generated by “SFQ Flux Bias (FBP) Pattern Generation” block.

Figure 10A:
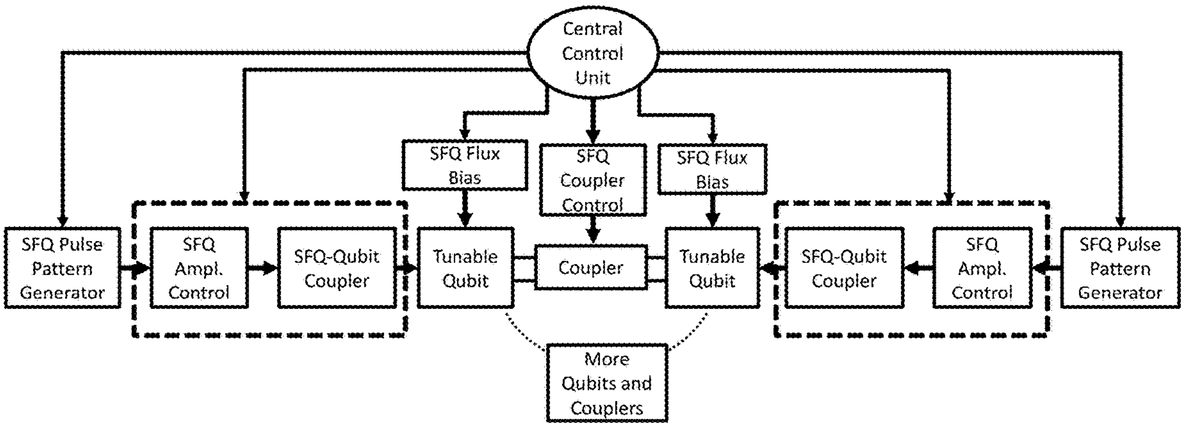
FIG. 10A shows a block diagram for multi-qubit gate operation with time-variable flux biasing of qubits and couplers.
Figure 10B:
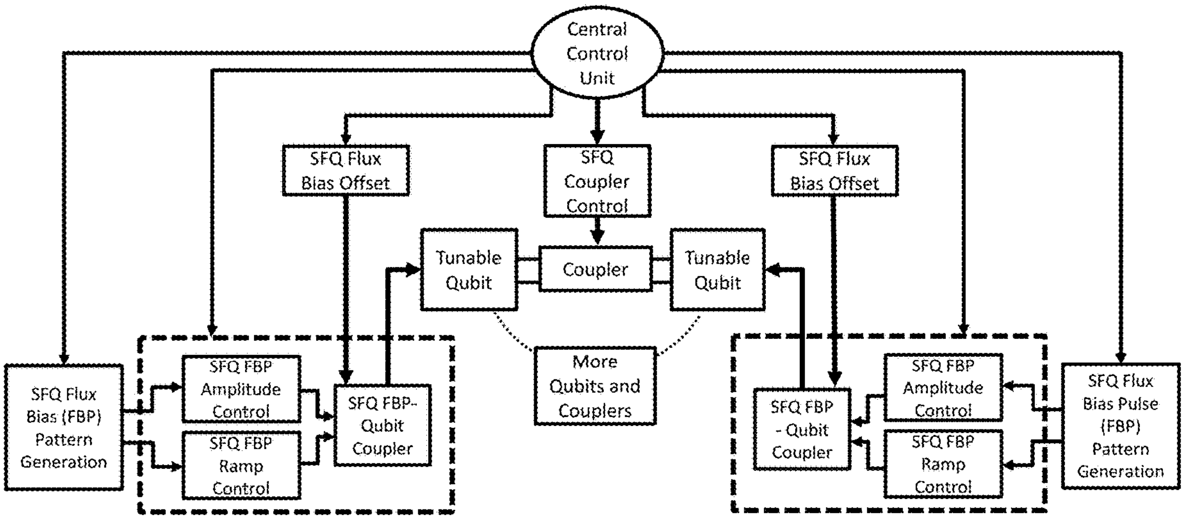
FIG. 10B shows a block diagram for multi-qubit gate operation with time- and pulse-rate-variable flux biasing of qubits and couplers.

FIGS. 10A and 10B take this one step further for two coupled qubits and beyond. The two tunable qubits linked by a coupler, shown in the center of the figure, comprise the superconducting quantum circuit itself. These may be linked to other qubits and couplers, as indicated on the bottom. The completely synchronized digital control at all levels enables new opportunities for precision control while minimizing decoherence of the quantum operation.

Figure 11:
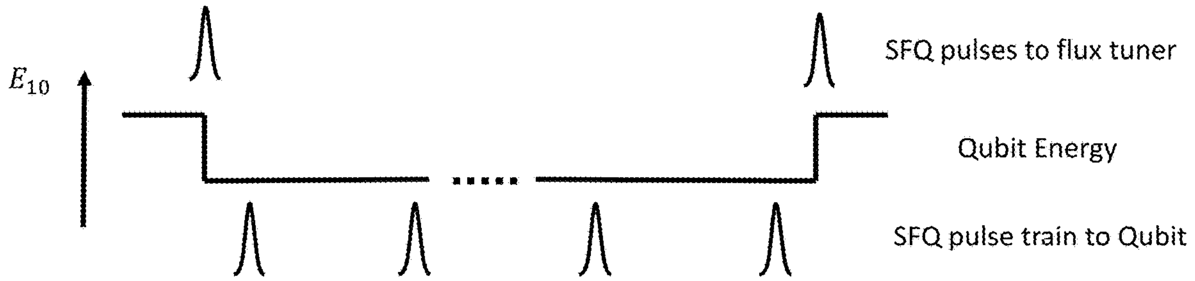
FIG. 11 shows a single qubit operation combining SFQ pulses for single qubit control and flux biasing.

An illustrative example of these two types of SFQ control is shown in FIG. 11. The pulses at the bottom (corresponding to opposite polarities) provide a flux bias that first tunes, then detunes, the energy of the qubit, shown in the middle. The pulses on top represent the resonant pulse train coupled to induce a transition of the qubit, during the time that its energy is properly tuned.

In addition to presenting the concept and method of superconducting digital flux bias of qubits, portions of a preferred embodiment have been designed, simulated, fabricated, and demonstrated experimentally.

Figure 12A:
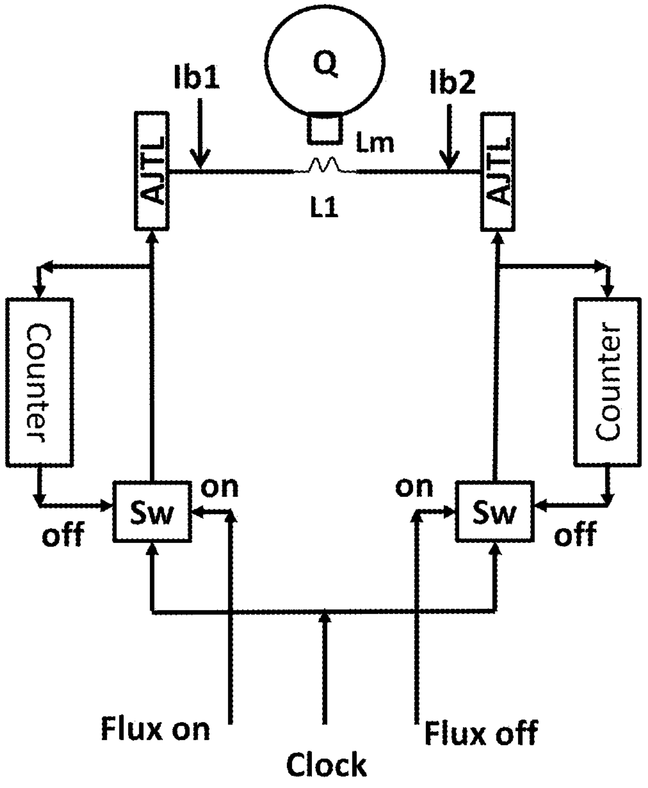
FIG. 12A shows a block diagram of a prototype SFQ flux bias circuit employing a counter.

FIG. 12A shows a block diagram of a flux bias control circuit similar to that shown in FIG. 3. This circuit includes positive and negative flux generating circuits, each with an amplifying JTL (AJTL), a switch, and a counter. This also includes a single coupling inductor L1 that couples magnetic flux to a qubit or coupler, labeled Q, and a superconducting clock source that sets the generation rate of SFQ pulses.

Figure 12B:
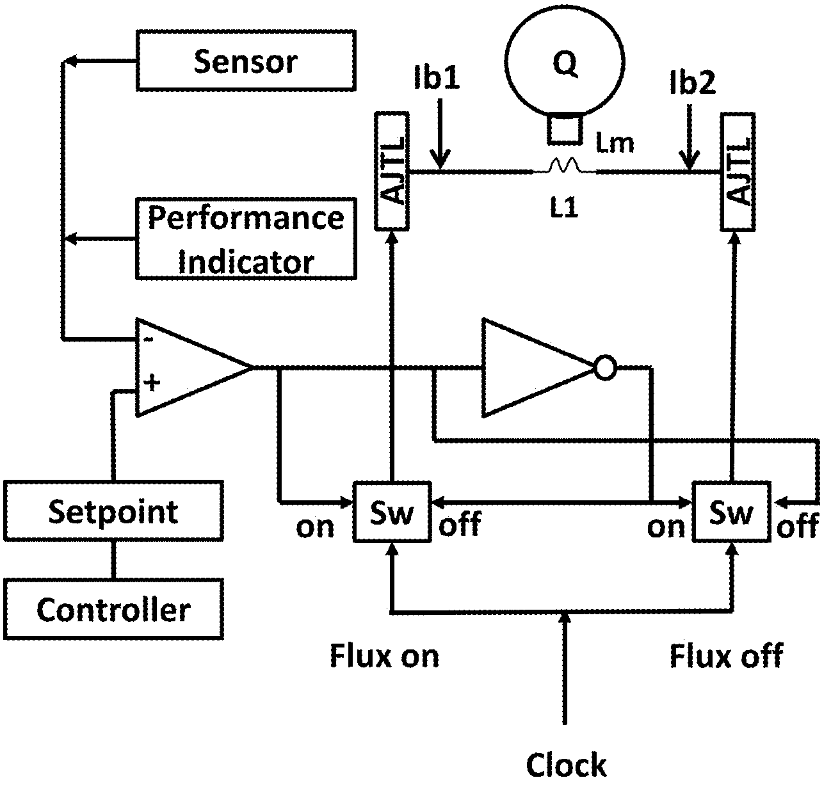
FIG. 12B shows a block diagram of a prototype SFQ flux bias circuit employing feedback.

Alternately, as shown in FIG. 12B, a flux bias control circuit similar to that shown in FIG. 3 is provided with a feedback input, based on a sensor measurement or a performance indicator dependent on the output of the qubit. This circuit also includes positive and negative flux generating circuits, each with an amplifying JTL (AJTL), a switch, a comparator for determining whether the magnetic flux is above or below the target value or setpoint, supplied by a controller, and an inverter for driving the opposite phase (Flux on vs. Flux off). The comparator may also have intrinsic complementary outputs. This also includes the single coupling inductor L1 that couples magnetic flux to the qubit or coupler, labeled Q, and a superconducting clock source that sets the generation rate of SFQ pulses. Not shown in 12B is an option for suppressing all pulses, for example when the sensor output or performance indicator demonstrates a sufficient proximity to the target that tuning is not required. Typically, this is produced by a digital control, a deadband control circuit, or hysteresis circuit, which advantageously may be implemented by adjusting the setpoint. The null tuning zone may be implemented by suppression of pulses or by presence of both Flux on and Flux off pulses. The former case reduces power dissipation. Typically, the comparator is implemented in digital logic, though an analog implementation is possible, so long as power dissipation is maintained at a low level. The comparator may be digital in amplitude and analog in time, and operate on phase relationships. For example, if the comparator is clocked, the output may be selectively dependent on whether one input precedes the clock and the other succeeds the clock. If both precede or succeed, then the comparator may produce a null output.

Figure 12C:
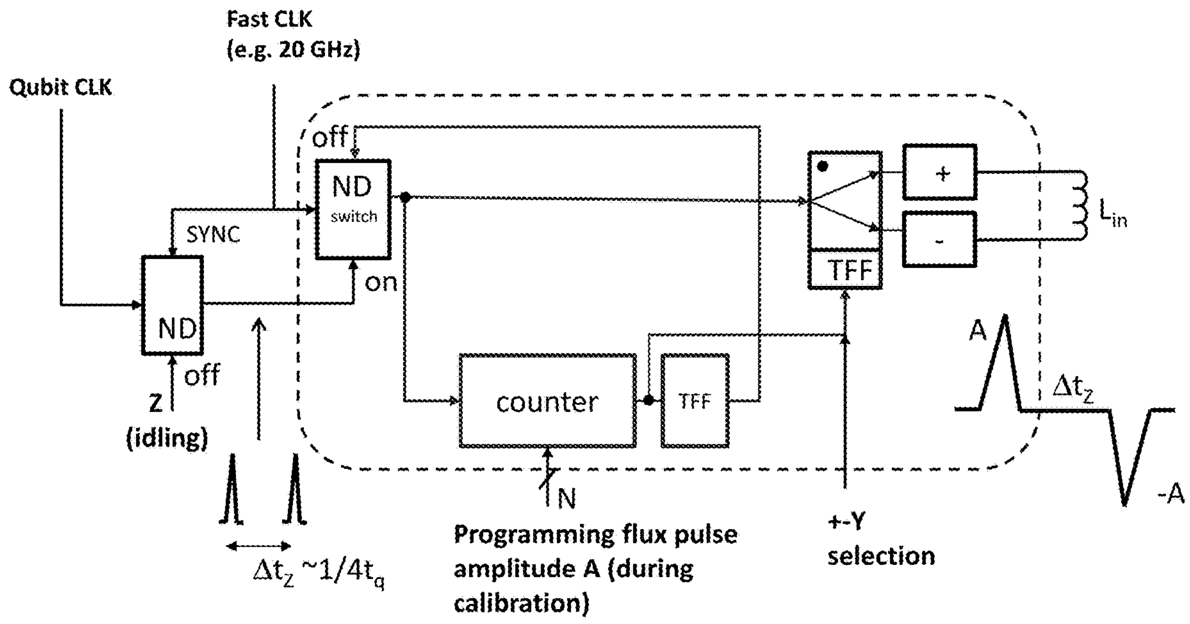
FIG. 12C shows a block diagram of a prototype SFQ flux bias circuit to produce net-zero flux bias pulses for fluxonium control.

FIG. 12C shows an example of an SFQ circuit to produce net-zero flux bias pulse which can be used for fluxonium control within a single qubit cycle (Larmor period). The net-zero pulse consists of two opposite polarity triangular flux bias pulses applied to the qubit with interval $\Delta t_Z$. The amplitude of each pulse is programmed using an SFQ counter, the carry signal of this counter triggers the polarity switch implemented using the toggle flip-flop (TFF). Non-destructive readout switches (ND) are used to control the beginning and completion of pulse generation.

Figure 12D:
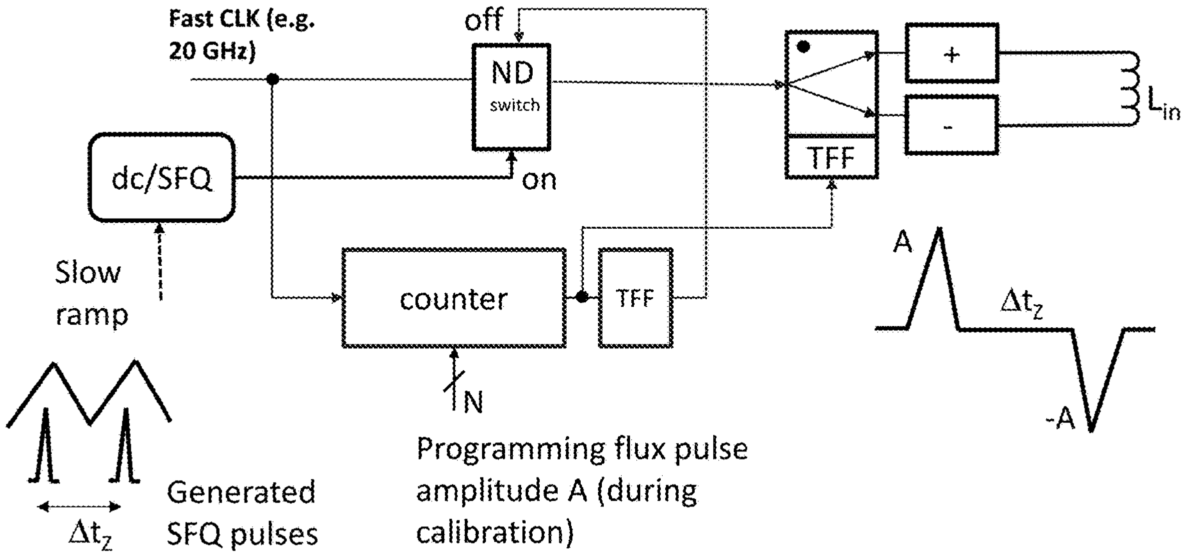
FIG. 12D shows a block diagram of a prototype low-hardware-overhead SFQ flux bias circuit to produce net-zero flux bias pulses for fluxonium control.

FIG. 12D shows an example of a simplified SFQ circuit to produce net-zero flux bias pulse similar to one described in FIG. 12C. The complexity reduction is achieved by using a dc/SFQ converter which generates control SFQ pulses to set the interval □$t_Z$ between the opposite polarity flux bias pulses. Although this scheme is simpler on the SFQ side, it requires a control signal for the dc/SFQ converter which can be generated by cryoCMOS or conventional room-temperature electronics.

Figure 13:
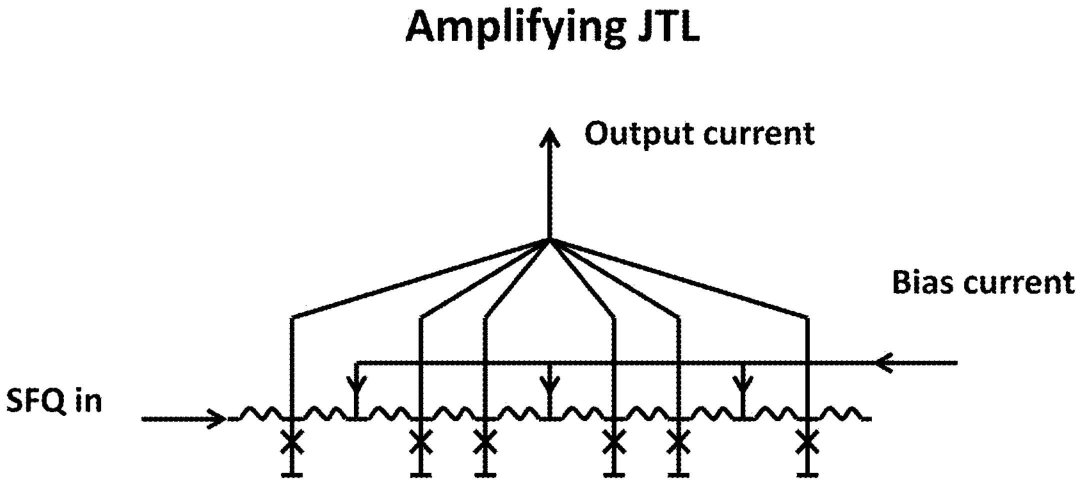
FIG. 13 shows a schematic of an amplifying JTL.
Figure 14A:
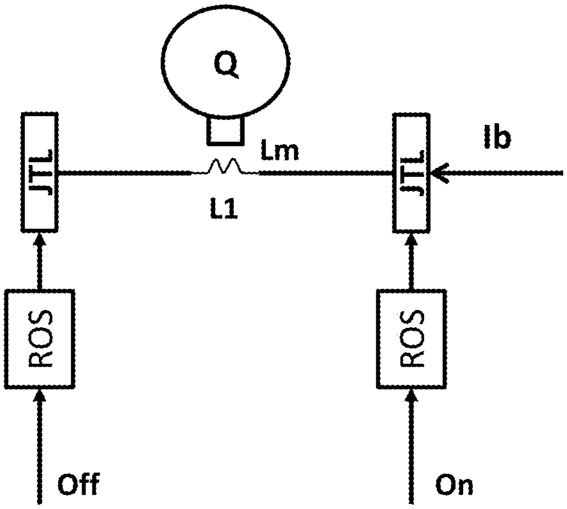
FIGS. 14A-14B show a block diagram and circuit schematic of a relaxation oscillator flux pump.
Figure 14B:
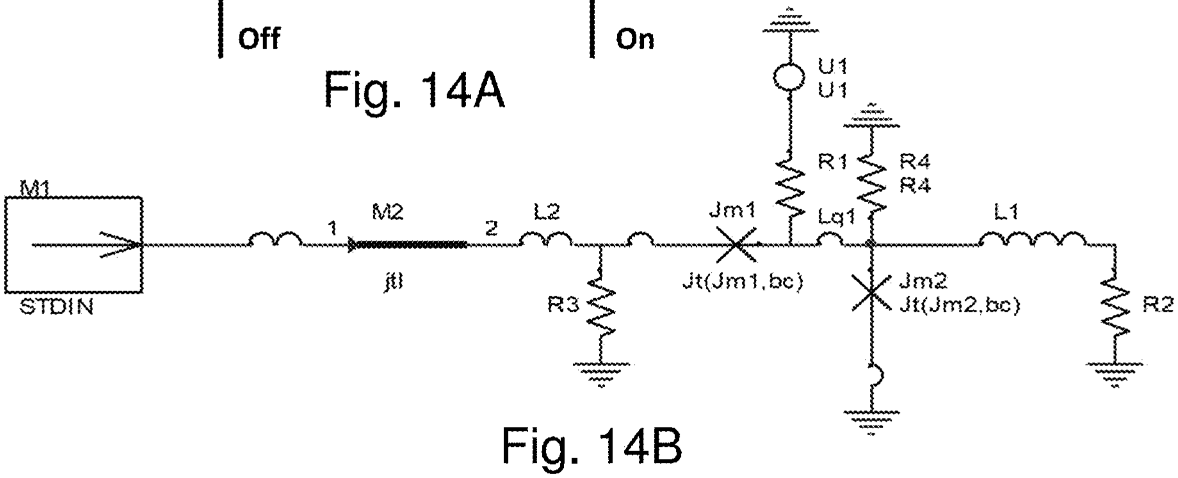
Figure 14C:
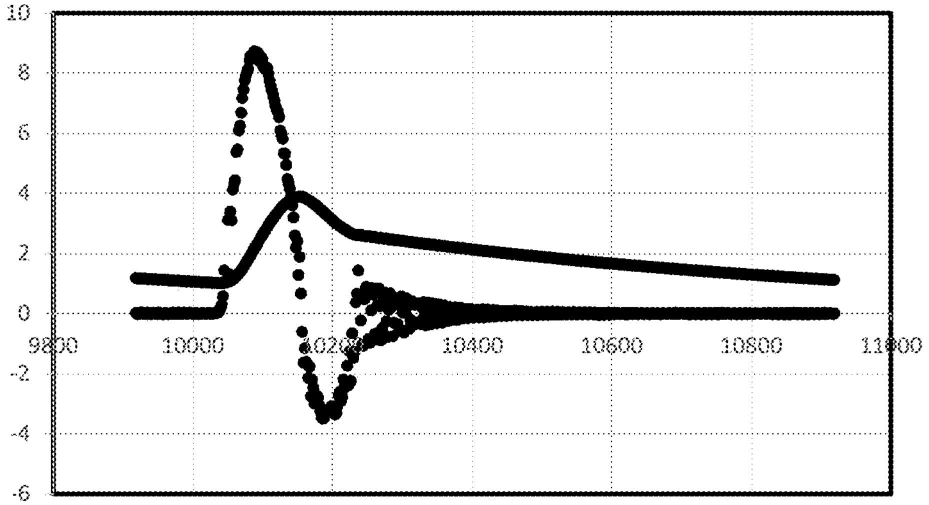
FIG. 14C shows a graph of a simulation of operation of the relaxation oscillator where the dotted curve shows the voltage output, and the solid curve represents the total flux output.

The AJTL can be a parallel JTL with 6 JTL stages in parallel, as shown in FIG. 13. Alternatively, a flux pump based on a relaxation oscillator (ROS) could be used, as shown in FIGS. 14A-14C. FIG. 14A shows the block diagram of the full flux bias circuit with two ROS circuits for both positive and negative flux. FIG. 14B shows the schematic of ROS, built around a hysteretic Josephson junction Jm2. When this junction switches, it remains in the voltage stage for an extended period of time, typically generating hundreds of fluxons or more. A simulation of operation of the ROS is shown in FIG. 14C, where the oscillating dotted curve shows the voltage output, and the solid curve with a long tail represents the total flux output. This ROS flux bias circuit would be particularly useful for the coarse channel of a two-stage flux bias circuit, as suggested in FIGS. 6 and 7.

Figure 15:
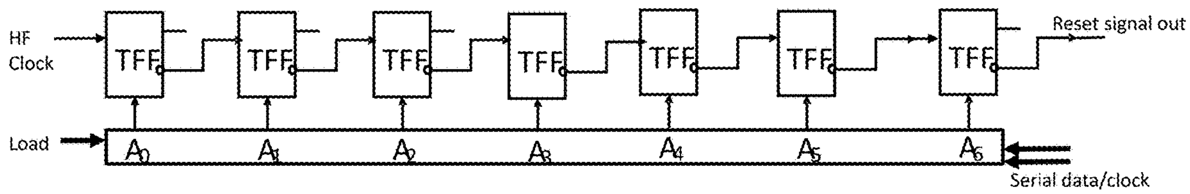
FIG. 15 shows a block diagram of a programmable pulse counter.

The counter can be a fixed frequency divider, based on a simple chain of N T-flip-flops (TFFs), well known in the prior art, which generates $2^N$ SFQ pulses. Alternatively, a programmable counter such as that in FIG. 15 can be used, which can generate an arbitrary programmable number of SFQ pulses up to $2^N$. This also comprises a series of N TFFs (where N=6 in FIG. 14C), linked to a serially programmable non-destructive readout (NDRO) register.

Figure 16A:
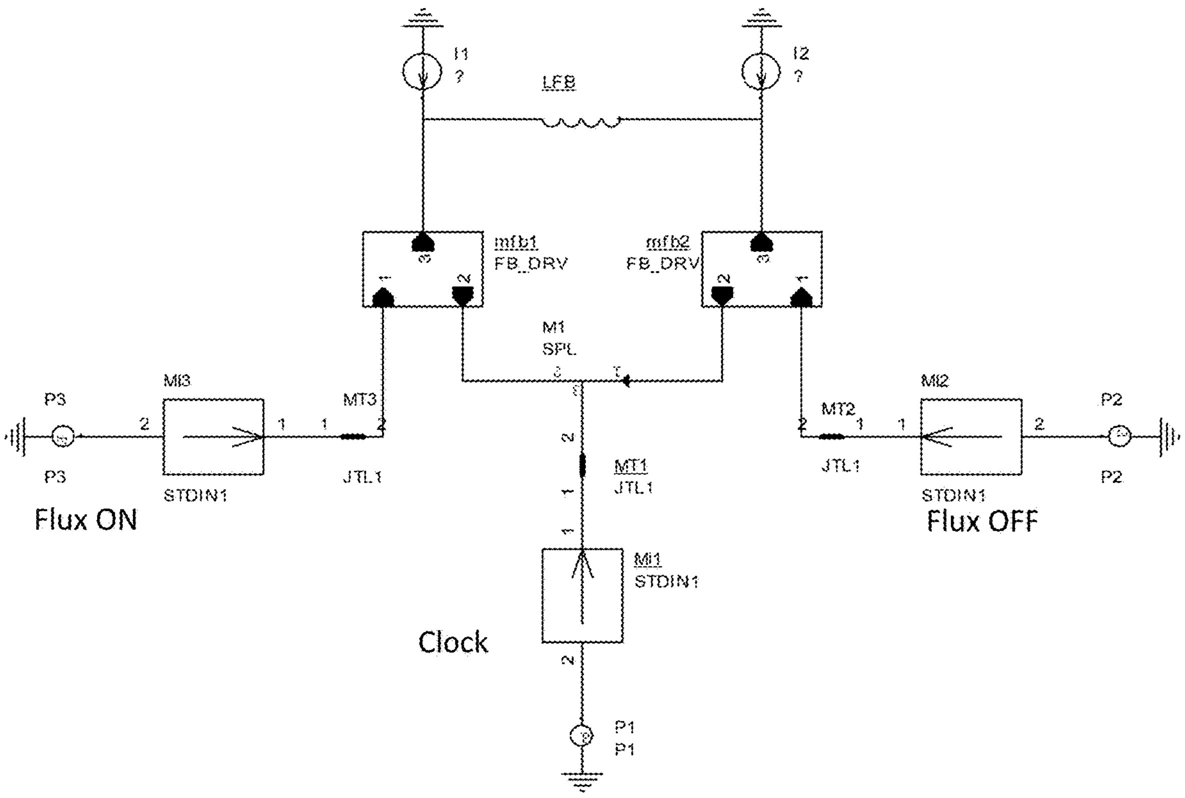
FIG. 16A shows a top-level schematic of a prototype SFQ flux bias circuit.

Portions of the schematic hierarchy for a prototype flux bias control circuit based on FIGS. 12A-12D are shown in FIGS. 16A, 16B, 16C, and 16D. FIG. 16A shows the components of the overall bipolar flux control circuit, including the positive and negative flux channels (Flux ON and Flux OFF), two identical flux bias drivers (FB_DRV), a synchronizing clock generator with a splitter for clock distribution, and an output flux bias inductor LFB. This output inductor would couple flux to a qubit or coupler, but the quantum circuit is not included in this prototype demonstration circuit.

Figure 16B:
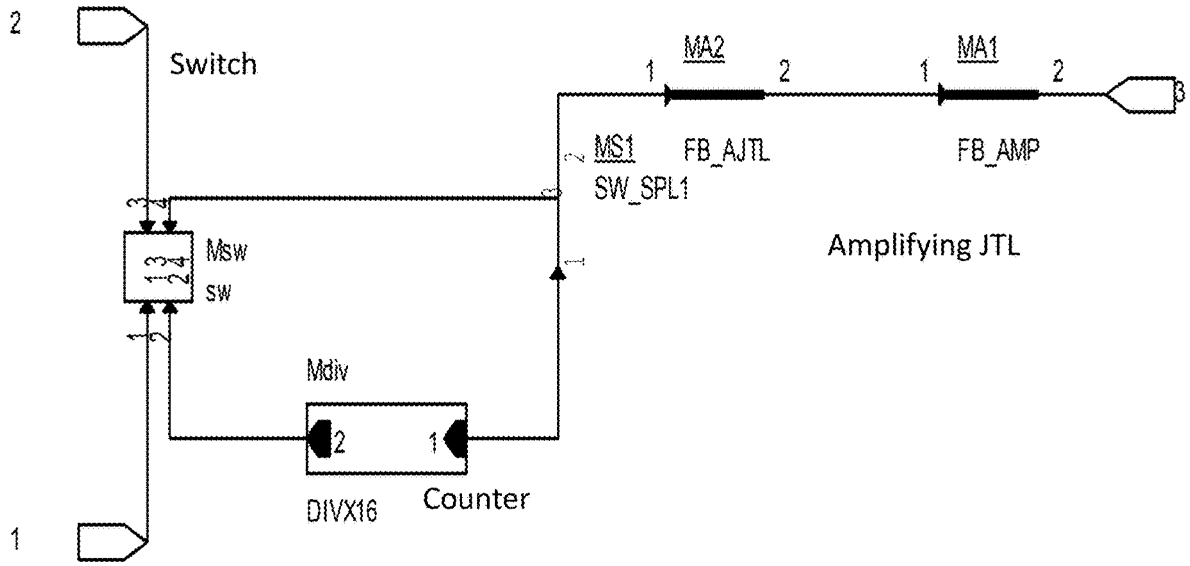
FIG. 16B shows a schematic of the flux generating circuit from FIG. 16A.
Figure 16C:
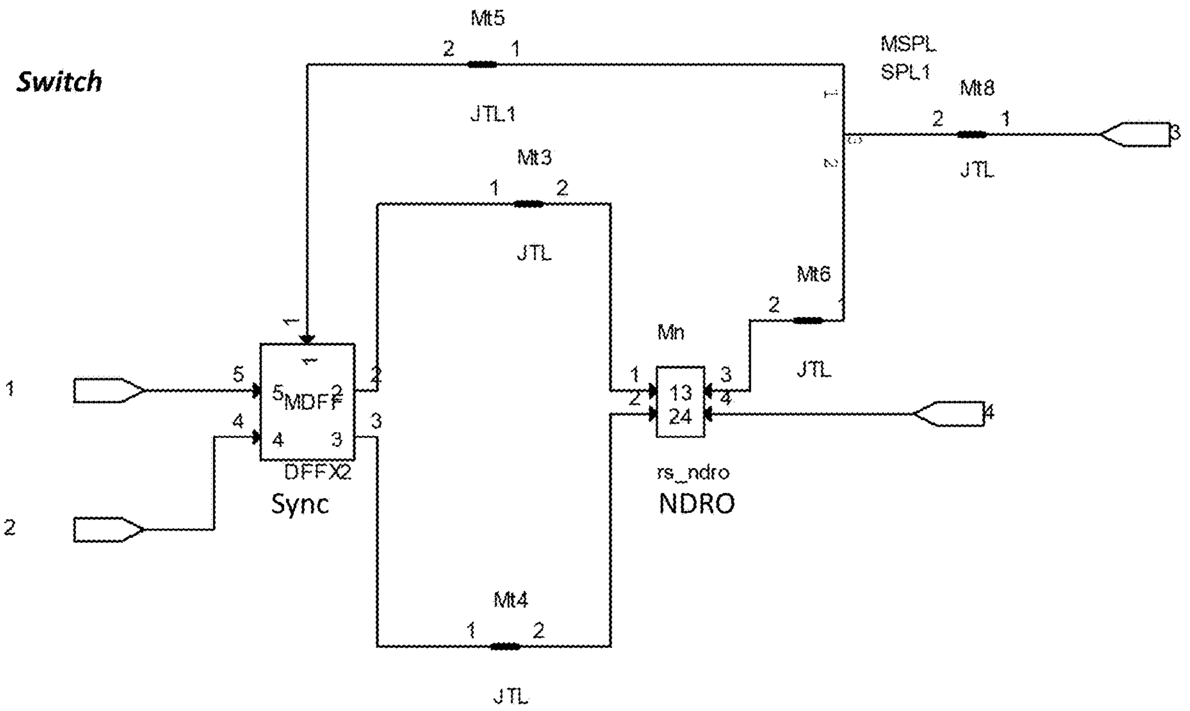
FIG. 16C shows a schematic of the switch from FIG. 16B.
Figure 16D:
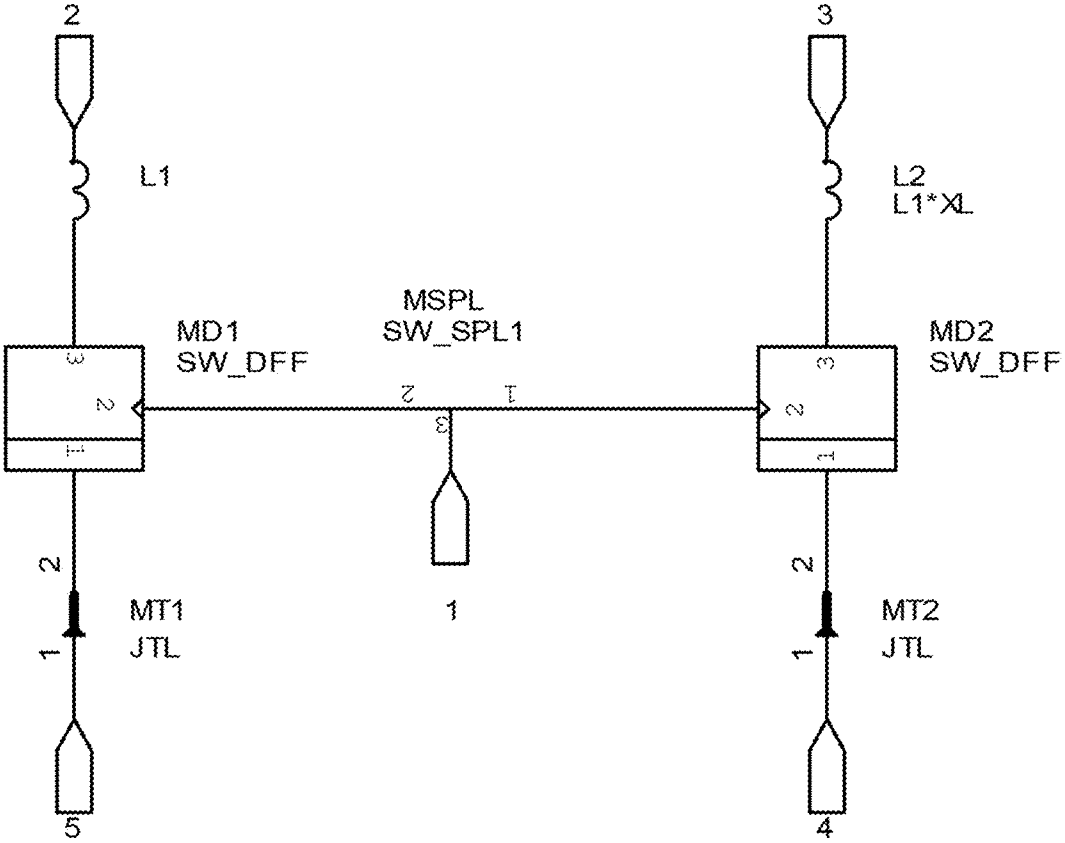
FIG. 16D shows a schematic of the synchronizer component of the switch from FIG. 16C.

FIG. 16B provides a more detailed schematic of the flux bias driver FB_DRV, including a switch, a 16-bit counter, and an amplifying JTL, as shown in the blocks in FIG. 11. The switch is further expanded in FIG. 16C, comprising a synchronizer circuit SYNC and a storage register NDRO. Finally in FIG. 16D, the SYNC circuit is shown to comprise two D-flip-flops (DFF) that are well known in the prior art.

Figure 17:
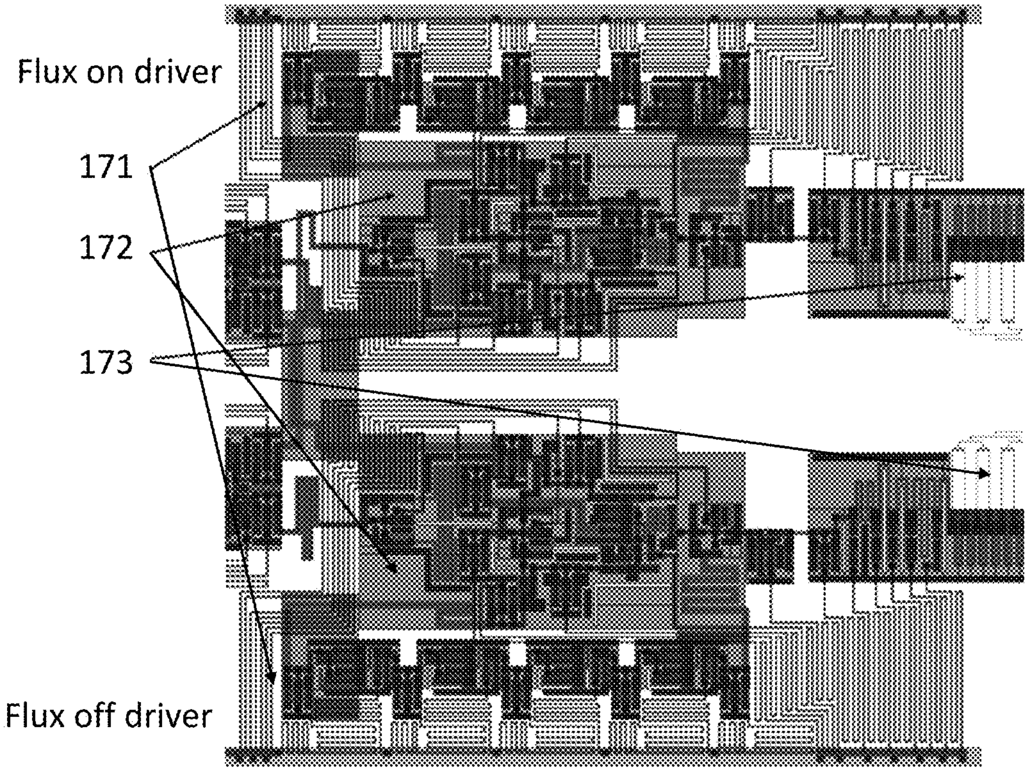
FIG. 17 shows a circuit layout of a prototype SFQ flux bias circuit.

The circuits of FIGS. 16A-16D were laid out on chip using a standard integrated circuit design tool, and parts of this chip layout are shown in FIG. 17. This includes the Flux on and Flux off Bias Drivers, with components counter 171 (×16), switch 172, and JTL current amplifier 173.

Figure 18:
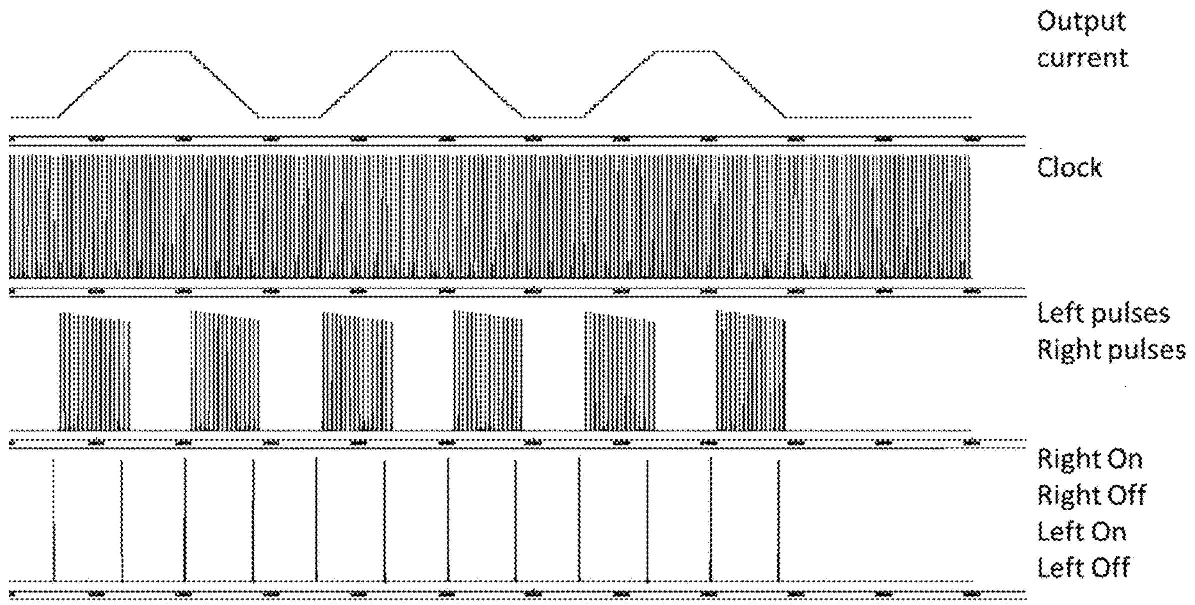
FIG. 18 shows a simulation of operation of the prototype SFQ flux bias circuit.

The operation of the circuit in FIGS. 16A-16D was simulated, and several inputs and outputs are shown in FIG. 18. The plot on top shows several periods of the output current (and hence the flux bias) being ramped up and down. Below this is the clock signal, the alternating flux pulses from the left and right sides (positive and negative flux), and the trigger pulses for the two sides.

Figure 19:
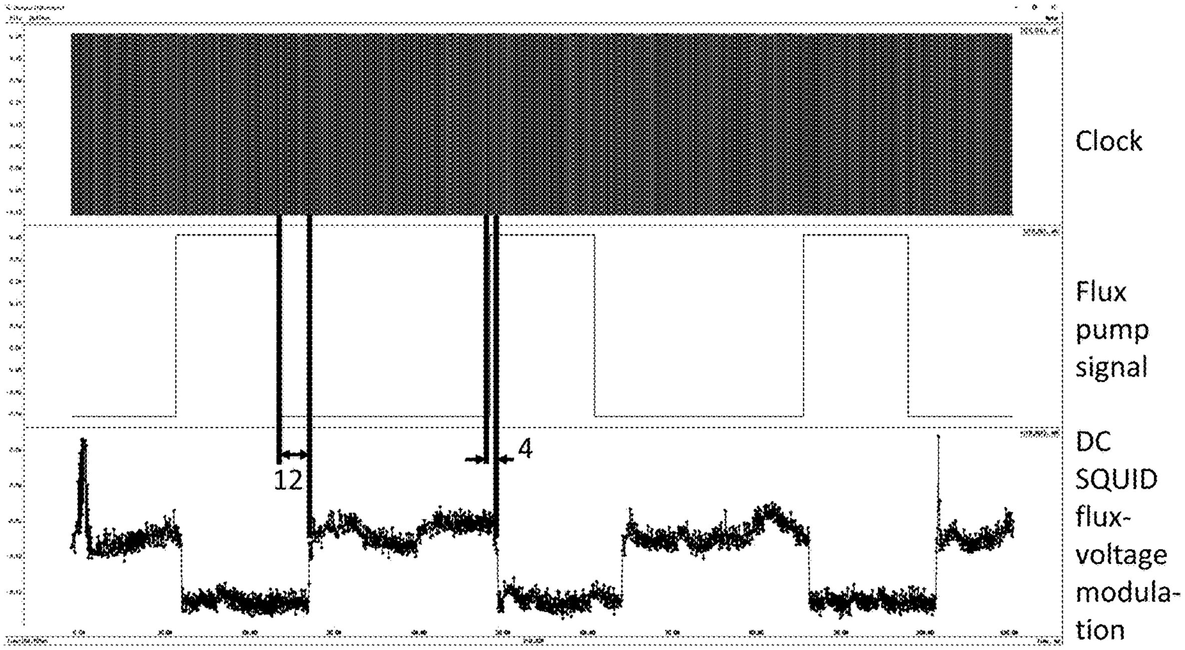
FIG. 19 shows experimental measurements of the prototype SFQ bias circuit.

A chip based on the layout of FIG. 17 was fabricated using niobium Josephson junction technology, cooled to about 4 K, below the superconducting critical temperature, and tested. Preliminary results are shown in FIG. 19, which shows the clock inputs, the flux pump inputs, and a magnetic flux output as measured by a DC SQUID. Although this was a preliminary low-frequency test, the circuit demonstrated the expected functionality.

Similar superconducting circuits would be expected to exhibit similar performance at high speed, at reduced cryogenic temperatures in the mK range, with flux bias linked to a superconducting qubit or inter-qubit coupler.

The invention claimed is:

1. A system for controlling a qubit having a qubit energy, comprising:

a first circuit configured to receive at least one control signal, to generate at least one sequence of single-flux-quantum pulses, and to selectively integrate the sequence of single-flux-quantum pulses into an integrated magnetic flux in a loop in dependence on the at least one control signal; and a second circuit configured to determine at least one of the integrated magnetic flux, and a performance metric of a qubit coupled to the integrated magnetic flux, having an output.

2. The circuit according to claim 1, further comprising a third circuit configured to receive the output of the second circuit and to generate the at least one control signal.

3. The system according to claim 1, wherein the first circuit is a superconducting circuit configured to generate the at least one sequence of single flux quantum pulses from a Josephson junction at cryogenic temperatures.

4. The system according to claim 1, wherein the first circuit comprises a plurality of Josephson junctions, configured as to increase the integrated magnetic flux in the loop with a flux-on circuit, and to decrease the integrated magnetic flux in the loop with a flux-off circuit.

5. The system according to claim 1, wherein the first circuit comprises a pair of output ports configured to produce a first signal configured to increase the integrated magnetic flux and a second signal adapted to decrease the integrated magnetic flux.

6. The system according to claim 1, further comprising a qubit, whose state is represented by a phase and an amplitude of a Bloch sphere, coupled to the integrated magnetic flux, wherein the phase and amplitude of the Bloch sphere are responsive to the integrated magnetic flux.

7. The system according to claim 5, wherein at least one of a microwave resonance, an energy, and a phase of the qubit is dependent on the integrated magnetic flux.

8. The system according to claim 1, further comprising a tunable qubit coupler for a qubit having at least one physical property tunable dependent on at least the integrated magnetic flux, wherein the integrated magnetic flux is coupled with the tunable qubit coupler to alter a property of the qubit.

9. The system according to claim 1, further comprising a switched qubit coupler configured to selectively control a presence and an absence of an interaction of a plurality of qubits.

10. The system according to claim 1, further comprising a frequency mixer and detector configured to receive an output of at least one qubit and to control the first circuit.

11. The system according to claim 1, wherein the qubit comprises a transmon qubit, and the first circuit is configured to, within a quantum calculation period of the qubit, define a first microwave resonant frequency of the qubit with the integrated magnetic flux, and subsequently define a second microwave resonant frequency of the qubit by changing the integrated magnetic flux, wherein the first microwave resonant frequency and the second microwave resonant frequency are different.

12. The system according to claim 1, wherein the first circuit further comprises a first input port configured to receive a reference frequency signal, a second input port configured to receive a microwave resonance signal from the qubit, and a comparing circuit configured to produce a comparison output configured to control the integrated magnetic flux to selectively change the integrated magnetic flux in response to the comparison output.

13. The system according to claim 1, wherein the first circuit is further configured to receive a signal representing a calculation state of the qubit, and control the first circuit dependent on the calculation state of the qubit.

14. The system according to claim 1, wherein the at least one sequence of single-flux-quantum pulses comprises a first sequence of single-flux-quantum pulses having a first amplitude, and a second sequence of single-flux-quantum pulses having a second amplitude.

15. The system according to claim 1, further comprising a superconducting digital circuit counter comprising Josephson junctions and being configured to count single-flux-quantum pulses and to determine whether a number of single-flux-quantum pulses has reached a target value representing a target integrated magnetic flux.

16. The system according to claim 1, further comprising a comparator configured to determine a relationship of the integrated magnetic flux to a target integrated magnetic flux.

17. The system according to claim 1, wherein the first circuit is configured to implement at least one of a frequency locked loop control with a detector configured to determine a relationship between a microwave frequency associated with the qubit and a reference microwave frequency.

18. A method for controlling a qubit having a qubit energy, comprising:

generating at least one control signal dependent on at least one of an integrated magnetic flux, and a performance metric of a qubit coupled to the integrated magnetic flux; and integrating at least one sequence of single-flux-quantum pulses into the integrated magnetic flux in a loop selectively dependent on the at least one control signal.

19. The method according to claim 18, wherein a state of a qubit is represented by a phase and an amplitude of a Bloch sphere, the qubit being coupled to the integrated magnetic flux, further comprising changing the phase and amplitude of the Bloch sphere responsive to changes of the integrated magnetic flux.

20. A control system for a transmon qubit, comprising:

an inductive loop configured to integrate a series of single-flux-quantum pulses into an integrated magnetic flux;

a coupling circuit configured to couple the integrated magnetic flux with the transmon qubit;

a sensor configured to determine a resonance frequency of the transmon qubit;

a control configured to control a value of the integrated magnetic flux dependent on the sensor output.

* * * * *